(12) United States Patent
Allen

(10) Patent No.: US 7,461,116 B2
(45) Date of Patent: Dec. 2, 2008

(54) EMULATION OF A FIXED POINT OPERATION USING A CORRESPONDING FLOATING POINT OPERATION

(75) Inventor: John R Allen, Los Altos, CA (US)

(73) Assignee: Agility Design Solutions Inc., Palo Alto, CA (US)

(*) Notice: Subject to any disclaimer, the term of this patent is extended or adjusted under 35 U.S.C. 154(b) by 692 days.

(21) Appl. No.: 10/665,999

(22) Filed: Sep. 17, 2003

(65) Prior Publication Data

US 2005/0065990 A1    Mar. 24, 2005

(51) Int. Cl.
*G06F 7/38* (2006.01)
*G06F 9/455* (2006.01)

(52) U.S. Cl. .......................... 708/495; 703/26
(58) Field of Classification Search ............... 708/204, 708/495; 703/204, 495, 26, 27
See application file for complete search history.

(56) References Cited

U.S. PATENT DOCUMENTS

| | | | |
|---|---|---|---|
| 5,222,037 A | 6/1993 | Taniquchi | |
| 6,173,247 B1 | 1/2001 | Maurudis et al. | |
| 6,266,769 B1 * | 7/2001 | Abdallah et al. | 712/221 |
| 6,460,177 B1 | 10/2002 | Lee | |
| 6,671,796 B1 * | 12/2003 | Sudharsanan et al. | 712/222 |
| 2003/0065698 A1 * | 4/2003 | Ford | 708/495 |

OTHER PUBLICATIONS

P. Banerjee, "An Overview of the AccelFPGA Compiler for Mapping MATLAB Programs onto FPGAs", Prith Banerjee—UC Berkeley Talk, Nov. 6, 2002, pp. 1-33.
M. Groden, Automatic RTL Conversion of DSP Algorithms for a Channelized Wideband Receiver, Int'l Signal Processing Conference, Apr. 2003, Dallas, TX, pp. 1-5.

"Filter Design Toolbox" For Use with MATLAB, User's Guide, Version 2, Chapter 5 "Quantization and Quantized Filtering" pp. 5.2-5.26, Chapter 6, "Working with Objects" pp. 6.1-6.10, Chapter 7, Quantizers and Unit Quantizers, pp. 7.2-7.10, Chapter 8, "Working with Quantized Filters", pp. 8.1-8.16, Chapter 9, "Working with Quantized FFTs", pp. 9.1-9.10, Chapter 10, "Quantized Filtering Analysis Examples", pp. 10.1-10.26, Jun. 2001.

(Continued)

*Primary Examiner*—Chuong D Ngo
(74) *Attorney, Agent, or Firm*—Silicon Valley Patent Group LLP; Omkar Suryadevara

(57) ABSTRACT

A computer is programmed to emulate a fixed-point operation that is normally performed on fixed-point operands, by use of a floating-point operation that is normally performed on floating-point operands. Several embodiments of the just-described computer emulate a fixed-point operation by: expanding at least one fixed-point operand into a floating-point representation (also called "floating-point equivalent"), performing, on the floating-point equivalent, a floating-point operation that corresponds to the fixed-point operation, and reducing a floating-point result into a fixed-point result. The just-described fixed-point result may have the same representation as the fixed-point operand(s) and/or any user-specified fixed-point representation, depending on the embodiment. Also depending on the embodiment, the operands and the result may be either real or complex, and may be either scalar or vector. The above-described emulation may be performed either with an interpreter or with a compiler, depending on the embodiment. A conventional interpreter for an object-oriented language (such as MATLAB version 6) may be extended with a toolbox to perform the emulation. Use of type propagation and operator overloading minimizes the number of changes that a user must make to their program, in order to be able to use such emulation.

85 Claims, 40 Drawing Sheets

OTHER PUBLICATIONS

Eaton, J. W. "GNU Octave Manual", Network Theory Limited, United Kingdom, 2002.
"MATLAB: The Language of Technical Computing—Using MATLAB Version 6", The Mathworks, Inc., 2002.
Allen R. et al. Chapter 4.4 in the book "Optimizing Compilers for Modern Architectures", 2002, Academic Press, USA, pp. 141-153.
Chapter 7 "Floating Point Unit" from "Intel Architecture Software Developer's Manual", vol. 1: Basic Architecture, 1997, pp. 59.

* cited by examiner

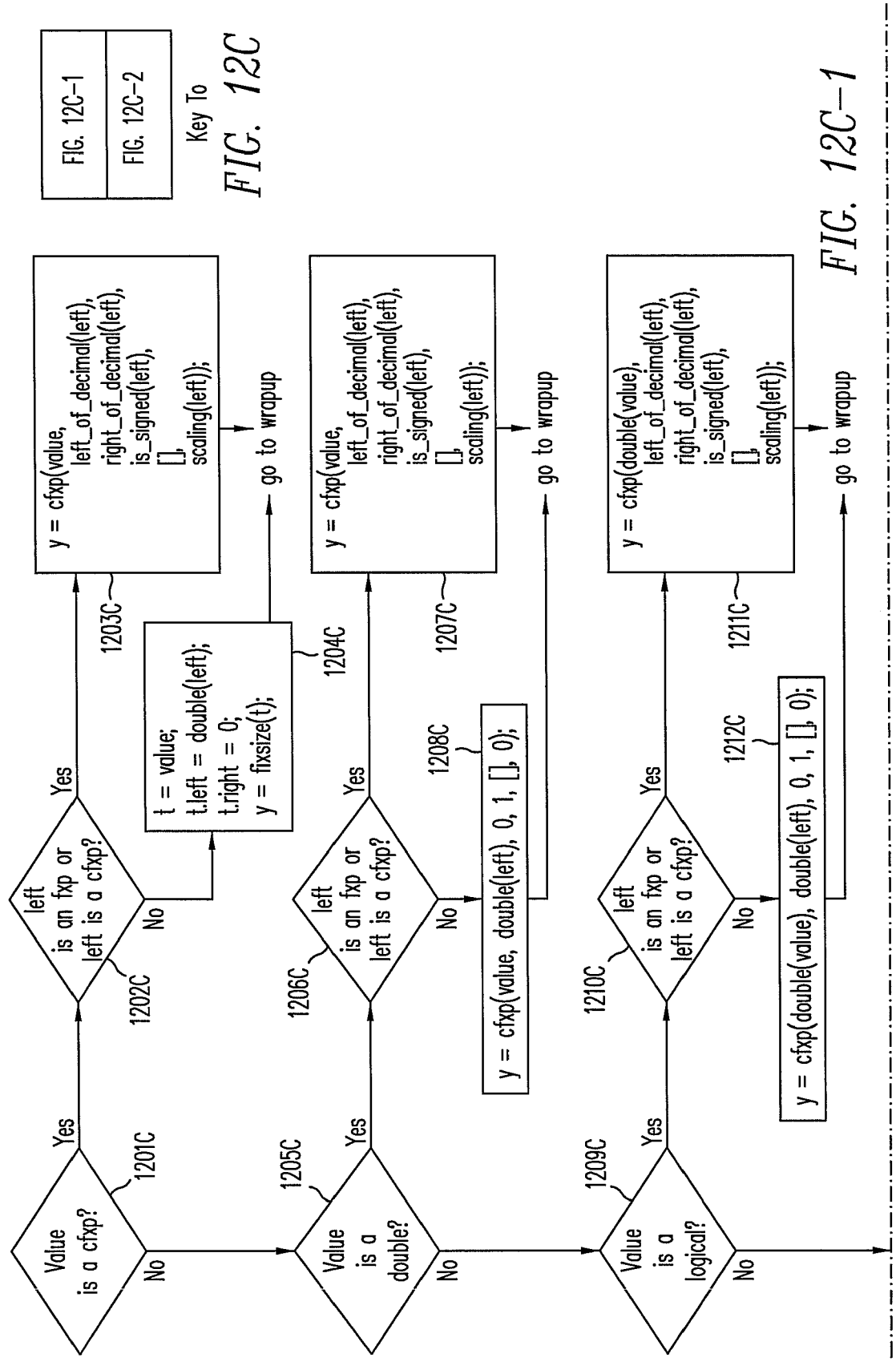

EMULATION OF A FIXED POINT OPERATION USING A CORRESPONDING FLOATING POINT OPERATION

CROSS-REFERENCE TO COMPUTER PROGRAM LISTING APPENDIX

Appendix C contains the following files in one CD-ROM (of which two identical copies are attached hereto), and is a part of the present disclosure and is incorporated by reference herein in its entirety.

| File | Size | Date |
|---|---|---|
| 0000.txt | 1519 | Aug 22 12:31 |
| 0001.txt | 676 | Aug 22 12:31 |
| 0002.txt | 1433 | Aug 22 12:31 |
| 0003.txt | 1444 | Aug 22 12:31 |
| 0004.txt | 1569 | Aug 22 12:31 |
| 0005.txt | 849 | Aug 22 12:31 |
| 0006.txt | 779 | Aug 22 12:31 |
| 0007.txt | 3312 | Aug 22 12:31 |
| 0008.txt | 1546 | Aug 22 12:31 |
| 0009.txt | 857 | Aug 22 12:31 |
| 0010.txt | 2624 | Aug 22 12:31 |
| 0011.txt | 2817 | Aug 22 12:31 |
| 0012.txt | 2815 | Aug 22 12:31 |
| 0013.txt | 2605 | Aug 22 12:31 |
| 0014.txt | 1437 | Aug 22 12:31 |
| 0015.txt | 1445 | Aug 22 12:31 |
| 0016.txt | 982 | Aug 22 12:31 |
| 0017.txt | 1425 | Aug 22 12:31 |
| 0018.txt | 1444 | Aug 22 12:31 |
| 0019.txt | 3245 | Aug 22 12:31 |
| 0020.txt | 4782 | Aug 22 12:31 |
| 0021.txt | 3183 | Aug 22 12:31 |
| 0022.txt | 2309 | Aug 22 12:31 |
| 0023.txt | 4811 | Aug 22 12:31 |
| 0024.txt | 1618 | Aug 22 12:31 |
| 0025.txt | 1733 | Aug 22 12:31 |
| 0026.txt | 4914 | Aug 22 12:31 |
| 0027.txt | 1724 | Aug 22 12:31 |
| 0028.txt | 752 | Aug 22 12:31 |
| 0029.txt | 1389 | Aug 22 12:31 |
| 0030.txt | 10903 | Aug 22 12:31 |
| 0031.txt | 850 | Aug 22 12:31 |
| 0032.txt | 858 | Aug 22 12:31 |
| 0033.txt | 2005 | Aug 22 12:31 |
| 0034.txt | 2885 | Aug 22 12:31 |
| 0035.txt | 2819 | Aug 22 12:31 |
| 0036.txt | 1963 | Aug 22 12:31 |
| 0037.txt | 2961 | Aug 22 12:31 |
| 0038.txt | 2823 | Aug 22 12:31 |
| 0039.txt | 1493 | Aug 22 12:31 |
| 0040.txt | 1323 | Aug 22 12:31 |
| 0041.txt | 9493 | Aug 22 12:31 |
| 0042.txt | 1235 | Aug 22 12:31 |
| 0043.txt | 1489 | Aug 22 12:31 |
| 0044.txt | 2085 | Aug 22 12:31 |
| 0045.txt | 1929 | Aug 22 12:31 |
| 0046.txt | 1345 | Aug 22 12:31 |
| 0047.txt | 943 | Aug 22 12:31 |
| 0048.txt | 5416 | Aug 22 12:31 |
| 0049.txt | 880 | Aug 22 12:31 |
| 0050.txt | 1653 | Aug 22 12:31 |
| 0051.txt | 1234 | Aug 22 12:31 |
| 0052.txt | 1337 | Aug 22 12:31 |
| 0053.txt | 5043 | Aug 22 12:31 |
| 0054.txt | 4471 | Aug 22 12:31 |
| 0055.txt | 4414 | Aug 22 12:31 |
| 0056.txt | 1482 | Aug 22 12:31 |
| 0057.txt | 2067 | Aug 22 12:31 |
| 0058.txt | 1365 | Aug 22 12:31 |
| 0059.txt | 1383 | Aug 22 12:31 |
| 0060.txt | 4423 | Aug 22 12:31 |
| 0061.txt | 1036 | Aug 22 12:31 |
| 0062.txt | 1229 | Aug 22 12:31 |
| 0063.txt | 1004 | Aug 22 12:31 |
| 0064.txt | 3406 | Aug 22 12:31 |
| 0065.txt | 3429 | Aug 22 12:31 |
| 0066.txt | 1034 | Aug 22 12:31 |
| 0067.txt | 1478 | Aug 22 12:31 |
| 0068.txt | 1721 | Aug 22 12:31 |
| 0069.txt | 998 | Aug 22 12:31 |
| 0070.txt | 949 | Aug 22 12:31 |
| 0071.txt | 979 | Aug 22 12:31 |
| 0072.txt | 804 | Aug 22 12:31 |
| 0073.txt | 1018 | Aug 22 12:31 |
| 0074.txt | 899 | Aug 22 12:31 |
| 0075.txt | 1816 | Aug 22 12:31 |
| 0076.txt | 881 | Aug 22 12:31 |
| 0077.txt | 1334 | Aug 22 12:31 |
| 0078.txt | 1154 | Aug 22 12:31 |
| 0079.txt | 1024 | Aug 22 12:31 |
| 0080.txt | 970 | Aug 22 12:31 |
| 0081.txt | 976 | Aug 22 12:31 |
| 0082.txt | 15636 | Aug 22 12:31 |
| 0083.txt | 1366 | Aug 22 12:31 |
| 0084.txt | 822 | Aug 22 12:31 |
| 0085.txt | 531 | Aug 22 12:31 |
| 0086.txt | 3544 | Aug 22 12:31 |
| 0087.txt | 3535 | Aug 22 12:31 |
| 0088.txt | 2069 | Aug 22 12:31 |
| 0089.txt | 3573 | Aug 22 12:31 |
| 0090.txt | 1067 | Aug 22 12:31 |
| 0091.txt | 1355 | Aug 22 12:31 |
| 0092.txt | 1647 | Aug 22 12:31 |
| 0093.txt | 1159 | Aug 22 12:31 |
| 0094.txt | 1188 | Aug 22 12:31 |
| 0095.txt | 967 | Aug 22 12:31 |
| 0096.txt | 1224 | Aug 22 12:31 |
| 0097.txt | 5262 | Aug 22 12:31 |
| 0098.txt | 1259 | Aug 22 12:31 |
| 0099.txt | 2624 | Aug 22 12:31 |
| 0100.txt | 2819 | Aug 22 12:31 |
| 0101.txt | 971 | Aug 22 12:31 |
| 0102.txt | 2815 | Aug 22 12:31 |
| 0103.txt | 1167 | Aug 22 12:31 |
| 0104.txt | 3223 | Aug 22 12:31 |
| 0105.txt | 2913 | Aug 22 12:31 |
| 0106.txt | 5098 | Aug 22 12:31 |
| 0107.txt | 1118 | Aug 22 12:31 |
| 0108.txt | 871 | Aug 22 12:31 |
| 0109.txt | 785 | Aug 22 12:31 |
| 0110.txt | 1334 | Aug 22 12:31 |
| 0111.txt | 833 | Aug 22 12:31 |
| 0112.txt | 1034 | Aug 22 12:31 |
| 0113.txt | 1644 | Aug 22 12:31 |
| 0114.txt | 764 | Aug 22 12:31 |
| 0115.txt | 650 | Aug 22 12:31 |
| 0116.txt | 684 | Aug 22 12:31 |
| 0117.txt | 994 | Aug 22 12:31 |
| 0118.txt | 1160 | Aug 22 12:31 |
| 0119.txt | 775 | Aug 22 12:31 |
| 0120.txt | 2261 | Aug 22 12:31 |
| 0121.txt | 2927 | Aug 22 12:31 |
| 0122.txt | 2202 | Aug 22 12:31 |
| 0123.txt | 3211 | Aug 22 12:31 |
| 0124.txt | 3006 | Aug 22 12:31 |
| 0125.txt | 2269 | Aug 22 12:31 |
| 0126.txt | 3404 | Aug 22 12:31 |
| 0127.txt | 5122 | Aug 22 12:31 |
| 0128.txt | 1681 | Aug 22 12:31 |
| 0129.txt | 4902 | Aug 22 12:31 |
| 0130.txt | 4838 | Aug 22 12:31 |
| 0131.txt | 13109 | Aug 22 12:31 |
| 0132.txt | 1234 | Aug 22 12:31 |
| 0133.txt | 1771 | Aug 22 12:31 |
| 0134.txt | 5544 | Aug 22 12:31 |
| 0135.txt | 1166 | Aug 22 12:31 |
| 0136.txt | 3332 | Aug 22 12:31 |
| 0137.txt | 1325 | Aug 22 12:31 |
| 0138.txt | 1550 | Aug 22 12:31 |
| 0139.txt | 2031 | Aug 22 12:31 |
| 0140.txt | 2097 | Aug 22 12:31 |
| 0141.txt | 1277 | Aug 22 12:31 |
| 0142.txt | 3317 | Aug 22 12:31 |
| 0143.txt | 4519 | Aug 22 12:31 |

-continued

| | | |
|---|---|---|
| 0144.txt | 4132 | Aug 22 12:31 |
| 0145.txt | 1140 | Aug 22 12:31 |
| 0146.txt | 1916 | Aug 22 12:31 |
| 0147.txt | 698 | Aug 22 12:31 |
| 0148.txt | 1778 | Aug 22 12:31 |
| 0149.txt | 4238 | Aug 22 12:31 |
| 0150.txt | 3712 | Aug 22 12:31 |
| 0151.txt | 1385 | Aug 22 12:31 |
| 0152.txt | 4577 | Aug 22 12:31 |
| 0153.txt | 958 | Aug 22 12:31 |
| 0154.txt | 2944 | Aug 22 12:31 |
| 0155.txt | 4983 | Aug 22 12:31 |
| 0156.txt | 5481 | Aug 22 12:31 |
| 0157.txt | 3315 | Aug 22 12:31 |
| 0158.txt | 1026 | Aug 22 12:31 |
| 0159.txt | 1165 | Aug 22 12:31 |
| 0160.txt | 1047 | Aug 22 12:31 |
| 0161.txt | 3902 | Aug 22 12:31 |
| 0162.txt | 1115 | Aug 22 12:31 |
| 0163.txt | 1385 | Aug 22 12:31 |
| 0164.txt | 1969 | Aug 22 12:31 |
| 0165.txt | 1341 | Aug 22 12:31 |
| 0166.txt | 1003 | Aug 22 12:31 |
| 0167.txt | 1541 | Aug 22 12:31 |
| 0168.txt | 1285 | Aug 22 12:31 |
| 0169.txt | 1146 | Aug 22 12:31 |
| 0170.txt | 4394 | Aug 22 12:31 |
| 0171.txt | 4119 | Aug 22 12:31 |
| 0172.txt | 2819 | Aug 22 12:31 |
| 0173.txt | 2815 | Aug 22 12:31 |
| 0174.txt | 707 | Aug 22 12:31 |
| 0175.txt | 3194 | Aug 22 12:31 |
| 0176.txt | 6241 | Aug 22 12:31 |
| 0177.txt | 2009 | Aug 22 12:31 |
| 0178.txt | 1298 | Aug 22 12:31 |
| 0179.txt | 1305 | Aug 22 12:31 |
| 0180.txt | 1076 | Aug 22 12:31 |
| 0181.txt | 1900 | Aug 22 12:31 |
| 0182.txt | 1645 | Aug 22 12:31 |
| 0183.txt | 2116 | Aug 22 12:31 |
| 0184.txt | 3454 | Aug 22 12:31 |
| 0185.txt | 3107 | Aug 22 12:31 |
| 0186.txt | 2625 | Aug 22 12:31 |
| 0187.txt | 2817 | Aug 22 12:31 |
| 0188.txt | 2815 | Aug 22 12:31 |
| 0189.txt | 2610 | Aug 22 12:31 |
| 0190.txt | 1227 | Aug 22 12:31 |
| 0191.txt | 1343 | Aug 22 12:31 |
| 0192.txt | 1248 | Aug 22 12:31 |
| 0193.txt | 749 | Aug 22 12:31 |
| 0194.txt | 2837 | Aug 22 12:31 |
| 0195.txt | 1691 | Aug 22 12:31 |
| 0196.txt | 12691 | Aug 22 12:31 |
| 0197.txt | 635 | Aug 22 12:31 |
| 0198.txt | 711 | Aug 22 12:31 |
| 0199.txt | 753 | Aug 22 12:31 |
| 0200.txt | 7952 | Aug 22 12:31 |
| 0201.txt | 723 | Aug 22 12:31 |
| 0202.txt | 985 | Aug 22 12:31 |
| 0203.txt | 1355 | Aug 22 12:31 |
| 0204.txt | 1481 | Aug 22 12:31 |
| 0205.txt | 4133 | Aug 22 12:31 |
| 0206.txt | 1149 | Aug 22 12:31 |
| 0207.txt | 753 | Aug 22 12:31 |
| 0208.txt | 3024 | Aug 22 12:31 |
| 0209.txt | 1842 | Aug 22 12:31 |
| 0210.txt | 2985 | Aug 22 12:31 |
| 0211.txt | 948 | Aug 22 12:31 |
| 0212.txt | 2564 | Aug 22 12:31 |
| 0213.txt | 821 | Aug 22 12:31 |
| 0214.txt | 1835 | Aug 22 12:31 |
| 0215.txt | 1001 | Aug 22 12:31 |
| 0216.txt | 825 | Aug 22 12:31 |
| 0217.txt | 4733 | Aug 22 12:31 |
| 0218.txt | 2824 | Aug 22 12:31 |
| 0219.txt | 2819 | Aug 22 12:31 |
| 0220.txt | 3510 | Aug 22 12:31 |
| 0221.txt | 1225 | Aug 22 12:31 |
| 0222.txt | 5013 | Aug 22 12:31 |
| 0223.txt | 5614 | Aug 22 12:31 |
| 0224.txt | 994 | Aug 22 12:31 |
| 0225.txt | 1752 | Aug 22 12:31 |
| 0226.txt | 945 | Aug 22 12:31 |
| 0227.txt | 982 | Aug 22 12:31 |
| 0228.txt | 3158 | Aug 22 12:31 |
| 0229.txt | 1071 | Aug 22 12:31 |
| 0230.txt | 1132 | Aug 22 12:31 |
| 0231.txt | 1194 | Aug 22 12:31 |
| 0232.txt | 2470 | Aug 22 12:31 |
| 0233.txt | 1385 | Aug 22 12:31 |
| 0234.txt | 1232 | Aug 22 12:31 |
| 0235.txt | 756 | Aug 22 12:31 |
| 0236.txt | 1158 | Aug 22 12:31 |
| 0237.txt | 906 | Aug 22 12:31 |
| 0238.txt | 653 | Aug 22 12:31 |
| 0239.txt | 896 | Aug 22 12:31 |
| 0240.txt | 635 | Aug 22 12:31 |
| 0241.txt | 808 | Aug 22 12:31 |
| 0242.txt | 891 | Aug 22 12:31 |
| 0243.txt | 796 | Aug 22 12:31 |
| 0244.txt | 845 | Aug 22 12:31 |
| 0245.txt | 1730 | Aug 22 12:31 |
| 0246.txt | 992 | Aug 22 12:31 |
| 0247.txt | 1128 | Aug 22 12:31 |
| 0248.txt | 540 | Aug 22 12:31 |
| 0249.txt | 659 | Aug 22 12:31 |
| 0250.txt | 2009 | Aug 22 12:31 |
| 0251.txt | 2880 | Aug 22 12:31 |
| 0252.txt | 2816 | Aug 22 12:31 |
| 0253.txt | 649 | Aug 22 12:31 |
| 0254.txt | 1806 | Aug 22 12:31 |
| 0255.txt | 648 | Aug 22 12:31 |
| 0256.txt | 1186 | Aug 22 12:31 |
| 0257.txt | 1969 | Aug 22 12:31 |
| 0258.txt | 2693 | Aug 22 12:31 |
| 0259.txt | 2823 | Aug 22 12:31 |
| 0260.txt | 1396 | Aug 22 12:31 |
| 0261.txt | 838 | Aug 22 12:31 |
| 0262.txt | 693 | Aug 22 12:31 |
| 0263.txt | 1753 | Aug 22 12:31 |
| 0264.txt | 986 | Aug 22 12:31 |
| 0265.txt | 1324 | Aug 22 12:31 |
| 0266.txt | 2250 | Aug 22 12:31 |
| 0267.txt | 711 | Aug 22 12:31 |
| 0268.txt | 653 | Aug 22 12:31 |
| 0269.txt | 751 | Aug 22 12:31 |
| 0270.txt | 756 | Aug 22 12:31 |
| 0271.txt | 2056 | Aug 22 12:31 |
| 0272.txt | 999 | Aug 22 12:31 |
| 0273.txt | 639 | Aug 22 12:31 |
| 0274.txt | 2406 | Aug 22 12:31 |
| 0275.txt | 1437 | Aug 22 12:31 |
| 0276.txt | 1366 | Aug 22 12:31 |
| 0277.txt | 4556 | Aug 22 12:31 |
| 0278.txt | 4599 | Aug 22 12:31 |
| 0279.txt | 957 | Aug 22 12:31 |
| 0280.txt | 3589 | Aug 22 12:31 |
| 0281.txt | 850 | Aug 22 12:31 |
| 0282.txt | 858 | Aug 22 12:31 |
| 0283.txt | 655 | Aug 22 12:31 |
| 0284.txt | 647 | Aug 22 12:31 |
| 0285.txt | 1784 | Aug 22 12:31 |
| 0286.txt | 827 | Aug 22 12:31 |
| 0287.txt | 651 | Aug 22 12:31 |
| 0288.txt | 635 | Aug 22 12:31 |
| 0289.txt | 1072 | Aug 22 12:31 |
| 0290.txt | 662 | Aug 22 12:31 |
| 0291.txt | 655 | Aug 22 12:31 |
| 0292.txt | 647 | Aug 22 12:31 |
| 0293.txt | 815 | Aug 22 12:31 |
| 0294.txt | 809 | Aug 22 12:31 |
| 0295.txt | 1307 | Aug 22 12:31 |
| 0296.txt | 2620 | Aug 22 12:31 |
| 0297.txt | 3655 | Aug 22 12:31 |
| 0298.txt | 3025 | Aug 22 12:31 |
| 0299.txt | 2817 | Aug 22 12:31 |
| 0300.txt | 1320 | Aug 22 12:31 |
| 0301.txt | 2955 | Aug 22 12:31 |

-continued

| | | |
|---|---|---|
| 0302.txt | 2819 | Aug 22 12:31 |
| 0303.txt | 5368 | Aug 22 12:31 |
| 0304.txt | 651 | Aug 22 12:31 |
| 0305.txt | 6308 | Aug 22 12:31 |
| 0306.txt | 746 | Aug 22 12:31 |
| 0307.txt | 1239 | Aug 22 12:31 |
| 0308.txt | 1491 | Aug 22 12:31 |
| 0309.txt | 2700 | Aug 22 12:31 |
| 0310.txt | 649 | Aug 22 12:31 |
| 0311.txt | 1526 | Aug 22 12:31 |
| 0312.txt | 659 | Aug 22 12:31 |
| 0313.txt | 1348 | Aug 22 12:31 |
| 0314.txt | 851 | Aug 22 12:31 |
| 0315.txt | 1000 | Aug 22 12:31 |
| 0316.txt | 2200 | Aug 22 12:31 |
| 0317.txt | 1400 | Aug 22 12:31 |
| 0318.txt | 2354 | Aug 22 12:31 |
| 0319.txt | 644 | Aug 22 12:31 |
| 0320.txt | 2010 | Aug 22 12:31 |
| 0321.txt | 1163 | Aug 22 12:31 |
| 0322.txt | 1078 | Aug 22 12:31 |
| 0323.txt | 996 | Aug 22 12:31 |
| 0324.txt | 799 | Aug 22 12:31 |
| 0325.txt | 1613 | Aug 22 12:31 |
| 0326.txt | 952 | Aug 22 12:31 |
| 0327.txt | 3602 | Aug 22 12:31 |
| 0328.txt | 2082 | Aug 22 12:31 |
| 0329.txt | 495 | Aug 22 12:31 |
| 0330.txt | 1147 | Aug 22 12:31 |
| 0331.txt | 495 | Aug 22 12:31 |
| 0332.txt | 646 | Aug 22 12:31 |
| 0333.txt | 1147 | Aug 22 12:31 |
| 0334.txt | 1090 | Aug 22 12:31 |
| 0335.txt | 495 | Aug 22 12:31 |
| 0336.txt | 554 | Aug 22 12:31 |
| 0337.txt | 1147 | Aug 22 12:31 |
| 0338.txt | 2815 | Aug 22 12:31 |
| 0339.txt | 493 | Aug 22 12:31 |
| 0340.txt | 495 | Aug 22 12:31 |
| 0341.txt | 493 | Aug 22 12:31 |
| 0342.txt | 511 | Aug 22 12:31 |
| 0343.txt | 493 | Aug 22 12:31 |
| 0344.txt | 503 | Aug 22 12:31 |
| 0345.txt | 2627 | Aug 22 12:31 |
| 0346.txt | 16042 | Aug 22 12:31 |
| 0347.txt | 841 | Aug 22 12:31 |
| 0348.txt | 1847 | Aug 22 12:31 |
| 0349.txt | 493 | Aug 22 12:31 |
| 0350.txt | 495 | Aug 22 12:31 |
| 0351.txt | 495 | Aug 22 12:31 |
| 0352.txt | 493 | Aug 22 12:31 |
| 0353.txt | 495 | Aug 22 12:31 |
| 0354.txt | 849 | Aug 22 12:31 |
| 0355.txt | 9622 | Aug 22 12:31 |
| 0356.txt | 878 | Aug 22 12:31 |
| 0357.txt | 1857 | Aug 22 12:31 |

The above files contain source code for a computer program (mostly in the MATLAB language with a couple in C language), for one embodiment of the invention.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Computers use two different representations for numbers. "Floating-point" representation (also called "double precision") is used for variables that require an extremely wide range of numerical values. For instance, a variable that takes on a value of $10^{-308}$ at one time in a program, and then takes on a value of $10^{+308}$ at a later time would typically be represented in floating-point. "Fixed-point" representation is used for variables that take on values within a reasonably limited range. For instance, a variable that takes on only integer values between −10000 and 10000 would typically be represented in fixed-point. A special case of fixed-point representation is "integer", which is used for variables that only take on values that have no fractional portion.

Integers are represented in computers as a sequence of bits (equivalent to a sequence of digits in human terms) with an implied decimal point (more correctly called "binary point"; both will be used interchangeably) at the right of the bits. The assumption hereinafter is that integers are represented in 2's complement notation, which is the most common representation. For example, the decimal number 13 is represented as 1101, which is interpreted from left to right as $1*2^3+1*2^2+0*2^1+1*2^0$ (just as decimal 13 is interpreted as $1*10^1 +3* 10^0$). Fixed-point representation differs from integer representation only in that the decimal point is not required to be at the right of the number. The decimal point may appear anywhere within the number, to the right of the number (with implicit zeros filling in the gap between the rightmost bit in the collection and the decimal point) or to the left of the number (again, with either implicit zeros or possibly ones (depending on signed considerations) filling in the gap between the leftmost bit in the sequence and the binary point). For example, fixed-point binary 11.01 is interpreted from left to right as $1*2^1+1*2^0+0*2^{-1}+1*2^{-2}$ or 3.25 in decimal. The "scale" of a fixed-point number is the number of bit positions between the implied binary point of the equivalent integer and the binary point of the fixed-point number, with positions to the right being positive and positions to the left being negative. For instance, the scale of 11.01 (binary, equal to 3.25 decimal) is negative two (−2), because the equivalent integer is 1101 (binary, equal to 13 decimal) and the binary point in the fixed-point number is 2 positions to the left of its implied location in the equivalent integer. 11.01 is equal to $1101*2^{-2}$. An alternative way of viewing the value of a fixed-point number is that it is equal to the value of the equivalent integer times 2 raised to the scale of the number, and that integers are simply fixed-point numbers with a scale of 0. Floating-point numbers are represented in computers as "$m*b^e$", where "m" (the mantissa) is a fixed-point number, "b" (the base) is almost always 2, and "e" (the exponent) is an integer.

In this context, the scale of a fixed-point number is the number of bits to the right of the binary point, and will be referred to as "right" hereafter. A related but slightly different property of a fixed-point number is an implicit "scaling factor" (also referred to as "scale" hereafter; the context will make the distinction clear). In many programming disciplines, the number that a user represents in a computer is very different from the number that represents the quantity that the user is actually measuring. For instance, numbers that represent a physical quantity (such as megahertz) may range from 1,000,000 to 10,000,000. While such numbers could be represented directly in fixed-point notation as numbers with 24 bits to the left of the decimal (and a scale of 0), a more typical representation would be to divide the numbers (which represent the physical quantity) by $2^{24}$, giving numbers between 0.059 and 0.59. "Scaling" the physical quantities into numbers between 0 and 1 is often done, as that range simplifies many computations. Note that the scaling almost never results in numbers scattered exactly between 0 and 1; in this case, for instance, the range of 0.059 and 0.59 is used as the largest range that can be obtained by dividing by a power of 2 without exceeding the bounding range of 0 to 1. If $2^{23}$ was used to scale the numbers, the range would be 0.108 to 1.08 which exceeds 1. A scale larger than $2^{24}$ would reduce the range more than necessary. The numbers presented to the computer are the fixed-point numbers between 0.059 and 0.59 with a "scale" that depends on the precision the programmer desires. The programmer manually remembers (in his mind) that the true numbers are related to the represented numbers by a "scaling factor" of 24; that is, the true numbers are equal to the represented numbers multiplied by 2 raised to the scaling factor.

Scaling factor is a property of fixed-point numbers that, to the knowledge of this applicant (John R. Allen), has always been kept in the programmer's head (i.e. a mental step). To the applicant's knowledge, the scale has never been explicitly stored in a memory of a computer and linked to the number's fixed-point representation. As described below in the Detailed Description section, such storage of scale linked to (in any manner) or alternatively as a portion of fixed-point representation of a number provides several advantages in certain embodiments of the invention by the applicant.

Fixed-point numbers possess the capability of being "signed" or "unsigned". Signed numbers can take on both positive and negative values; the leftmost bit (the "sign bit") of the number is used to indicate whether the value is positive or negative. Unsigned numbers can only take on non-negative values, allowing an extra bit (the sign bit) to be applied to the number's value. Fixed-point numbers can also be characterized by their "size" (the total number of bits in the number), their "right" (the number of bits to the right of the decimal), and their "left" (the number of bits to the left of the decimal, excluding the sign bit for signed values). Fixed-point numbers (and floating-point numbers) can furthermore be characterized as being "real" or "complex". A complex fixed-point number is one which has a non-zero imaginary component; a real fixed-point number is one where the imaginary component is known to be zero.

The property of fixed-point numbers as being "signed" or "unsigned" is hereinafter called the "signedness" property of the number. The property of a fixed-point number as being "real" or "complex" is hereinafter called the "complexness" property of the number.

Arithmetic of fixed-point numbers is similar to arithmetic of integers. Two fixed-point numbers that have the same scale can be added or subtracted just as if they were integers; the result has the same scale as the operands. Two fixed-point numbers with differing scales must be adjusted to have the same scale (much as floating-point numbers do) before they can be added or subtracted as integers. Any two fixed-point numbers can be multiplied using integer arithmetic; the scale of the result is equal to the sum of the scales of the operands. Similarly, any two fixed-point numbers can be divided using integer arithmetic; the scale of the result is equal to the scale of the dividend minus the scale of the divisor. Since fixed-point arithmetic is much simpler than floating-point arithmetic, computer applications where possible prefer to use fixed-point variables and arithmetic. Fixed-point arithmetic is faster, easier to implement in hardware, and requires less electrical power to execute.

Unlike floating-point arithmetic, fixed-point arithmetic has two common modes of execution, known as "saturation" and "modulo". In saturation arithmetic (so named because values "saturate" at two boundaries: the largest value and the smallest value) values that exceed the largest representable value for a fixed-point representation are represented as the largest value and values that are smaller than the smallest representable value are represented as the smallest value.

As used herein, the term "largest representable value" is the largest number that can be represented in a given fixed-point representation and the term "smallest representable value" is the smallest number that can be represented in a given fixed-point representation. For example, the largest number that can be represented in a signed fixed-point number that contains 4 bits to the left of the binary point and 0 bits to the right of the binary point is 7. If the value 8 (obtained, say by adding 7 and 1) is converted into such a representation when saturation arithmetic is in effect, the resulting fixed-point number is 7, since that is the largest value for a signed 4-bit fixed-point number.

Under modulo arithmetic, values that exceed the largest representable value or are smaller than the smallest representable value are "wrapped" into the representable range of the fixed-point number by dropping the most significant bits. Modulo arithmetic wraps the representable numbers into a ring, so that running off the high end of the representable numbers moves back onto the low end. That is, increasing the largest representable number by 1 in the least significant bit results in the smallest (most negative number); similarly, subtracting 1 in the least significant bit from the smallest number results in the largest number.

If modulo arithmetic were in effect for the previous example of adding 7 and 1, the resulting 4-bit signed fixed-point number is −8, which is obtained by dropping any extra bits generated to the left. Similarly, the smallest number in a signed 4-bit fixed-point representation is −8. If the true value −9 is obtained from a subtraction of, say 1 from −8, while saturation arithmetic is in effect, the resulting fixed-point number is −8, the smallest representable number. If modulo arithmetic is in effect, the resulting fixed-point number is 7, obtained again by dropping any extra bits generated on the left.

A notion central to several higher level programming languages is the concept of the "type" of a variable or constant. A variable's type is a succinct representation of the amount of storage that a variable requires in memory, the operations that may legally be performed on the variable, and the other variables and constants with which the variable may be combined. Typical "primitive" variable types in various languages include integer, double (or double precision), complex, and char. "Primitive" types are so-named because they represent basic arithmetic or computational types.

"Derived" types, which are more complex combinations of primitive types, can be built from the basic primitive types. For instance, a "scalar" is typically a single element. A "vector" is a sequence of scalars collected together; individual elements are accessed and set by notation similar to, for instance, "A(i)" to access the i'th element of the vector A. An array is a collection of vectors; individual elements are accessed and set by notation similar to, for instance, "A(i,j)" to access the i'th element of the j'th vector of array A. In other words, scalars are 0 dimensional objects; vectors are 1 dimensional objects, and arrays are 2 (or more) dimensional objects. The "shape" of a type is the number of dimensions it has: 0 for scalars, 1 for vectors, and 2 or more for arrays.

Computer programs involve two distinct levels: a "specification level" and an "execution level". The specification level is the representation that conveys the intent of the user, and is generally a higher level programming language. The execution level is the representation used by the computer to implement that intent.

While the execution level is often the instruction set of the computer, it may well be other things, such as another programming language. For instance, a program written in MATLAB™ may be translated into C for execution; in that case, MATLAB is the specification level and C is the execution level. Similarly, interpreters typically translate source programs to an intermediate representation, which they then use to drive execution. In such cases, the original source program is the specification level and the intermediate representation used by the interpreter is the execution level.

Note also that the specification level and the execution level can be the same language. For instance, a MATLAB source program may be translated to a different, optimized MATLAB source program. In such a case, the original source program is the specification level and the translated MATLAB program is the execution level. Given that all programs eventually execute on the instruction set of a computer, the assembly or machine level is also an execution level for all of the examples above.

Typically, computers have separate functional units and instructions for executing (a) fixed-point arithmetic and (b) floating-point arithmetic. Higher level mathematical constructs at the specification level, such as complex arithmetic or vector operands, are implemented at the execution level by combinations of scalar operations. For example, an addition of two complex fixed-point numbers is usually implemented by two separate fixed-point additions, one for the real portion and one for the imaginary portion. An addition of two 10-element vector floating-point operands is typically effected by using the floating-point functional unit 10 times, once for each element of the vector.

Because floating-point variables have a wide dynamic range whereas fixed-point variables have limited dynamic range, high-complexity algorithms such as, for example, signal processing algorithms, are typically developed using floating-point variables and floating-point arithmetic. Floating-point representation allows the user to delay the burden of dealing with practical implementation issues such as computational overflow. Once the algorithm has been proven correct in floating-point and the dynamic ranges of its variables are well-understood, the floating-point program is often manually converted into an equivalent fixed-point program, where variables are represented in fixed-point representation and arithmetic operations are performed using fixed-point instructions. Many computer architectures support only fixed-point operations; on those that support both fixed-point and floating-point, fixed-point operations execute much faster.

Correctly converting an initial floating-point program into an equivalent fixed-point program requires a thorough understanding of the dynamic values taken on by variables and expressions in the program. Gathering this information and using it to correctly convert a program is a difficult process, meaning that it is normally done manually. For example, The Mathworks provides a "quantize" function (see Chapter 6, pages 6.1 through 6.10 of "Filter Design Toolbox Users Guide", June 2001) that must be applied when converting the following original code (in the MATLAB language):

$a=b+c+d+e+f;$

The user needs to manually generate the following code:

$t=b+c;$ $t=$quantize($t$, parms);

$t=t+d;$ $t=$quantize($t$, parms);

$t=t+e;$ $t=$quantize($t$, parms);

...

$a=t;$ where "parms" is a parameter that indicates the desired precision of the fixed-point result.

Other examples of the recommended MATLAB quantization using the "quantize" function include the following example (taken from "Automatic RTL Conversion of DSP Algorithms for a Channelized Wideband Receiver" by Mike Groden, http://www.accelchip.com/copy/LNX paper.pdf, also published in International Signal Processing Conference, April, 2003, Dallas, Tex.)

temp11$r$=quantize($q$out , . . . ($x$in$r$1+$x$in$r$3)+($x$in$r$2+$x$in$r$4));

temp12$r$=quantize($q$out , . . . ($x$in$r$5+$x$in$r$7)+($x$in$r$6+$x$in$r$8));

$X$out$r$1=quantize($q$out, temp11$r$+temp12$r$);

$X$outi1=quantize($q$out, 0);

and this example (taken from "An Overview of the AccelFPGA Compiler for Mapping MATLAB Programs onto FPGAs") by Prith Banerjee, http://bwrc.eecs.berkeley.edu/Seminars/Banerjee-11.6.02/MATCH-AccelFPGA-Berkeley.pdf) where the following MATLAB code

```
sum = 0;
for k = 1:4
    mult = indatabuf(k) * coeff(k);
    sum = sum + mult;
end
``` is quantized as

```
% Converted Fixed Point MATLAB
qpath = quantizer('fixed', 'floor', 'wrap', [8,0]);
qresults = quantizer('fixed', 'floor', 'wrap', [16,0]);
sum = quantize( qresults, 0 );
for k = quantize( qpath, 1:4 )
    mult = quantize( qresults, indatabuf(k) * ...
        coeff(k) );
    sum = quantize( qresults, sum + mult );
end
```

These examples illustrate the significant changes currently required to "quantize" a MATLAB program using the quantize function. Hereinafter, the phrase "quantize" will refer to the act of converting a floating-point program into an equivalent fixed-point program, selecting values for properties such as signedness, complexness, and precision so as to meet various requirements, unless the context specifically indicates the MATLAB function "quantize".

Unfortunately, manual efforts in effecting changes such as addition of the word "quantize" to a line of a software program tend to be inefficient, inflexible, tedious, and error prone. Such efforts typically require so many modifications that the final program's appearance and the logical flow thereof are quite different from that of the original (i.e., floating-point) program. Moreover, a substantial investment in time is usually required to perform the conversion, resulting in both high manpower costs as well as substantial real-time delays.

At a very high level, computer languages can be divided into two categories: "statically-typed" languages and "dynamically-typed" languages. In statically-typed languages such as C and C++, programmers must specify the type (that is, whether the variable is fixed-point or floating-point, whether the variable represents a single number or a collection of numbers, etc.) of every variable in the program. In dynamically-typed languages such as MATLAB, programmers do not specify the types of variables. Instead, variables derive their types from the expressions assigned to them.

Other patents have dealt with the problem of converting floating-point programs written in statically-typed languages into fixed-point programs. See U.S. Pat. No. 6,460,177 granted to Lee and entitled "Method For Target-Specific Development Of Fixed-Point Algorithms Employing C++ Class Definitions" and also see U.S. Pat. No. 6,173,247 granted to Maurudis et al. entitled "Method and Apparatus for Accurately Modeling Digital Signal Processors", both of which are incorporated by reference herein in their entirety. The applicant notes that Lee's approach involves changing variable declarations and header files (which implicitly changes variable declarations). As a result, his approach appears to be limited to statically-typed languages and will not work with dynamically-typed languages such as MAT-LAB, which do not contain declarations. Furthermore, Lee appears to be silent on what process should be effected with implicitly-typed quantities, such as constants. For example, how should the number "1" be interpreted in an expression "a+1" where "a" is a fixed-point variable? Should it be an integer value, a fixed-point value, a floating-point value, or something else? The applicant notes that this question appears to be left both unasked and unanswered in Lee's patent.

Note also that Lee describes range capture to identify some small number of statistics about variables' values, such as the maximum and minimum value taken on. Lee's range capture is apparently limited to summary information. Being summary, the range capture (by definition) is not all inclusive, and misses important information such as locations where overflows occur, how significant the overflows are, the original source of overflows versus overflows that are propagated, etc. For instance, if the range capture shows that a variable takes on values between −0.1 and 7.9, then a user can properly determine that a signed, left=3, right=12 representation will hold the values taken on by the variable. However, if "−0.1" minimum value is the only negative value, and that value occurs in only one insignificant computation, it may well be possible to represent the values using an unsigned representation, allowing an extra bit of precision on the right. In other words, an unsigned, left=3, right=13 representation may well work. The applicant notes that this fact cannot be determined by Lee's range capture.

SUMMARY

A computer that is programmed in accordance with the invention emulates an operation that is written at the specification level ("specification level" is used herein as defined in the Background section above) as occurring on fixed-point operands by use of an operation at the execution level ("execution level" is used herein as described in the Background section above) that is normally performed on floating-point operands. A specification level program is the representation that conveys the intent of the user, but is not necessarily directly executable on a computer, and is generally expressed in a higher level programming language by the user. The execution level program is the representation of the specification level program that is used by the computer to directly (in machine language) or indirectly (in an intermediate language, used as input to an interpreter, for example) perform the functions described in the specification level program.

Several embodiments of the just-described computer emulate a fixed-point operation by: expanding at least one fixed-point operand into a floating-point representation (also called "floating-point equivalent"), performing, on the floating-point equivalent, a floating-point operation that corresponds to the fixed-point operation, and reducing the floating-point result into a fixed-point result. Note that all embodiments in accordance with the invention perform the operation of expanding (as just described), followed by the operation of reducing (as just described) in this order, when emulating a fixed-point operation.

The just-described fixed-point result may have the same representation as the fixed-point operand(s) and/or any user-specified fixed-point representation, depending on the embodiment. Also depending on the embodiment, the operands and the result may be either real or complex, and may be either scalar or vector.

The above-described emulation may be performed either with an interpreter or with a compiler, depending on the embodiment. A conventional interpreter for an interactive array language (such as MATLAB version 6) may be modified in accordance with the invention to perform the above-described emulation. For example in the case of an object-oriented language (such as MATLAB version 6), a class may be created specifically to identify fixed-point values. The class is created as an embodiment, ahead of time (for example, by a software vendor) as a predetermined class that is supplied or sold to a user in the form of a toolbox or library installed in the memory of the user's computer. Fixed-point operands are represented by the user (in the memory of the computer) as objects of that class, and a new fixed-point value may be created by the user (in the memory of the computer) by instantiating a new object of that class via a constructor function included in the toolbox or library.

Moreover, in object-oriented languages that support operator overloading (such as MATLAB version 6), one or more fixed-point operations are implemented in such a modified interpreter of some embodiments in accordance with the invention by overloading an operator normally used to denote the corresponding floating-point operation. For example, the symbol "+" is typically used in programming languages to denote addition. In object-oriented languages that support operator overloading, the "+" symbol is overloaded for fixed-point operands to indicate addition to the modified interpreter. Although implemented together in some embodiments, the just-described operator overloading may be implemented independent of the above-described object instantiation in other embodiments.

An interpreter (such as MATLAB version 6) is modified, in certain embodiments of the invention, to respond to a request for construction (via a call to the constructor function described above) of a new fixed-point variable in an otherwise type-less polymorphic language as follows: the interpreter executes a function to dynamically allocate a region in memory for holding all information necessary to express that operand in a fixed-point format, including, for example: (a) floating-point equivalent of the operand (e.g. in double precision), (b) one or more properties such as the size of the fixed-point operand, the position of a binary point within the fixed-point operand and/or whether a bit of the fixed-point operand denotes a sign bit (i.e. signed or unsigned).

Although certain embodiments of the method are implemented in an interpreter, in other embodiments such a method is implemented by use of at least one compiler that translates (at compile time) all operations from a specification level of a type-less polymorphic language into machine level. After such translation (by a compiler or series of compilers and/or translators), the computer is able to directly execute the translated program. In such embodiments, the compiler has inferencing mechanisms to recognize one or more predetermined indicators (e.g. constructor function calls) of variables as being fixed-point operands. The compiler propagates the indicated type to other operations and assignments that depend on the results as appropriate, and combines such type indications to obtain the type of intermediate expressions. The compiler uses such type information to generate sequences of execution-level instructions appropriate for performing the fixed-point operations. The instruction sequences being generated may be direct fixed-point instructions, corresponding sequences of floating-point instructions, or any other instruction sequence that emulates fixed-point operations.

Several embodiments of the invention are implemented as a method of writing a computer program, wherein said method includes using operator overloading and fixed-point objects in dynamically-typed languages as a mechanism for converting working floating-point programs into equivalent fixed-point programs. This method includes inserting a function call to identify a variable as being of fixed-point type, then using said variable in a statement (in a specification level computer program) without any other identifiers of the variable as being of fixed-point type. This method enables a much simpler, more readable, less error prone method of creating programs for fixed-point processors.

BRIEF DESCRIPTION OF THE DRAWINGS

FIG. 12C is a key to FIGS. 12C-1 and 12C-2.

DETAILED DESCRIPTION

A user may prepare a program 110 (FIG. 1A) containing the following: a fixed-point representation of a real number 111 and a fixed-point operation 112 to be performed on number 111. The program 110 may then display or otherwise use a fixed-point result 113 obtained from performing operation 112 (which has been detailed by the user (such as a programmer) at the specification level). Number 111 may be provided to specification-level operation 112 either as a constant or as a value of a variable that can change over time, depending on the embodiment. Number 111 may, in certain embodiments, also be a vector, array, or other collection of values.

Figure 1A:
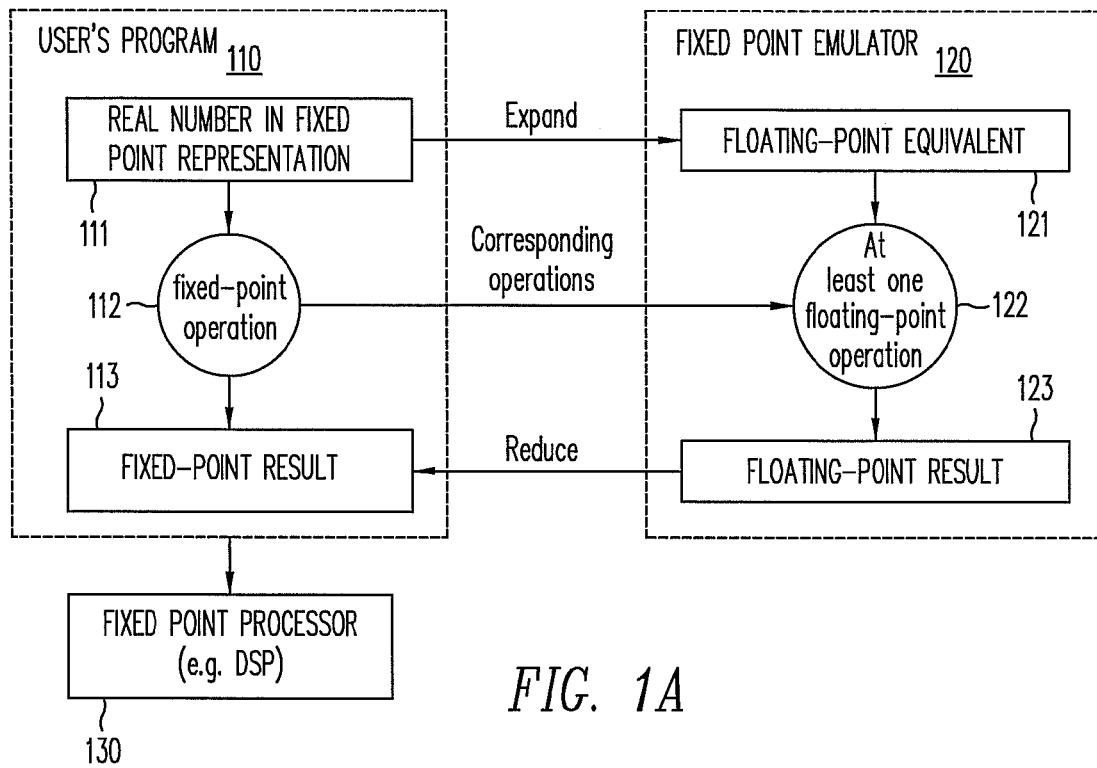
FIG. 1A illustrates, in a high-level block diagram, a computer 120 (called "fixed-point emulator") that emulates a fixed-point operation in a user's program 110 by performing a corresponding floating-point operation in accordance with the invention.

Referring to FIG. 1A, a program 110 may be written for use with a fixed point processor 130, such as, for example, a digital signal processor (DSP). Often, fixed point processor 130 is not available to the user. In accordance with the invention, user's program 110 is provided to a computer 120 (also called "fixed point emulator") that emulates operation 112 by use of at least one operation 122 at the execution level that is normally performed on one or more floating-point operands.

Certain embodiments of the just-described computer 120 use execution-level instructions that are designed to operate on floating-point numbers to execute operations that at the specification level are fixed-point. One critical aspect of some embodiments of the type described herein is the execution of fixed-point arithmetic using at least one floating-point execution-level operation, where execution level includes both the actual computer hardware as well as other intermediate abstraction levels beneath the specification language.

For example, a MATLAB program that contains fixed-point operands and operations that the MATLAB interpreter executes (in accordance with the invention) using floating point machine instructions is a simple case. The MATLAB program in that example is the specification level; the machine instruction language is the execution level. However, another way of accomplishing that same task is to translate the original MATLAB program into another language (say, for instance the C programming language), which is then later translated into machine instructions. The C language program may have the fixed-point arithmetic represented as floating-point operations. In that case, the MATLAB program is the specification level and the C program is an execution level.

Similarly, the original MATLAB program may be translated into an equivalent MATLAB program that uses floating-point operations; in that case, MATLAB is both the specification level and the execution level. Alternatively, the MATLAB interpreter, may as a first step, translate the MATLAB source program into an intermediate representation which then drives the interpreter, and that intermediate representation may use floating-point operations rather than fixed-point. An execution level in that case is the MATLAB interpreter's intermediate representation.

Figure 1B:
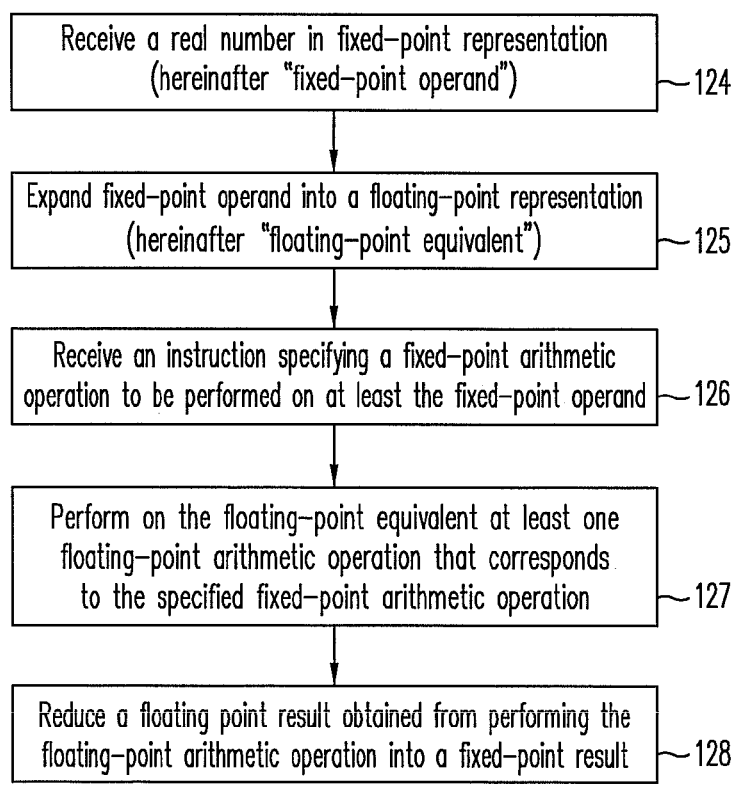
FIG. 1B illustrates, in a flow chart, acts performed by fixed-point emulator 120 illustrated in FIG. 1A, in several embodiments.
Figure 1C:
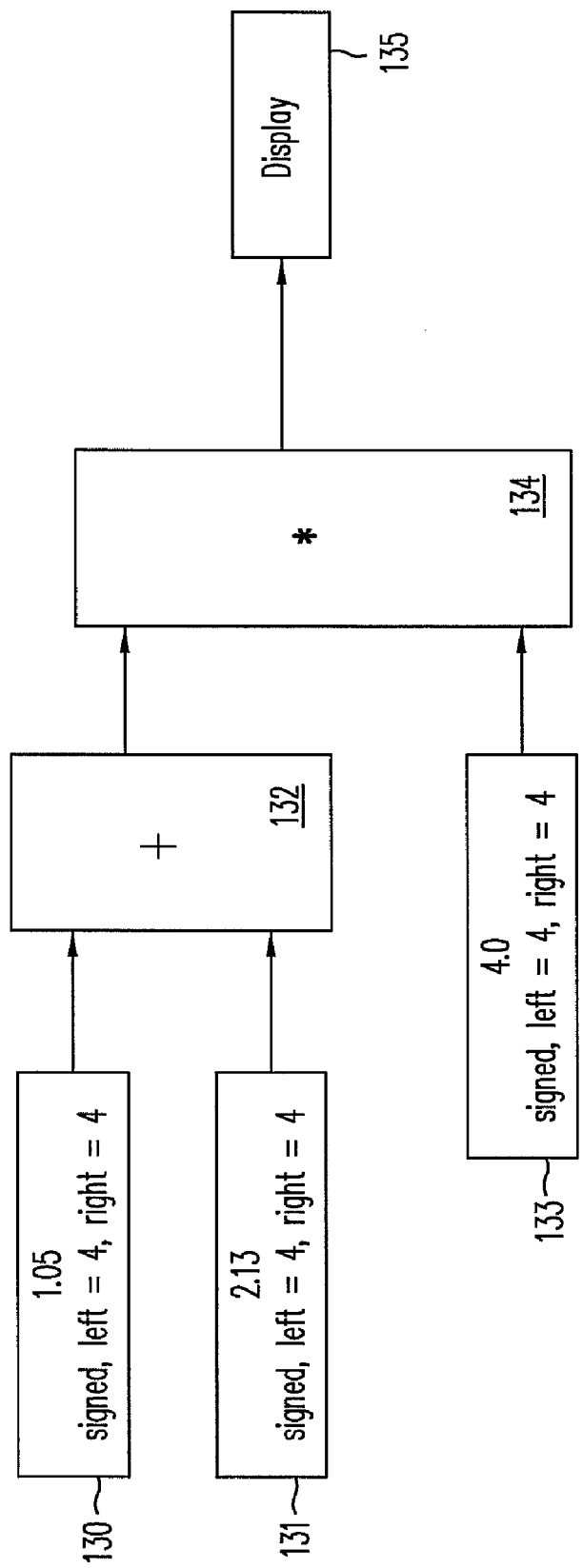
FIG. 1C illustrates a graphical representation for a computation that takes the contants 1.05 (box 130) and 2.13 (box 131), adds them via act 132, then multiplies the result by the constant 4.0 (box 133) via act 134 to obtain a result to be displayed (in box 135).

Finally, the specification level may be a graphical language. For instance, the users program may be represented graphically, such as in the embodiment illustrated in FIG. 1C. FIG. 1C illustrates one graphical representation for a computation that takes the contants 1.05 (box 130) and 2.13 (box 131), adds them via act 132, then multiplies the result by the constant 4.0 (box 133) via act 134. The result is displayed via act 135. The execution level for such a representation is in some embodiments machine level language; in other embodiments it is a programming language such as C; and in still other embodiments, it is MATLAB.

In FIG. 1A, the number of operations that are performed on floating-point equivalent by computer 120 depends on the fixed-point operation 112. For example, a single floating-point operation 122 (of absolute value) is performed by computer 120 when the fixed-point operation 112 is an absolute value operation. In a different example, a series of operations 122 (for example, floating-point additions and multiplications) are performed when taking the sin or log (operation 112) of a floating-point equivalent 121. In a third example, a sequence of two floating-point operations 122 are performed when performing a multiply-accumulate operation (commonly called a MAC).

Specification level operation 112 (FIG. 1A) being emulated by computer 120 may be, for example, a two-operand execution-level operation such as (add, subtract, multiply or divide), and/or a single-operand operation such as (absolute value, sign (equal to the value of a number divided by its absolute value), round_down, and round_up) to be performed on one or more fixed-point operands. It may also be a multi-operand operation which is comprised of multiple source-level operations, such as a multiply-accumulate, which is represented in many programming languages as a multiplication followed by an addition. In several embodiments of the invention, no distinction is made between whether the operation is two operand, single operand, or multiple operand, although in emulation of single operand operations, certain acts may be simplified or skipped as noted below (e.g. normalization need not be performed in implementing single operand operations of some embodiments).

The just-described two operations 112 and 122 are similar to one another although they differ in representation of their operands and result (and such operations are referred to herein as "corresponding" to one another). Specifically, operations 112 and 122 have results that may be identical or approximate to one another (depending on precision). For example, a floating-point add operation 122 corresponds to a fixed-point add operation 112; a floating-point absolute value operation 122 corresponds to a fixed-point absolute value operation 112; and so on.

Certain embodiments of the just-described computer 120 use hardware (not shown) that is dedicated for performance of floating-point operations. Examples of such hardware are found in Intel Corporation's microprocessor called Pentium Pro, which has two floating point units (and two integer units which are not used in some embodiments). Moreover, Intel's Pentium processor and the Intel486 processor both have one floating point unit. Note that such floating-point hardware may also be included in a computer as a math co-processor that is coupled to and used by a microprocessor. In several embodiments, the floating-point hardware conforms to an industry standard, such as IEEE Std. 854 and/or 754. For a description of such floating-point hardware, see Chapter 31 entitled "Floating Point Unit" in the book Intel Architecture Software Developer's Manual.

Such floating-point hardware is used as described herein, to emulate performance of fixed-point operations. For this reason, such a computer 120 (FIG. 1A), when programmed as described herein, may be used to simulate a Digital Signal Processor (DSP) that typically contains hardware dedicated for performance of fixed-point operations. Depending on the embodiment, such a computer 120 may emulate any commonly-used operations on one or more fixed-point operands e.g. a Boolean operation, a logarithmic or exponential operation in addition to one or more arithmetic and/or trigonometric operations.

Several embodiments of the above-described method emulate a fixed-point operation by receiving a real number 111 in a fixed-point representation (hereinafter "fixed-point operand") as illustrated by act 124 in FIG. 1B and expanding the fixed-point operand 111 into a floating-point representation (hereinafter "floating-point equivalent") 121 as illustrated by act 125. Depending on the embodiment, floating-point equivalent 121 may be stored within computer 120 (FIG. 1A) as a single-precision floating-point number (e.g. a 4-byte number) or as a double-precision floating-point number (e.g. an 8-byte number), or even as a double extended-precision floating-point number (e.g. a 16-byte number). Some embodiments contain a global flag that may be set by the user to indicate the size of floating-point number to be used in emulating fixed-point arithmetic.

Figure 5A:
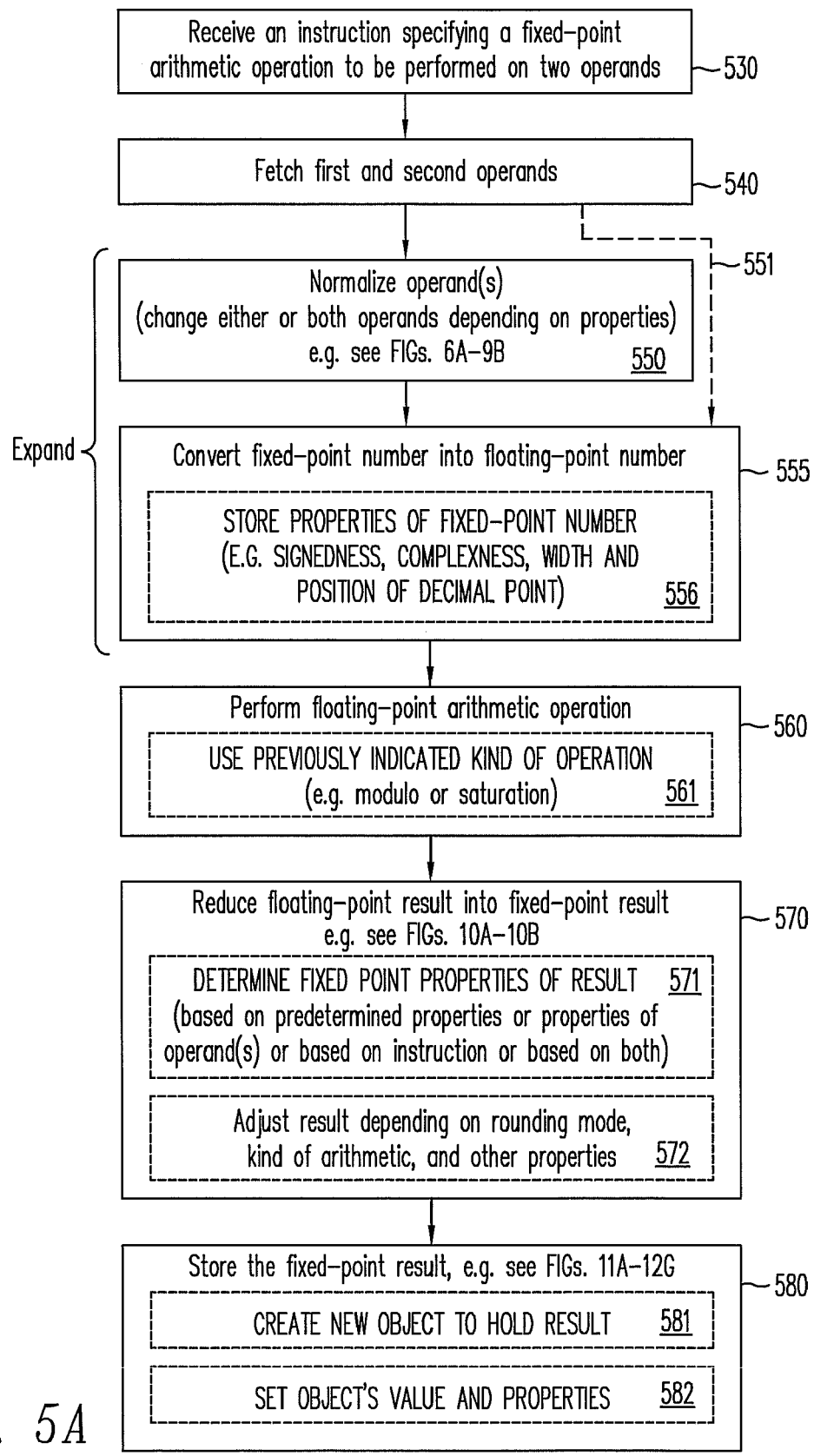
FIGS. 5A and 5B illustrate, in a flow chart, acts performed in one specific implementation of a fixed-point emulator in accordance with the invention.

In some embodiments, in act 125, during the expansion step, a precision of the fixed-point operand is stored prior to performing the floating-point arithmetic operation in act 127 (as described in greater detail in act 556 of FIG. 5A in one embodiment). Moreover, in this embodiment in act 128, the stored precision is used during reduction of the floating-point result into the corresponding fixed-point result (as described in greater detail in act 571 of FIG. 5A in one embodiment).

Note that, during emulation of a fixed-point operation, the reduction act is performed after the expansion act in all embodiments of the invention (as illustrated by expansion acts 125 and 325 in FIGS. 1B and 3B preceding reduction acts 128 and 328, respectively), with the following advantage. This particular order allows the use of floating-point arithmetic (and therefore floating-point hardware) during emulation of fixed-point arithmetic, thereby to allow programs written in fixed-point arithmetic to be developed and debugged without use of fixed-point hardware.

In an embodiment that uses the language supported by the MATLAB interpreter, the fixed-point representation stores the value of the fixed-point number as a floating-point value. In such embodiments, the process of expanding fixed-point operand 111 into floating-point equivalent 121 is simply a load operation.

Fixed-point numbers can be characterized by their "size" (the total number of bits in the number) their "right" (the number of bits to the right of the binary point), and their "left" (the number of bits to the left of the binary point, excluding the sign bit for signed values). Setting any two of these subproperties determines the third subproperty (of the precision property). A fixed-point number's "precision" property is a combination of its size, left, and right, and is determined by any two of these subproperties.

In the above-described act 125, if the instruction uses a single operand, then the act 125 is performed without any normalization on the operand. The word "normalization" is used to mean converting multiple operands with differing values of a single property (for example, signed value and unsigned value of the signedness property or real value and complex value of the complexness property) into equivalent operands having a common value of the property. Therefore, in the above-described act 125, if the instruction uses two operands, then the act 125 includes an act of normalization that is performed on at least one of the operands so that the normalized operand has the same property value as the other operand (in case of two operands).

In the above-described act 125, if the instruction uses multiple operands having different precisions, then the act 125 includes an act of normalization which can be implemented differently depending on the embodiment as noted next. Specifically, in a first embodiment, only one operand is normalized to have the precision of the other operand, in the case of two operands. In a second embodiment, both operands are normalized to have a common precision different from the precision of each of the two operands. The common precision can be the maximum precision supported by the representation, or alternatively, the common precision can be obtained from the precision of the two operands. In one embodiment, the common precision is obtained by combining the maximum of the two "left" subproperties of the precisions of the operands, and the maximum of the two "right" subproperties, into a single precision for the result. For example, in the case of one operand having the precision left=3, right=5 and another operand have the precision left=6, right=2, the common precision is left=6, right=5.

Computer 120 also receives (as per act 126 in FIG. 1B) an instruction which includes a fixed-point operation 112 (FIG. 1A) to be performed on the fixed-point operand 111 which was received in act 124. Note that act 126 may happen in any order relative to act 125, depending on the embodiment. For example, in the case that computer 120 as illustrated in FIG. 1B implements an interpreter, operands are typically fetched before instructions, so that act 126 may happen after act 125. In the case that computer 120 implements an executable generated as a result of a compiler, instructions are typically fetched before operands, and act 126 may happen before act 125.

Specifically, depending on the embodiment, a method of the type described herein may be performed inside either an interpreter or a compiler. An interpreter of the type described herein translates and executes each specification-level operation before proceeding to the next specification-level operation, regardless of whether the operation and/or operand is floating-point or fixed-point. On the other hand, a compiler translates all specification-level operations into execution-level instructions at one time; after translation the computer executes each translated instruction. The compiler combines static and dynamic inference methods for intrinsic type, shape, rank, and structural inference to generate executable code prior to execution. Depending on the implementation, compiler-generated code may execute several times (e.g. 1000 times) faster than an interpreter for the same code.

An existing interpreter or compiler for an interactive array language is modified in certain embodiments to support an operand of fixed-point type by use of floating-point hardware and/or software normally present in the computer. For example, an interpreter and/or compiler is modified to dynamically allocate a region in memory for holding all information necessary to express that operand in a fixed-point format, including, for example: (a) floating-point equivalent of the operand (e.g. in double precision), (b) the size of the fixed-point number, and (c) the left or the right subproperty of the precision of the fixed-point number.

In several embodiments, the interpreter and/or compiler is for an object-oriented language and hence an object, for representing a fixed-point operand, is created by instantiation of a predetermined class. Moreover, one or more fixed-point arithmetic operations are implemented by overloading an operator normally used to denote the corresponding floating-point arithmetic operation (e.g. the same symbol "+" denotes an arithmetic operation of adding two operands, regardless of the type of operands).

In some embodiments, when a fixed-point arithmetic operation has a constant as one of the operands, the interpreter automatically converts the constant into its fixed-point representation before combining with the other operands. The interpreter uses the size, left, right, etc. of the known fixed-point operands to set the characteristics for the fixed-point conversion of the constant. Thereafter, the interpreter converts (i.e. expands in accordance with the invention) all operands, including the constant, into floating-point representation and performs the floating-point arithmetic operation on the floating-point equivalents. The floating-point equivalent of a fixed-point operand is the value of that operand expressed by some embodiments of this invention in floating-point representation. (Floating-point representation is, for example, the IEEE 754 standard for floating-point arithmetic).

In some embodiments, an interpreter and/or compiler supports a dynamically-typed (i.e. polymorphic) language, wherein variables' types are determined by the type of the expressions assigned to them. In such languages, a specification-level variable may be used at one point in the program as though it were typed one way and used again at a different point as though it were typed differently. Specifically, a variable "A" may be used as if it was in a fixed-point representation with binary point in a first position in some instructions of a software program, and in some other instructions of the same program the same variable "A" may be used as if it was fixed-point representation but with the binary point in a second position. In one embodiment, the MATLAB interpreter automatically accommodates such dynamic changes in variables' types, and therefore, no further modification is needed to such an interpreter to perform methods of the type described.

As illustrated by the "quantize" examples listed in the Background section, converting a working double-precision program for a polymorphic language such as MATLAB into an equivalent fixed-point program is currently a difficult, tedious, error-prone task. This conversion process is extremely important in many programming applications, particularly for programming digital signal processors. Current art requires manually decomposing large expressions expressed using arithmetic operators into smaller expressions and encapsulating the decomposed, smaller expressions inside calls to the "quantize" function. To be absolutely correct, such large expressions must be decomposed into binary expressions; use of larger expressions is possible, but requires intimate user knowledge of the functioning of the program and can lead to extremely hard-to-find bugs.

In one embodiment of this invention, the methods described herein allow a program that has been modified by addition of a few function calls to be automatically converted from double-precision MATLAB programs into equivalent fixed-point programs. Rather than having to break expressions within existing lines of software programs into subexpressions (in the limit, binary subexpressions) encapsulated by calls to a function such as the MATLAB function "quantize", several embodiments include a method for quantizing programs that involves the insertion of a few constructors at certain lines of code within a working floating-point program, without otherwise changing the program.

The certain lines of code where constructors need to be inserted are immediately adjacent to or contain any expressions used to define variables where the expressions contain no variables that are of fixed-point type, or in the cases where it is desired on a special case basis to change the default precision of a fixed-point expression. There are only a few such lines of code in a program, so that fixed-point equivalent of a working floating-point program is extremely similar in function and appearance to the original unquantized program. In fact most lines in the floating-point software program are the same as the corresponding lines in the fixed-point software program.

Regardless of the order of acts 125 and 126, computer 120 performs (as illustrated by act 127) on the floating-point equivalent 121 generated by act 125, a floating-point operation 122 that corresponds to the fixed-point operation 112 identified in act 126. The floating-point operation executed in act 122 generates a floating-point result 123 that may be identical or approximate (as noted above) to a result that would have been generated by performance of the fixed-point operation (depending on precision). Thereafter, computer 120 converts (i.e. reduces; see act 128) the floating-point result 123 generated by act 126 into a corresponding fixed-point result 113. As noted above, fixed-point result 113 may be used in any manner, e.g. displayed to the user or used in another operation.

In certain embodiments that support functions that do not return fixed-point results, computer 120 may be programmed to skip the reducing act 128. For example, certain functions may supply a Boolean value or an integer as the result, in which case there is no need to reduce the result into a fixed-point number. Furthermore, some embodiments support performance of an arithmetic operation on operands of two types, e.g. a first operand may be of fixed-point type and a second operand may be of floating-point type. In such a case, act 125 performs a conversion (i.e. expansion) of the first operand to its floating-point equivalent and then the floating-point operation is performed on the floating-point equivalent and the second operand (which has remained unchanged so far).

When using floating-point equivalents to emulate fixed-point operands and fixed-point operations, the precision of fixed-point operands is inherently limited by the precision of floating-point equivalents. In several embodiments, the floating-point representation conforms to an IEEE Standard for floating-point arithmetic, such as IEEE 754. In such embodiments, the precision of the fixed-point result is limited by the number of bits in the mantissa of the floating-point representation.

Figure 2A:
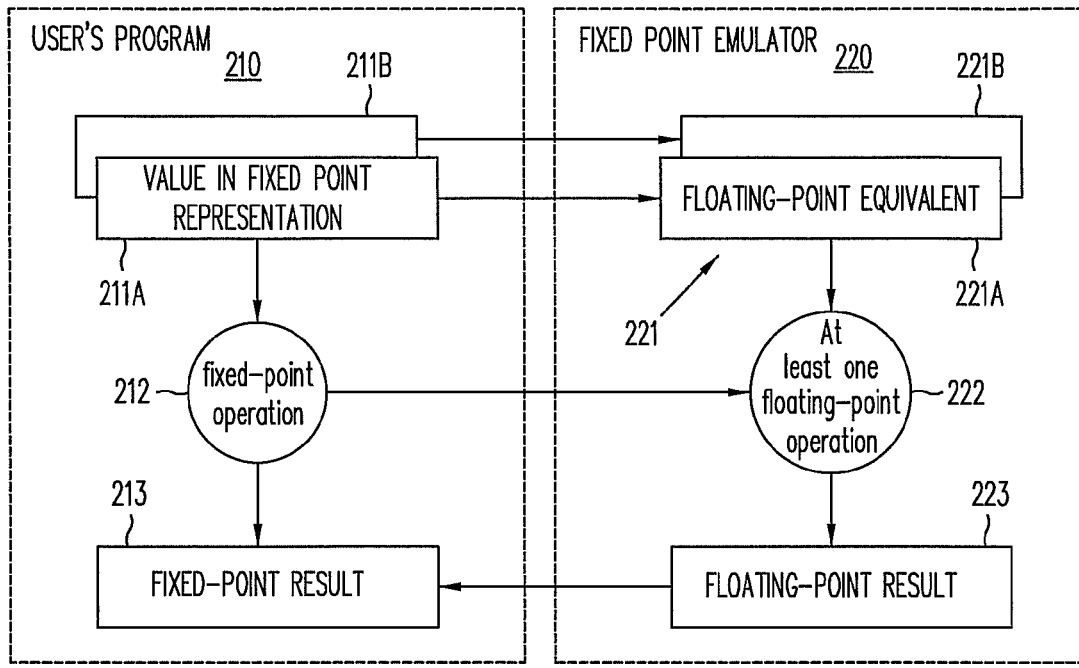
FIG. 2A illustrates, in a high-level block diagram similar to FIG. 1A, a fixed point emulator 220 for a pair of real fixed-point operands (which may be one of (a) two variables, (b) a variable and a constant, or (c) two constants) that yields a real fixed-point result.

Although only one real number 111 is illustrated in FIG. 1A as being an operand for fixed-point operation 112, as would be apparent to the skilled artisan, such an operation 112 may have any number of operands. For example, FIG. 2A illustrates two operands 211A and 211B that are provided in program 210 as input to operation 212. Many of the reference numerals in FIG. 2A are obtained by adding 100 to the corresponding reference numerals in FIG. 1A. Note that each of operands 211A and 211B can be either constant or a value held in a variable.

The number of operations that are performed on floating-point equivalent by computer 220 depends on the fixed-point operation 212. For example, a single floating-point operation 222 (of addition) is performed by computer 220 when the fixed-point operation 212 is a fixed-point addition operation. In a different example, a series of operations 222 (for example, floating-point divisions and subtractions) are performed when performing a remainder operation 212 of two floating-point equivalents 221.

Figure 2B:
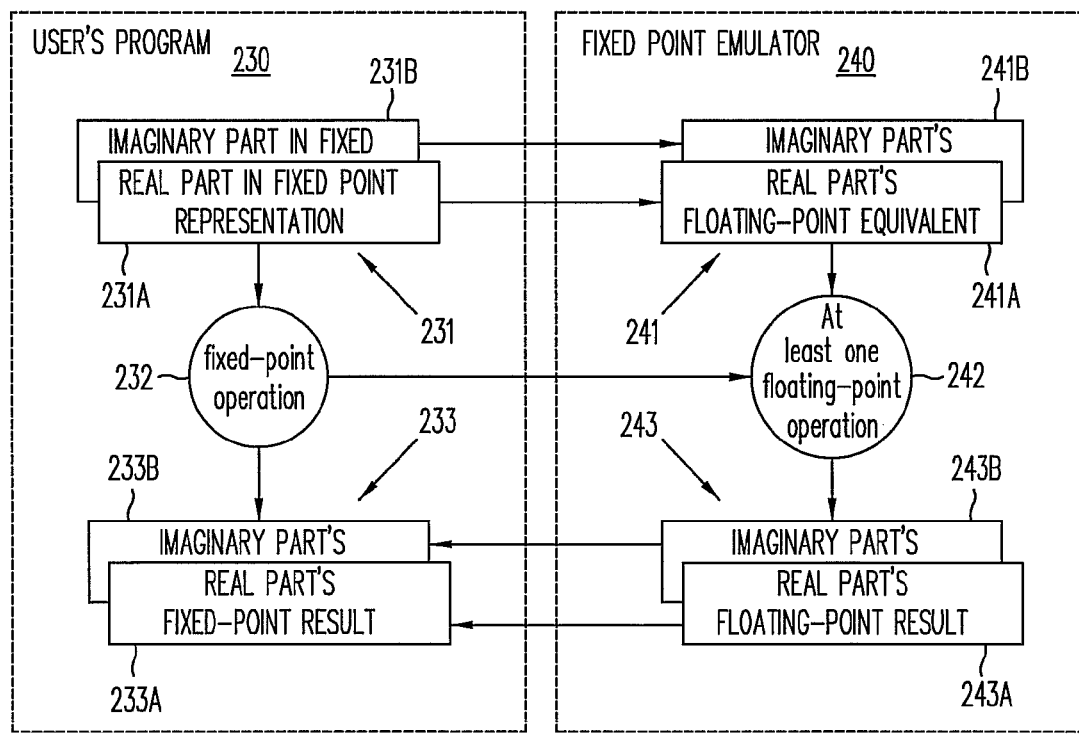
FIG. 2B illustrates, in a high-level block diagram similar to FIG. 1A, a fixed point emulator for a complex fixed-point operand (which may be either a variable or a constant) that yields a complex fixed-point result.

Furthermore, a user's program 230 (FIG. 2B) may contain a complex number 231 in fixed-point representation, wherein number 231 includes a real part 231A and an imaginary part 231B. Computer 240 is programmed to convert (i.e. expand) fixed-point real part 231A and fixed-point imaginary part 231B into the respective floating-point equivalents 241A and 241B. Each of these two parts is stored as a double-precision number in certain embodiments of computer 240. Thereafter, computer 240 performs a floating-point operation 242 on the complex floating-point equivalent 241 (formed by real part 241A and imaginary part 241B), to generate a complex floating-point result 243. Complex floating-point result 243 in turn is converted (i.e. reduced) to a complex fixed-point result 233 by performing the conversion (i.e. reduction) on each of the real part 243A and the imaginary part 243B respectively.

The number of execution level operations that are performed on floating-point equivalent by computer 240 depends on the fixed-point operation 232. For example, in an architecture that directly supports addition of complex numbers, a single floating-point operation 242 (of addition) is performed by computer 240 when the fixed-point operation 232 is a fixed-point complex addition operation. In a different example, a series of operations 242 (for example, floating-point multiplications and additions) are performed when performing a complex fixed-point multiplication operation 232 of two floating-point equivalents 241.

Figure 2C:
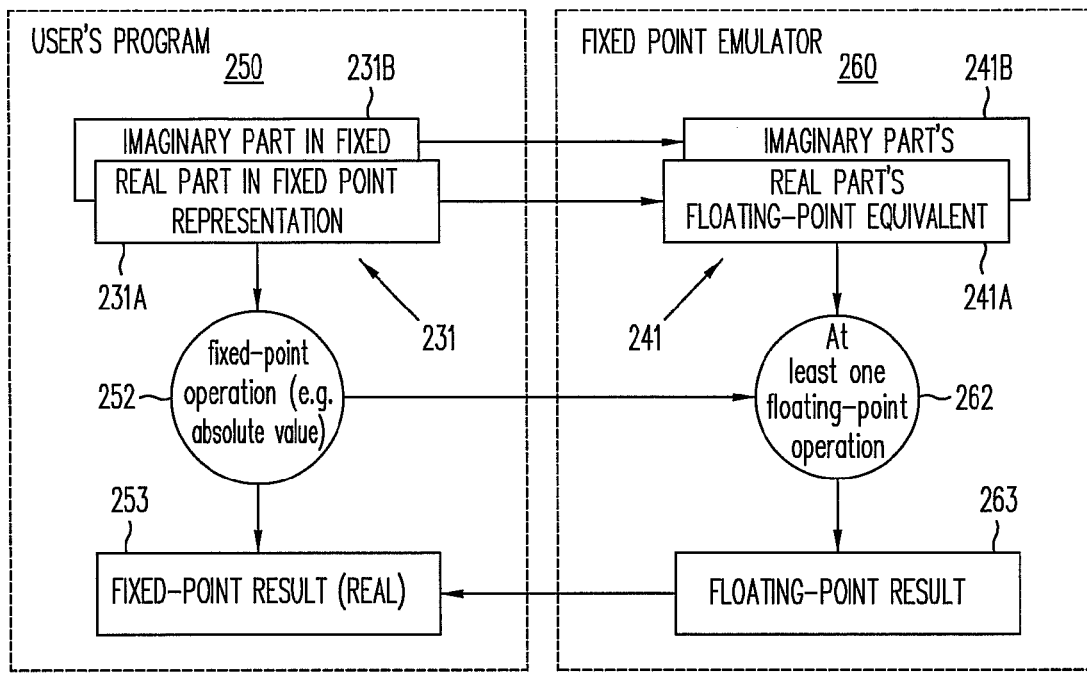
FIG. 2C illustrates, in a high-level block diagram similar to FIG. 1A, a fixed point emulator for a complex fixed-point operand (which may be either a variable or a constant) that yields a real fixed-point result.

As shown in FIG. 2C, a users program 250 may contain a complex number 231 in fixed-point representation (as described above in reference to FIG. 2B). In the embodiment of FIG. 2C, as described above in reference to FIG. 2B, complex number 231 is converted (i.e. expanded) by computer 260 into floating-point equivalents 241A and 241B. Each of these two parts is stored as a double-precision number in certain embodiments of computer 260. Thereafter, computer 260 performs a floating-point operation 262 on the complex floating point equivalent 241 (described above) to yield a real floating-point result 263. This result 263 is then converted (i.e. reduced) into real fixed-point result 253 that is further used in users program 250.

The number of execution level operations that are performed on floating-point equivalent by computer 260 depends on the fixed-point operation 252. For example, a single floating-point operation 262 of extracting the real part of a complex number is performed by computer 260 when the fixed-point operation 252 is the MATLAB function "real". In a different example, a series of operations 262 (for example, floating-point multiplications and divisions) are performed when performing an absolute value operation 252 of two floating-point equivalents 241.

Figure 2D:
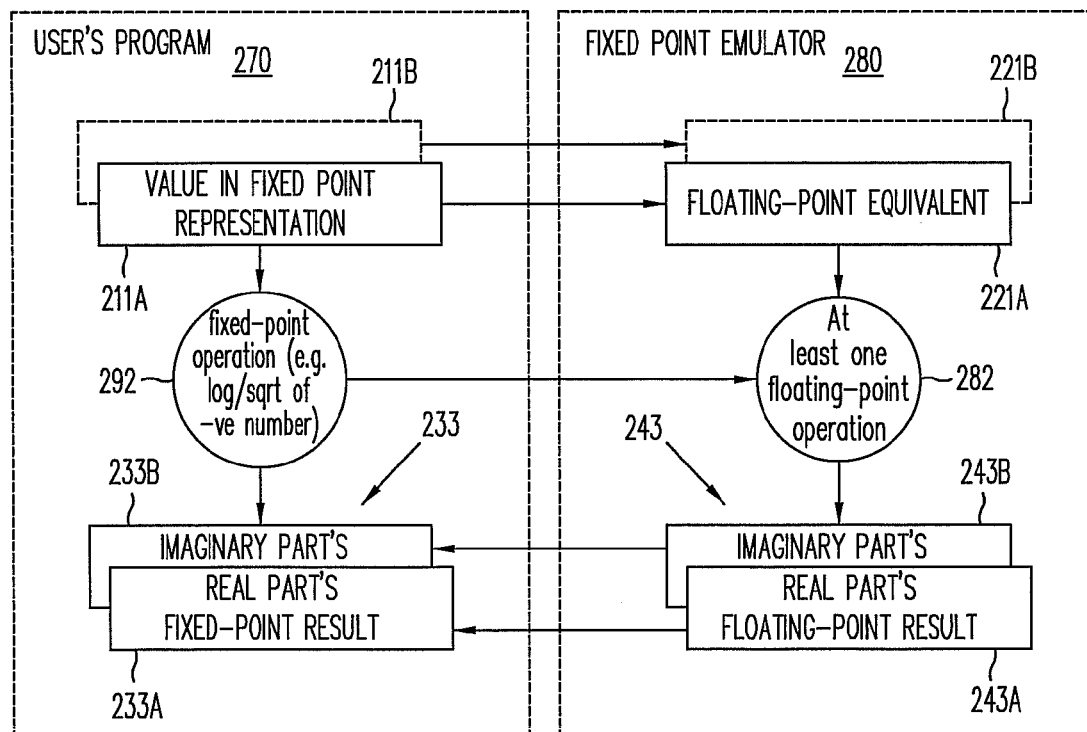
FIG. 2D illustrates, in a high-level block diagram similar to FIG. 1A, a fixed point emulator for a pair of real fixed-point operands (which may be one of a) two variables, b) a variable and a constant, or c) two constants) that yields a complex fixed-point result.

As shown in FIG. 2D, a users program 270 may contain a pair of real numbers 211A and 211B in fixed-point representation (as described above in reference to FIG. 2A). In the embodiment of FIG. 2D, as described above in reference to FIG. 2A, numbers 211A and 211B are converted (i.e. expanded) by computer 280 into floating point equivalents 221A and 221B. Each of these numbers is stored as a double precision number in certain embodiments of computer 280. Thereafter, computer 280 performs a floating point operation 282 on the floating-point equivalents 221A and 221B to yield a complex floating-point result 243. This result 243 is then converted (i.e. reduced) into complex fixed-point result 233 that is further used in users program 270. In FIG. 2D the fixed-point operation 292 may be a single operand operation (such as the square root of a negative number) or a multiple operand operation (such as the MATLAB function "complex", which forms the complex number a+b*i from two operands a and b). In some embodiments, normalization will be done in the case of multiple operand operations, as discussed below, if the property values are different.

Figure 3A:
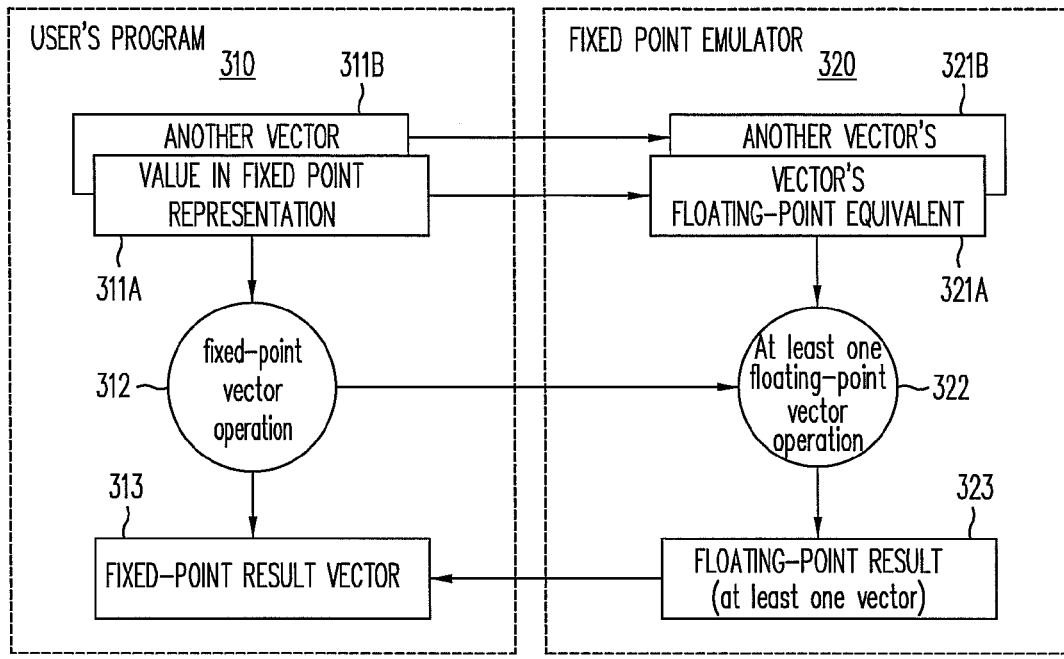
FIGS. 3A and 3B illustrate, in diagrams similar to FIGS. 1A and 1B respectively, an embodiment of the invention that uses vector operands.

Although the above description of FIGS. 2A, 2B, 2C, and 2D refers to scalar operands, certain embodiments operate on vector or array operands in a manner similar or identical to that described above. As used herein, the term "vector" denotes a one-dimensional collection of numbers; the term "array" denotes a multi-dimensional collection of numbers. For example, FIG. 3A illustrates two vector operands 311A and 311B (each containing fixed-point numbers as elements) provided in program 310 as input to a fixed-point vector operation 312. Many of the reference numerals in FIG. 3A are obtained by adding 100 to the corresponding reference numerals in FIG. 2A.

Vector (or array) operands 311A and 311B may have associated properties 311PA and 311PB (such as signedness, complexness, precision, and scaling factor). Associated properties 311PA and 311PB are not explicitly listed in FIG. 3A, but their format is detailed for one embodiment in FIG. 4D. In one embodiment of this invention, the fixed-point representation stores a single common value for each of these properties for each vector (or array). For example, all elements of vector 311A may have the property of being unsigned, in which case, only one value of unsignedness is stored in memory for the entire vector 311A, regardless of the number of elements in that particular vector or array.

Figure 3B:
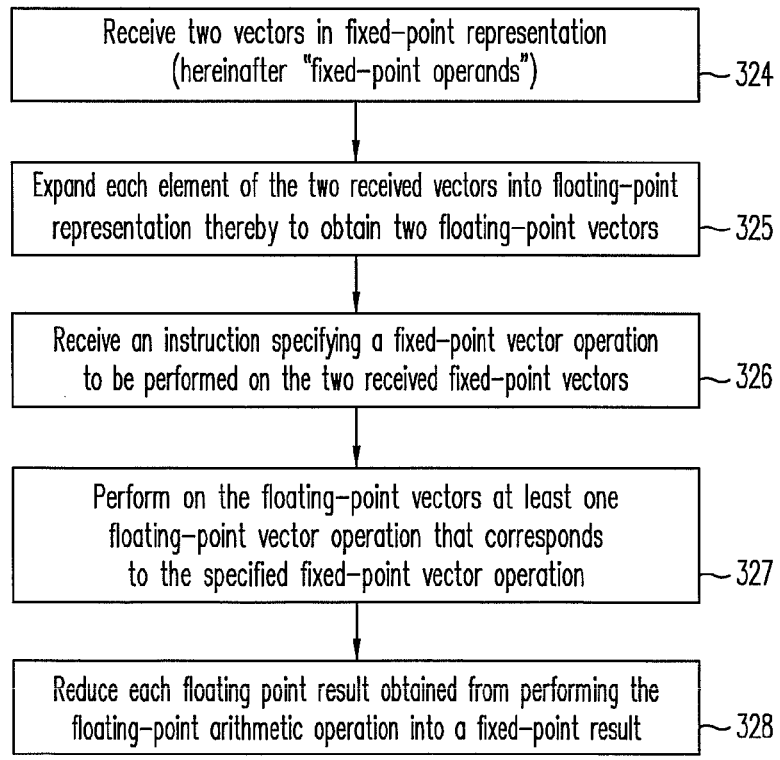

Computer 320 (which operates as a fixed-point emulator) performs a floating-point vector operation 322 on the floating-point vector operands 321A and 321B, as per act 327 in FIG. 3B.

Prior to act 327, floating-point vector operands 321A and 321B are obtained from the corresponding fixed-point vector operands 311A and 311B, by conversion of each element of each vector operand (as per act 325 in FIG. 3B), in the manner described above for one or more scalar operands. Note that the vector conversion just described differs from an expansion of a scalar in the sense that a single set of properties (regardless of the number of elements of the vector) may be used for the vector operand as described below in reference to FIG. 4D. If such optimization is not done, then the vector conversion is no different then a number of scalar expansions equal in number to the number of elements in the vector.

Furthermore, each floating-point element of a result vector 323 that is obtained from operation 322 is converted (as per act 328 in FIG. 3B) to a corresponding fixed-point element of result vector (or array) 313. In some embodiments, result vector (or array) 313 has a property 313P of the same value as one of the two input properties 311PA and 311PB (for example, if 311PA is unsigned and 311PB is signed, the result property 313P is unsigned).

In other embodiments, result vector (or array) 313 has a property 313P that depends in some manner on the input properties 311PA and 311PB (for example, if property 311PA has a precision of left=4, right=8 and property 311PB has a precision of left=2, right=6 and the fixed-point vector operation is multiplication, the result property 313P has a precision of left=6, right=14, formed by summing the left and right values, respectively). In the just described example, the precision of the result is dependent on the instruction that is being performed, although in other embodiments, the precision of the result may be independent of the instruction (for instance, in the case of an addition operator).

Therefore, as described in the above example, the two fixed-point representations of the operands (also referred to as "first fixed-point representations") are different from the fixed-point representation of the result (also referred to as "second fixed-point representation"). In such cases, methods of the type described herein use the previously stored precision properties 463A and 463B in state vector 460 of FIG. 4E to determine the precision of the result.

Figure 4A:
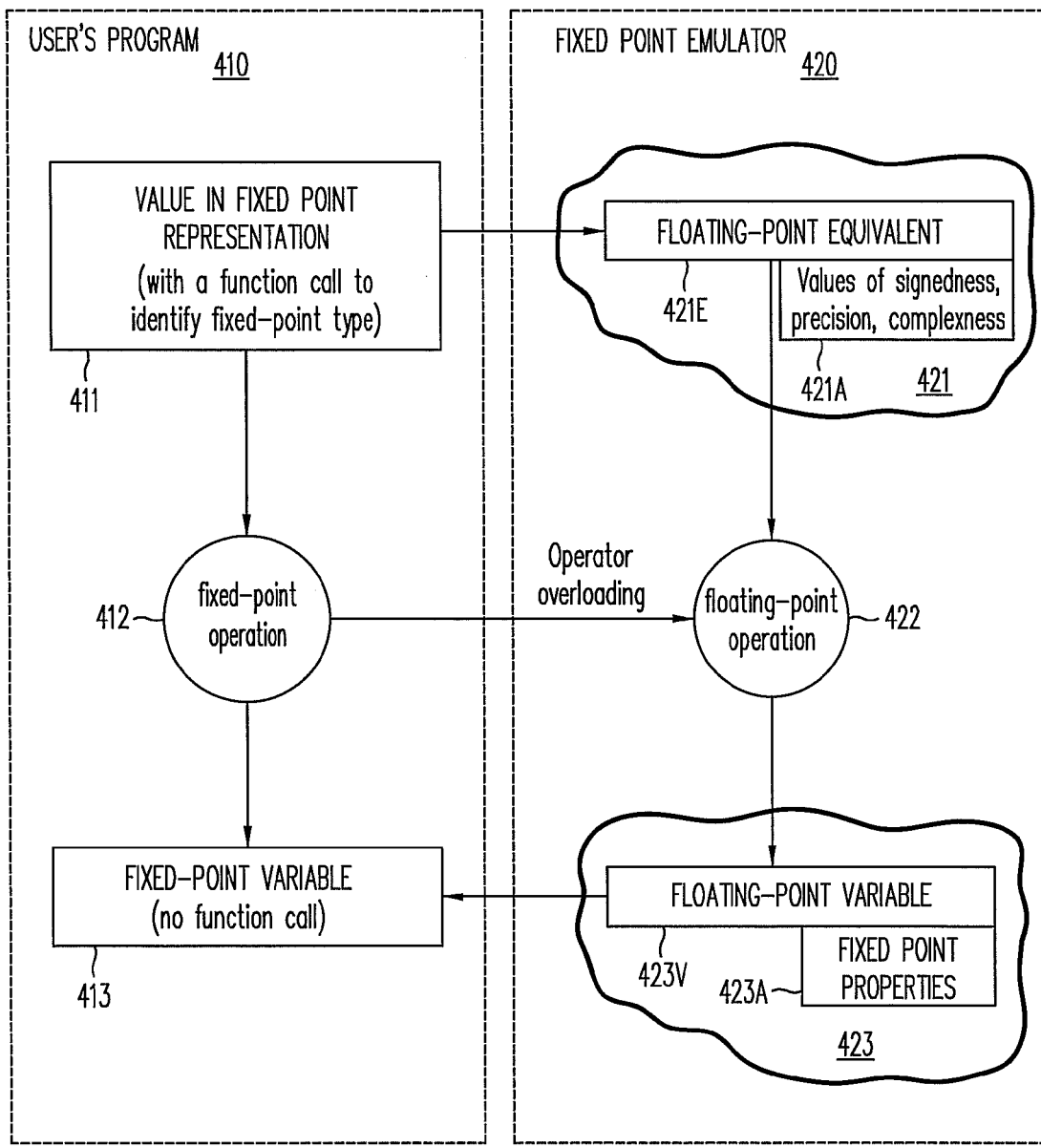
FIG. 4A illustrates, in a high-level block diagram similar to FIG. 1A, one specific implementation of a fixed point emulator that uses function calls to identify fixed-point variables and that uses operator overloading when specifying the to-be-performed fixed point operations.
Figure 4B:
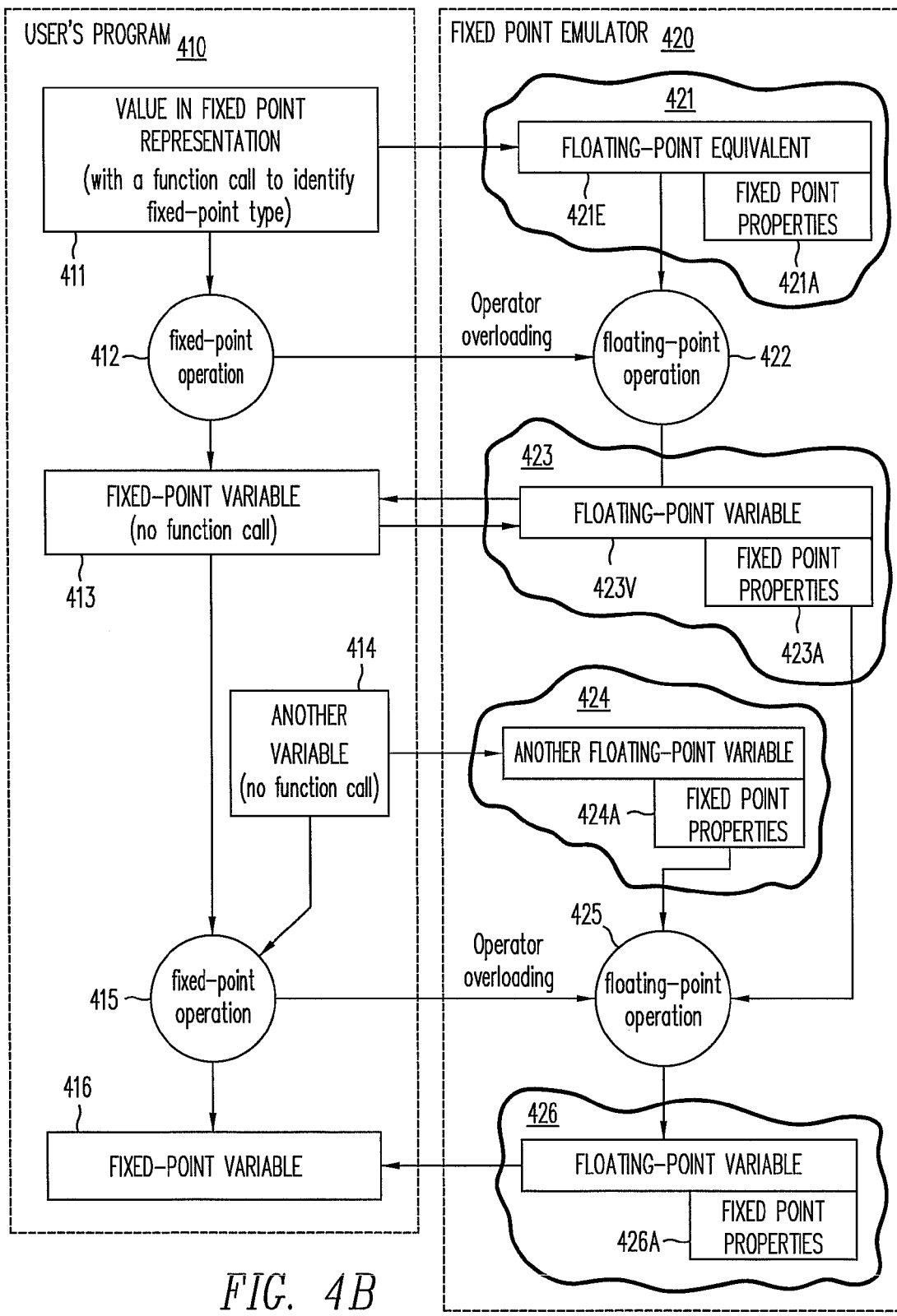
FIG. 4B illustrates, in a high-level block diagram similar to FIG. 1A, the implementation of FIG. 4A wherein the type of operands is propagated across one or more operations in certain embodiments of the invention.
Figure 4C:
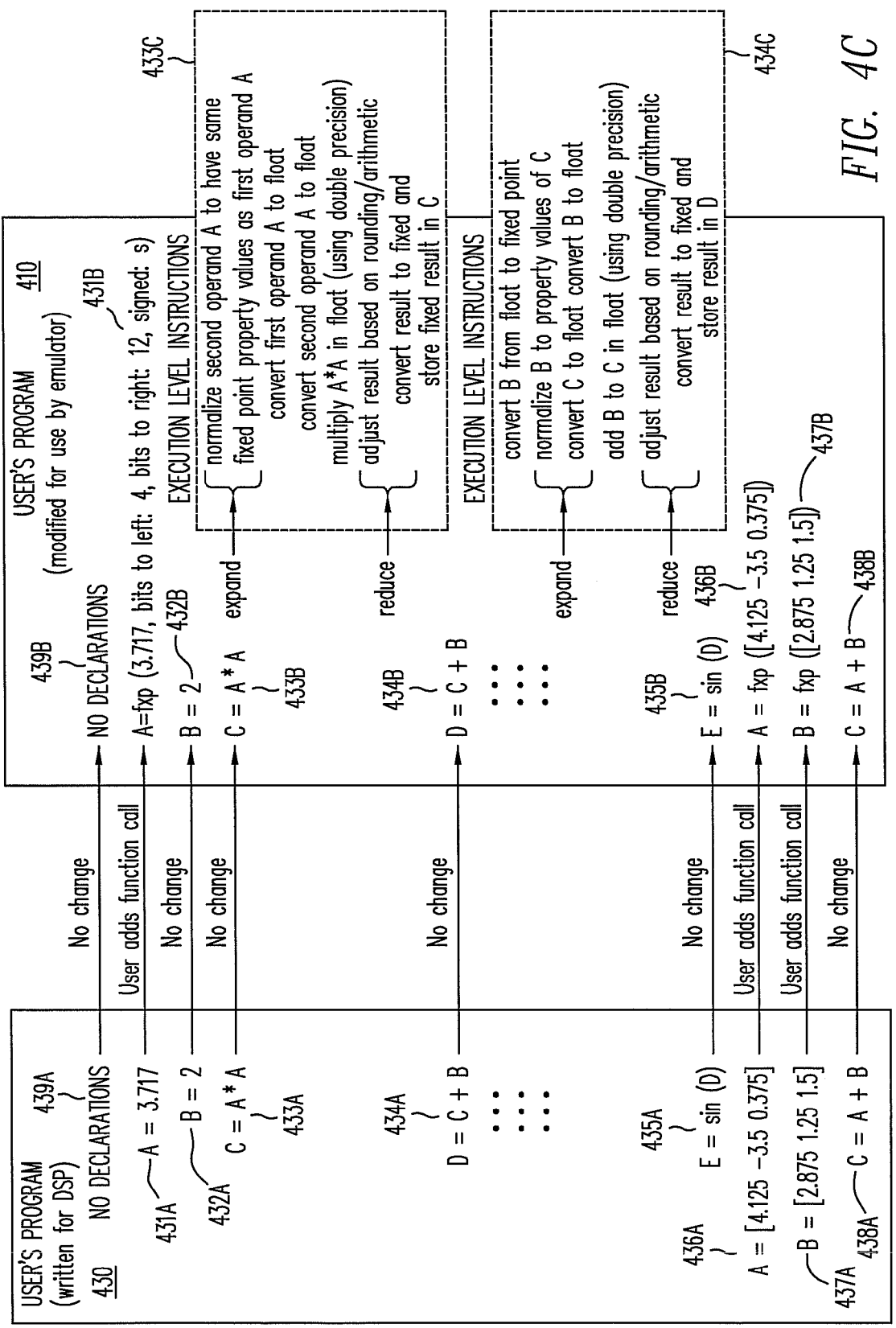
FIG. 4C illustrates a user's program written for a fixed point processor being changed for use with a fixed point emulator of the type illustrated in FIG. 4A.
Figure 4D:
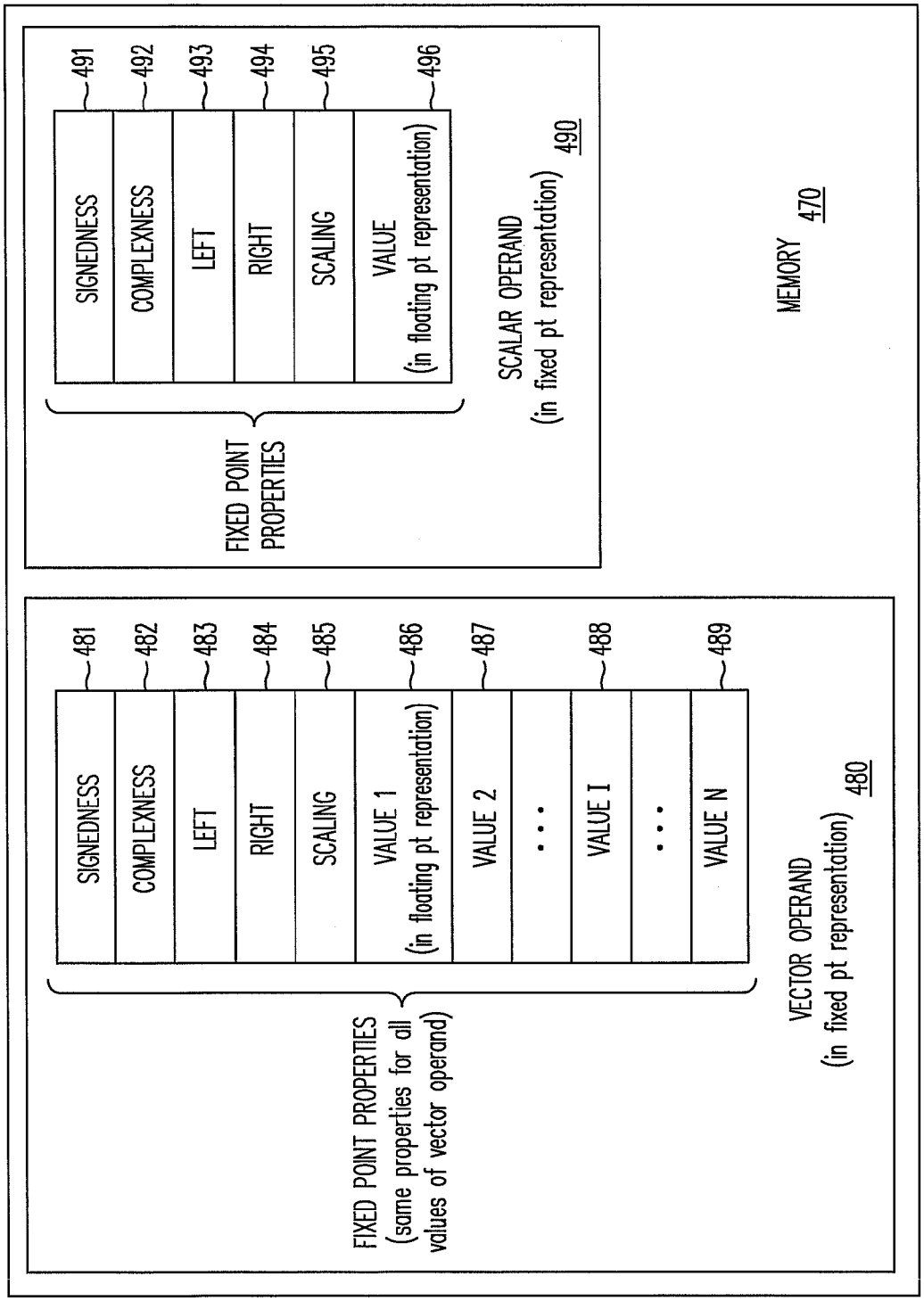
FIG. 4D illustrates the properties of vector and scalar fixed-point objects in the memory of a computer that has been programmed in accordance with the invention.
Figure 4E:
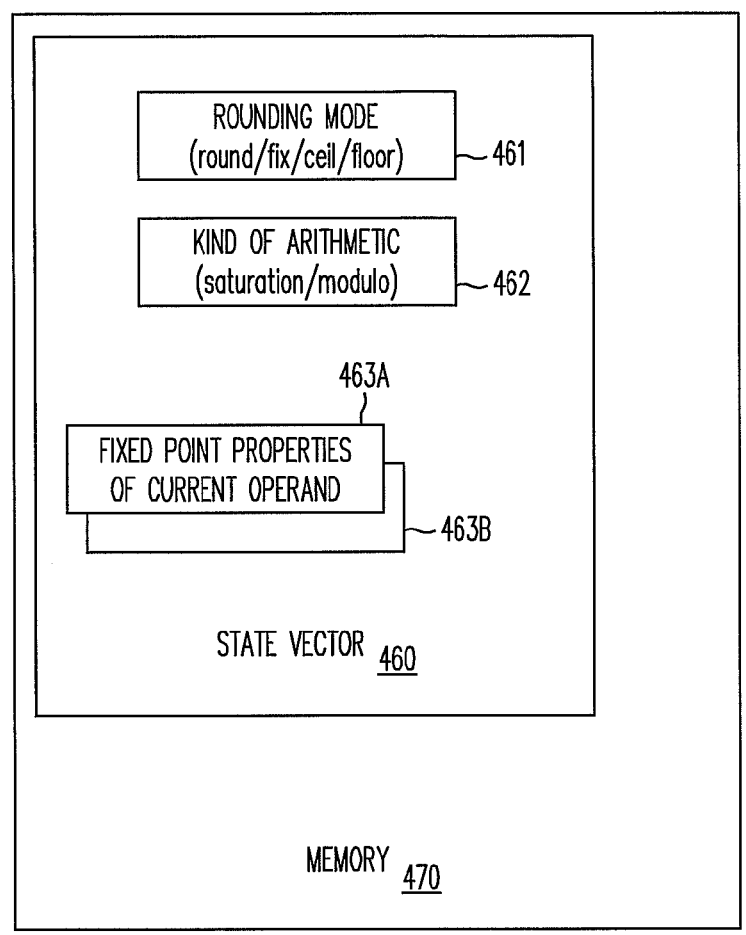
FIG. 4E illustrates the values contained in a state vector in the memory of a computer during an emulation of a fixed-point operation in several embodiments of the invention.

In some embodiments, the value of the signedness property of the result is determined in a similar manner from the signedness properties of the fixed-point operands, using the signedness values from the stored properties 463A and 463B of FIG. 4E. For instance, in some embodiments if a signed fixed-point number is added to an unsigned fixed-point number, the resulting fixed-point number is unsigned.

In some embodiments, the value of the complexness property of the result is determined from the complexness properties of the fixed-point operands, using the complexness values from the stored properties 463A and 463B of FIG. 4E. For example, in some embodiments, adding a real fixed-point number to a complex fixed-point number yields a complex fixed-point result.

In some embodiments, the value of the scaling factor for the result is automatically determined from the scaling factors of the fixed-point operands, using the scaling factors stored in location 485 in FIG. 4D. For example, multiplying two fixed-point operands yields a fixed-point result with a scaling factor equal to the sum of the scaling factors 485 of the operands. Similarly, dividing two fixed-point operands yields a fixed-point quotient with a scaling factor equal to the scaling factor of the dividend minus the scaling factor of the divisor. In some embodiments, warning or error messages are issued under the control of a predetermined flag when a request is made in a specification level operation to combine two invalidly scaled operands. For instance, an attempt to add two fixed-point operands that have different scaling factors (e.g. the scaling factor of the first operand is 1 and the scaling factor of the second operand is 2) results in a warning message in some embodiments. A skilled artisan, in view of these disclosures, can easily extend the number of cases of invalid combinations of scaling factors.

Figure 4F:
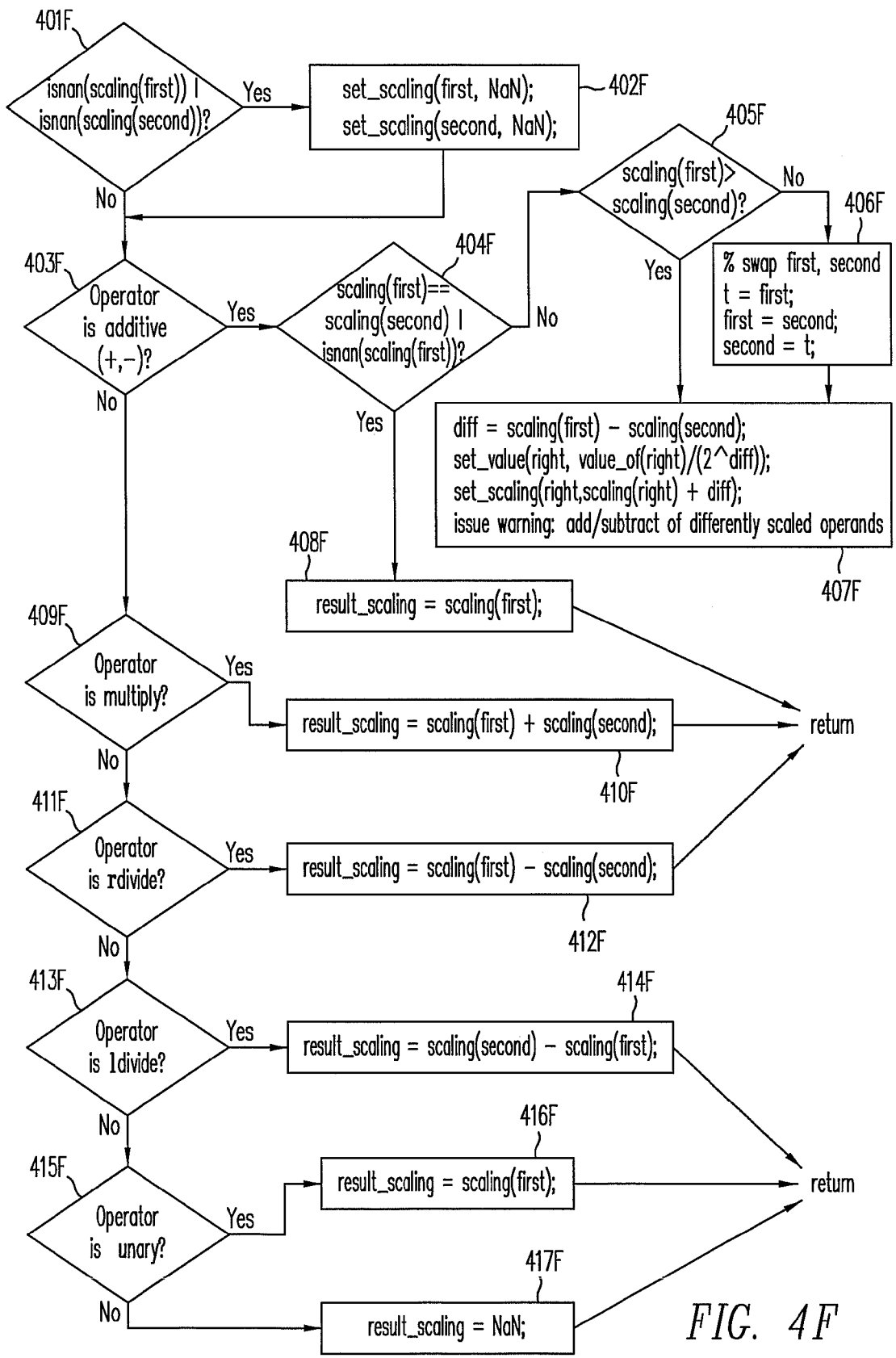
FIG. 4F illusrates, in a flow chart, acts performed to determine whether operands are validly scaled and to compute the scaling factor of the result in one specific implementation of a fixed-point emulator in accordance with the invention.

In some embodiments, attempts to combine invalidly scaled operands are automatically rescaled by the programmed computer to produce validly scaled operands, as shown in FIG. 4F. For instance, the attempt to add a fixed-point operand with a scaling factor of 1 ("first operand") with a second fixed-point operand with a scaling factor of 2 ("second operand") is handled by dividing the value of the "first operand" by 2 and changing the scaling factor of the first operand to be 2. In some embodiments, the floating point value "NaN" is used to represent an unknown or invalid scaling factor for an operand (and thereafter, any further operations involving an operand having a "NaN" scaling factor will propagate a "NaN" scaling factor).

In FIG. 3B, the fixed-point vector operands are received in act 324 and the instruction containing a fixed-point vector operation to be performed in these operations is received in act 326. As noted above, act 326 may be performed after act 325 in case of an interpreter, whereas the opposite is true in case of a compiler.

One or more of the above-described embodiments may be implemented to extend any conventional dynamically-typed language, in which all real numbers are by default assumed to be floating-point double precision numbers. For instance, in one embodiment that uses IEEE standard 754 for double precision numbers, real numbers are stored in a 64 bit word, with 53 bits used for the mantissa and 11 bits used for the exponent. Other embodiments may use different sizes for storing the mantissa and exponent of double-precision numbers.

Several such embodiments are illustrated in FIG. 4A wherein a value 411 is explicitly identified by a user as being in a fixed-point representation, e.g. by making a call to a function prior to a first use of value 411. Computer 420 recognizes the function call as an indication that a variable that holds the result from the function is a fixed-point number. In the just-described embodiments, if a real number is not explicitly identified by a user as being fixed-point, then the real number is handled by computer 420 in the normal manner, i.e. as a double precision floating-point operand.

If a dynamically-typed language is object-oriented, the function being called can be, for example, a constructor function of an object 421 (FIG. 4A) that holds a floating-point equivalent 421E of the fixed-point value 411. Object 421 is therefore instantiated by the function being called, using a predetermined class. Such an object 421 may also include one or more properties 421A of the fixed-point representation of value 411. For example, the fixed-point representation may have a predetermined precision and scale (or a predetermined left and right subproperty). Such information is also stored in object 421 as fixed-point properties 421A.

As illustrated in FIG. 4D, in one specific exemplary embodiment, fixed-point properties 421A (from FIG. 4A) that are used include the following: the signedness property (whether or not the value is being held is signed or unsigned) in memory location 481 (which is held as, e.g. Boolean or double precision), the complexness property (whether or not the value being held is a real value (imaginary part equal to 0) or a complex value) in memory location 482 (which can be held as, e.g. Boolean or double precision), bits to the left of binary point (which is held as, e.g. integer or double precision) in memory location 483, bits to the right of binary point (which is held as, e.g. integer or double precision) in memory location 484; and scaling factor (which is held as, e.g. integer or double precision) in memory location 485. Note that number of bits to left 483 and number of bits to right 484 together form the precision property.

Although properties 481-485 are shown in FIG. 4D as being a portion of fixed-point representation of vector operand 480, as would be apparent to the skilled artisan, one or more such properties are stored separately from the representation 480, and linked thereto, in alternative embodiments.

Applicant has recognized that the precision of a fixed-point number is determined by setting any two of the three sub-properties: number of bits to the left of the decimal or binary point (left), number of bits to the right of the decimal or binary point (right), and total number of bits in the number (size). While in one embodiment illustrated in FIG. 4D the number of bits to the left 483 and the number of bits to the right 484 have been used to represent precision, in one alternative embodiment, the size and the number of bits to the left are used. In another alternative embodiment, the size and the number of bits to the right are used to represent precision. In all of the three embodiments just described, the precision is represented in at least two memory locations. Note that it is possible to represent precision in three memory locations by redundantly storing all three of the just-described numbers.

In some embodiments, certain advantages are obtained by storing the scaling factor 485 in the fixed-point representation 480 in memory 470 of a computer, as shown in FIG. 4D. Such storage eliminates the need for the programmer to keep the scaling factors in his head, and allows automatic detection of programmer errors by the computer. For example, an attempt to add two fixed-point numbers that have different scaling factors 485 is automatically detected and an error message is displayed to the programmer in certain embodiments. Note that in other embodiments, such a scaling factor is not stored in memory 470, for example, if such error messages need not be generated.

In this embodiment, values representing the numbers are also stored in memory 470, in memory locations 486-489. Note that the values may be stored in memory locations 486-489 in a common format which can be any of several formats, including integer and (in one specific embodiment) floating-point (for example, IEEE standard 754). Note also that memory locations 481-489 together represent a single vector operand 480. In a similar manner, a single scalar operand 490 may be held in memory locations 491-496. The reference numbers 491-496 are obtained by adding 10 to the corresponding reference numbers 481-486. Note that in the case of a scalar operand 490, only one value of the fixed-point number is stored at memory location 496 in floating-point representation. In an embodiment that works with MATLAB, instead of a single value being stored at location 496, a pair of values (real part and imaginary part) is stored in a corresponding pair of memory locations (i.e., at least one additional memory location not shown in FIG. 4D is required and used when the two parts are to be stored separately in some embodiments).

Because fixed-point values can only take on values within a limited range of numbers while data values may vary widely according to domain, programmers typically have to scale their data into a range that fits their fixed-point representation. For instance, if a given set of data values vary between $1.0*2^{+100}$ and $1.5*2^{+100}$, a user will typically represent the data in fixed-point as numbers varying between 1.0 and 1.5, and will remember that the true number is actually the fixed-point number multiplied by $2^{+100}$. The scaling propery is provided for all fixed-point numbers to enable the user to explicitly track (i.e. store) this scaling factor rather than implicitly tracking it in his memory. Note that this scaling factor is related to, but slightly different from, the scale of a fixed-point number. The scale relates to the value of the number stored in the computer; the scaling factor relates the value of the number stored in the computer to the number that describes the physical quantity being measured.

In several embodiments as illustrated in FIGS. 4A and 4B, the above-described predetermined class is used to instantiate another object to hold a result 423 generated by performance of the floating point operation 422. Note that floating-point operation 422 may be indicated using the very same operator that is used for fixed-point operation 412 (e.g. via operator overloading). The property values 423A of the fixed-point result 423 may be determined by a number of factors, including the property values 421A of the input operand (or operands) and the operator. So, computer 420 thereafter generates a fixed-point result 413 from the floating-point result 423, as described herein. In a number of embodiments, the property values 423A are identical to the property values 421A, except, for example, in case the operation is absolute value and the operand is complex or, for example, in the case the operation is square root and the operand is a negative real fixed-point number.

Consider, for instance, the following examples which a skilled artisan will recognize in view of this disclosure to be easily extended into more general cases. In the examples, the notation "fxp(l, r, s)" means a real fixed-point number or vector which has "l" bits of precision to the left of the decimal/binary point, "r" bits of precision to the right, and is signed if "s" is 1 and unsigned if "s" is 0.

a) abs(fxp(l,r,s)) can be an fxp(l,r,s) if s is 0 (unsigned).
 b) abs(fxp(l,r,s)) can be an fxp(l,r,s) if s is 1 (signed), if overflow is permissible in some cases.
 c) abs(fxp(l,r,s)) can be an fxp(l+1,r,s) if s is 1 (signed) and overflow is not acceptable.
 d) fxp(l,r,s)+fxp(l,r,s) can be an fxp(l,r,s) if overflow is permissible in some cases.
 e) fxp(l,r,s)+fxp(l,r,s) can be an fxp(l+1,r,s) if overflow is not acceptable.
 f) fxp(l,r,s)*fxp(l,r,s) can be an fxp(2*l−1, 2*r+1, s) if s is 1 (signed) and overflow is permissible for one specific case.
 g) fxp(l,r,s)*fxp(l,r,s) can be an fxp(2*l, 2*r, s) if s is unsigned or if overflow is not acceptable in any cases.
 h) fxp(l,r,s)*fxp(l,r,s) can be an fxp(2*l, r, s) if s is unsigned, extra bits of precision are not important, and a small amount of overflow is acceptable.
 i) fxp(l,r,s)*fxp(l,r,s) can be an fxp(l,r,s) if the application is such that the extra bits of precision are not significant and overflow is acceptable.

Extrapolating from these cases, it should be apparent to a skilled artisan that the properties of the results depend on a) the left subproperty of the input operands, b) the right subproperty of the input operands, c) the signedness property of the input operands, d) the operator, and e) the complexness property of the input operands. The function which maps these input properties to the corresponding result properties is known as the "result characteristic function". Table A (listed below) gives the defaults for the result characteristic function used in a specific embodiment.

Because the result properties are dependent on the input properties listed previously (making the result properties a function of the input properties), some embodiments may determine result properties via any programming mechanism used to implement a function. That is, such embodiments may embed the "function" of the input parameters directly into the code; they may create a table of function pointers which are called for specific input properties; they may embed the function in a table which is read by the code and used to calculate result properties; or they may use any other programming method used to program computational functions.

As is indicated by previous examples, users often desire to change the result properties of certain operands based on the application. Some embodiments allow such flexibility by providing the user access to interfaces to set or change precision of operators. An illustration of such functionality is an "fxp_precision" function as used below. Such a function allows the precision of specific operators to be adjusted to the users' requests. For instance, many digital signal processors use a wide accumulator for summing up the results of multiplies (a multiply-and-accumulate or MAC instruction) on vectors. To represent such an architectural feature, users will want to specify that the results of any addition are the width of the accumulator. If, for instance, the accumulator is 40 bits wide, the first statement below would be used to indicate that the results of adding two 8-bit numbers should be a 40-bit number:

```
fxp_precision ('+', 8, 8, 40)
acc = dot (A,B)
```

In another context within the same program, the users may wish to avoid the accumulator, and do addition within a standard arithmetic unit. The "fxp_precision" functionality can be used in such a case to specify that the result of adding two 8-bit numbers is an 8-bit number:

```
fxp_precision ('+', 8, 8, 8)
mean = (acc1 + acc2)/2
```

In other contexts, the user may increase the precision by one bit, to avoid overflow. A typical use for this would be in hardware design, where users are designing full adders.

```
fxp_precision ('+', 8, 8, 9)
mean = (mean*100)+mean;
```

For this reason in some embodiments, the user sets precision for performance of an operation, and then the computer performs the operation at the set precision. Furthermore, in certain embodiments, a user may specify different properties for the result, e.g. by using a variable having the different properties to hold the result.

Depending on the embodiment, a constructor function (e.g. having the name "fxp") that is used to identify the fixed-point variable 411 in program 410 may be designed to receive an indication of one or more properties of the fixed-point operand, e.g. the size (in bits) of a storage element that is to hold the real number, and the precise location of a binary point within the size. Alternatively, a function may be limited to just identifying an operand as being of the fixed-point type. In such embodiments, all operands may be deemed to have a common type which is previously specified (e.g. via another function or a separate instruction). The fixed-point properties of any particular operand may be alternatively specified via another function call, depending on the embodiment.

Several embodiments in accordance with the invention support implicit conversion into fixed-point types caused by propagation of a previously-specified fixed-point type across an operation. Specifically, as illustrated in FIG. 4B, when a fixed-point variable 423 is one of two operands that are to be operated upon by a floating-point operation 425, the other operand (derived from variable 414 specified by the user) is automatically converted into the same fixed-point type as variable 423 even if the user has not explicitly indicated variable 414 as being of the fixed-point type. Therefore, operation 425 is performed on two fixed-point operands 423 and 424, to obtain a result 426 which is also a fixed-point type whose characteristics (precision, signedness, etc.) are determined by applying the result characteristic function (defined previously with the reference to Table A) to the properties of operands 423 and 424 and the combining operator.

The above-described features of type propagation and operator overloading allow a program that is specified in floating-point to be converted for a a fixed point processor (such as a DSP) by inserting a function call at the first occurrence of a variable or expression that is to be fixed-point or that needs its fixed-point properties changed. No other change is necessary throughout the rest of the program (unless the type of a variable is changed). For example, as illustrated in FIG. 4C, a DSP program 430 may be converted into a program 410 to be used as input to emulator 420 simply by replacing a statement 431A by another statement 431B. Specifically, statement 431B includes a call to the constructor function "fxp" to identify the variable "A" as being of type fixed-point, because this statement is the first time that variable A has been defined. Note that statement 431B includes identification of a number of properties, specifically of 4 bits to the left of the binary point, 12 bits to the right of the binary point, and the property of being signed. In an alternative embodiment, statement 431B does not include any arguments other than the value to the constructor function "fxp". In this alternative embodiment, the modified interpreter automatically assumes certain defaults, such as number of bits to the left of the binary point being 8 when not explicitly specified.

As illustrated in FIG. 4C, statement 433A in program 430 is not changed. Instead, the variable C in statement 433B is automatically assigned (by an interpreter or compiler) to have the fixed-point properties defined by applying the result characteristic function to the operator "*" and the properties of variable A, by virtue of the above-described type propagation. Furthermore, no change is made to statement 434A; variable D in statement 434B receives fixed-point properties defined by applying the result characteristic function to the operator "+", the properties of the variable C and the properties of the variable B. Note that such type propagation can occur indefinitely within program 410, e.g. to variable E in statement 435B. Therefore, during such type propagation as is performed by the modified interpreter, the precision of the fixed-point operand (such as the variable 'C' in statement 433B) is used during emulation of another instruction (e.g. statement 434B) that uses a result of the fixed-point arithmetic operation (e.g. statement 433B).

The just-described type propagation allows a user to (a) develop their algorithm in floating point in the normal manner, (b) insert function calls for variables that are fixed-point and identify their properties, (c) use emulation to test the algorithm's expected behavior on fixed-point hardware, and if not satisfied go back to (b) to change the properties, and eventually when satisfied go to (d) where a compiler is used to generate executable code for the fixed-point hardware. In act (b) above, the user needs to merely insert an "fxp" or "cfxp" (where 'cfxp' designates the function used to create complex fixed-point variables) constructor function call as appropriate for each newly-created variable or each variable whose type is being changed from a previously-used type. This novel method of developing fixed-point programs is superior in many ways to the current state of the art: it is simpler to implement; it is less error-prone; and it requires far fewer changes to floating-point source programs, so that the floating-point program and the equivalent fixed-point program are similar in appearance.

Note that the above-described act (b) of inserting function calls eliminates the need to use header files of the type described by Lee in U.S. Pat. No. 6,460,177. Another difference over Lee's teachings is that Lee specifically excludes the use of classes and overloading to emulate fixed-point instructions using floating-point arithmetic (see Lee's column 3, line 40). In contrast, several embodiments of the type described herein use classes, overloading and type propagation to eliminate the need for a programmer to change every line of their program where a fixed-point variable occurs.

Furthermore, in certain embodiments of the type described herein, the user can dynamically change the type of a variable during execution in the interpreter (e.g. so that at a given moment in time the result of multiplying two 8-bit numbers is stored in a 16-bit word rather than 8-bit word, and then at a later point in time the user may change the type of the result back to 8-bit word).

Moreover, Lee also makes no mention in U.S. Pat. No. 6,460,177 of the use of unsigned variables and complex fixed-point operands, whereas some embodiments of the type described herein use either or both of these. Specifically, several embodiments convert unsigned operands to floating-point type (which is signed) for emulation of the fixed-point operation, and thereafter convert a floating-point result back to unsigned type. In contrast, Lee's compiler automatically uses unsigned operands and unsigned operations so that an unsigned value results with no adjustment necessary. Similarly, Lee's compiler may use an integer processor built into the computer to support modulo and saturation arithmetic, and for this reason Lee does not do any thing special for these kinds of arithmetic. In contrast, several embodiments of the type described herein have functions to implement the appropriate arithmetic operation, depending on the value of a user-accessible flag which indicates 'modulo' or 'saturation'. Furthermore Lee fails to disclose or suggest certain embodiments of the invention that use classes to emulate fixed-point operations based on floating-point operations.

As illustrated in FIG. 4C, the specification level instruction 433B, although not changed from the corresponding instruction 433A in the user's program 430, is executed by use of a compiler/interpreter as the execution level instructions illustrated in 433C. Specifically, in some embodiments, instructions 433C include normalizing the second operand to have the same fixed-point property values as the first operand, and in this example, given that the two operands are the same, the act of normalizing is performed, but results in no change to the properties of the operands. After multiplication of the two operands in floating-point arithmetic, the floating-point result is adjusted based on the rounding mode and the kind of arithmetic (saturation, modulo).

Similar execution level instructions 434C are performed in response to the specification level 434B (which is obtained from the corresponding instruction 434A with no change thereof). One difference between 433C and 434C is that 434C includes a execution level instruction to convert the operand B. Certain embodiments of the just-described computer 120 use execution-level instructions that are designed to operate on floating-point numbers to execute operations that at the specification level are fixed-point. One critical aspect of this patent is the execution of fixed-point arithmetic using at least one floating-point execution-level operation, where execution level includes both the actual computer hardware as well as other intermediate abstraction levels beneath the specification language. Although specified as integer in 432A, operand B is recognized by MATLAB as a floating-point number, because MATLAB contains no direct support for integers, and therefore operand B is converted from floating-point to fixed-point in execution level instructions 434C. The normalization step in execution level instruction 434C gives the fixed-point equivalent of operand B the same property values as the fixed-point operand C.

To set up a computer to perform emulation in certain embodiments, the user installs software of the type described herein in a path (where "path" describes an ordered set of directories that an operating system or program searchs when hunting for programs or functions) that is searched by an interpreter or compiler when program 410 in FIG. 4A is interpreted or compiled (respectively). The software that is installed contains two types of functions: constructor functions (that in this embodiment are called "fxp" and "cfxp" for real and complex fixed-point, respectively) that are to be used whenever a fixed-point object is instantiated, and operator functions that are invoked when the interpreter/compiler encounters an operation to be performed on the real or complex fixed-point.

In a dynamically-typed language in which program 430 (FIG. 4C) is written, the type of a variable can be changed any number of times throughout the user's program. As illustrated in FIG. 4C, the variable 'A' is identified in statement 431B to be a scalar and the same variable 'A' is later identified in statement 436B to be a one dimensional vector of size 3. In order for definition of variable 'A' in statement 436B to become a fixed-point vector, the user must add the function call to the "fxp" function, as illustrated in statement 436B. If the "fxp" call is not inserted, the variable 'A' will remain as originally defined to be a one dimensional double-precision vector of length 3, as per statement 436A. Inserting the call to "fxp" in statement 436B will guarantee that the use of variable 'A' in statement 438B will be as a fixed-point vector.

While inserting the call to the "fxp" constructor function in statement 436B guarantees that further uses of the variable 'A' will access a fixed-point representation, it is not necessary in embodiments that support implicit conversion of double-precision operands. In such embodiments, when a binary operator is encountered in which one operand is fixed-point and the other is double precision, the computer is programmed to implicitly and automatically convert the double precision operand into fixed-point. As a result, the fact that the variable 'B' is converted to fixed-point via an "fxp" constructor call in statement 437B means that the use of variable 'B' in 438B is real fixed-point. Hence, the computer will automatically convert the use of 'A' in statement 438B into real fixed-point, if it is of a type other than real fixed-point. For this reason, the "fxp" constructor call for 'A' is not strictly required in statement 436B in all embodiments.

One example of a dynamically-typed language that is extended in some embodiments as described above in reference to FIGS. 4A-4C is MATLAB version 6 as described in, for example, a book entitled "MATLAB® The Language of Technical Computing, Using MATLAB" published 2002 and available from The MathWorks, Inc., 3 Apple Hill Drive, Natick, Mass. 01760-2098, USA, Phone 508-647-7000, and on the Internet at www.mathworks.com. The just-described book is incorporated by reference herein in its entirety.

Certain embodiments implement a compiler of the type described herein to parse programs written in the MATLAB language, recognize and infer fixed-point operations and operands, and generate machine instructions that directly execute the fixed-point operations. Specifically, when using several embodiments of the type described herein, the user does not need to statically define classes and interactions between classes in the manner described by Maurudis in U.S. Pat. No. 6,173,247. Instead, the dynamic typing features of MATLAB allow the user to specify the initial types of input variables using constructor functions such as "fxp" and "cfxp"; the language (not the user) then propagates these type definitions from the variables to their uses. Compilers for such programs must statically infer these variable types using static analysis techniques, such as data-flow analysis. Interpreters such as the MATLAB interpreter automatically handle object definitions and interactions at run time. Regardless, in no case does the user have to directly specify fixed-point classes and interactions between fixed-point classes. As illustrated in FIG. 4C, no declarations 439A are presented in users program 430 in embodiments supporting dynamically-typed languages, whereas such declarations are required for the static classes described by Maurudis. For this reason, no changes of the type described by Maurudis are applicable to the user program 430.

Furthermore, the static classes described by Maurudis require that class interactions be statically declared at compile-time. For instance, the class definitions in support of overloading the addition operator will specify (in conversion of programs as described by Maurudis) at compile-time the result of adding two 8-bit operands (for example, the result may be an 8-bit result with overflow, it may be a 9-bit result with no possibility of overflow, or it may be a 16-bit result that flows into an accumulator). Regardless of the choice of result, the type of the result will be fixed statically for the entire program as per Maurudis. In contrast to Maurudis, in embodiments in accordance with this invention that support dynamically-typed languages, the results of overloaded operators may be changed while the program is running (without the user having to specify the changes ahead of time). Thus, it is possible for the addition operator to be overloaded at one point of a program (in embodiments of the invention) with a function that causes the addition of two 8-bit operands to produce an 8-bit result, and at a later time in the program, the overloading function changed so that the addition of two 8-bit operands then produces a 9-bit result.

Specifically, classes for the objects are provided to the MATLAB version 6 interpreter by software prepared in the manner described herein. Such software is called a "toolkit" and serves to extend and/or modify the MATLAB interpreter to support fixed-point arithmetic. Depending on the embodiment, the fixed-point type of variables is either dynamically recognized or statically inferred. In the case of interpreters, the interpreter's engine must retain type information for variables (in addition to other information). Whenever it encounters an expression, the interpreter then has the types of the expression's operands, so that it can dynamically recognize the type of the expression. In the case of compilers, the compiler must effect some form of static analysis to determine the types of variables involved in an expression, in order to statically infer the expression type. One possible form of static analysis used in some embodiments is data-flow analysis, as described in Chapter 4.4 of a book entitled *Optimizing*

*Compilers for Modern Architectures* by Randy Allen and Ken Kennedy (and this chapter is incorporated by reference herein in its entirety).

In embodiments wherein a conventional interpreter (such as MATLAB version 6) automatically propagates type information of operands beyond an arithmetic operation (also called "first operation") that is being performed on the operands, the following modification is made to the interpreter. Specifically, a result of the first operation (for example, the result of statement 433B in FIG. 4C) is saved by the modified interpreter in fixed-point representation if either or both operands have fixed-point representation. Thereafter, in any subsequent arithmetic operation (also called "second operation") that uses the result (for example, statement 434B in FIG. 4C), a second operand (of the second operation) (the variable 'B' in the case of statement 434B in FIG. 4C) is converted by the modified interpreter into its fixed-point representation (if necessary, as is the case with the variable 'B' in statement 434B in FIG. 4C, which was a double precision variable at the completion of statement 432B), and then a corresponding floating-point arithmetic operation is performed by the modified interpreter on the floating-point equivalents of each of the result of the first operation and the second operand.

In certain embodiments, wherein the conventional interpreter (such as MATLAB 6) supports a dynamically-typed language, the following modification is made to the interpreter to support "mixed-mode" operations (i.e., multi-operand operations where the types of the operands differ). Specifically, for acceptable cases of conversion, the interpreter is modified to automatically convert an operand from its naturally-derived type to a type that is suitable for the operator and other operands. For instance, when presented with a binary operation between a fixed-point value and a double precision value (e.g. "A+1" where A is a fixed-point variable), the interpreter in these embodiments automatically converts the double precision value to the corresponding fixed-point value before effecting the operation (e.g. convert "1" to a fixed-point value with the same precision as "A").

A skilled artisan will easily recognize that this form of implicit conversion can be extended in the modified interpreter of the type described above to many properties and data types, including conversions between signed and unsigned values, conversions between real and complex values, conversions between fixed-point values with different precisions, and conversions between variables with different types. This implicit mixed-mode conversion simplifies the process of reducing a double precision program to fixed-point by automatically handling constants.

Polymorphism is supported in embodiments that extend the polymorphic languages that support operator overloading (e.g. MATLAB). Embodiments that overload all operators used within a function and that do not directly insert fixed-point constructors within the function enable a function to be polymorphically applied to fixed-point operands as well as all other operands.

Moreover, although a call to a single function is illustrated in FIGS. 4A-4C, in several embodiments either of two functions may be used to identify variables as being one of two different types, namely real fixed-point objects and complex fixed-point objects. Examples of such functions in one embodiment are the "fxp" and "cfxp" constructor calls described earlier. Furthermore, in certain embodiments, a single function (e.g. "fxp") may be used to identify not only real fixed-point objects but also complex fixed-point objects, e.g. by appropriately setting the value of a parameter that is passed to such a function (e.g. to the value "c" for complex real and "r" for non-complex real).

The real fixed-point and complex fixed-point objects may be represented in memory 470 using the data structures in FIG. 4D, wherein the difference between a real fixed-point object and a complex fixed-point object is as follows. The real fixed-point object has a value of 'real' (or, in some embodiments, "fxp") stored for its complexness property at memory location 492 while the complex fixed-point object has a value of 'complex' (or in some embodiments, 'cfxp') stored at location 492. As noted elsewhere herein, instead of a single value stored at memory location 496, two values (real and imaginary components) are stored for all scalar fixed-point objects (regardless of whether the object is real or complex) for embodiments that work with MATLAB. In such embodiments, the imaginary component of a real fixed-point object is always set to 0. In other embodiments, storage may be saved by storing only the real component of real fixed-point objects.

FIG. 4F illustrates via a flowchart setting of the scaling factor in embodiments of the invention that support scaling. In act 401F, the programmed computer examines the scaling factors of the operands, to see if any of the scaling factors are NaN (IEEE floating representation for "Not a Number"). NaN is used in some embodiments to represent an unknown scaling factor; when a NaN is found, the scaling factors of all operands are set to NaN in act 402F. In act 403F, the programmed computer checks whether the controlling operator is additive in nature (e.g. addition, subtraction). If so, it checks in act 404F whether the scaling factors of the two operands are equal or whether they are NaNs (one of the key properties of NaN is that NaN~=NaN). If they are, the programmed computer proceeds to act 408F, and sets the scaling factor for the computed result to be the common scaling factor (taken from the first operand). If the scaling factors of the operands differ, the programmed computer exchanges operands, if necessary, so that the operand with the larger scaling factor is the first operand via acts 405F and 406F. (Note that the "%" is used in these acts to begin a comment, which extends to the end of the line, following MATLAB's comment convention).

In act 407F, it adjusts the two operands to have the same scaling factor by dividing the value of the operand with the smaller scaling factor (the second operand) by two raised to the power of the difference (essentially shifting the value to the right) while increasing its scaling factor by the difference. While either operand can be adjusted to obtain equal scaling factors (the first operand can be adjusted by multiplying its value by two raised to the power of the difference and reducing its scaling factor by the difference) the correct one to adjust for fixed-point operands is the second one. Because its value is being shifted to the right, it is losing precision in the least significant digits, causing the smallest loss of precision. Adjusting the first operand shifts value to the left, causing the most significant digits to disappear.

If the operator in FIG. 4F is a multiply, as determined in act 409F, the scaling of the result is set to the sum of the two scaling factors, in act 410F. If the operator is a rdivide (normal arithmetic division) as determined in act 411F, the scaling of the result is set to the difference between the scaling of the first operand and the scaling of the second operand in act 412F. If the operator is a ldivide (second operand divided by first operand) as determined in act 413F, the scaling of the result is set to the difference between the scaling of the second operand and the scaling of the first operand in act 414F. If the operator is a unary operator, as determined in act 415F, the scaling of the result is set to the scaling of the first input operand in act 416F. Otherwise, the scaling is assumed to be unknown in act 417F. Note that the embodiment illustrated in FIG. 4F is limited to only a few operators; this is not a limitation of the invention. A skilled artisan, in view of this disclosure, can easily extend the flowchart in FIG. 4F to handle wider ranges of operators.

Certain embodiments of the invention implement the acts illustrated in FIG. 5A. In act 530, an instruction is received, specifying a fixed-point arithmetic operation that is to be performed on two operands. The computer then fetches values for the first operand and for the second operand (as per act 540). The two operands are then adjusted (as per act 550) if necessary, so that the specified operation can be performed.

Adjustment may be necessary, for example, if one operand is signed and the other is unsigned. Adjustment may also be necessary, for example, if the operands do not have the same precision, left, or right. Such adjustment is also referred to as normalization of the operands. Exemplary implementations of such adjustment are described below in greater detail, in reference to FIGS. 6A-6B, 7A-7B, 8A-8B and 9A-9B.

(as per act 571) followed by normalization of the results (as per act 572). Specifically, in act 571, the programmed computer determines, for the result, the precision, the signedness, the complexness and the scaling factor. In one embodiment during conversion in act 571, the stored precisions of each of the operands from the respective memory locations 483 and 484 (as shown in FIG. 4D) are used to determine the precision of the result. The precision of the result depends on the precision of the operands and the operation being performed, as described elsewhere herein.

Depending on the embodiment, during conversion in act 571, the other properties (complexness, signedness, scaling factor) of the result may also be determined based on the corresponding stored properties of the operands and/or the operation. Specifically, in certain embodiments, during act 571 the complexness and signedness of the result is determined by the following table (Table A):

TABLE A

| First Operand Signed? | First Operand Complex? | Second Operand Signed? | Second Operand Complex? | Operation | Result Signed? | Result Complex? |
|---|---|---|---|---|---|---|
| No | No | Yes | Yes | Addition(+) | No | Yes |
| Yes | Yes | No | No | Addition(+) | No | Yes |
| Yes | No | No | Yes | Addition(+) | No | Yes |
| No | Yes | Yes | No | Addition(+) | No | Yes |
| No | Yes | No | Yes | Addition(+) | No | Yes |
| Yes | No | Yes | No | Addition(+) | Yes | No |
| No | No | No | No | Addition(+) | No | No |
| Yes | Yes | Yes | Yes | Addition(+) | Yes | Yes |

Referring back to FIG. 5A, as illustrated by dashed line 551, adjustment of operands may not be required if the embodiment being implemented supports only one value for some fixed-point properties (e.g. signed operands only or unsigned operands only).

After normalization, the operands are converted into a floating-point number (having a mantissa and an exponent) in act 555. During conversion, one or more fixed-point properties, such as signedness (in memory location 481 as shown in FIG. 4D), complexness (in memory location 482), and precision (in memory locations 483 and 484) are also stored (as per act 556), so that the received number can be converted back from floating-point type to fixed-point type whenever necessary. In an alternative embodiment, the fixed-point properties are not stored (act 556 is not performed) and instead the properties are directly obtained from the operands after performing act 560 in order to determine the properties of the result in act 571.

Next, as illustrated by act 560, a floating-point arithmetic operation that corresponds to the identified fixed-point arithmetic operation is then performed. In certain embodiments, only one kind of operation may be supported in act 560 e.g. only modulo arithmetic operation or only saturation arithmetic operation. In other embodiments, both kinds of arithmetic are supported, and the user may indicate the type of operation to be used ahead of time, via an instruction which sets a flag indicating the kind of operation to be used in act 560. In such embodiments, the flag is checked in an act 561, and based on the value of the flag; a previously-indicated kind of operation is performed in act 560.

Next, in act 570 the floating-point result from act 560 is converted into a fixed-point result. Conversion in act 570 may include determining the fixed-point properties of the results The table may be more detailed in other embodiments, as illustrated in the attached software. A table such as Table A is only one way of specifying a result characteristic function in accordance with the invention. Other embodiments may use other methods of specifying this function.

During act 572, if a floating-point result has more precision than the fixed-point result to be generated, the floating-point result is adjusted, based on, for example, a rounding mode (i.e. round up or round down) previously specified by the user and/or fixed-point properties of the result. Note that MATLAB contains built-in operations for doing all of these on vector operands, and such operations are used in some embodiments. Furthermore, many operations do not create more bits of precision than the precision in the result and therefore rounding is used only in certain operations (such as divide).

In one exemplary embodiment, the rounding mode currently in effect is stored in a state vector (for example, in location 461 of state vector 460 in FIG. 4E). Values that may be stored in location 461 of vector 460 include "round" (for normal rounding (a 1 in the next significant bit rounds up; a 0 truncates)), "ceil" (always round toward positive infinity); "floor" (always round toward negative infinity); and "fix" (always round toward 0). For example, if the fixed-point decimal number 1.0 (with a precision of 4 bits to the left of the binary point and 0 bits to the right of the binary point) is divided by the fixed-point decimal number 4.0 (with the same precision), the result is the fixed-point decimal number 1.0 if location 461 contains the value "ceil" and is the fixed-point decimal number 0.0 if location 461 contains the value "round".

As another example, if the floating-point result represents a fixed-point number which is unsigned (which may be required when the operand is also unsigned) then any negative floating-point result is converted into its positive equivalent in act 572. Such conversion may be automatic, or alternatively under user control, based on flags that may be written by the user and read by the computer.

As yet another example, if the result after rounding overflows the largest positive number or the smallest negative number allowed by the fixed-point representation, the floating-point result is adjusted depending on whether modulo or saturation arithmetic is in effect. Then the fixed-point result is set equal to the floating-point result.

In one exemplary embodiment, the kind of arithmetic currently in effect is stored in a state vector (for example, in location 462 of state vector 460 in FIG. 4E). Values that may be stored in location 462 of vector 460 include "saturate" (for saturation arithmetic, where values that exceed the largest representable value for a fixed-point representation are represented as the largest value and where values that are smaller than the smallest representable value are represented as the smallest value) and "modulo" (for modulo arithmetic, where values that exceed the largest representable value or are smaller than the smallest representable value are "wrapped" into the representable range of the fixed-point number by dropping the most significant bits).

As used herein, the term "largest representable value" is the largest number that can be represented in a given fixed-point representation and the term "smallest representable value" is the smallest number that can be represented in a given fixed-point representation. For example, the largest number that can be represented in a signed fixed-point number that contains 4 bits to the left of the binary point and 0 bits to the right of the binary point is 7. If the value 8 is stored into such a representation when saturation arithmetic is in effect, the resulting fixed-point number is 7, since that is the largest value for a signed 4-bit fixed-point number. If modulo arithmetic is in effect, the resulting fixed-point number is −8, which is obtained by dropping any extra bits generated to the left. Similarly, the smallest number in a signed 4-bit fixed-point representation is −8. If the value −9 is stored while saturation arithmetic is in effect, the resulting fixed-point number is −8, the smallest representable number. If modulo arithmetic is in effect, the resulting fixed-point number is 7, obtained again by dropping any extra bits generated on the left.

In some embodiments, if location 462 of the vector 460 in FIG. 4E contains the value "saturate", then the result of adding the fixed-point number 4.0 (signed, with number of bits to the left of the binary point equal to 4) to the fixed-point number 4.0 (signed, with number of bits to the left of the binary point equal to 4) would be converted to the result 7. If location 462 contains the value "modulo", the result of that addition would be −8.

Depending on the operation, a fixed-point result can have different fixed-point properties than the operand: e.g. the result of multiplying two single precision fixed-point operands can be either a single precision or a double precision fixed-point result. Multiplying two 8-bit fixed-point numbers can, in some embodiments, result in a 16-bit fixed-point product. An exemplary implementation of such adjustment is described below in greater detail, in reference to FIGS. 10A-10D.

The fixed-point result from act 570 is thereafter stored in act 580. Specifically, in an act 581, a new fixed-point object is created to hold the result, e.g. by instantiating a predetermined class that is declared for fixed-point objects. Moreover, in another act 582, the value of the object is loaded from the floating-point result, and furthermore the properties of the object are set, e.g. based on the properties determined in act 571 (described above).

Figure 5B:
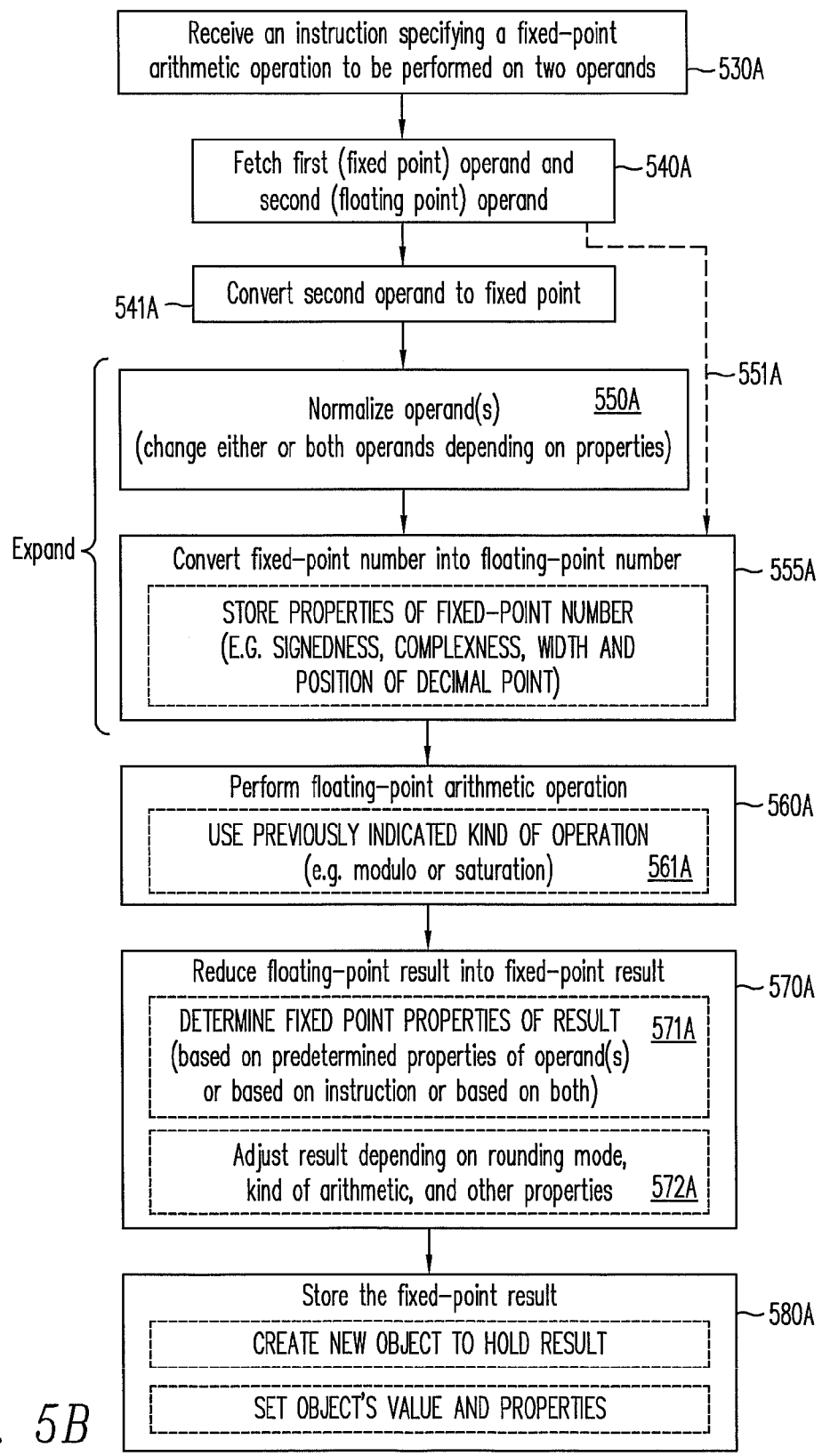

In another embodiment, acts similar to those described above in reference to FIG. 5A are performed as illustrated in FIG. 5B, with the following differences. Specifically, in act 540A, two or more operands are received, of which one operand (hereinafter, the first operand) is received in fixed-point representation and another operand (hereinafter the second operand) is received in representation other than fixed-point representation (for example, floating-point representation or integer). In such a case, an act 541A is performed to convert the second operand into fixed-point representation. The fixed-point representation for the second operand has the same properties (precision, signedness, complexness) as the fixed-point representation for the first operand.

At this stage after completion of act 541A, all operands that were received in act 540A are in fixed-point representation, thereafter, acts 550A-580A of FIG. 5B are performed in a manner similar to the corresponding acts 550-580 of FIG. 5A. For example, act 555A is performed on each of the operands received from act 540A. Note that the act 541A of reducing non fixed-point numbers into fixed-point representation specifically includes conversion of constant operands, allowing a representation of fixed-point constants in languages that do not support such a notation. For example, if the variable 'A' is an unsigned fixed-point number with precision left=4, right=0 and it is used in the expression "A+8" in the MATLAB language, then the floating-point constant "8" is converted via act 541A into an unsigned fixed-point number with precision left=4, right=0.

Following this conversion into fixed-point, act 550A will convert the fixed-point constant back into floating-point representation. In some cases, such as the example given of combining "8" with an unsigned fixed-point number with precision left=4, right=o, the result converted into fixed-point then back into floating-point will be identical to the original floating-point constant (i.e. "8"). In other cases, it may differ, however. For instance, if the constant "8" is combined with a signed fixed-point number with precision left=3, right=0, the initial conversion (act 541A) into fixed-point produces the constant "3", assuming saturation arithmetic is in effect, since the largest representable value for a signed left=3, right=0 number is "3". The conversion back into floating-point (act 555A) will then produce a floating-point value "3". In another example of change, if the constant is negative and the first operand is unsigned, the constant will be converted into a nonnegative number when it is converted into an unsigned.

Alternative embodiments convert the floating-point constant or variable into the minimally-sized fixed-point variable that will hold it, rather than the size and precision of other operands.

The conversion of floating-point constants and variables in acts 540A and 541A is novel, and is counter to normal programming language semantics. Variable types in programming languages form a lattice, with the most specific type (e.g. a fixed-point type) at the bottom of the lattice, more general types (e.g. integer) in the middle) and the most general types (e.g. floating-point) at the top. Operations involving types at the bottom of the lattice are the fastest and most efficient to implement; operations involving types at the top of the lattice are the slowest and most complex to implement. Accordingly, when speed and efficiency are the primary concern, the correct choice when combining two operands of different types is to convert both to the lowest type above them that contains both of them—the lowest common type.

In the case of combining a fixed-point type with a floating-point type, this rule would call for both variables to be converted to the floating-point type before combining. Acts 540A and 541A instead call for the types to be converted to the lowest common type below them in the lattice—in the specified case, to the fixed-point type. This conversion may cause some loss of precision in the more general type—in the specified case, to the floating-point type.

This novelty is an aspect that is critical in the development of DSP applications. Floating-point arithmetic is slow relative to fixed-point arithmetic, and most applications that are developed for fixed-point DSPs are time-critical (that is, they have to complete a certain amount of work within a given time). In many cases, the targeted fixed-point DSP architecture may not support floating-point arithmetic instructions. The methods of some embodiments described herein provide solutions to two problems: a) the development and simulation of fixed-point DSP programs in emulation environments that do not fully or directly support fixed-point arithmetic instructions, and b) providing a mechanism for compiling developed programs for a targeted fixed-point DSP (which will support fixed-point arithmetic instructions but may not support floating-point instructions), and have the resulting target code running on the target DSP produce results that are bitwise identical to the results produced in the simulation of (a).

In the absence of acts 540A and 541A, the defined semantics for combining a fixed-point variable and a floating-point variable or constant would be equivalent to that of expanding the fixed-point variable to floating-point, then doing the resulting arithmetic in floating-point. These semantics would be slow, or even impossible to implement on a fixed-point DSP, and would thereby defeat goal (b). By inverting the type lattice in acts 540A and acts 541A, the methods described herein provide a more natural semantics for mixed operations, as well as a mechanism for expressing and naturally reducing constants in languages that do not support fixed-point constants (such as MATLAB) into fixed-point form. These methods also allow both goals (a) and (b).

As noted above, a computer that is programmed to implement the interpreter or compiler for the language MATLAB is modified in certain embodiments of the invention to recognize with a user's program 410 (FIG. 4C) the calls to constructor functions "fxp" and "cfxp" (note that other function names can be used in other embodiments). Specifically, when software for emulation is installed in the programmed computer, a function having the name "fxp" is placed in a path (where path refers to a list of directories that a computer searches when hunting for a function) that will in future be searched by the computer to find such externally-defined functions. Similar actions are performed for "cfxp".

Also at this time of setting up the programmed computer, a table indicative of the relationship of the fixed-point type to all types native to the interpreter is appropriately initialized in the computer. For example, a default relationship is that fixed-point type dominates all other types. The just-described table is used by the computer to determine the type of the operation to be performed (i.e. a fixed-point operation is performed (or emulated) if even one of the two operands is of fixed-point type). Such a table is accessible to the user via commands of the interpreter, so that the user can dynamically change any such relationship between any two types supported by the programmed computer.

When processing program 410, the programmed computer (which may be implementing either an interpreter or a compiler) initially scans and parses a statement, e.g. statement 431B which is "A=fxp (3.717);". The scanning and parsing is done in the normal manner of any compiler or interpreter.

After parsing this statement, the programmed computer (in embodiments that support the MATLAB language) determines that symbol "fxp" must be either a function or an array, and checks if the symbol "fxp" is defined in its internal symbol table. The programmed computer also uses the left and right parenthesis in the above statement 431B to decide that the symbol "fxp" represents a function and not an array. Then, the programmed computer searches in a predetermined path to its local storage device (e.g. a directory path in a hard disk) for a file that has the same name as function "fxp".

If the file is found, the programmed computer (in embodiments supporting the MATLAB language), following the procedures of standard interpreters, identifies formal arguments to be passed to function "fxp", creates a new workspace, creates variables for formal arguments, assigns values from the actual parameters, and passes control to the first statement in function "fxp". The just-described last two acts of assigning values and passing control are performed only in case of an interpreter and furthermore on completion of function "fxp" control returns to the interpreter which then scans and parses the next statement, e.g. statement 432B in program 410 (FIG. 4C). The workings of the function "fxp" are detailed in FIGS. 11A-11G for embodiments that support the MATLAB language; the corresponding function for constructing complex fixed-point variables "cfxp" is detailed in FIGS. 12A-12G for embodiments that support the MATLAB language. Both are described below in detail.

At some point during the scanning and parsing of statements in program 410, the programmed computer scans and parses a statement that contains an operation, such as statement 433B in FIG. 4C which is C=A*A. With such a statement, the programmed computer first evaluates any expressions on the two sides of the operator to obtain the first and second operands.

Then the programmed computer checks if the two operands are of the same type (e.g. both may be fixed-point type). If so, the programmed computer for embodiments that support operator overloading checks to see if there is a function designated to perform the operation specified by the operator. For instance, in embodiments that support the MATLAB language, the programmed computer, when performing the "multiply" operation for a real fixed-point object, will check if a file named "mtimes.m" is located in a directory named "@fxp" (created by concatenating "@" with the constructor name). Other languages support operator overloading in different fashions, and embodiments supporting those languages will obviously behave slightly differently.

For embodiments supporting MATLAB, if such a file is found in the appropriate directory (specifically in the above example, a file named "mtimes.m" must be found in a directory named "@fxp", and that directory must be contained in the path), then the programmed computer identifies formal arguments to be passed to function "mtimes", creates a new workspace, creates variables for formal arguments, assigns values from actuals, and passes control to the first statement in function "mtimes" (all in the fashion of standard interpreters). If the file is not found, an error message is generated.

If the two operands differ in type in embodiments supporting MATLAB, then the interpreter checks to see if the type of the first operand is inferior to the type of the second operand. Note that superiority of the fixed-point type over all types native to the interpreter is initially set up. Due to superiority of the fixed-point type, the computer performs a search similar or identical to that described above. Specifically, the programmed computer checks if a file named "mtimes.m" is located in a directory named "@firsttype", wherein "firsttype" is the type of the first operand. In one exemplary embodiment, "firstttype" may take on the values "fxp" or "cfxp" for real fixed-point and complex fixed-point types, respectively. If "firsttype" has the value "fxp", and if the "mtimes" function is again found in the directory "@fxp", and the same actions (described above) are performed to pass control to the function.

As would be apparent to the skilled artisan, a corresponding set of acts are performed for the second side operand being of fixed-point type. Specifically, if the first operand happened to be inferior (e.g. a single precision floating point number) and the second operand happened to be superior, eventually the 'mtimes' function is again found in the directory with a name derived from the variable's type, and the same actions (described above) are performed to pass control to the function.

Each of various functions for fixed-point operations (such as multiply, divide, add, subtract) that are defined for use with one or more fixed-point operands may be implemented to have logic of the type as illustrated in FIGS. 6A, 6B, 7A, 7B, 8A, 8B, 9A and 9B) and described below in detail. Note however, that at the very end, after performance of the corresponding floating-point operation, some functions may have extra statements. Specifically, after the floating-point operation, no adjustment is required in most operations but some operations, such as multiply and divide, typically require adjustment of precision (in case the result has twice the precision as the operands).

Figure 6A:
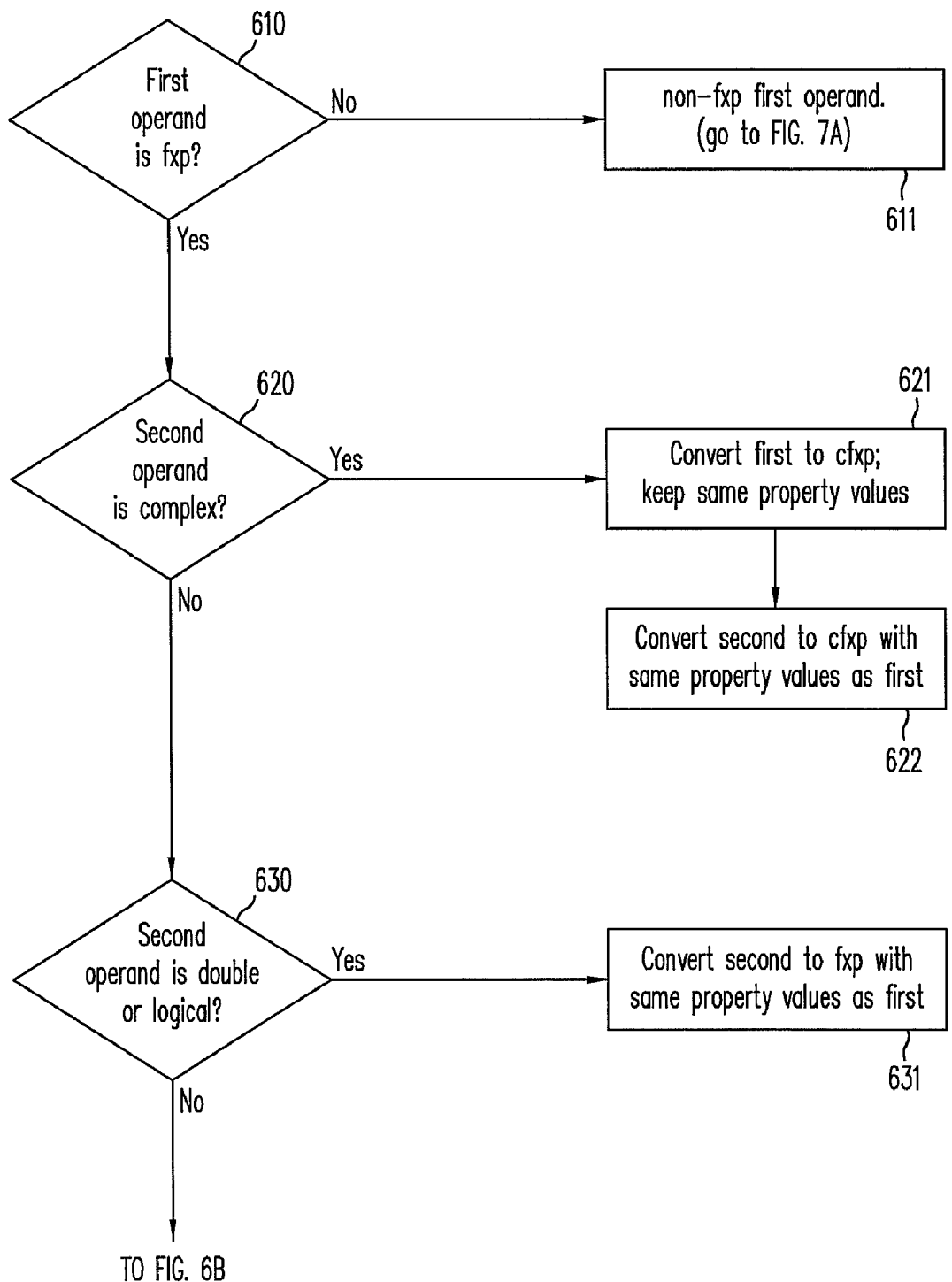
FIGS. 6A and 6B illustrate, in a flow chart, acts performed during normalization of operands in act 550 of FIG. 5A when the left operand is a real fixed-point operand.
Figure 6B:
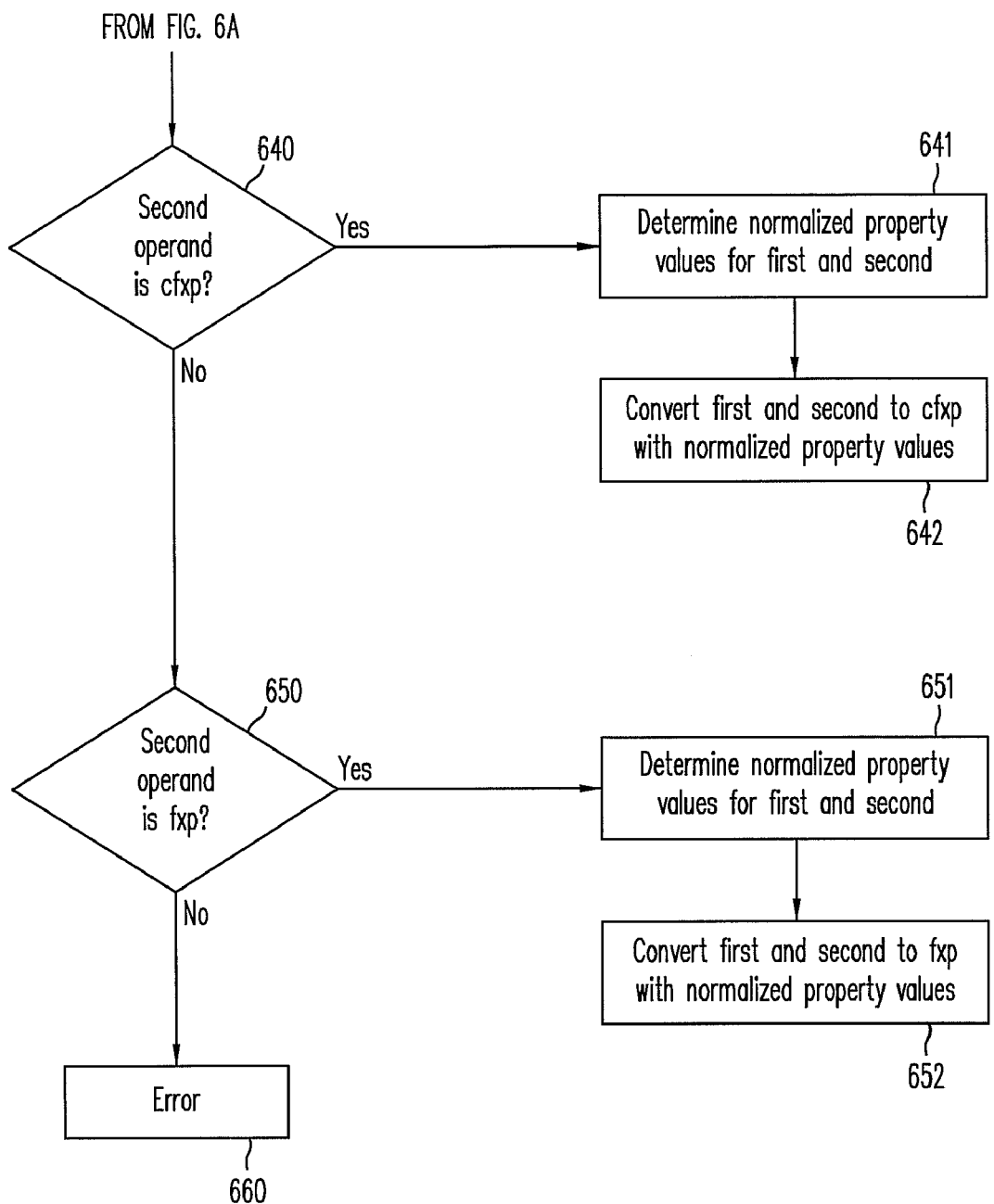

When control is first passed to a function for a fixed-point operation, a programmed computer normalizes the two operands (to be operated on by the instruction) depending on whether or not they are of the same fixed-point type, e.g. as illustrated by acts in FIGS. 6A and 6B. Such acts are performed when implementing act 550 in FIG. 5 in certain embodiments of the invention. Act 550 is performed by an interpreter or compiler for the language MATLAB which is extended to perform the acts in FIGS. 6A and 6B. Note that at this stage at least one of the two operands has been determined to be either a fixed-point number or a complex fixed-point number.

In some embodiments, the functions which implement the acts in FIGS. 6A and 6B contain statements written in the language MATLAB, version 6. Use of the MATLAB language allows a common function to handle two kinds of operands, namely vector (and thereby array) and scalar. Specifically, in these embodiments, scalar operands are handled inside the common function as if they were vectors of length 1.

The embodiments described in FIGS. 6A, 6B, 7A, 7B, 8A, 8B, 9A and 9B are implemented in MATLAB, and use constructor functions named "fxp" and "cfxp" to create real and complex fixed-point objects, respectively. The complexness property in this embodiment is stored inside a MATLAB-provided field for objects called "class". Values stored inside the "class" field need to be identical to the names of the constructor functions used to create objects of that class, due to MATLAB language conventions. Accordingly, an object that has a "class" field set to "fxp" is a real fixed-point object and an object with a "class" field of "cfxp" is a complex fixed-point object. The flowcharts in FIGS. 6A, 6B, 7A, 7B, 8A, 8B, 9A and 9B follow the implementation faithfully, so that all references to "fxp" in the figures should be interpreted as "real fixed-point object" and all references to "cfxp" should be interpreted as "complex fixed-point object".

Referring to FIG. 6A, in an act 610 the programmed computer checks if one of the operands (hereinafter first operand) is a fixed-point operand. Such a check may be performed, for example, by comparing a value of a storage element (which is to indicate the type of the first operand) with a predetermined value. For example, the storage element corresponding to the type of the first operand may have been previously set to a predetermined value (e.g. the integer constant 23) that denotes a fixed-point object. If this value is not found, then the programmed computer goes to act 611 which is further illustrated in FIG. 7A.

If in act 610 the first operand's type storage element contains the predetermined value, then the programmed computer goes to act 620 (FIG. 6A) to check the type of the remaining operand (hereinafter second operand). In act 620, if the programmed computer finds that the second operand is a complex floating-point number (as indicated by the value in the above-described "type" storage element), then the programmed computer performs acts 621 and 622. In acts 621 and 622, the programmed computer converts the two operands so that they have the same type. The real fixed-point object will be converted to a complex fixed-point object, so that the real number may be easily combined with the complex number. Similarly, the complex number will be converted to a complex fixed-point object, having the same properties as the original real fixed-point object. The result is 2 complex fixed-point objects which may then be combined.

Note that the type test in act 620 (or any of the type checks in FIG. 6 and FIG. 7) does not check for integer, float, complex integer, complex float, or other similar types of operands. The MATLAB language does not directly support these types, so in embodiments that support only MATLAB there is no need to include such a check. In view of this disclosure, a skilled artisan will easily recognize that the flow chart can be extended to support other types in embodiments that support richer type systems. A skilled artisan will also recognize that since integer types are a subset of fixed-point types, integers may also be represented as a fixed-point values with 0 bits to the right of the decimal point in reference to act 620.

Note also that the type test in act 620 (or any of the type checks in FIG. 6 and FIG. 7) does not check for vector, array, scalar, or other collective types. In the MATLAB language all types are inherently arrays (scalars are arrays with only 1 element, for instance), so in embodiments that support only MATLAB there is no need to check for size and shape. In view of this disclosure, a skilled artisan will easily recognize that the flow chart can be extended to support vector and array types in embodiments that support more restrictive type systems.

In some embodiments, the conversion of a real fixed-point object into a complex fixed-point object as called for in act 621 is performed by the "cfxp" constructor function. One such embodiment is detailed in FIGS. 12A-12G, presented later. In some embodiments, the complex floating-point numbers are converted into complex fixed-point objects via the "cfxp" constructor function, again as detailed in FIGS. 12A-12G.

If the second operand is not a complex floating-point number (in act 620), then the programmed computer goes to act 630 to check if the second operand is of type double precision floating-point or if it is of type logical. If so, then the programmed computer goes to act 631, and converts the second operand into a real fixed-point object, and having the same properties as the first operand. In some embodiments, this conversion is effected by the "fxp" constructor function, which is detailed in FIGS. 11A-11G. Act 631 of reducing doubles into fixed-point objects is novel, and is counter to semantics of standard programming languages. This act expedites the conversion of floating-point programs into fixed-point equivalents by automatically reducing floating-point variables according to context.

In act 630 (FIG. 6A), if the answer was no, the programmed computer goes to act 640 (FIG. 6B) to check if the second operand is a complex fixed-point object. If so, the programmed computer goes to act 641 to determine normalized properties for the first and second operands. Thereafter, the normalized properties are used in act 642 in conversion of the first operand and the second operand.

If the second operand is not a complex fixed-point object (in act 640), the programmed computer goes to act 650 to check if the second operand is a real fixed-point object. If so, the programmed computer goes to act 651. In act 651, the programmed computer determines normalized properties for the operands and thereafter uses them in conversion of the first operand and the second operand. Note that acts 651 and 652 are similar to acts 641 and 642 described above, with the exception that acts 651 and 652 are reducing the inputs into real fixed-point objects while acts 641 and 642 are reducing the inputs into complex fixed-point objects.

Figure 7A:
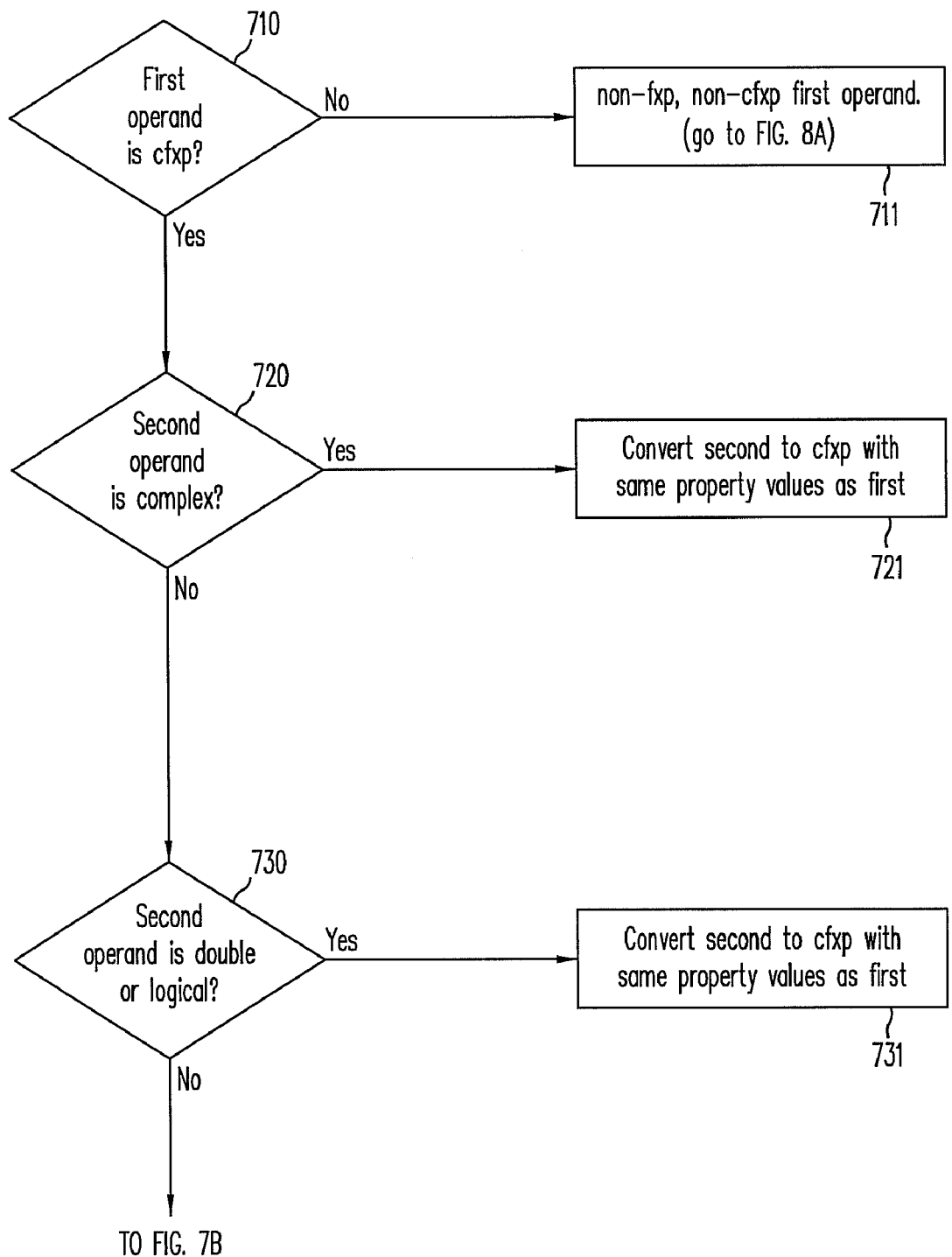
FIGS. 7A and 7B illustrate, in a flow chart, acts performed during normalization of operands of act 550 of FIG. 5A when the left operand is a complex fixed-point operand.
Figure 7B:
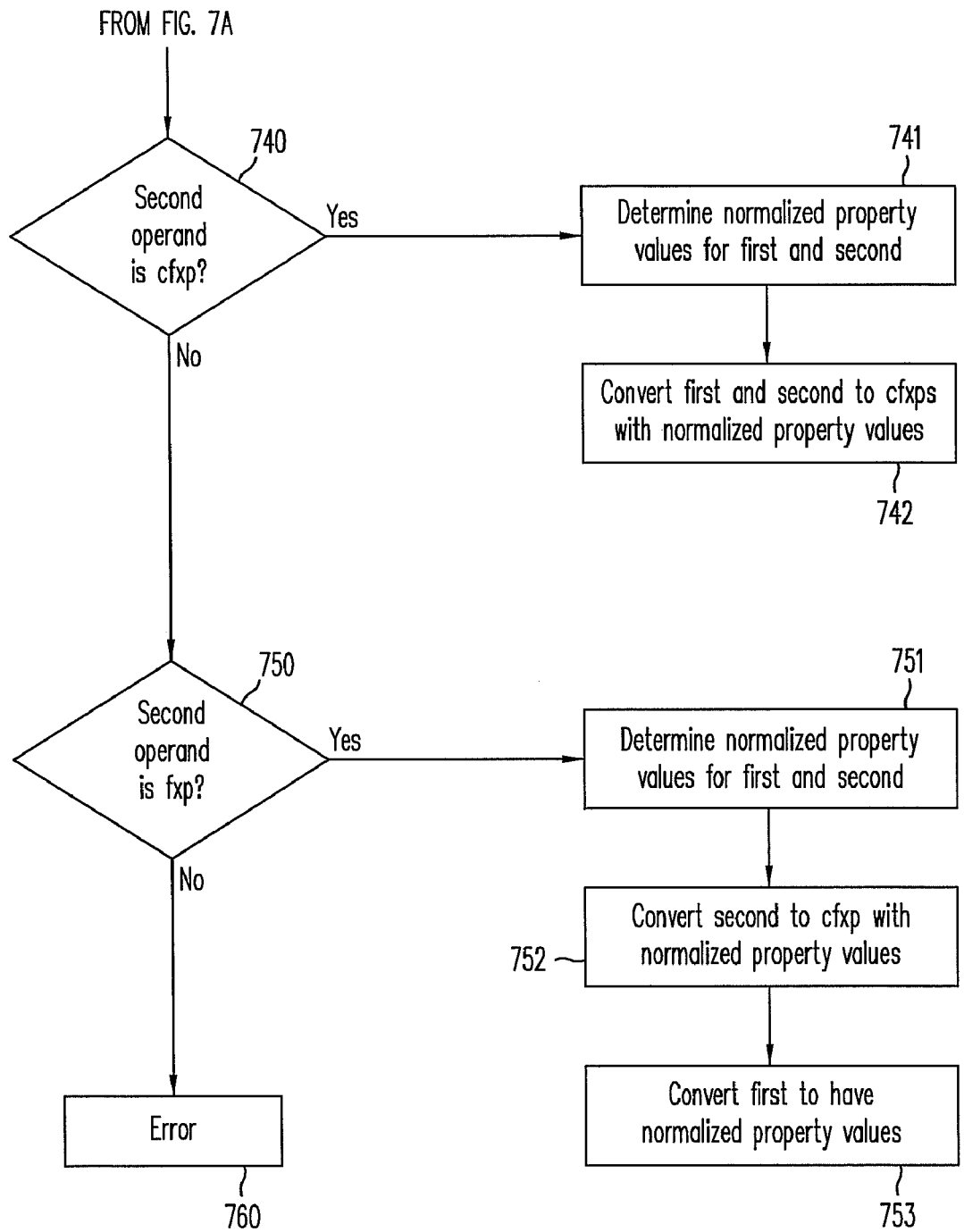

In act 611, the programmed computer performs a series of acts as illustrated in FIGS. 7A and 7B. Specifically, in act 710, the programmed computer checks if the first operand is a complex fixed-point object and if not, goes to an act 711 for processing an operand that is now known not to be fixed-point. Act 711 is further illustrated in FIGS. 8A and 8B and described in detail below. In act 710 if the answer is yes, the programmed computer goes to act 720.

In act 720 the programmed computer checks if the second operand is a complex floating-point number. If so, then the programmed computer performs act 721 to convert the second operand to a complex fixed-point object that has the same properties as the first operand. This results in two complex fixed-point objects with equivalent property values. These objects are easy to combine with arithmetic operations. Note that while act 721 and act 622 have similar descriptions, they occur in different contexts and produce different results. Act 721 is invoked by the programmed computer when the first operand is a complex fixed-point object and the second operand is a complex floating-point number. In that context, it converts the second operand into a complex fixed-point object, resulting in two complex fixed-point objects. Act 622 is invoked by the programmed computer when the first operand is a real fixed-point object and the second operand is a complex floating-point number. In order not to lose the imaginary part of the complex number, the programmed computer in that case converts the real fixed-point object into a complex fixed-point object (act 621, assuming an imaginary portion of 0), then converts the complex floating-point number into a complex fixed-point object, resulting in two complex fixed-point objects. In FIGS. 7A and 7B, the acts 720, 721, 730, 731, 740, 741, 742, 750, and 751 are identical to the corresponding acts in FIGS. 6A and 6B that are obtained by subtracting 100. For example, act 721 is identical to act 621, and act 730 is identical to act 630 and so on. Act 752 is a slight addition required for complex fixed-point objects that is not required in the real case.

Figure 8A:
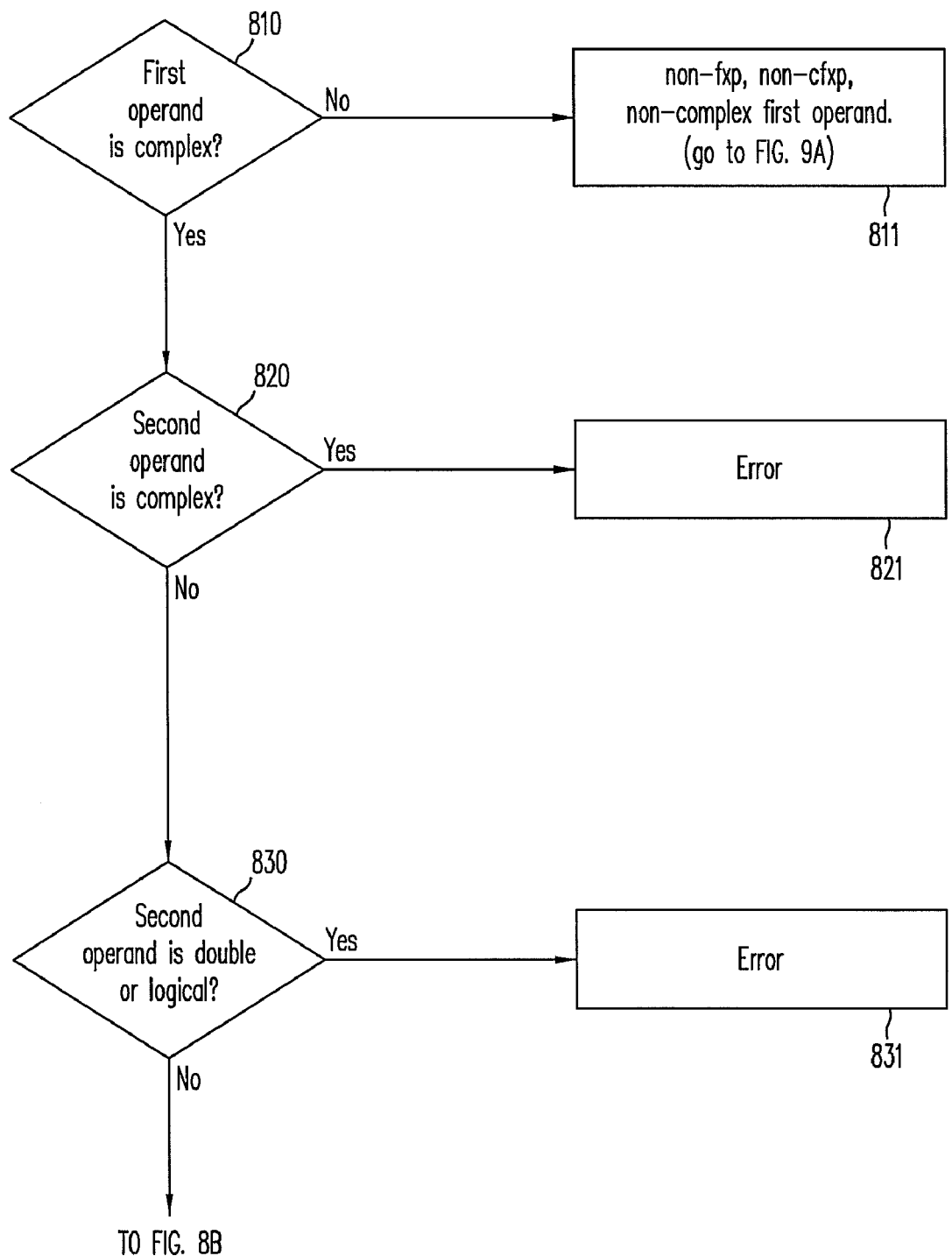
FIGS. 8A and 8B illustrate, in a flow chart, acts performed during normalization of operands of act 550 of FIG. 5A when the left operand is a complex floating-point operand.
Figure 8B:
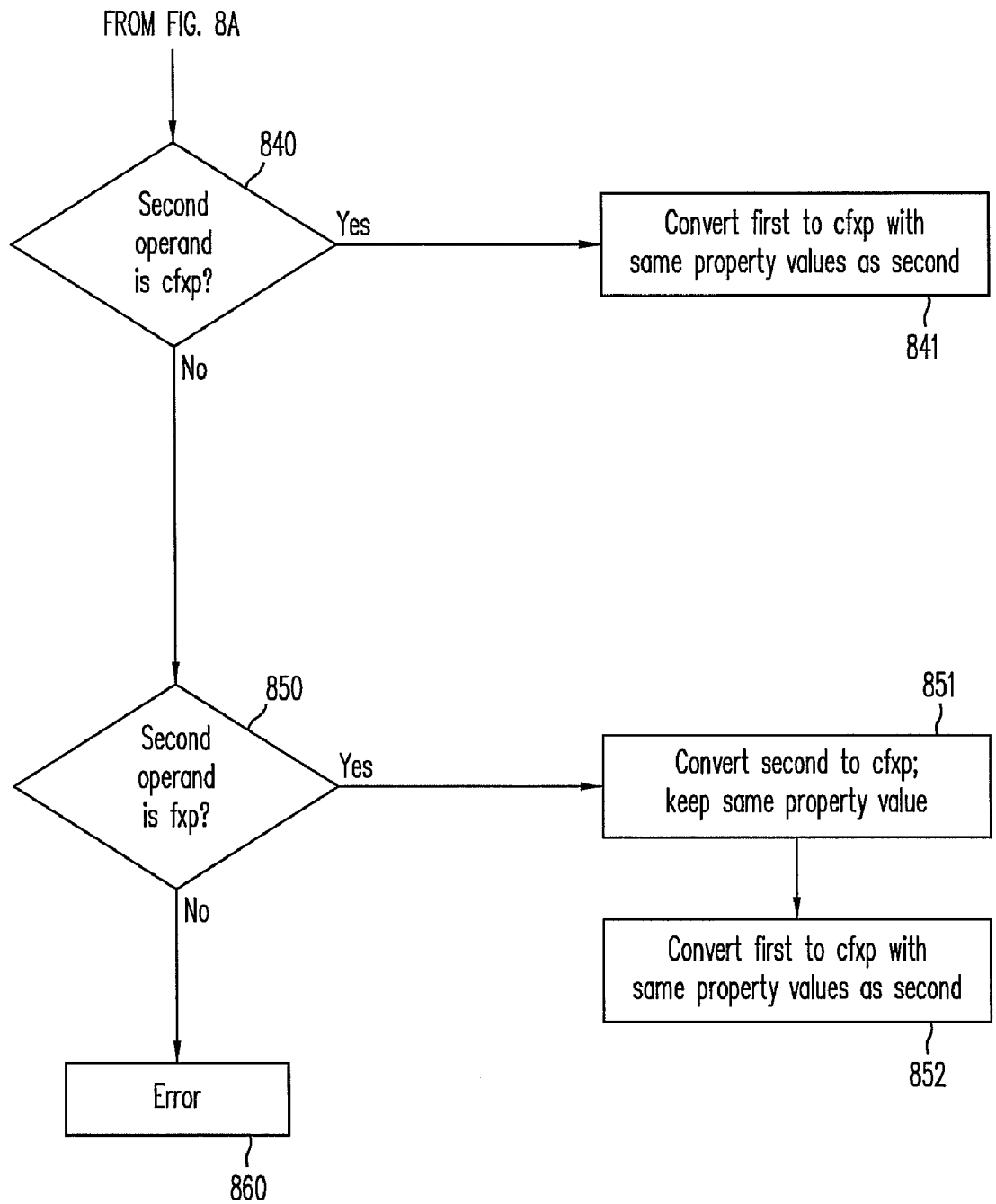

In act 711, the programmed computer performs a series of acts as illustrated in FIGS. 8A and 8B. Specifically, in act 810, the programmed computer checks if first operand is a complex floating-point object and if not goes to an act 811 for processing an operand that is now known to be neither fixed-point nor complex floating-point. Act 811 is further illustrated in FIGS. 9A and 9B and described in detail below. In act 810 if the answer is yes, the programmed computer goes to act 820.

In act 820, if the second operand is a complex floating-point number, then the programmed computer performs act 821 in which an error is reported (because both operands are complex numbers and the operation should have been directly handled by a MATLAB interpreter or compiler in the conventional manner). If the answer is no in act 820, then the programmed computer goes to act 830 to check if the second operand is of type double precision floating-point or if it is of type logical. If so, then the programmed computer goes to act 831, and reports error (because neither operand is a fixed-point object; here too the operation should have been directly handled by a MATLAB interpreter or compiler in the conventional manner).

In act 830 if the answer is no, the programmed computer goes to act 840 (FIG. 8B) to check if the second operand is a complex fixed-point object. If yes, the programmed computer goes to act 841 to convert the first operand to a complex fixed-point object with the same property values as the second operand. Note that although acts 841 and 622 are similar, they are invoked in different contexts. Act 841 is invoked by the programmed computer when the first operand is a complex floating-point number and the second operand is a complex fixed-point object. Act 841 converts the complex floating-point number into a complex fixed-point object with the same property values as the second complex fixed-point operand, resulting in two complex fixed-point objects with equivalent property values. Arithmetic operations can then be performed on these operands. Act 622 is invoked by the programmed computer when the first operand is a real fixed-point object and the second operand is a complex floating-point number. In order not to lose the imaginary part of the complex number, the programmed computer in that case converts the real fixed-point number into a complex fixed-point object (act 621, assuming an imaginary portion of 0), then converts the complex floating-point number into a complex fixed-point object, resulting in two complex fixed-point operands.

If the second operand is not a complex fixed-point object (in act 840), the programmed computer goes to act 850 to check if the second operand is a real fixed-point object. If so, then the programmed computer goes to acts 851 and 852. Acts 851 and 852 are similar or identical to the corresponding acts 651 and 652 described above wherein the programmed computer converts the two operands to the same type, namely complex fixed-point and having the same properties. If the answer is no in act 850, an error is reported in act 860 (because the second operand appears to have an undefined type which is not any of: complex floating-point, double precision floating-point, logical, complex fixed-point and fixed-point). Note that this embodiment supports the limited number of types that are supported by MATLAB. A skilled artisan, in view of this disclosure, can easily extend this flowchart to support languages with richer type systems.

Figure 9A:
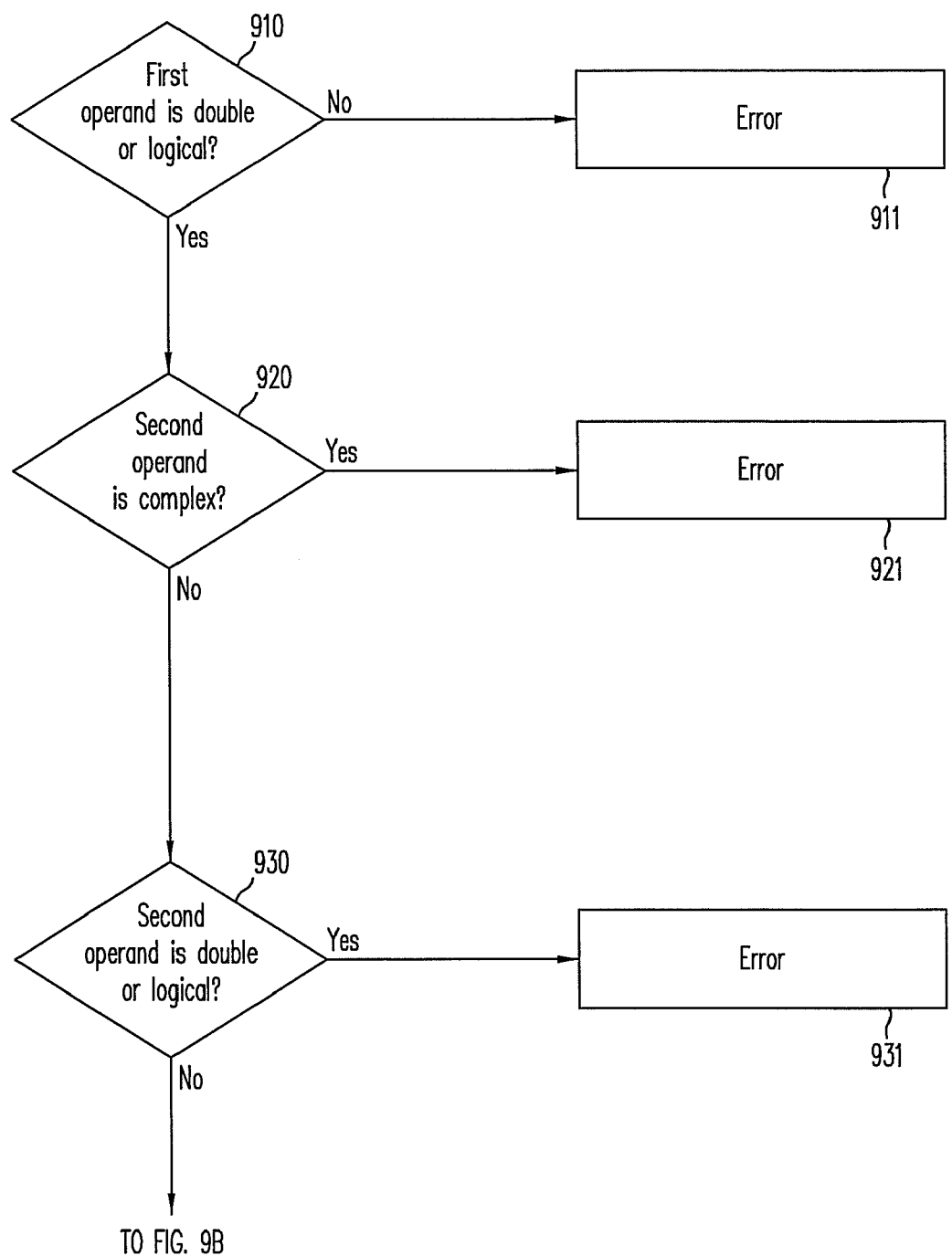
FIGS. 9A and 9B illustrate, in a flow chart, acts performed during normalization of operands of act 550 of FIG. 5A when the left operand is a logical operand or a double precision floating-point operand.
Figure 9B:
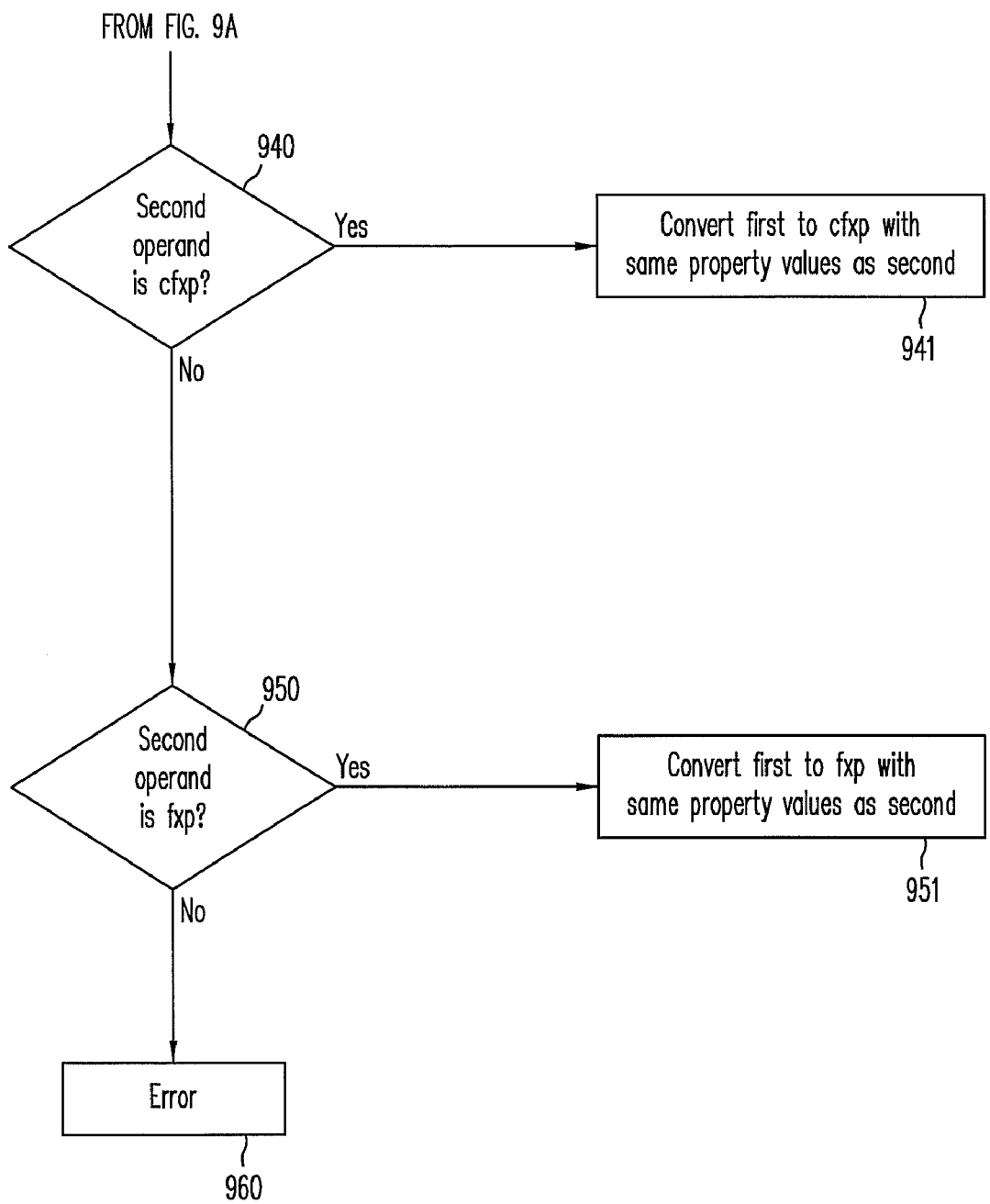

In act 811, the programmed computer performs a series of acts as illustrated in FIGS. 9A and 9B. Specifically, in act 910, the programmed computer checks if the first operand is a logical or double precision floating-point number. If the answer is no, then the programmed computer reports an error in act 911 (because the first operand appears to have an unknown type). Note that this embodiment supports the limited number of types that are supported by MATLAB. A skilled artisan, in view of this disclosure, can easily extend this flowchart to support languages with richer type systems. If the answer is yes in act 910, the programmed computer goes to act 920.

In FIGS. 9A and 9B, the acts 920, 921, 930, 931, 940, 941, 950, 951, and 960 are identical to the corresponding acts in FIGS. 8A and 8B that are obtained by subtracting 100. For example, act 921 is identical to act 821, and act 930 is identical to act 830 and so on, with some minor changes due to the argument types. For instance, there is no act 952 corresponding to act 852. Act 852 is invoked when the first operand is a complex floating-point number and the second operand is a real fixed-point object. These two operands will be converted into complex fixed-point objects in two steps: first converting the real fixed-point object into a complex fixed-point object (imaginary portion 0) with the same property values (act 851), and second, reducing the complex floating-point number into a complex fixed-point object with the same property values as the first operand. Act 951 is invoked when the first operand is a real floating-point number or a logical number and when the second operand is a real fixed-point object. These two operands will be converted into real fixed-point objects; since one operand is already a real fixed-point object, no conversion is necessary on it, and hence the analog of act 852 is not necessary.

When emulating a user-specified fixed-point instruction, a programmed computer normalizes the result obtained from performance of a floating-point operation, e.g. as illustrated by the acts in FIGS. 10A-10D. Specifically, in act 1001, the programmed computer checks if the result is to be an unsigned number and if so goes to act 1002 and otherwise goes to act 1003. Both acts 1002 and 1003 set the values for two system variables, as follows (wherein "left" is the required number of bits to the left of the binary point for the fixed-point result and "right" is the required number of bits to the right of the binary point for the fixed-point result). The variable "realmax" in this embodiment is a MATLAB builtin function that returns the largest floating-point number. That number is guaranteed to be greater than the largest representable fixed-point number (regardless of precision); similarly, the negative of realmax is guaranteed to be smaller than the smallest representable fixed-point number (regardless of precision)

Figure 10A:
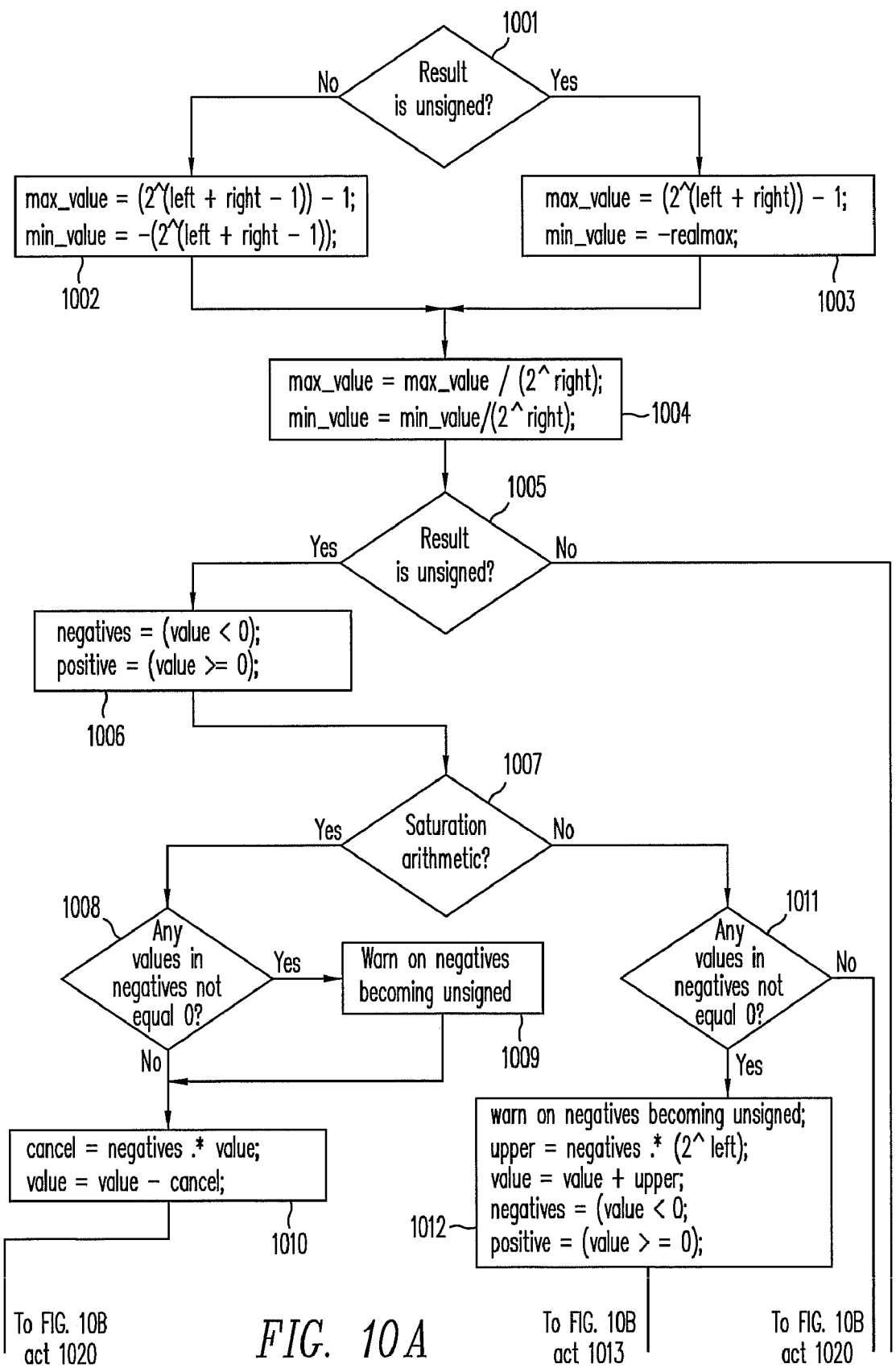
FIGS. 10A, 10B, 10C, and 10D illustrate, in a flow chart, acts performed during normalization of result of act 570 of FIG. 5A.
Figure 10B:
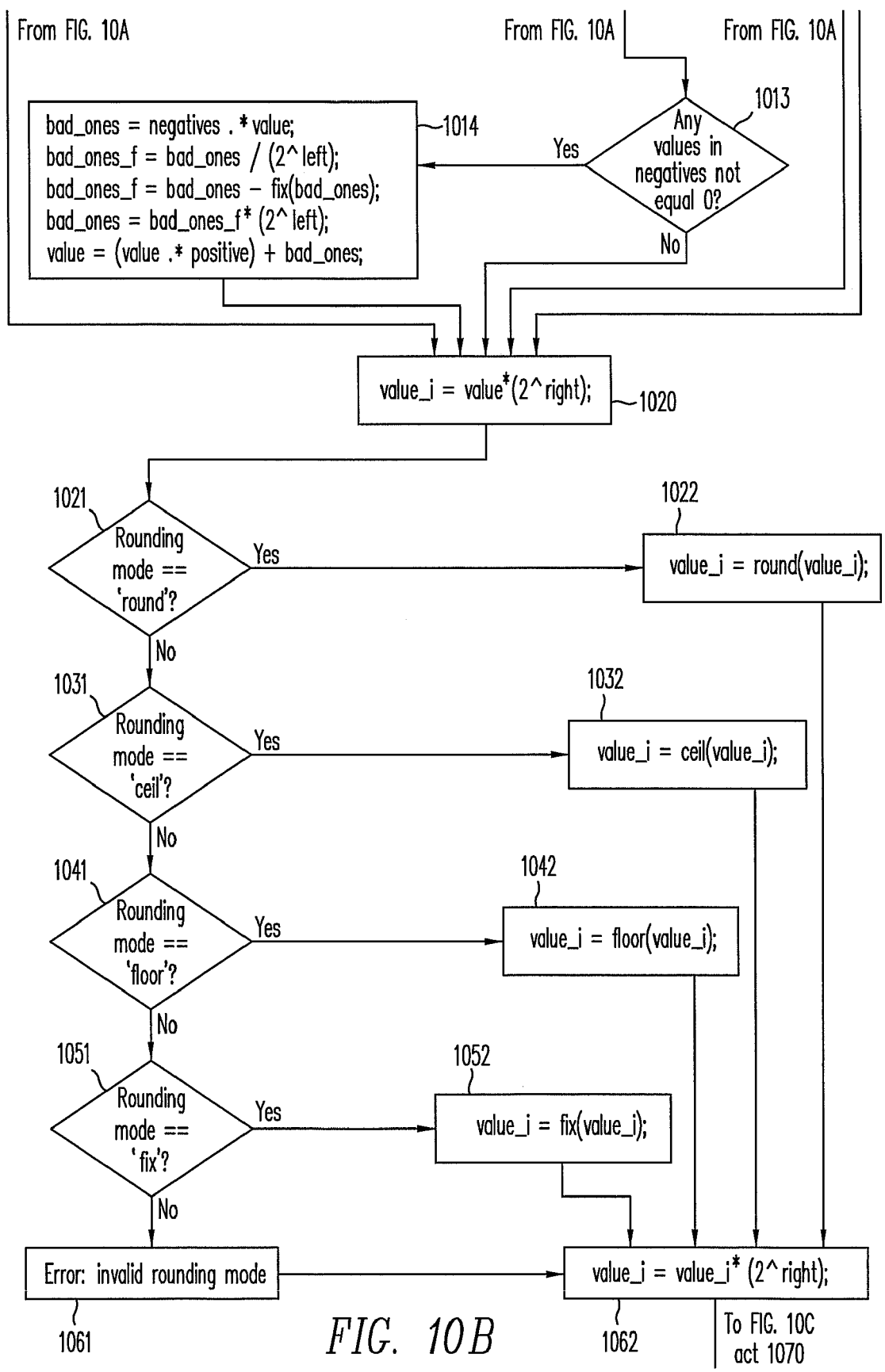
Figure 10C:
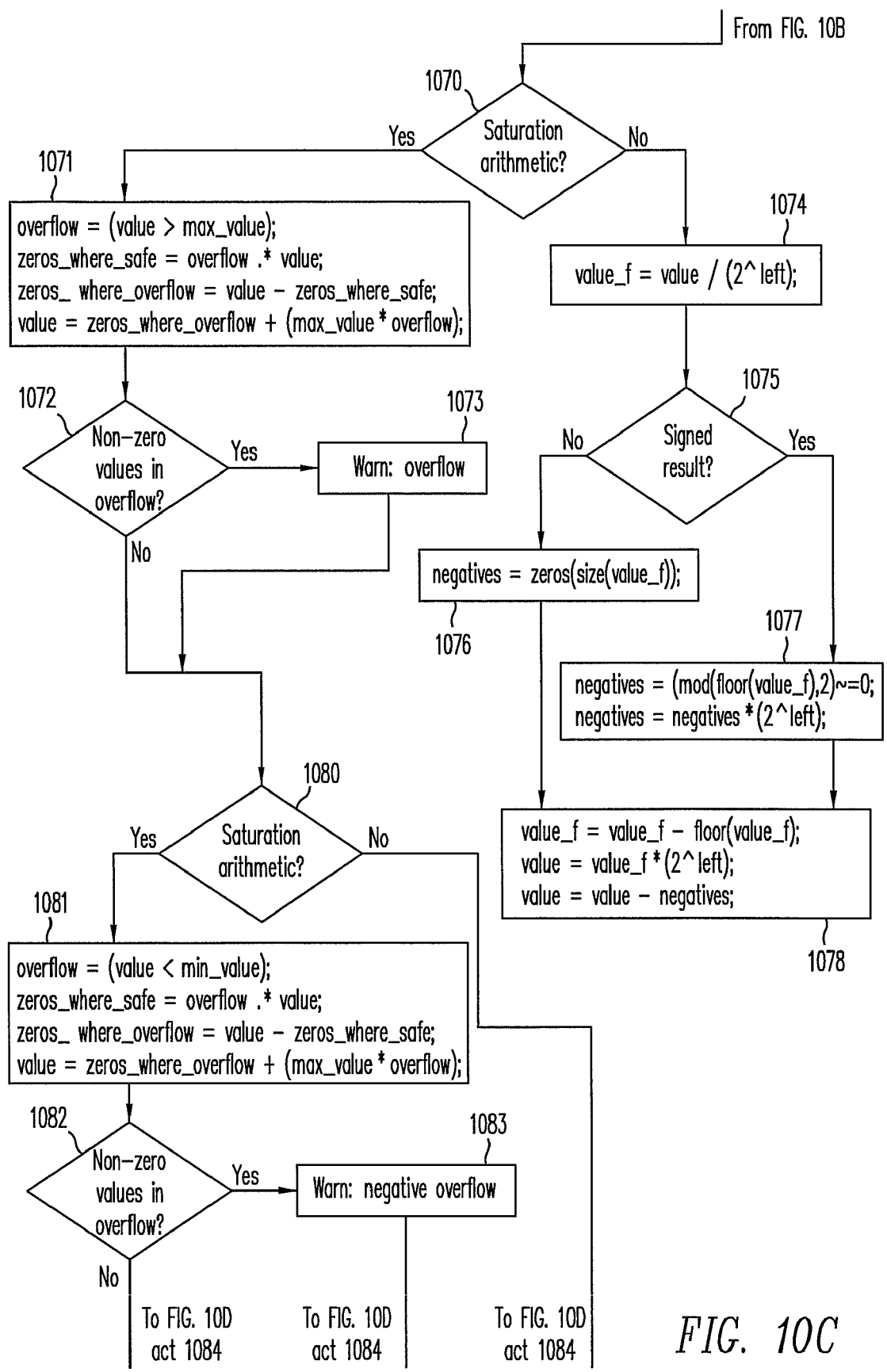
Figure 10D:
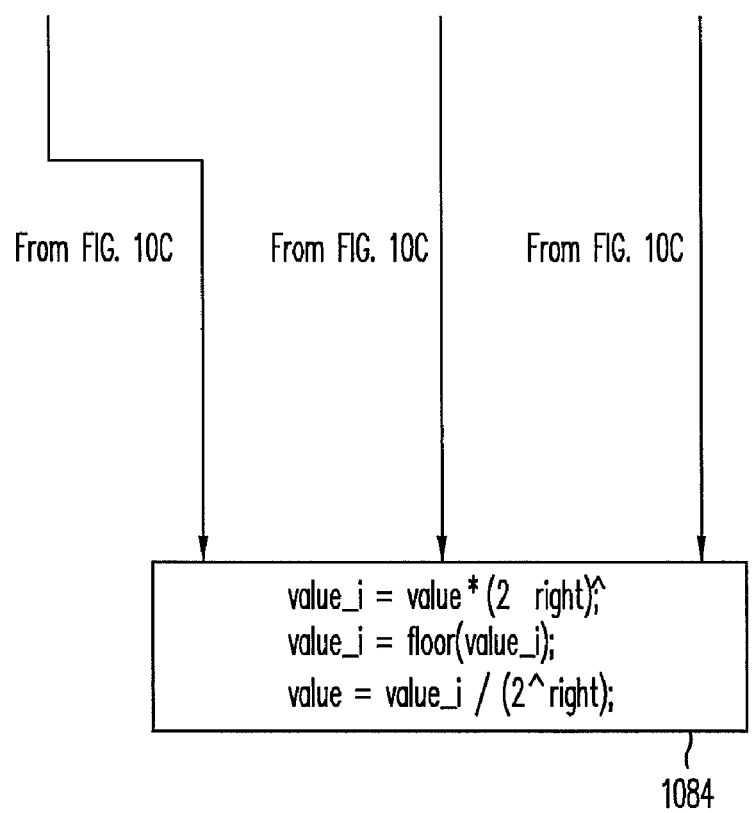

| Act in FIG. 10A | Variable   | Value                     |
|-----------------|------------|---------------------------|
| 1002            | max_value  | $2^{(left+right-1)} - 1$  |
| 1002            | min_value  | $-2^{(left+right-1)}$     |
| 1003            | max_value  | $2^{(left+right-1)} - 1$  |
| 1003            | min_value  | $-realmax$;               |

After acts 1002 and 1003, the variable "max_value" holds the floating-point value for the bit pattern for the largest representable value in the fixed-point precision determined by "left" and "right", but with the binary point set at the right of the value rather than as determined by the precision. Similarly, "min_value" holds the floating-point value for the bit pattern for the smallest representable value in the fixed-point precision determined by "left" and "right", but again with the binary point set at the right of the value. Next, in act 1004, the just-described max_value and min_value are adjusted to set the binary point in the correct position for the precision by moving the binary point left into the pattern as follows:

| Variable   | Value                |
|------------|----------------------|
| max_value  | $max\_value/2^{right}$ |
| min_value  | $min\_value/2^{right}$ |

At this point, "max_value" and "min_value" are floating-point variables that hold the values for the largest and smallest representable values, respectively, in the precision "left" and "right". Thereafter, an act 1005 checks if the result is unsigned. If so, the programmed computer goes to act 1006 to set two variables, "positives" and "negatives" based on the floating-point representation of the result value ("value"):

$$negatives = (value < 0);$$
$$positives = (value >= 0);$$

The variable "negatives" is a logical object that has identical shape to "value" (that is, if "value" is a 2-dimensional array, "negatives" is a 2-dimensional array; if "value" is a length-10 vector, "negatives" is a length-10 vector) which is equal to 1 in all positions where "value" is less than zero and is equal to 0 in all other positions. The variable "positives" is the complement to "negatives"; it is a logical object which is equal to 1 in all positions where "value" is greater than or equal to 0 and is equal to 0 in all other positions. The negatives and positives variables are used later as discussed below.

Next, in act 1007, the programmed computer checks if the arithmetic operation being performed is for saturation arithmetic. If so, the programmed computer goes to act 1008 and checks whether any values in the negatives are not equal to zero. If so, the programmed computer goes to act 1009 and generates a warning to the user that he is creating unsigned variables from negative values. Since unsigned variables can only represent values that are greater than or equal to 0, creating a negative value for an unsigned variable often indicates an error in the user's program, and a warning can save valuable debugging time. After act 1009 and also if the answer is no in act 1008, the programmed computer goes to act 1010. In act 1010, the programmed computer sets two variables as follows, again based on the assumption that the variable "value" holds the floating-point representation of the unconverted result:

$$cancel = negatives.*value;$$
$$value = value - cancel;$$

Since unsigned variables can only take on values that are greater than or equal to 0, under saturation arithmetic results that are to be unsigned saturate in the negative direction at 0. Accordingly, any floating-point results that are to be converted to unsigned and that are negative need to be changed to 0. The variable "cancel" is used to effect that change. "Cancel" is a floating-point object that has the same shape as "value", that is identical to "value" in all positions where "value" is negative, and that is 0 in all other positions. Subtracting "cancel" from "value" then sets "value" to 0 in all positions where it is originally negative (performing the act of saturating the unsigned variable at 0) and leaves all other positions unaffected.

Thereafter, the programmed computer goes to act 1020 (FIG. 10B) and sets the value_i to be equal to "value* $2^{right}$". Referring back to FIG. 10A, if in act 1005 the answer is no, then also the programmed computer goes to act 1020 (described above). Furthermore, in act 1007 if the answer is no (i.e. for modulo arithmetic), the programmed computer goes to act 1011 and checks if any values in the negatives are not equal to 0, and if no again goes to act 1020 (described above).

If in act 1011, the answer is yes, then the user is attempting to assign negative values into an unsigned variable. The programmed computer goes to act 1012 and issues a warning on assigning negative values into an unsigned variable. Act 1012 makes the first step towards converting the negative values into unsigned under the assumption of modulo arithmetic. If the negative values have overflowed into only one bit position, that bit can be corrected by adding a positive number to that value. That positive number is equal to 2 raised to a power equal to the position of the incorrect bit. This transformation is effected in act 1012:

---
$$\text{upper} = \text{negatives} * 2^{\text{left}}$$
$$\text{value} = \text{value} + \text{upper}$$
---

The variable "upper" is a floating-point object identical in shape to "value" (which holds the floating-point representation of the results). In every position where "value" is less than zero, "upper" holds a value equal to 2 raised to the power equal to the position of the incorrect bit. In all other positions, "upper" is equal to 0. Adding "upper" to "value" correctly converts all negative values that are incorrect in only one bit position into the correct unsigned value assuming modulo arithmetic, leaves all nonnegative positions unaffected, and sets all negative values that are incorrect in more than one position as negative In some cases, there may still be some negatives in the result even after performing the above described act 1012, and if so, the result was incorrect in more than one bit position. Such cases require a more expensive method for generating the correct result of modulo arithmetic. The existence of additional negatives is determined in act 1012 as follows:

---
$$\text{negatives} = (\text{value} < 0)$$
$$\text{positive} = (\text{value} >= 0)$$
---

Next, the programmed computer goes to act 1013 and checks if any values in negatives are not equal to 0. If so, the programmed computer goes to act 1014 and initializes the following variables:

---
$$\text{bad\_ones} = \text{negatives}.*\text{value};$$
$$\text{bad\_ones\_f} = \text{bad\_ones}/2^{\text{left}}$$
$$\text{bad\_ones\_f} = \text{bad\_ones\_f} - \text{fix}(\text{bad\_ones\_f})$$
$$\text{bad\_ones} = \text{bad\_ones\_f} * 2^{\text{left}}$$
$$\text{value} = \text{value}.*\text{positive} + \text{bad\_ones}$$
---

The objective of this sequence of steps is to eliminate the excess bits on the left (most significant position) of negative numbers in "value". The resulting numbers are still negative, but now are now larger in value than the smallest negative number representable in the signed fixed-point presentation left="left" and right="right", with the same bit pattern in the significant positions as the original numbers. Note that this is not the final result, as the numbers are still negative. However, a simple later step will yield the final result.

The variable "bad_ones" has the same shape as the floating-point variable "value", and has zeros in all positions where "value" is non-negative and is equal to "value" in all positions where "value" is negative. In other words, "bad_ones" is equal to "value" in all bad (i.e. negative) locations and is 0 in all other positions. The programmed computer then eliminates the extraneous bits to the left by shifting "bad_ones" to the right by "left" number of bits (effected by the divide by 2 ^ "left" to yield the variable "bad_ones_f"). At this point, "bad_ones_f" is a floating-point variable that has all the correct bits of the result to the right of the decimal or binary point, and all the extraneous bits that need to be removed to the left of the decimal or binary point. The programmed computer removes the extraneous bits to the left by computing the truncated version of "bad_ones_f" (obtained by "fix(bad_ones_f)"—"fix" is a MATLAB function that truncates a floating-point number at the decimal point), then subtracting that result from the complete version of "bad_ones_f". This leaves only the bits to the right of the binary point. The correct values to be substituted ("bad_ones") are then obtained by shifting "bad_ones_f" to the left by "left" number of bits (again, effected by a multiply, since the representation at this time is floating-point). The correct values are then inserted back into the "value" variable by multiplying "value" element wise by the identically-shaped variable "positives" (which has a one in every location where "value" is non-negative and a zero in every location where "value" is negative, so that only the non-negative values pass through) and then adding the variable "bad_ones" (which is zero in every location where "value" is non-negative and has the correct bit pattern for every location where "value" is negative).

To illustrate with an example, assume that we have obtained the result value −15.0 (which in binary is "10001") for an operation done in modulo arithmetic where the result precision is left=3, right=0. Since −15.0 contains 5 bits to the left of the decimal, the 2 leftmost bits need to be eliminated. These bits are eliminated by first computing "bad_ones_f", which for this scalar quantity is a floating-point variable equal to −15.0/8, or −1.875, which is equivalent to shifting the bit pattern 10001 to the right 3 bits (giving 10.001). The extraneous bits to the left of the decimal are removed from "bad_ones_f" by subtracting the truncated version from it from the original value (10.001-10.000 ==0.001, or in floating point, −1.875−(−1)==−0.875). This value is then shifted back to the left 3 bits (done by a multiply, since this is floating-point form) to make it have the scaling that it started with: the easiest way to remove the bits on the left is to shift all the bits that we desire to keep to the right of the binary point, remove all integer bits, then shift the bits back into their original position. With the example we have, shifting −0.875 to the left 3 bits yields −0.875*8 which is equal to −7. In binary, this is 1001.00 (the sign bit is necessary on the left to indicate that the number is negative). Later steps will convert this value into a positive 1, which is the correct modulo result.

Next, the programmed computer goes to act 1020 (described above) to set "value_i", the value obtained by shifting all the significant digits (where "significant digits" will be defined below) in the floating point input to the left of the decimal point. The objective of acts 1021 through 1061 is to "round the floating-point result" to the nearest fixed-point equivalent. A fixed-point number has a limited number of bits (as indicated by the precision property. For example, the floating-point number (expressed in binary) 1.010101*2^0 contains more bits than can be represented in an unsigned fixed-point number that has 1 bit to the left of the binary point and 3 bits to the right of the binary point. If this floating-point value needs to be converted into such a fixed-point number, then it will need to be adjusted ("rounding the floating-point result") so that it has the floating-point representation corresponding to the nearest fixed-point equivalent with the specified precision properties. The objective of acts 1021 through 1061 is to find the fixed-point number with the specified precision that is closest in value to the floating-point input. Because there can be two fixed-point numbers that are equally close to a floating-point number (for instance, the floating point number $1.0101*2^0$ is equally near to 1.010 and 1.011 when the specified precision is unsigned, left=1, right=3), a rounding mode, specified by the user, is used to break ties. Standard rounding modes include normal rounding (also called "round", a 1 in the next significant bit rounds up; a 0 truncates), ceil (always round toward positive infinity), floor (always round toward negative infinity), and fix (always round toward 0). Using rounding modes of round and ceil, 1.0101 would become 1.011 for the example of left=1, right=3; it would become 1.010 for rounding modes of floor and fix. Acts 1021 through 1061 find the fixed-point number closest to the input floating-point number (using a user-specified rounding mode to break ties) and specifies the value of that fixed-point number in floating-point form.

Acts 1021 through 1061 in this embodiment work by utilizing 4 MATLAB functions that are provided to users: "round" (that rounds floating-point numbers to the nearest integer values based on whether the next significant bit contains a 1), "ceil" (that rounds floating-point numbers to the nearest integer by rounding towards positive infinity), "floor" (that rounds floating-point numbers to the nearest integer by rounding towards negative infinity), and "fix" (that rounds floating-point numbers to the nearest integer by rounding towards 0). In view of this disclosure, a skilled artisan can easily extend the concepts herein to languages that do not contain such builtin functions.

Act 1020 through 1061 takes the floating-point input, performs a left shift on its value (by multiplying the value by $2^{right}$) to get all the bits that will be contained in the fixed-point equivalent (the "significant bits") to the left of the decimal. This resulting value is the variable "value_i", for "value as an integer". These acts then effect the appropriate rounding functionality, based on the user-specified rounding mode, by calling the corresponding MATLAB function. The result is an integer value, represented as a floating-point number that has the floating-point value corresponding to the fixed-point equivalent, shifted to the left by the number of bits specified in the "right" property. The exact floating-point value for the fixed-point equivalent is then obtained by dividing by $2^{right}$, effectively shifting the value to the right "right" number of bits. This is the objective of acts 1020 through 1062; the following paragraphs provide more detail on the exact operation of these acts.

After performing act 1020, the programmed computer goes to act 1021 and checks if the rounding mode is currently set to 'round' and if so, goes to act 1022 to invoke the function "round" with "value_i" as a parameter and then goes to act 1062 (described below).

In act 1021 if the answer is no, the programmed computer goes to act 1031 and checks if the rounding mode is 'ceil' and if so goes to act 1032 and invokes the function "ceil" with "value_i" as a parameter and then goes to act 1062. If the answer in act 1031 was "no", the programmed computer proceeds to act 1041. In act 1041 the programmed computer checks if the rounding mode is set to "floor" and if so goes to act 1042 to invoke the function "floor" with "value_i" as a parameter and thereafter goes to act 1062.

In act 1041 if the answer is no, the programmed computer goes to act 1051 and checks if the rounding mode is 'fix' and if so goes to act 1052 and invokes the function "fix" with "value_i" as the parameter, and then goes to act 1062. If the answer is no in act 1051, the programmed computer goes to act 1061 to display an error message about use of an invalid rounding mode. Then the computer goes to act 1062.

In act 1062, the programmed computer sets the "value_i" to be equal to the "value_i*$2^{right}$". Thereafter, the programmed computer goes to act 1070 to check if the arithmetic is to be of the saturation kind, and if so goes to act 1071 and otherwise goes to act 1074. In act 1071, the programmed computer computes the following values:

```
overflow = (value > max_value)
zeros_where_safe = overflow.*value
zeros_where_overflow = value−zeros_where_safe
value = zeros_where_overflow + (max_value * overflow)
```

After "value" is calculated above, the programmed computer goes to act 1072 to check if there are any non-zero values in overflow, and if so goes to act 1073 to warn about overflow and then goes to act 1080. If the answer is no in act 1072, the programmed computer goes to act 1080 directly (i.e. without warning).

In act 1074, the programmed computer sets value_f=value/$2^{left}$ and thereafter goes to act 1075 to check if the result is to be signed and if so goes to act 1077 to calculate negatives as follows:

```
negatives = (mod(floor(value_f),2) ~= 0
negatives = negatives * 2^left
```

Thereafter, the programmed computer goes to act 1078, where the following values are calculated:

```
value_f = value_f − floor (value_f)
value = value_f*2^left
value = value − negatives
```

Next, the programmed computer goes to act 1080. In one embodiment, act 1080 is repeated, and the repetition happens because of evolution of the code during development of this embodiment. Note, however, that in other embodiments, such repetition of act 1081 is not required and act 1081 could follow 1072/1073 directly.

If the answer was no in act 1075 then the programmed computer goes to act 1076 and sets negatives=zeros(size(value_f)) and thereafter goes to act 1078 discussed above.

If in act 1080 the programmed computer finds that the arithmetic is to be saturation, the programmed computer goes to act 1081 and computes the following values:

```
overflow = (value < min_value)
zeros_where_safe = overflow.*value
zeros_where_overflow = value−zeros_where_safe
value = zeros_where_overflow + (max_value * overflow)
```

Next, the programmed computer goes to act 1082 which is identical to the above-described act 1072, and goes (either via act 1083 or directly) to act 1084. In act 1084, the programmed computer computes the value as follows:

```
value_i = value*2^right
value_i = floor (value_i)
value = value_i/2^right
```

Note that if the answer is no in act 1080, the programmed computer goes directly to act 1084. After act 1084, control is returned to the context that initiated the call to function "fixsize". In some embodiments, function "fixsize" is called primarily from the real and complex fixed-point constructor functions (e.g. "fxp" and "cfxp" in one embodiment) described below.

FIGS. 10A through 10D detail the operation in one embodiment of a function ("fixsize") for real fixed-point objects. As diagrammed, this function does not support complex fixed-point objects. However, the only change necessary to support complex fixed-point objects is to apply the function as diagrammed first to the real component of the complex fixed-point object, then to the imaginary component (or vice versa; order is not important). In view of this disclosure, a skilled artisan can easily create such a function by applying the methods detailed in FIGS. 10A through 10D separately to the real and imaginary components of a complex fixed-point object. Hereinafter, when references are made to the function "fixsize", they will be to the function flowcharted in FIGS. 10A through 10D for real fixed-point objects, and to the similar but derived function for complex fixed-point objects. Note that the procedures detailed in FIGS. 10A-10D apply equally well to scalar, vector, and array inputs, allowing such collections to be accepted transparently as argument types.

FIGS. 11A-11G detail the operation of the real fixed-point object constructor function in flow chart form for one embodiment in the MATLAB language. In this embodiment, the constructor function is named "fxp". The "fxp" function can take up to six arguments: "value" (the value to be converted to fixed-point, which may be a scalar, vector or array, and which may be of type double, fixed-point (for changing properties), complex fixed-point, or logical), "left" (number of bits that the resulting fixed-point number has to the left of the binary point), "right" (number of bits that the resulting fixed-point number has to the right of the binary point), "signed" (if 1 or 's', then create a signed fixed-point object; otherwise create an unsigned fixed-point object), "rounding" (an alternative form of rounding to be used for this call in place of the global default), and "scaling" (a scaling factor to be applied to the new fixed-point object). It is not necessary to specify all 6 arguments to the fxp constructor function; defaults are assumed for missing arguments if less than 6 are passed.

The embodiments described in FIGS. 11A-11G and 12A-12G are implemented in MATLAB, and use constructor functions named "fxp" and "cfxp" to create real and complex fixed-point objects, respectively. The complexness property in this embodiment is stored inside a MATLAB-provided field for objects called "class". Values stored inside the "class" field need to be identical to the names of the constructor functions used to create objects of that class, due to MATLAB language conventions. Accordingly, an object that has a "class" field set to "fxp" is a real fixed-point object and an object with a "class" field of "cfxp" is a complex fixed-point object. The flowcharts in FIGS. 11A-11G and 12A-12G follow the implementation faithfully, so that all references to "fxp" in the figures should be interpreted as "real fixed-point object" and all references to "cfxp" should be interpreted as "complex fixed-point object". Moreover, any time the "class" field is set to "fxp", it should be interpreted as setting the complexness property to "real" and similarly, setting the "class" field to "cfxp" should be interpreted as seting the complexness property to "complex".

The "fxp" constructor in this embodiment in addition to constructing new real fixed-point objects (such as vector operand 480 and scalar operand 490 illustrated in FIG. 4D described above) also provides for changing properties of existing fixed-point objects and for converting other entities into fixed-point objects. Support of this extra functionality is provided through varying calling conventions. For instance, when the first argument to the "fxp" constructor is an existing real fixed-point object, the constructor takes that object (value plus properties) as the starting point for the return object and then modifies those properties that are specified by other parameters. Thus, if the "value" parameter is a real fixed-point object and only the "left" parameter is passed, the constructor uses all the property values of the existing "value" (right, signedness, scale) other than the one passed-in (left), setting the value of the left property to be the second ("left") parameter. Similarly, if only two arguments are passed to the constructor and the second argument is a real or complex fixed-point object, then the constructor "copies" the property values of the second object into the corresponding properties of the first object when creating the new fixed-point object. That is, it uses the values of left, right, signed, and scaling properties that are present for the second ("left") parameter as the properties for the new fixed-point object. This convention supercedes the first convention, so if the fxp constructor is called with two real fixed-point objects as parameters, the result real fixed-point object has the value of the first argument and the property values of the second.

Figure 11A:
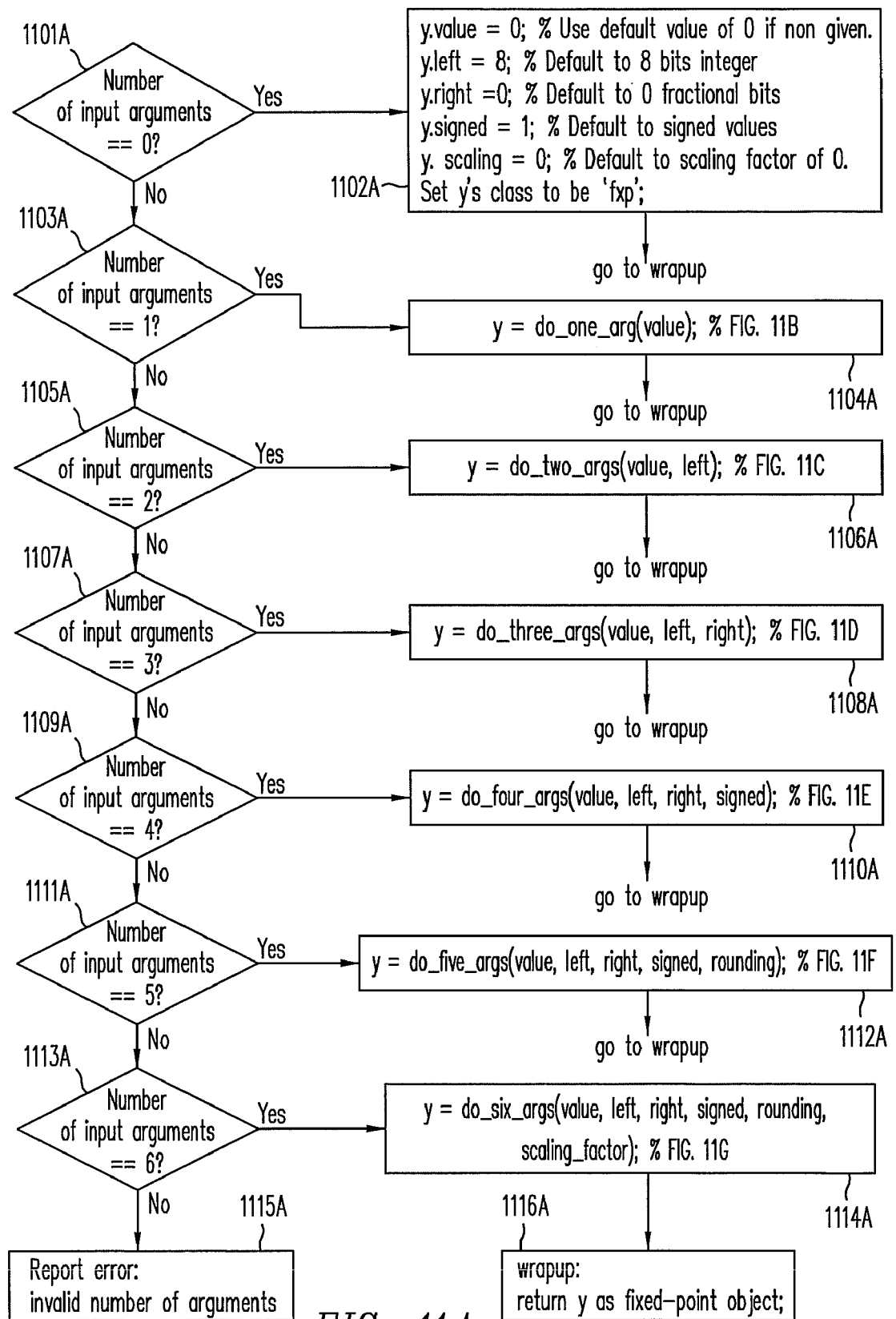
FIGS. 11A, 11B, 11C, 11D, 11E, 11F, and 11G illustrate, in a flow chart, acts performed during the creation of a real fixed-point constant, variable, or vector.

FIG. 11A details the high level operation of the fxp constructor in flow chart form. At the highest level, the fxp constructor selects an action based on the number of arguments passed in. The purpose of the selected action is to provide default values for the arguments that the user did not provide.

Act 1101A of FIG. 11A tests whether there are any input arguments at all. If there are none, the programmed computer executes act 1102A that creates a signed fixed-point object ("y") with a default value of 0, 8 bits of precision to the left of the binary point, no bits of precision to the right of the binary point, and a scaling factor of 0. After flagging y as a real fixed-point object to the MATLAB interpreter by setting its class to be 'fxp' (which, in this embodiment, is the same as setting the complexness property to be "real"), the programmed computer jumps to "wrapup" (act 1116A) which returns y as the result.

If the answer to act 1101A is "no", meaning that there is at least one input argument, the programmed computer executes act 1103A, testing whether there is only one input argument ("value"). If the answer is "yes", the programmed computer executes act 1104A, which sets y to be a real fixed-point object containing that value via the actions in FIG. 11B (detailed below), then returns that fixed-point object by jumping to "wrapup" (act 1116A). The input argument "value" may be a scalar value, a vector of values, or an array of values; the result has the same shape as "value".

If the answer to act 1103A is "no", meaning that there are at least two input arguments, the programmed computer executes act 1105A, testing whether there are exactly two input arguments ("value" and "left"). If the answer is "yes", the programmed computer executes act 1106A, which processes the two input arguments ("value" and "left") via the actions in FIG. 11C (detailed below), setting the result fixed-point object in the variable "y", then returns that real fixed-point object by jumping to "wrapup" (act 1116A).

If the answer to act 1105A is "no", meaning that there are at least three input arguments, the programmed computer executes act 1107A, testing whether there are exactly three input arguments ("value", "left", and "right"). If the answer is "yes", the programmed computer executes act 1108A, which processes three input arguments ("value", "left", and "right")

via the actions in FIG. 11D (detailed below), setting the result fixed-point object in variable "y" and returning that real fixed-point object by jumping to "wrapup" (act 1116A).

If the answer to act 1107A is "no", meaning that there are at least four input arguments, the programmed computer executes act 1109A, testing whether there are exactly four input arguments ("value", "left", "right", and "signed"). If the answer is "yes", the programmed computer executes act 1110A, which processes four input arguments via the actions illustrated in FIG. 11E, setting the result fixed-point object in variable "y" and returning that result real fixed-point object by jumping to "wrapup" (act 1116A).

If the answer to act 1109A is "no", meaning that there are at least five input arguments, the programmed computer executes act 1111A, testing whether there are exactly five input arguments ("value", "left", "right", "signed", and "rounding"). If the answer is "yes", the programmed computer executes act 1112A, which processes five input arguments via the actions illustrated in FIG. 11F, setting the result in variable "y" and returning that result by jumping to "wrapup" (act 1116A).

If the answer to act 1111A is "no", meaning that there are at least six input arguments, the programmed computer executes act 1113A, testing whether there are exactly six input arguments ("value", "left", "right", "signed", "rounding", and "scaling"). If the answer is "no", there are too many input arguments, which the programmed computer reports as an error via act 1115A. Otherwise, the programmed computer executes act 1114A, which processes six input arguments via the actions illustrated in FIG. 11G, setting the result fixed-point object in variable "y", and returning that result real fixed-point object via "wrapup" (act 1116A).

While this embodiment assumes six arguments to the fxp constructor, a skilled artisan will easily recognize in view of this disclosure that the number, order, and default values for the arguments are details which are easily changed. Other embodiments have separate constructors for (for instance) signed and unsigned fixed-point objects, reducing the number of arguments required. Other embodiments have different ways of expressing precision. Similarly, having separate constructors for real fixed-point objects and complex fixed-point objects is again an arbitrary choice of embodiment; alternative embodiments use a single constructor with an argument or value-test to construct both real and complex fixed-point quantities.

Figure 11B:
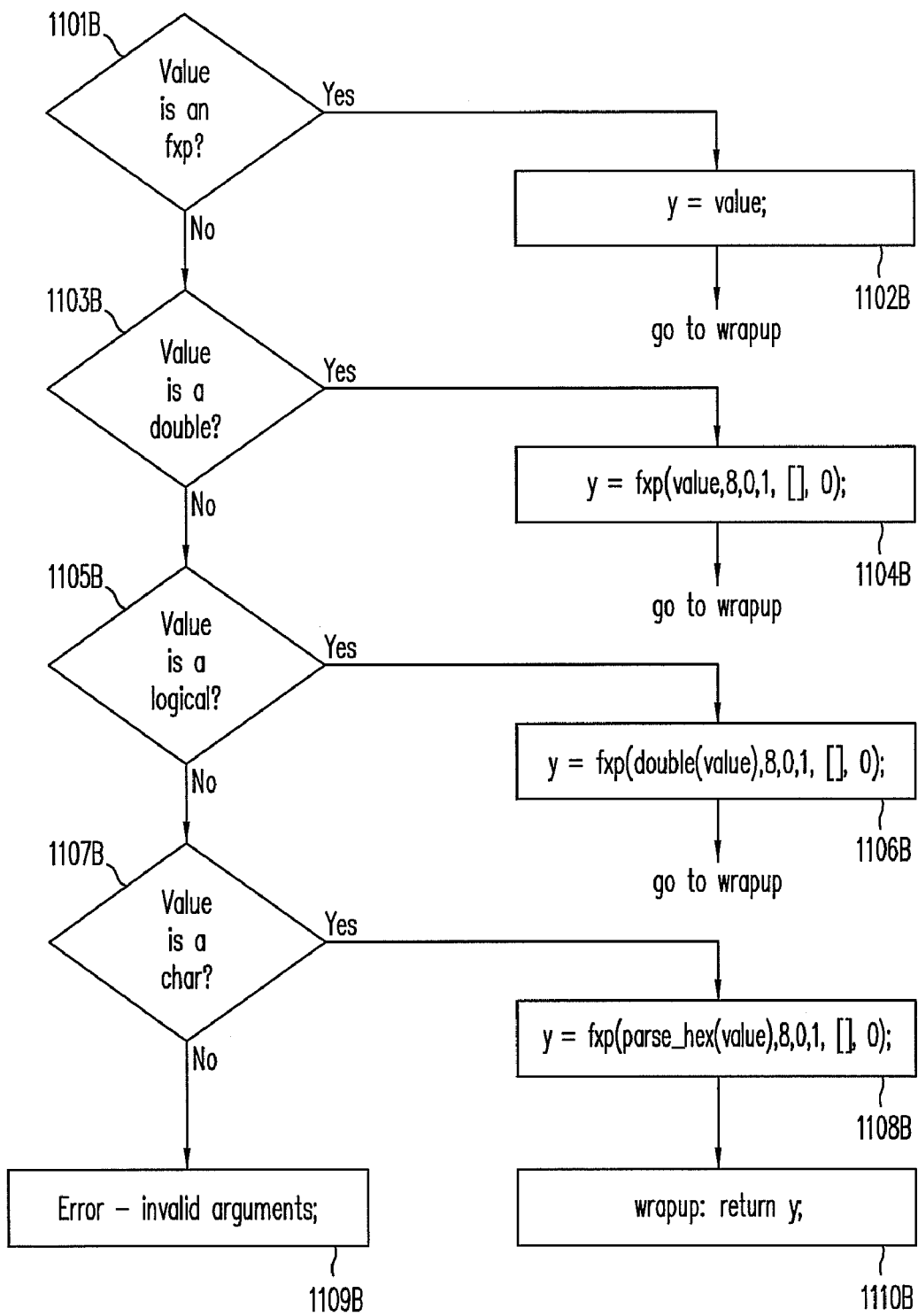

FIG. 11B details the functionality of the fxp constructor when presented with only one argument, the "value" to be converted. The programmed computer first checks whether "value" is already a real fixed-point object in act 1101B. If the answer is "yes", then the programmed computer simply sets the result fixed-point object to be the input fixed-point object ("value") in act 1102B, and jumps to "wrapup" (act 1110B) to return. Again, "value" may be a scalar, a vector, or an array.

If the answer to act 1101B is "no", the programmed computer then tests whether "value" is a double in act 1103B. In this embodiment, the term "double" includes both "double-precision" and "complex double-precision". If the answer is "yes", the programmed computer recursively invokes the fxp constructor function on the first argument ("value") via act 1104B, passing in the default values for the rest of the arguments of left=8, right=0, signed=1, rounding=[ ] ("[ ]" in MATLAB denotes an "empty" object, which is a special object that has no elements in it; references to an "empty" variable are references to a variable that has the value of [ ]), and scaling=0. These choices of default values are arbitrary, and take on different values in other embodiments. For instance, another embodiment computes the minimum number of bits required to the left and the right of the binary point to correctly hold the double precision number in the first argument ("value") and uses those values for "left" and "right" rather than 8 and 0. The newly-created fixed-point object "y" is returned after a jump to "wrapup" (act 1110B). Again, both "value" and "y" may be a scalar, a vector, or an array.

If the answer to act 1103B is "no", the programmed computer then tests whether "value" is a logical in act 1105B. If the answer is "yes", the programmed computer recursively invokes the fxp constructor function on the first argument ("value") converted to a double. The recursive invocation is via act 1106B, with default values passed in for the rest of the arguments of left=8, right=0, signed=1, rounding=[ ], and scaling=0. These choices of default values are arbitrary, and take on different values in other embodiments. The newly-created real fixed-point object "y" is returned after a jump to "wrapup" (act 1110B). Again, both "value" and "y" may be a scalar, a vector, or an array.

If the answer to act 1105B is "no", the programmed computer then tests whether "value" is a character or character array in act 1107B. If the answer is "yes", the programmed computer assumes that the input is in the form of a character string expressing the value in hexadecimal form. It calls "parse_hex" (a function which converts numbers in hexadecimal string format into doubles) on the first argument ("value") to convert it into floating-point in act 1108B, then converts that floating-point result into a real fixed-point object "y" via a recursive call to the fxp constructor function. The other parameters passed to that recursive invocation are the default values of left=8, right=0, signed=1, rounding=[ ], and scaling=0. The newly created real fixed-point object "y" is returned after a jump to "wrapup" (act 1110B).

If the answer to act 1107B is "no", then an unknown or invalid argument has been passed as the first argument, and the programmed computer issues an error message via act 1109B. Note that this embodiment has chosen to deal only with the relatively few types available in MATLAB; a skilled artisan, in view of this disclosure, can easily extend the number of types handled by cascading tests in acts 1101B, 1103B, 1105B, and 1107B. Note also that since MATLAB does not distinguish between vector, scalar, and array types (operators work transparently and polymorphically regardless of shape) that shape and size are not components of the test in this embodiment. A skilled artisan, in view of this disclosure, can easily extend the tests to accommodate languages with richer or stricter typing systems.

Figure 11C:
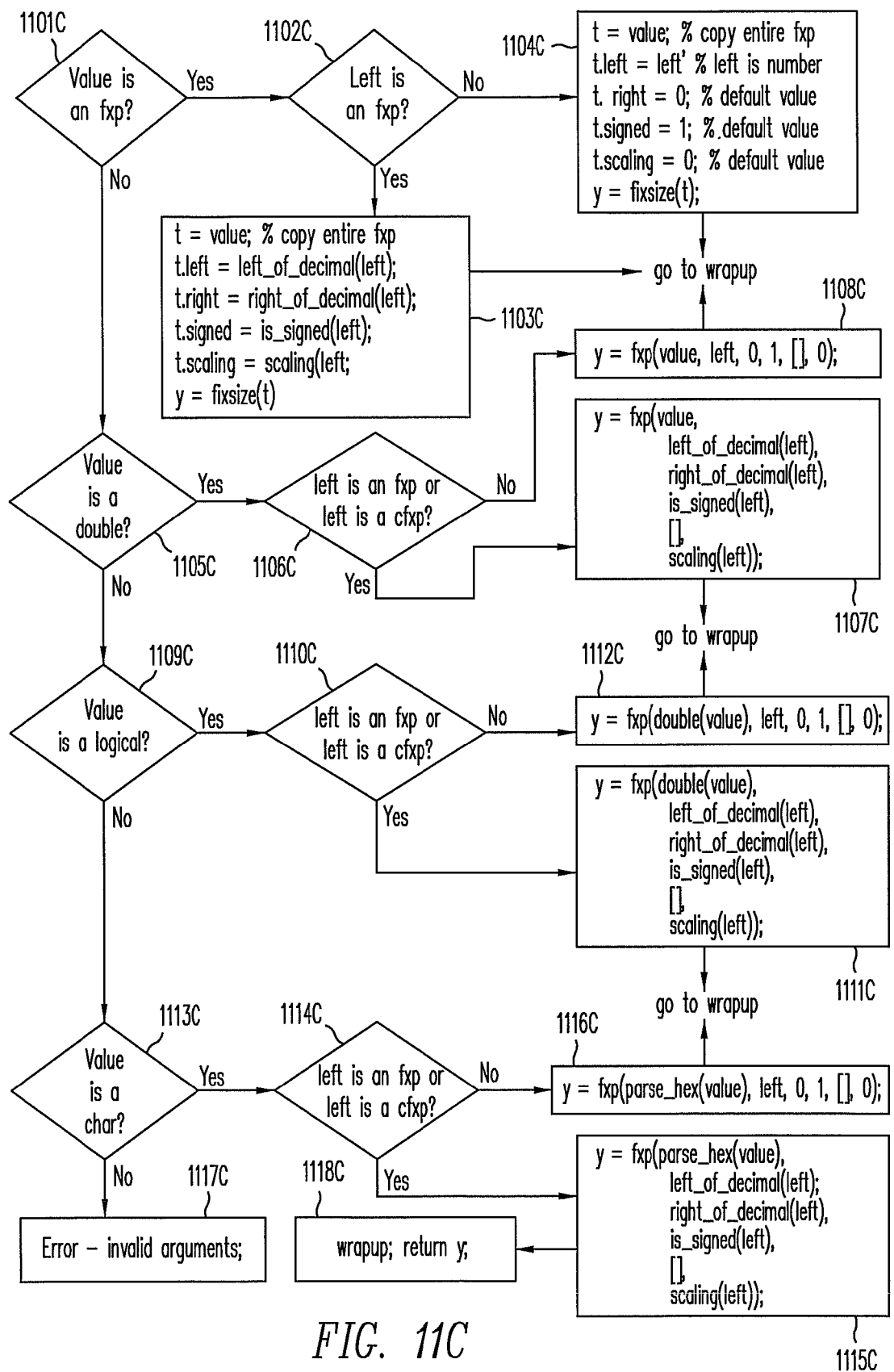

FIG. 11C details the actions of the fxp constructor when it is passed two arguments: "value" and "left". The programmed computer first checks in act 1101C whether the first argument ("value") is a real fixed-point object. If the answer is "yes", it then checks in act 1102C whether the second argument ("left") is also a real fixed-point object. If the answer there is also "yes", then the programmer has passed in two fixed-point objects as arguments to the fxp constructor. In this embodiment, the fxp constructor function supports a convention such that when only two arguments are passed to the constructor and they are both real fixed-point objects, the constructor returns a fixed-point object that has the value of the first argument combined with the property values of the second. That is, the returned fixed-point object takes its value from the first argument ("value") and all property values (such as left, right, precision) from the second argument ("left"). This convention makes it easy to attach the properties of a second fixed-point object to a first. Implementing this convention, the programmed computer proceeds to act 1103C, where it creates a temporary variable "t" by copying both value and properties from the first argument ("value"). After act 1103, "t" is identical in all property values to the first argument. The programmed computer then sets the left, right, signed, and scaling property values of "t" to be the same those as possessed by the second argument ("left"). It calls fixsize (which for one embodiment is flowcharted in FIGS. 10A through 10D) to adjust the value of "t" for the new property values. The result real fixed-point object "y" is then returned via a jump to "wrapup" (act 1118C). "Value", "left", and "y" may be scalars, vectors, or arrays.

If the answer to act 1102C is "no", then the program has received two arguments, the first of which ("value") is a real fixed-point object and the second of which ("left") is not. In that case, the programmed computer executes act 1104C, creating a temporary variable "t" which has all the property values of the input fixed-point object. The programmed computer then sets the precision property of "t"; the subproperty left is set to the second input argument ("left") while the subproprty right is set to 0. Its signedness is set to the default "signed", and its scaling is set to 0. The function "fixsize" (which for one embodiment is flowcharted in FIGS. 10A through 10D) is then called to adjust the real fixed-point object's value to the newly-set property values. The result fixed-point object "y" is then returned via a jump to "wrapup" (act 1118C). Again, the input arguments and results may be scalars, vectors, or arrays.

If the answer to act 1101C is "no", the programmed computer next checks in act 1105C whether the first input argument ("value") is a double. If "yes", the programmed computer then checks in act 1106C whether the second argument ("left") is a fixed-point object (real or complex). If the answer is again "yes", then the programmer has specified a double and a fixed-point object (either real or complex) as the two input arguments. In this embodiment, the fxp constructor function supports a convention such that when only two arguments are passed to the constructor and the first is a double and the second is a fixed-point object (real or complex), the constructor creates a real fixed-point object that has the value of the first argument ("value") combined with the property values of the second argument ("left"). Act 1107C implements this convention. It recursively calls the fxp constructor function, passing as arguments the first parameter ("value") and the property values of the second parameter ("left") ("left_of_decimal" is a function that returns the number of bits to the left of the binary point for a fixed-point object; "right_of_decimal" is a function that returns the number of bits to the right of the binary point for a fixed-point object; "is_signed" returns 1 if a fixed-point object is signed and 0 if it is unsigned; and "scaling" returns the scaling factor for a fixed-point object). The result real fixed-point object "y" is then returned via a jump to "wrapup" (act 1118C). Again, the input arguments and results may be scalars, vectors, or arrays.

If the answer to act 1106C is "no", then the constructor function has received two doubles as parameters. It converts the first argument into a real fixed-point object and sets the resulting fixed-point objects left subproperty to be the second argument ("left"). This is done by recursively calling the fxp constructor in act 1108C, passing down the received parameters followed by default values of right=0, signed=1, rounding=[ ], and scaling=0. The result real fixed-point object "y" is then returned via a jump to "wrapup" (act 1118C). Again, the input arguments and results may be scalars, vectors, or arrays.

If the answer to act 1105C is "no", the programmed computer next checks via act 1109C whether the first argument is a logical. If the answer to act 1109C is "yes", then the programmed computer repeats the logic of acts 1106C, 1107C, and 1108C in acts 1110C, 1111C, and 1112C, respectively, but converting the logical "value" to a double before converting it to a fixed-point object.

If the answer to act 1109C is "no", the programmed computer checks via act 1113C whether the first argument is a character string. If the answer to act 1113C is "yes", then the programmed computer repeats the logic of acts 1106C, 1107C, and 1108C in acts 1114C, 1115C, and 1116C, respectively, but converting the string "value" into a double via the "parse_hex" function before converting it to a real fixed-point object.

If the answer to act 1113C is "no", then the fxp constructor has received a set of invalid arguments and it reports an error via act 1117C. Note that this embodiment has chosen to deal only with the relatively few types available in MATLAB; a skilled artisan, in view of this disclosure, can easily extend the number of types handled by cascading tests in acts 1101C, 1105C, 1109C, and 1113C. Note also that since MATLAB does not distinguish between vector, scalar, and array types (operators work transparently and polymorphically regardless of shape) that shape and size are not components of the test in this embodiment. A skilled artisan, in view of this disclosure, can easily extend the tests to accommodate languages with richer or stricter typing systems.

Figure 11D:
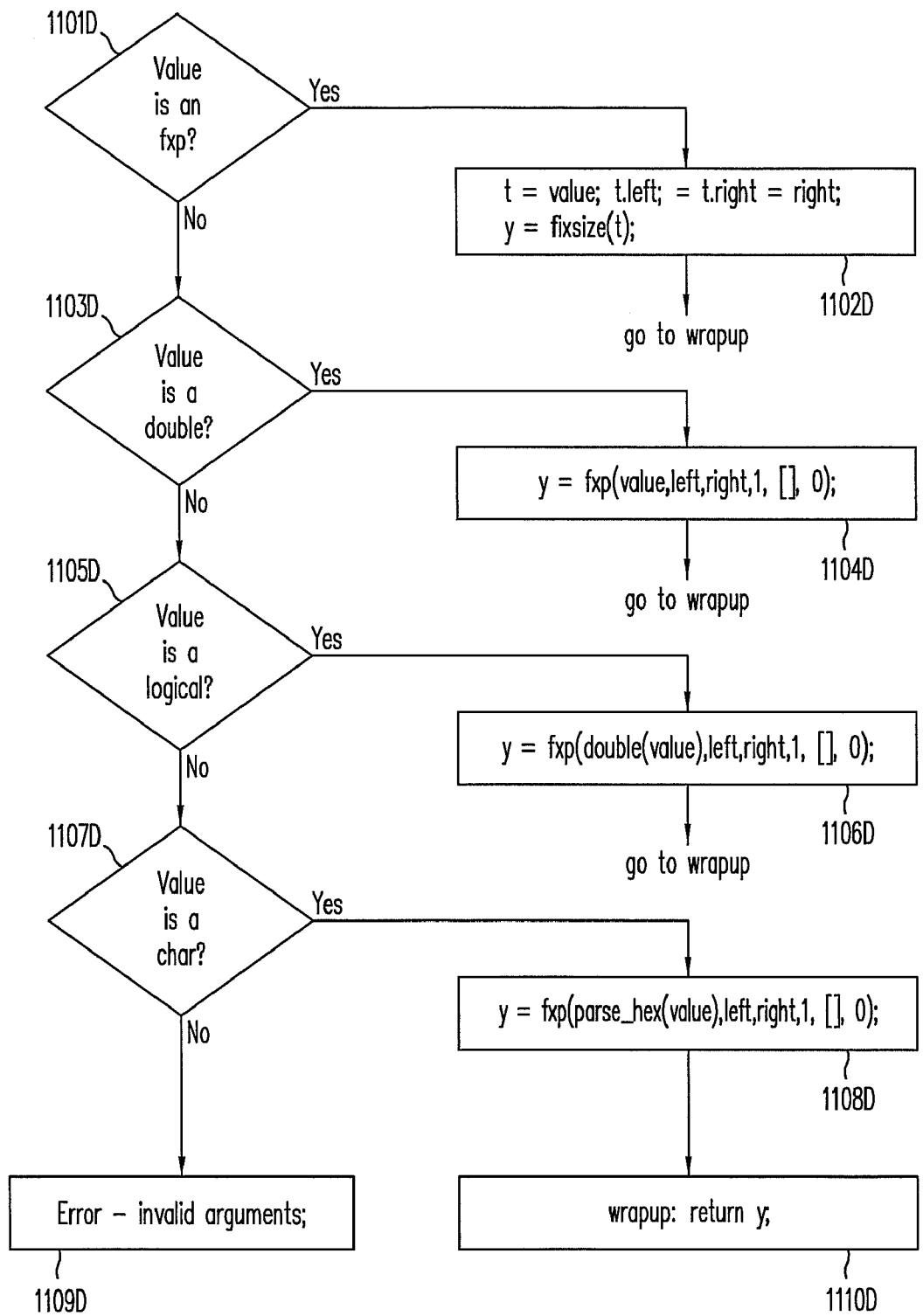

FIG. 11D details the actions of the fxp constructor when it is passed three arguments: "value", "left", and "right". The programmed computer first checks the type of the first argument ("value") in act 1101D. If the argument is a real fixed-point object, the programmed computer creates a new temporary fixed-point object "t" in act 1102D, setting its value and all its property values to be the same as those in the first argument ("value"). The programmed computer then sets the left and right subproperty values of "t" to the second ("left") and third ("right") arguments, respectively. Finally, the function fixsize is called (which is flowcharted in FIGS. 10A-10D for one embodiment) to adjust the value of "t" for the new property values. The real fixed-point result "y" is then returned via a jump to "wrapup" (act 1110D). "Value" and "y" may be scalars, vectors, or arrays.

If the answer to act 1101D is "no", the programmed computer next checks in act 1103D whether the first argument ("value") is of type double. If the answer is "yes", then the programmed computer recursively invokes the fxp constructor function in act 1104D, passing in default values of signed=1, rounding=[ ], and scaling=0 for the missing inputs. The result real fixed-point object "y" is then returned via a jump to "wrapup" (act 1110D). "Value" and "y" may be scalars, vectors, or arrays.

If the answer to act 1103D is "no", the programmed computer checks in act 1105D whether the first argument ("value") is of type logical. If so, it repeats the logic of act 1104D in act 1106D after first converting the logical value to a double. Likewise, if the answer to act 1105D is "no", the computer checks in act 1107D whether the first argument ("value") is of type char. If so, it repeats the logic of act 1104D in act 1108D, but converting the hexadecimal string into a double. If the answer to act 1107D is "no", then the fxp constructor has been provided an invalid set of arguments, and it reports an error in act 1109D. Note that this embodiment has chosen to deal only with the relatively few types available in MATLAB; a skilled artisan, in view of this disclosure, can easily extend the number of types handled by cascading tests in acts 1101D, 1103D, 1105D, and 1107D. Note also that since MATLAB does not distinguish between vector, scalar, and array types (operators work transparently and polymorphically regardless of shape), shape and size are not components of the test in this embodiment. A skilled artisan, in view of this disclosure, can easily extend the tests to accommodate languages with richer or stricter typing systems.

Figure 11E:
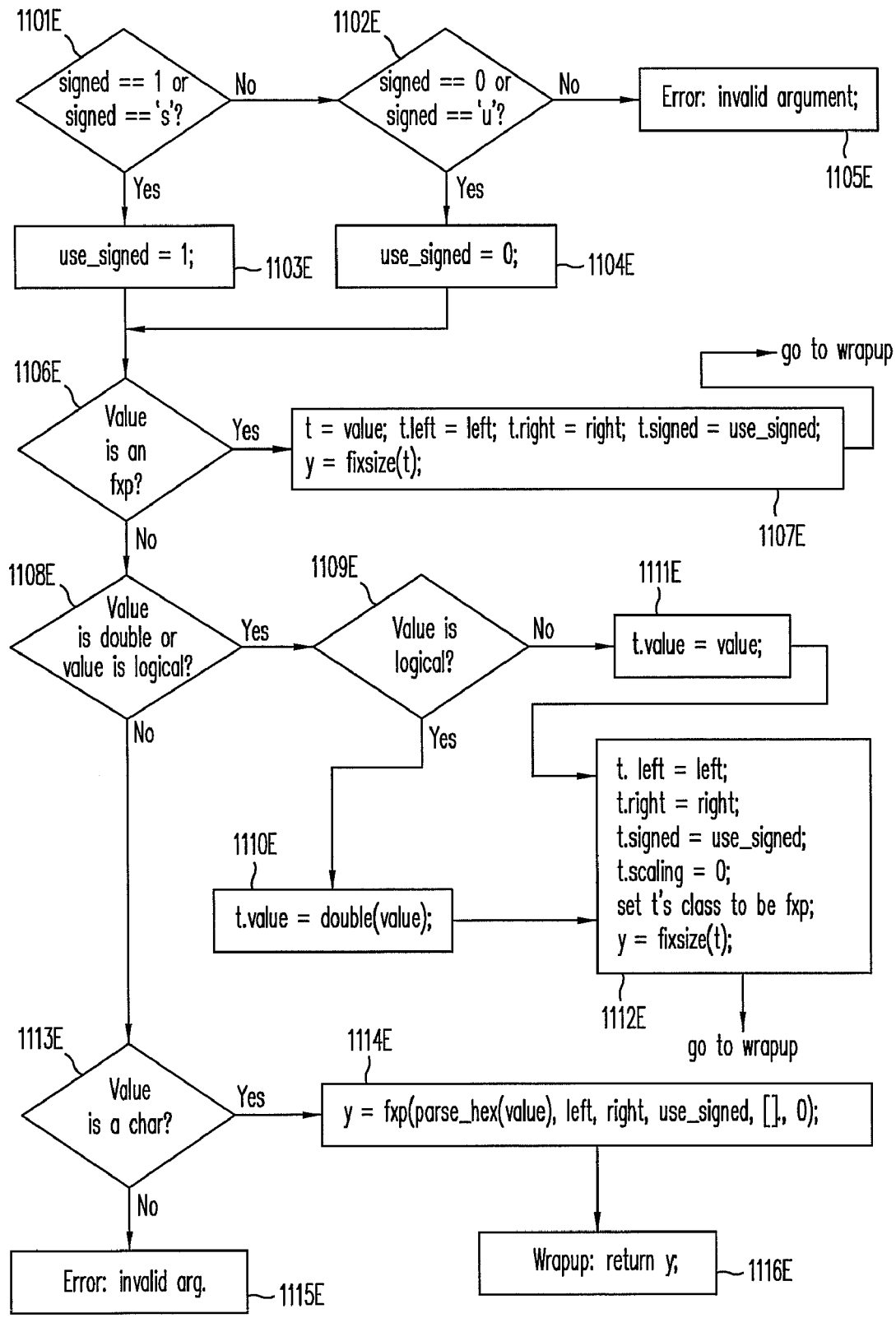

FIG. 11E details the actions of the fxp constructor when it is passed four arguments: "value", "left", "right" and "signed". The programmed computer first checks whether the "signed" parameter is equal to 1 or to 's' in act 1101E. If the answer is "yes", it sets a flag "use_signed" to be 1 in act 1103E, then proceeds to act 1106E. If not, it tests whether the "signed" parameter is equal to 0 or to 'u' in act 1102E. If "signed" is one of these two values, the programmed computer sets the flag "use_signed" to 0 in act 1104E and proceeds to act 1106E. Otherwise, the "signed" parameter has an invalid value, and an error is reported in act 1105E. Acts 1101E through 1104E detect whether the programmer is requesting a signed real fixed-point object, and record that information by setting the flag "use_signed" to 1 for a signed fixed-point object and to 0 for an unsigned fixed-point object.

The programmed computer next checks the type of the first argument ("value") in act 1106E. If the argument is a real fixed-point object, the programmed computer executes act 1107E to create a temporary variable "t". The computer creates "t" as an identical copy of the first argument ("value"), then sets the left, right, and signed property values to corresponding parameters. It then calls fixsize (which is flowcharted in FIGS. 10A-10D for one embodiment) to adjust the value of "t" for the new property values. The result fixed-point object "y" is then returned via a jump to "wrapup" (act 1116E). "Value" and "y" may be scalars, vectors, or arrays.

If the answer to act 1106E is "no", the programmed computer next checks in act 1108E whether the first argument ("value") is of type double or logical. If so, the programmed computer then separates out logicals from doubles in act 1109E, and creates a temporary fixed-point object "t" whose value is set to either the first argument (if it is a double) or to the first argument converted to a double (if the first argument is a logical) via act 111E. Act 1112E completes the fixed-point object by setting the left, right, and signed property values to the corresponding input parameters, setting the scaling to 0 (the default value), setting the object's class to be 'fxp' (which in this embodiment is the way of setting the complexness property to be 'real'), and invoking the function fixsize (which is flowcharted in FIGS. 10A through 10D for one embodiment) to adjust "t" for the new properties. The result fixed-point object "y" is then returned via a jump to "wrapup" (act 1116E). "Value" and "y" may be scalars, vectors, or arrays.

If the answer to act 1108E is "no", the programmed computer checks in act 1113E whether the first argument ("value") is of type char. If so, it recursively invokes the fxp constructor function in act 1114E, passing the first argument ("value") converted to a double (via the function call "parse_hex" which converts strings in hexadecimal format into doubles), the user-provided arguments of "left", "right", and "signed", and the default values for rounding of [ ] and for scaling of 0. The result real fixed-point object "y" is then returned via a jump to "wrapup" (act 1116E).

If the answer to act 1113E is "no", then the fxp constructor has been called with an invalid set of arguments, and an error is reported via act 1115E. Note that this embodiment has chosen to deal only with the relatively few types available in MATLAB; a skilled artisan, in view of this disclosure, can easily extend the number of types handled by cascading tests in acts 1101E, 1103E, 1106E, 1108E, and 1113E. Note also that since MATLAB does not distinguish between vector, scalar, and array types (operators work transparently and polymorphically regardless of shape) that shape and size are not components of the test in this embodiment. A skilled artisan, in view of this disclosure, can easily extend the tests to accommodate languages with richer or stricter typing systems.

Figure 11F:
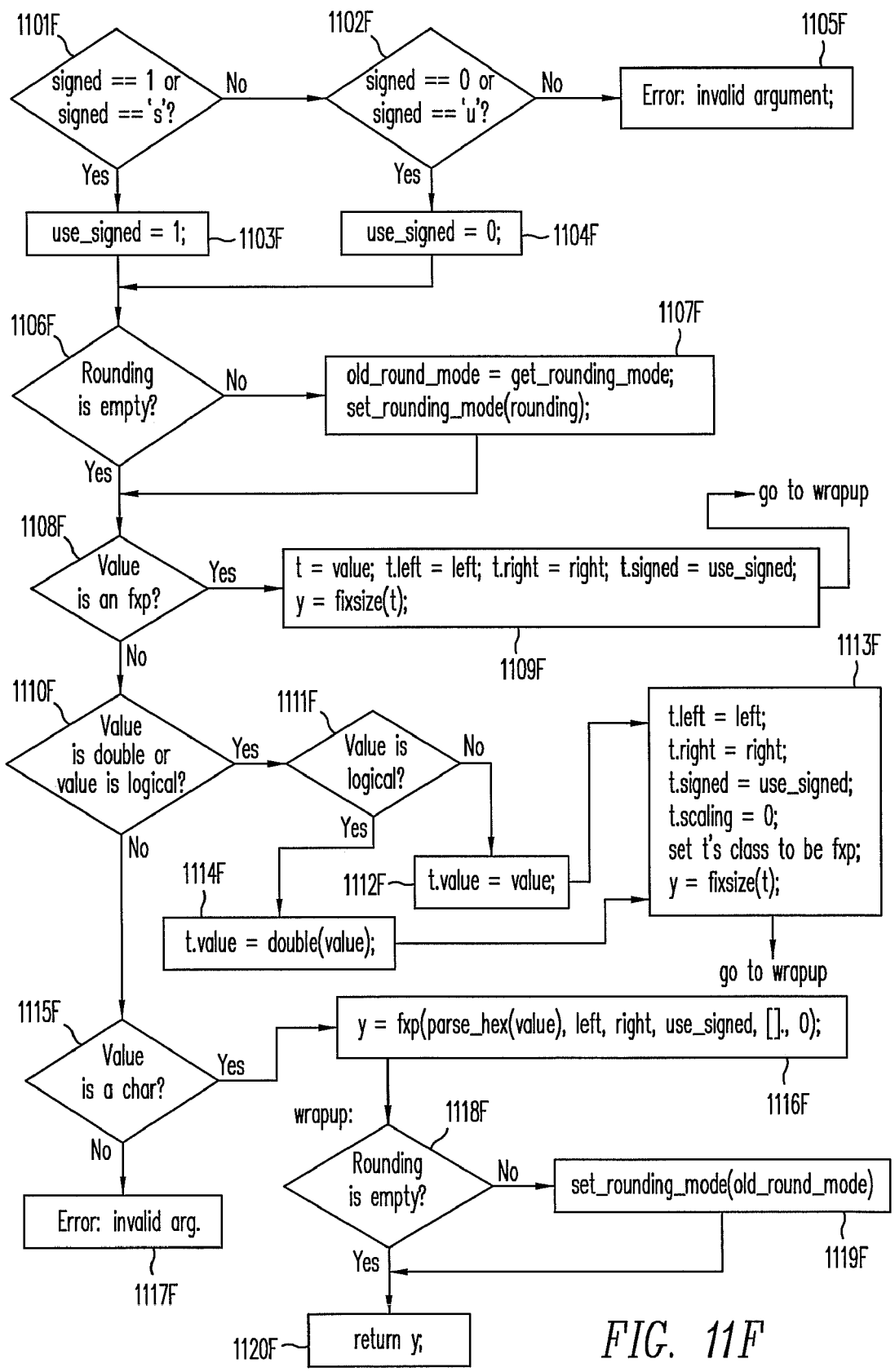

FIG. 11F details the actions of the fxp constructor when it is passed five arguments: "value", "left", "right", "signed", and "rounding". The last parameter permits a temporary change in rounding mode while this fixed-point object is being created. When this parameter is not empty, the fxp constructor saves the global rounding mode, replacing it with the user-requested mode. Before exiting, the constructor restores the previous mode. Acts 1101F through 1105F are for determining the signedness property value of the new fixed-point object. These acts are identical to corresponding acts 1101E through 1105E in FIG. 11E. Act 1106F then tests whether a "rounding" parameter has been passed in. If "yes", the programmed computer then saves the current rounding mode in act 1107F and sets the global rounding mode to be the type of rounding indicated by the "rounding" parameter. This global rounding mode is used by the procedure "fixsize" (detailed in FIGS. 10A-10D for one embodiment) as called from acts 1109F and 1113F. It then proceeds to act 1108F, which is also the continuation of act 1106F if "rounding" is empty.

Acts 1108F through acts 1117F are identical in function to acts 1106E through acts 1115E in FIG. 11E; the corresponding act numbers in FIG. 11F are obtained by adding 2 to the act in FIG. 11E. Acts 1118F through 1120F do the cleanup of the rounding mode, if the mode was changed at the beginning of the procedure (act 1107F). Act 1118F tests whether "rounding" is empty, which determines whether the rounding mode was changed. If it was, act 1119F sets it back to the saved value in the variable "old_round_mode". Act 1120F then returns the newly-created real fixed-point object.

Figure 11G:
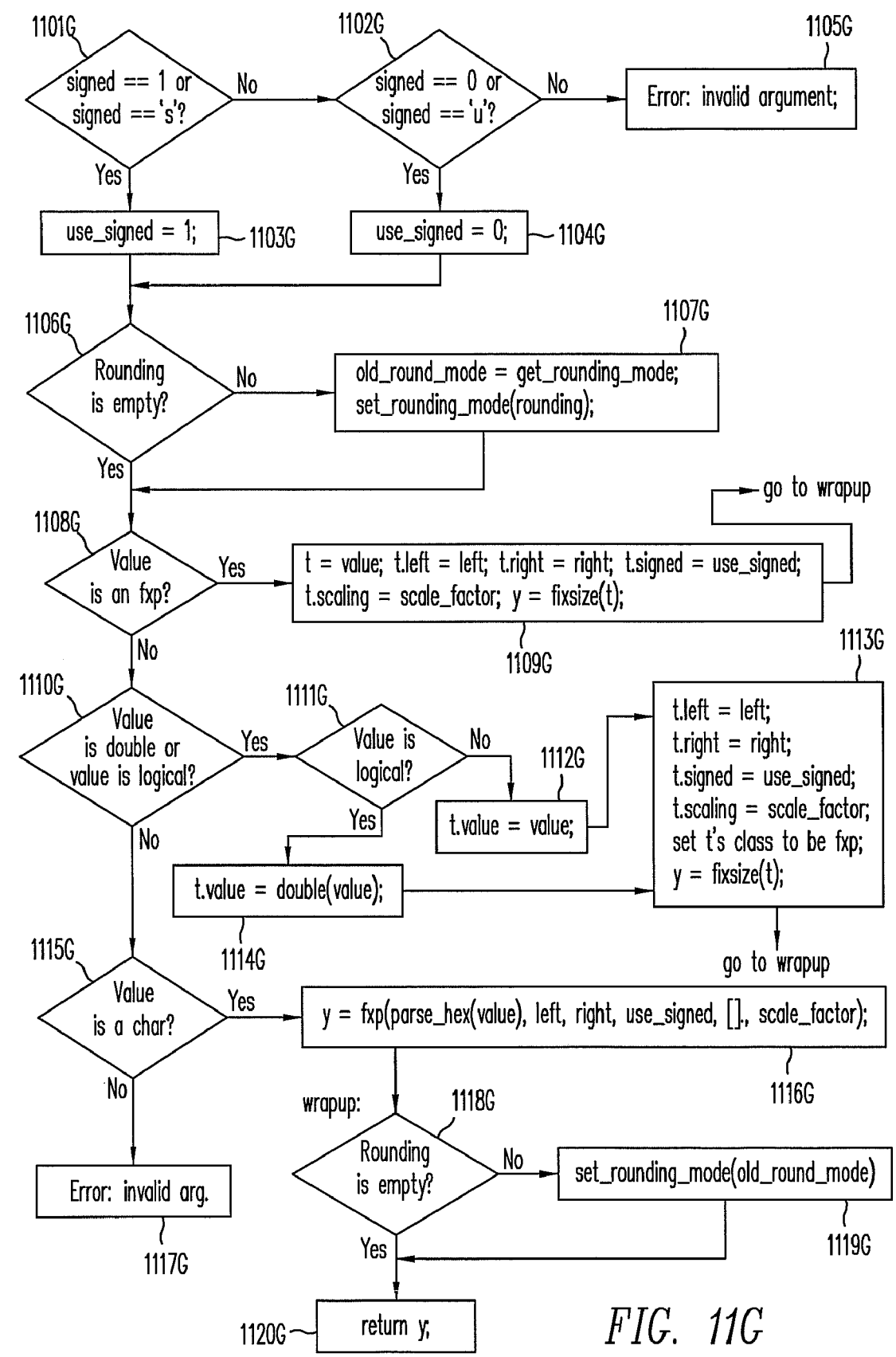

FIG. 11G details the actions of the fxp constructor when it is passed six arguments: "value", "left", "right", "signed", "rounding", and "scale_factor". The sixth argument "scale_factor" is a scaling factor to be applied to the input argument "value". Acts 1101G through 1120G mirror exactly acts 1101F through 1120F in FIG. 11F. The only difference between the FIGS. 11F and 11G is that in FIG. 11F, the user has not provided an argument for "scaling_factor". In that case, a default value of 0 is used. In FIG. 11G, an input argument "scaling_factor" has been provided; that value is used in place of the default.

FIGS. 12A-12G detail the operation of the complex fixed-point object constructor in flow chart form for one embodiment in the MATLAB language. This constructor, named "cfxp" in this embodiment, can take up to six arguments: "value" (the value to be converted to complex fixed-point, which may be a scalar, vector or array, and which may be of type double, fixed-point (for changing properties), complex fixed-point (for changing properties), or logical), "left" (value of the left subproperty of precision), "right" (value of the right subproperty of precision), "signed" (if 1 or 's', then create a signed complex fixed-point object; otherwise create an unsigned complex fixed-point object), "rounding" (an alternative form of rounding to be used for this call in place of the global default), and "scaling" (a scaling factor to be applied to the created complex fixed-point object). It is not necessary to specify all 6 arguments to the cfxp constructor function; defaults are assumed for missing arguments if less than 6 are passed.

The 'cfxp' constructor in this embodiment also provides for changing properties of existing complex fixed-point objects and for converting fixed-point objects and other entities into complex fixed-point objects. This extra functionality is supported through variable calling conventions. For instance, when the first argument to the cfxp constructor is an existing complex fixed-point object, the constructor sets the property values of the existing object to the corresponding passed-in parameters. Thus, if the first argument ("value") is a complex fixed-point object and only the second ("left") parameter is passed, the constructor creates a complex fixed-point object whose property values are identical to those of the first parameter ("value") with the exception of the left subproperty, which is set to the second parameter ("left"). Similarly, if only two arguments are passed to the constructor and the second argument is a fixed-point object (real or complex), the constructor "copies" the properties of the second object other than its value when creating the new complex fixed-point object. That is, it uses the values of left, right, signed, and scaling that are present for the second ("left") parameter combined with the value of the first ("value") parameter to construct the new complex fixed-point object. This convention supercedes the first convention, so if the cfxp constructor is called with two complex fixed-point objects as parameters, the result complex fixed-point object has all the property values of the second rather than the property values of the first. Also, if the cfxp constructor is called with two real fixed-point objects having identical property values and with no other parameters, the constructor creates a new complex fixed-point object equal to the "value"+"left"*i (the first parameter becomes the real component of the complex object and the second parameter becomes the imaginary component). In other words, the two real fixed-point objects are treated as components of a complex number, and the new complex fixed-point object has the same properties as both, with one real fixed-point object serving as the real component and the other as the imaginary. This convention supercedes the previous two.

In describing the functionality of the cfxp constructor, note that all references to function "fixsize" in FIGS. 10A through 10D are to the complex version of said function, in which the flowcharts of FIGS. 10A through 10D are applied to both the real and imaginary portions of the fixed-point object.

Figure 12A:
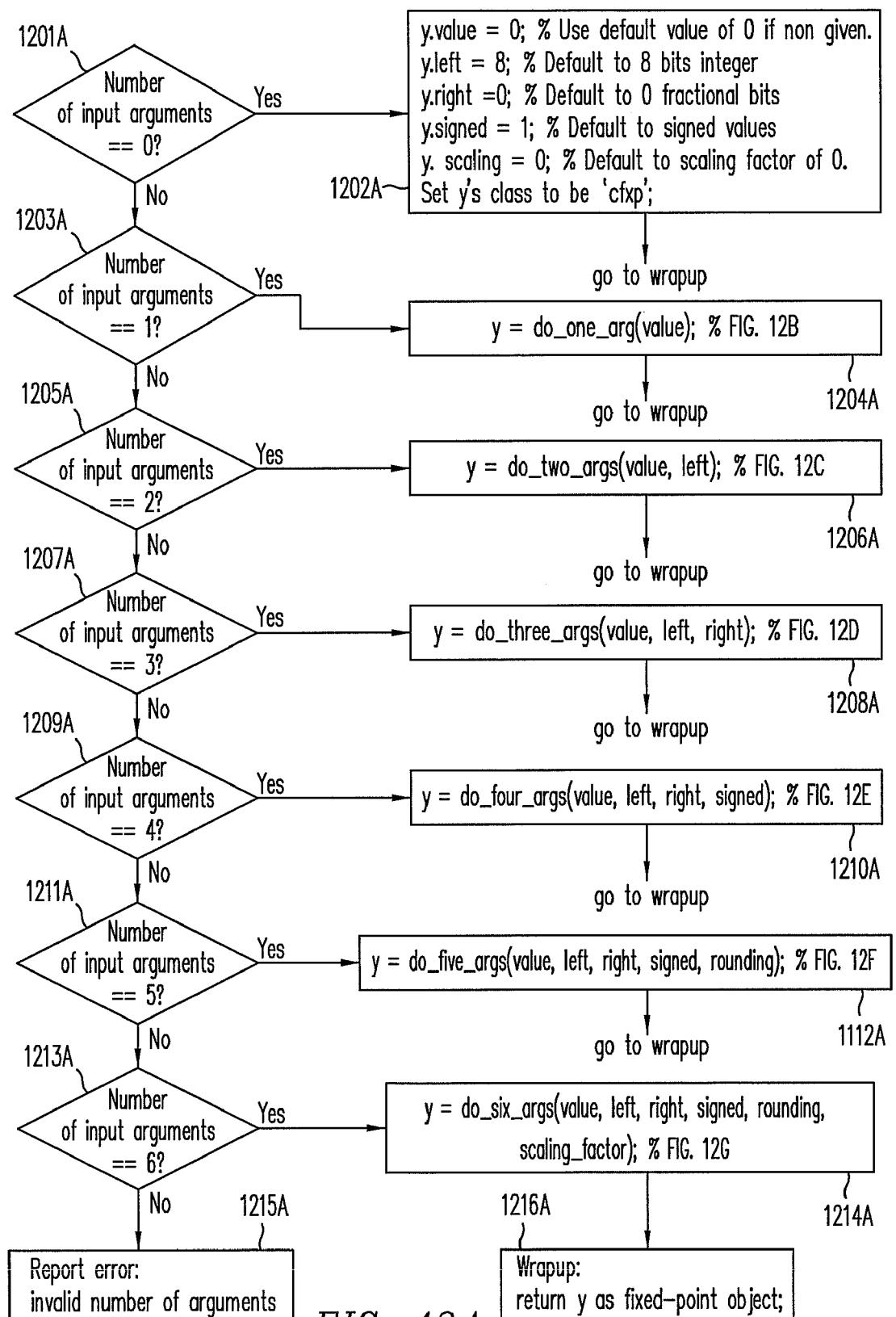
FIGS. 12A, 12B, 12C, (12C-1, 12C-2), 12D, 12E, 12F, and 12G illustrate, in a flow chart, acts performed during the creation of a complex fixed-point constant, variable, or vector.

FIG. 12A details the high level operation of the cfxp constructor in flow chart form. At the highest level, the cfxp constructor selects an action based on the number of arguments passed in. The purpose of the action selected is to provide defaults for missing arguments.

Act 1201A of FIG. 12A tests whether there are any input arguments at all. If there are none, the programmed computer executes act 1202A that creates a signed complex fixed-point number ("y") with a default value of 0, 8 bits of precision to the left of the binary point, no bits of precision to the right of the binary point, and a scaling factor of 0. After flagging y as a complex fixed-point object to the MATLAB interpreter (by setting its class field to 'cfxp', the equivalent in this embodiment of setting the complexness property to "complex"), the programmed computer jumps to "wrapup" (act 1216A) which returns y as the result.

If the answer to act 1201A is "no", meaning that there is at least one input argument, the programmed computer executes act 1203A, testing whether there is only one input argument ("value"). If the answer is "yes", the programmed computer executes act 1204A, which sets y to be a complex fixed-point object containing that value via the actions in FIG. 12B (detailed below), then returns that object by jumping to "wrapup" (act 1216A). The input argument "value" may be a scalar value, a vector of values, or an array of values; the result has the same shape as "value".

If the answer to act 1203A is "no", meaning that there are at least two input arguments, the programmed computer executes act 1205A, testing whether there are exactly two input arguments ("value" and "left"). If the answer is "yes", the programmed computer executes act 1206A, which processes the two input arguments via the actions in FIG. 12C (detailed below), setting the result in the variable "y", then returns that complex fixed-point object by jumping to "wrapup" (act 1216A).

If the answer to act 1205A is "no", meaning that there are at least three input arguments, the programmed computer executes act 1207A, testing whether there are exactly three input arguments ("value", "left", and "right"). If the answer is "yes", the programmed computer executes act 1208A, which processes three input arguments via the actions in FIG. 12D (detailed below), setting the result in variable "y", and returning that complex fixed-point result by jumping to "wrapup" (act 1216A).

If the answer to act 1207A is "no", meaning that there are at least four input arguments, the programmed computer executes act 1209A, testing whether there are exactly four input arguments ("value", "left", "right", and "signed"). If the answer is "yes", the programmed computer executes act 1210A, which processes four input arguments via the actions in FIG. 12E, setting the result in variable "y" and returning that complex fixed-point result by jumping to "wrapup" (act 1216A).

If the answer to act 1209A is "no", meaning that there are at least five input arguments, the programmed computer executes act 1211A, testing whether there are exactly five input arguments ("value", "left", "right", "signed", and "rounding"). If the answer is "yes", the programmed computer executes act 1212A, which processes five input arguments via the actions in FIG. 12F, setting the result in variable "y" and returning that complex fixed-point result by jumping to "wrapup" (act 1216A).

If the answer to act 1211A is "no", meaning that there are at least six input arguments, the programmed computer executes act 1213A, testing whether there are exactly six input arguments ("value", "left", "right", "signed", "rounding", and "scaling"). If the answer is "no", there are too many input arguments, which the programmed computer reports as an error via act 1215A. Otherwise, the programmed computer executes act 1214A, which processes six input arguments via the actions in FIG. 12G, setting the result in variable "y", and returning that complex fixed-point result via "wrapup" (act 1216A).

While this embodiment assumes six arguments to the cfxp constructor function, a skilled artisan will easily recognize in view of this disclosure that the number, order, and default values for the arguments are details which are easily changed. Other embodiments have separate constructors for (for instance) signed and unsigned complex fixed-point objects, reducing the number of arguments required. Other embodiments have different ways of expressing precision. Similarly, having separate constructor functions for real fixed-point objects and complex fixed-point objects is again an arbitrary choice of embodiment; alternative embodiments use a single constructor with an argument or value-test to construct both real and complex fixed-point objects.

Figure 12B:
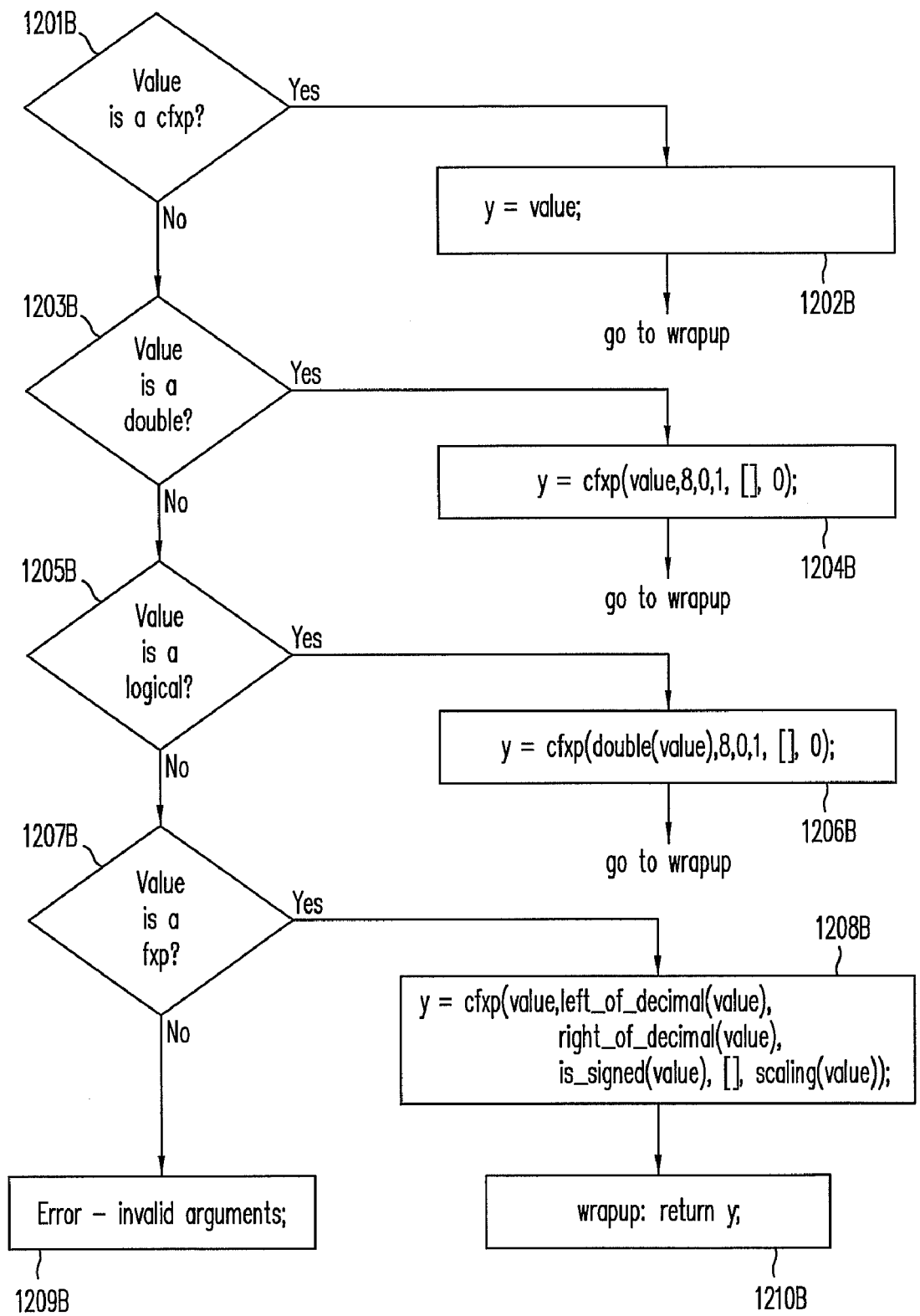

FIG. 12B details the functionality of the cfxp constructor function when presented with only one argument, the "value" to be converted. The programmed computer first checks whether the first argument ("value") is already a complex fixed-point object in act 1201B. If the answer is "yes", then the programmed computer simply copies the input argument into the return variable "y" in act 1202B, and jumps to "wrapup" (act 1210B) to return that complex fixed-point object. Again, "value" may be a scalar, a vector, or an array.

If the answer to act 1201B is "no", the programmed computer then tests whether the argument ("value") is a double in act 1203B. In this embodiment, the term "double" includes both "double-precision" and "complex double-precision". If the answer is "yes", the programmed computer recursively invokes the cfxp constructor function on input argument via act 1204B, passing in the default values for the remainder of the arguments of left=8, right=0, signed=1, rounding=[ ], and scaling=0. These default choices are arbitrary, and are different in other embodiments. For instance, another embodiment computes the minimum number of bits required to the left and the right of the binary point to correctly hold the "value" argument, and uses those computed minimums for the left and right subproperties, rather than 8 and 0. The newly-created complex fixed-point object "y" is returned after a jump to "wrapup" (act 1210B). Again, both "value" and "y" may be a scalar, a vector, or an array.

If the answer to act 1203B is "no", the programmed computer then tests whether the input argument ("value") is a logical in act 1205B. If the answer is "yes", the programmed computer recursively invokes the cfxp constructor function via act 1206B on the double equivalent to the input argument ("value"), with default values passed in for the remainder of the arguments of left=8, right=0, signed=1, rounding=[ ], and scaling=0. These default choices are arbitrary, and are strictly a choice of embodiment. The newly created complex fixed-point object "y" is returned after a jump to "wrapup" (act 1210B). Again, both "value" and "y" may be a scalar, a vector, or an array.

If the answer to act 1205B is "no", the programmed computer then tests whether "value" is a fixed-point object in act 1207B. If "yes", the programmed computer in act 1208B converts the real fixed-point object into a complex fixed-point object with the same property values by adding an imaginary part of 0. The newly-created complex fixed-point object "y" is returned after a jump to "wrapup" (act 1210B).

If the answer to act 1207B is "no", then an unknown or invalid argument has been passed, and the programmed computer issues an error message via act 1209B.

Figures 2, 12C:
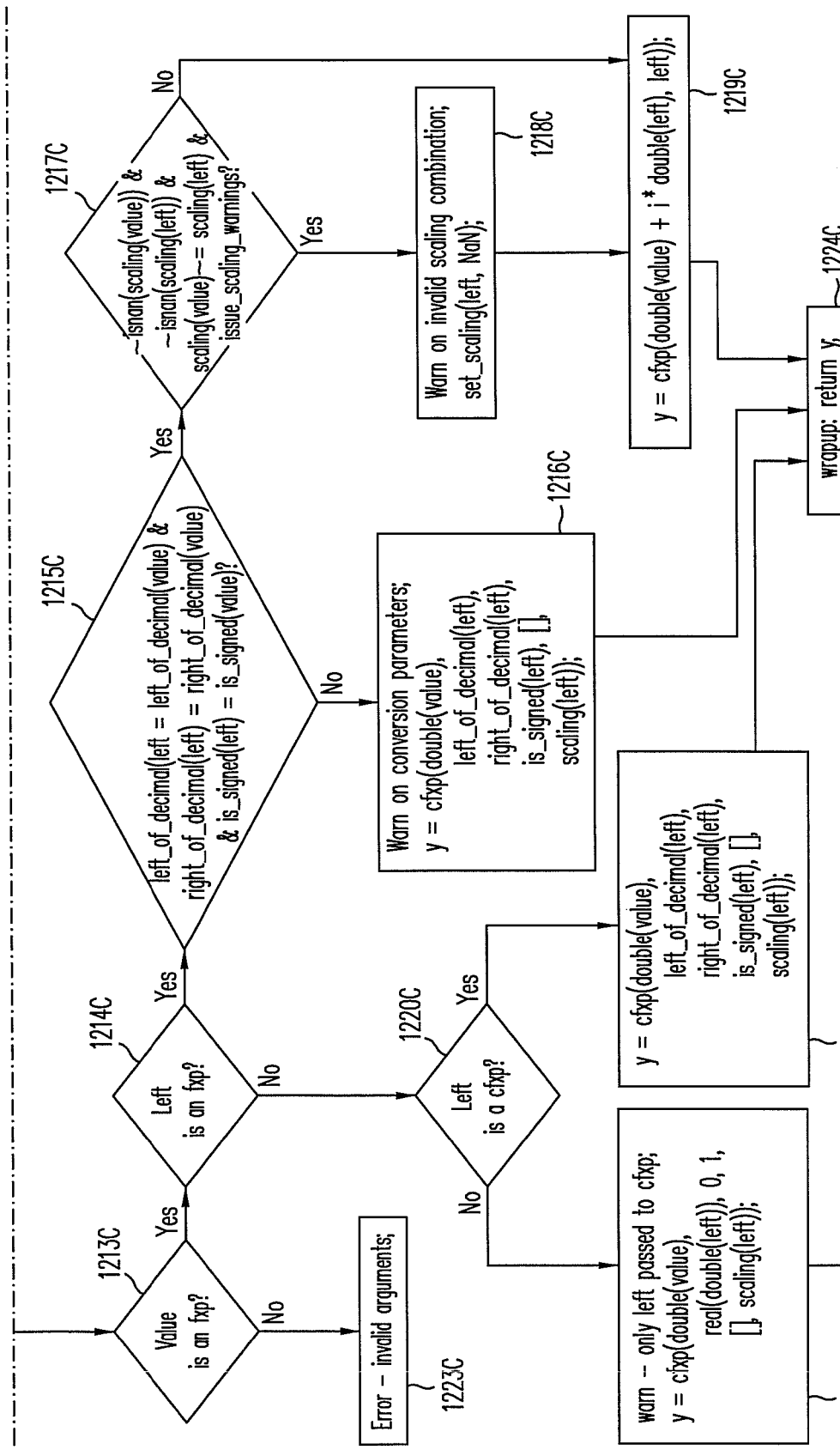

FIG. 12C details the actions of the cfxp constructor function when it is passed two arguments: "value" and "left". The programmed computer first checks in act 1201C whether the first argument ("value") is a complex fixed-point object. If "yes", it checks in act 1202C whether the second argument ("left") is a fixed-point object (real or complex). If that answer is also "yes", the constructor has received two arguments, both of which are fixed-point objects, and the first of which ("value") is complex. This embodiment supports the convention of transferring the property values of the second fixed-point object to the first when it receives only two arguments, the first of which is a complex fixed-point object and the second of which is any fixed-point object. In other words, the return object is a copy of the first argument (including value) that has the property values of the second argument applied to it. Act 1203C implements that convention, by recursively calling the cfxp constructor with parameters of: the first argument to the current invocation ("value") and the appropriate properties of the second argument ("left") ("left_of_decimal" is a function that returns left subproperty value of any fixed-point object; "right_of_decimal" is a function that returns the right subproperty value of any fixed-point object; "is_signed" is a function that returns the signedess property value of any fixed-point object; and "scaling" is a function that returns the scale factor property of a fixed-point object). Note that all complex fixed-point objects "x" in this embodiment are defined such that left_of_decimal (real(x))==left_of_decimal (imag(x)) and right_of_decimal (real(x))==right_of_decimal (imag(x)). If the answer to act 1202C is "no", the programmed computer assumes that the second argument ("left") contains the left subproperty value for the new complex fixed-point object. Act 1204C creates a new temporary complex fixed-point object "t" that is initially an identical copy of the first argument ("value"). The programmed computer then sets the left subproperty value of "t" to be the second input argument ("left") and the right subproperty value of "t" to be 0 (an arbitrary default value). It then calls the function "fixsize" (which is detailed in FIGS. 10A through 10D for one embodiment) to adjust the value of the resulting complex fixed-point object to the new property values. In the case of both acts 1203C and 1204C, the result complex fixed-point object "ly" is returned via a jump to "wrapup" (act 1224C). "Value", "left", and "y" may be scalars, vectors, or arrays.

If the answer to act 1201C is "no", the programmed computer next checks in act 1205C whether the first input argument ("value") is a double. If "yes", the programmed computer then checks in act 1206C whether the second argument ("left") is a fixed-point object (real or complex). If the answer is again "yes", then the programmer has specified a double and a fixed-point object as the two input arguments. In this embodiment, the cfxp constructor function supports a convention for this argument set of creating a new complex fixed-point object by applying the property values of the second argument to the value of the first. Act 1207C implements this convention. It recursively calls the cfxp constructor function, passing as parameters: the first input argument ("value") to the current invocation, followed by the property values of the second input argument ("left") to the current invocation, much as was done in act 1203C. The result complex fixed-point object "y" is then returned via a jump to "wrapup" (act 1224C). Again, the input arguments and results may be scalars, vectors, or arrays.

If the answer to act 1206C is "no", the constructor function has received two doubles as parameters. The constructor converts the first argument into a complex fixed-point object that has the second argument as the value for its left subproperty, and default property values of right=0, signed=1, rounding= [ ], and scaling=0. This conversion is effected by a recursive call to the cfxp constructor function in act 1208C. The default choices for property values that the user did not provide are arbitrary, and differ in other embodiments. The result complex fixed-point object "y" is then returned via a jump to "wrapup" (act 1224C). Again, the input arguments and results may be scalars, vectors, or arrays.

If the answer to act 1205C is "no", the programmed computer next checks via act 1209C whether the first argument is a logical. If the answer to act 1209C is "yes", then the programmed computer repeats the logic of acts 1206C, 1207C, and 1208C in acts 1210C, 1211C, and 1212C, respectively, but only after converting the logical-typed first argument ("value") into a double.

If the answer to act 1209C is "no", the programmed computer checks via act 1213C whether the first argument is a real fixed-point object. There is no analogous check in FIG. 11C for constructing fixed-point objects from complex fixed-point objects passed as arguments. That is, the fxp constructor does not support a first argument of a complex fixed-point object. Such a check would be useful if, for instance, one wanted to use the fxp constructor function to select either the real or the imaginary part of a complex fixed-point object and return it as a real fixed-point object (analogous to the act of passing in two real fixed-point objects to the cfxp constructor function to construct a complex fixed-point object as the combination of the two). In MATLAB, the functions "real" and "imag" are natural candidates for performing that functionality on complex fixed-point objects, since that is what those functions do to complex floating-point numbers. This embodiment uses "real" and "imag" in that fashion. Other embodiments do not support "real" and "imag" and provide mechanisms in the fxp constructor for extracting parts of a complex fixed-point object.

If the answer to act 1213C is "yes", then the programmed computer tests in act 1214C whether the second argument ("left") is also a real fixed-point object. If so, then the cfxp constructor function has received two real fixed-point objects as arguments. This embodiment supports the convention whereby the cfxp constructor function creates a new complex fixed-point object equal to "first argument+second argument*i" when passed to real fixed-point objects with identical property values. The property values of the result (other than complexness) are set to be the same as the property values of the input arguments. Before constructing such a complex fixed-point object, the programmed computer checks in act 1215C that the two real fixed-point objects have identical property values (left, right, signedness). If not, then the conditions for the construction of "value+i*left" are not met, and the programmed computer proceeds to act 1216C, where it issues a warning and implements the convention of converting the real fixed-point first argument into a complex fixed-point result by applying the property values of the second. The warning is issued because the resulting complex fixed-point object is known to have an imaginary component of 0. The resulting complex fixed-point object is returned via a jump to "wrapup" (act 1224C).

If after act 1215C the two real fixed-point arguments have the same property values, the programmed computer performs another check on the scaling in 1217C. If the scalings of the two fixed-point objects are inconsistent, the computer issues a warning in act 1218C, and sets the scaling for the second argument ("left") to be non-existent (the floating-point value "NaN" is used to representing a non-provided scaling in this embodiment). "Consistent" scalings in act 1217C are tested by a conjunction of clauses. First, if the scaling factor of either argument is a NaN (as determined by the built-in MATLAB function "isnan"), then no scaling has been provided and there can be no conflict. If both scalings are not NaNs, there is no conflict if they are equal (there is a single scaling factor that can be used for the resulting complex fixed-point number) and there is a conflict if they are not (there is no obvious choice of which one to use for the result). The choice of equal scalings is one particular to this embodiment; other embodiments can adjust the two fixed-point objects so as to obtain an equal scaling. Once scaling has been checked and warnings (if necessary) issued, the programmed computer constructs the complex fixed-point object by a recursively calling the cfxp constructor function in act 1219C, passing down as the first argument the complex combination ("first arg+second arg*i") for the value and a sample fixed-point object (the second input argument) to provide needed property values. The resulting complex fixed-point object is returned via a jump to "wrapup" (act 1224C).

If the second argument ("left") is not a real fixed-point object in act 1214C, the programmed computer checks whether it is a complex fixed-point object in act 1220C. If "yes", then the cfxp constructor function has been passed a real fixed-point object ("value") and a complex fixed-point object ("left"). Following the conventions desribed earlier, the programmed computer will create a new complex fixed-point object that is a combination of the value of the first argument (with an added imaginary component of 0) and the property values of the second argument. This creation is effected in act 1222C by a recursively invoking the cfxp construction passing as parameters the value of the first argument converted to double precision followed by the property values of the second argument. It returns the newly constructed complex fixed-point object via a jump to "wrapup" (act 1224C).

If the second argument ("left") is not a complex fixed-point object in act 1220C, the programmed computer issues a warning in act 1221C and constructs a complex fixed-point object from the first argument ("value"), using the numerical value of the second argument ("left") as the left subproperty value. The remaining properties are taken as the standard defaults of right=0, signed=1, and scaling factor equal to that of the first argument. The newly constructed cfxp object is returned in act 1224C.

If act 1213C reveals the first argument ("value") not to be a fixed-point object, the programmed computer issues an error message in act 1223C, indicating that it does not know how to deal with the type of the input argument. Note that this embodiment has chosen to deal only with the relatively few types available in MATLAB; a skilled artisan, in view of this disclosure, can easily extend the number of types handled by cascading tests in acts 1201C, 1205C, 1209C, and 1213C. Note also that since MATLAB does not distinguish between vector, scalar, and array types (operators work transparently and polymorphically regardless of shape) that shape and size are not components of the test in this embodiment. A skilled artisan, in view of this disclosure, can easily extend the tests to accommodate languages with richer or stricter typing systems.

Figure 12D:
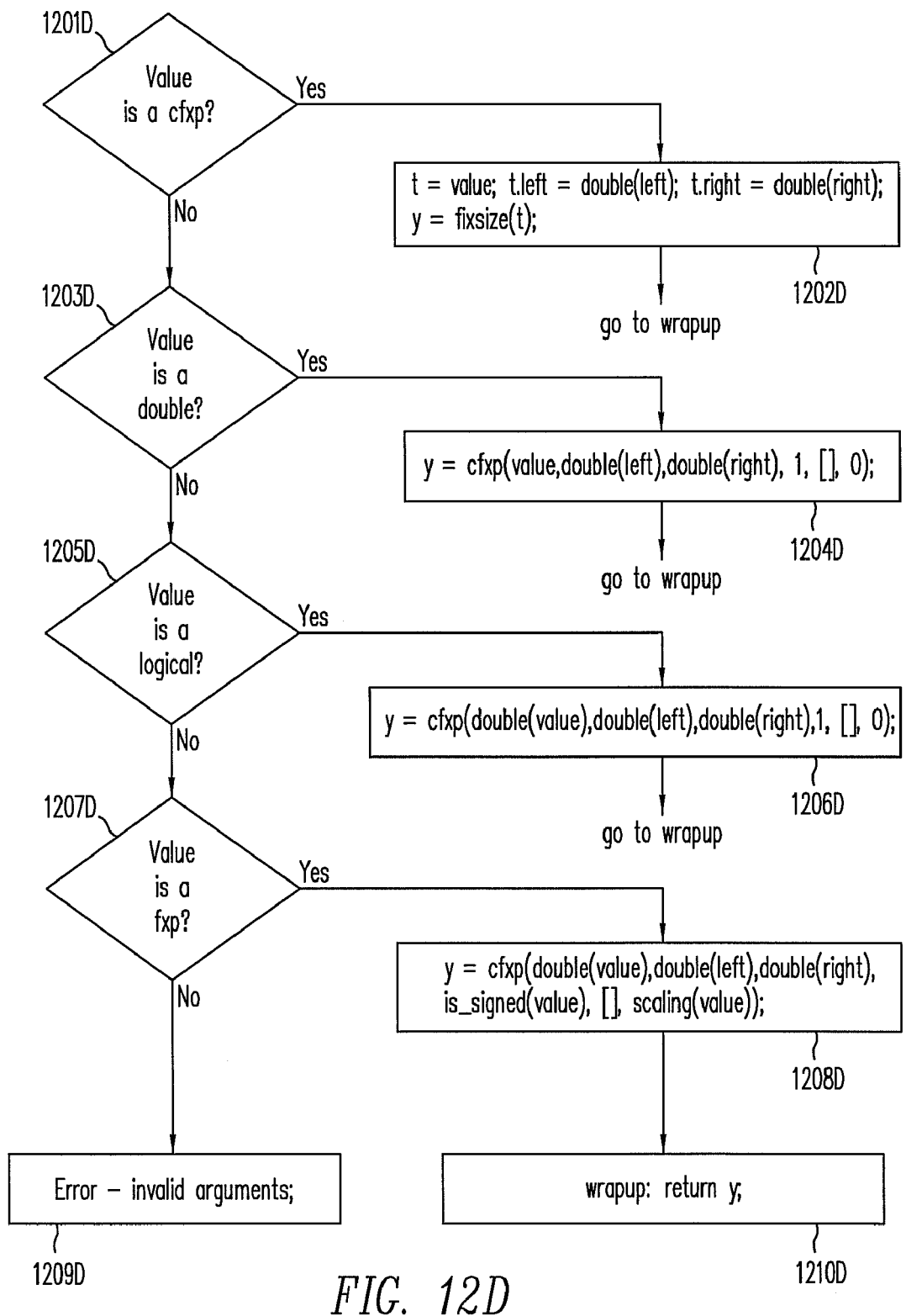

FIG. 12D details the actions of the cfxp constructor when it is passed three arguments: "value", "left", and "right". The programmed computer first checks the type of the first argument ("value") in act 1201D. If it is a complex fixed-point object, the programmed computer creates a temporary "t" that is identical to the first argument (in act 1202D), then sets the left and right subproperty values of "t" to be the second and third arguments to the constructor, respectively. The programmed computer then calls "fixsize" (which for one embodiment is flowcharted in FIGS. 10A through 10D) to adjust "t" for the new property values. The result complex fixed-point object "y" is then returned via a jump to "wrapup" (act 1210D). "Value" and "y" may be scalars, vectors, or arrays.

If the answer to act 1201D is "no", the programmed computer checks in act 1203D whether the first argument ("value") is of type double. If "yes", then the programmed computer recursively invokes the cfxp constructor function in act 1204D, passing default values of signed=1, rounding=[ ], and scaling=0 for the missing inputs. The result complex fixed-point object "y" is then returned via a jump to "wrapup" (act 1210D). "Value" and "y" may be scalars, vectors, or arrays.

If the answer to act 1203D is "no", the programmed computer checks in act 1205D whether the first argument ("value") is of type logical. If so, it repeats the logic of act 1204D in act 1206D after converting the logical first argument into a double. If the answer to act 1205D is "no", the computer checks in act 1207D whether the first argument is a real fixed-point object. If so, the programmed computer recursively calls the cfxp construction function in act 1208D to convert the fixed-point object into a complex fixed-point object. The property values that were not provided in the original constructor call (signedness and scaling) are taken from the property values for the fixed-point object. The resulting complex fixed-point object "y" is returned via a jump to "wrapup" (act 1210D). If the answer to act 1207D is "no", then the cfxp constructor has been provided an invalid set of arguments, and it reports an error in act 1209D. Note that this embodiment has chosen to deal only with the relatively few types available in MATLAB; a skilled artisan, in view of this disclosure, can easily extend the number of types handled by cascading tests in acts 1201D, 1203D, 1205D, and 1207D. Note also that since MATLAB does not distinguish between vector, scalar, and array types (operators work transparently and polymorphically regardless of shape) that shape and size are not components of the test in this embodiment. A skilled artisan, in view of this disclosure, can easily extend the tests to accommodate languages with richer or stricter typing systems.

Figure 12E:
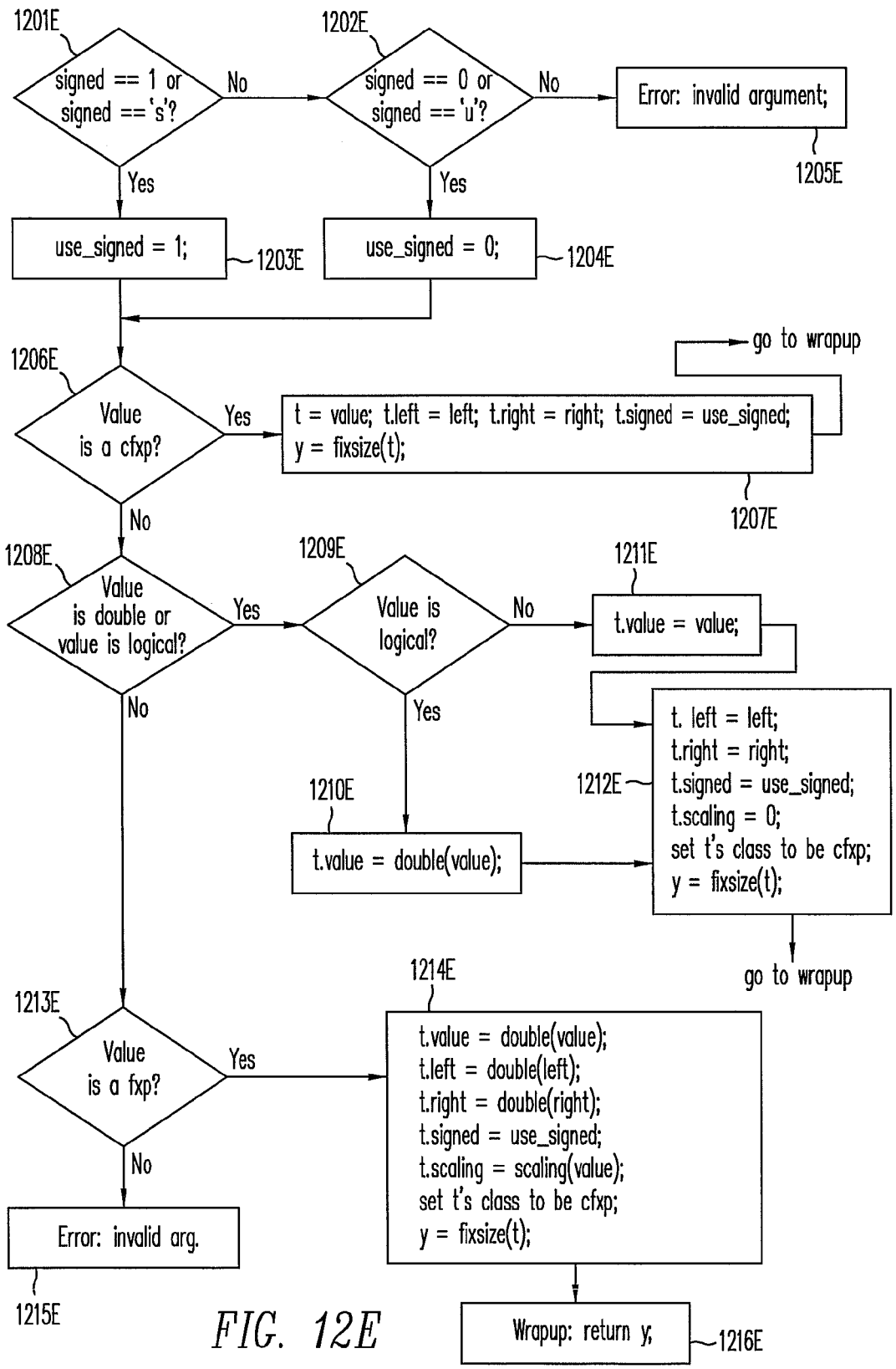

FIG. 12E details the actions of the cfxp constructor when it is passed four arguments: "value", "left", "right" and "signed". The programmed computer first checks whether the "signed" parameter is equal to 1 or to 's' in act 1201E. If the answer is "yes", it sets a flag "use_signed" to be 1 in act 1203E, then proceeds to act 1106E. If not, it tests whether the "signed" parameter is equal to 0 or to 'u' in act 1202E. If "signed" is one of these two values, the programmed computer sets the flag "use_signed" to 0 in act 1204E and proceeds to act 1206E. If not, the "signed" parameter has an invalid value, and an error is reported in act 1205E. Acts 1201E through 1204E are detecting the requested signedness property value and recording that information by setting the flag "use_signed".

The programmed computer next checks the type of the first argument ("value") in act 1206E. If it is a complex fixed-point object, the programmed computer in act 1207E creates a temporary complex fixed-point object "t" identical in value and properties to the first argument. The programmed computer then sets the left, right, and signed property values of "t" to the corresponding arguments passed to the constructor. It then calls "fixsize" (which in one embodiment is flowcharted in FIGS. 10A through 10D) to adjust "t" for the new property values. The result complex fixed-point object "y" is then returned via a jump to "wrapup" (act 1216E). "Value" and "y" may be scalars, vectors, or arrays.

If the answer to act 1206E is "no", the programmed computer next checks in act 1208E whether the first argument ("value") is of type double or logical. If so, the programmed computer separates out logicals from doubles in act 1209E, creating a double precision temporary variable "t" whose value is that of the first argument converted to double precision. If the first argument is a double, the conversion is trivial (act 1211E); if it is a logical, the conversion is effected in act 1210E. Act 1212E completes the complex fixed-point object by setting the left, right, and signed property values according to the input parameters, by setting the scaling to the default 0, by setting the object's class to be 'cfxp' (thereby setting its complexness property value to be complex, marking it as a complex fixed-point object), and invoking the function "fixsize" (which in one embodiment is flowcharted in FIGS. 10A through 10D) to adjust "t" for the new properties. The result complex fixed-point object "y" is then returned via a jump to "wrapup" (act 1216E). "Value" and "y" may be scalars, vectors, or arrays.

If the answer to act 1208E is "no", the programmed computer checks in act 1213E whether the first argument ("value") is a real fixed-point object. If so, act 1214E creates a new complex fixed-point object by directly assigning the appropriate property values to a new variable "y". The value of "y" comes from the first argument (converted to a double). Its left and right subproperties come from the second and third arguments, respectively (again, converted to double), and its signedness property comes from the fourth argument. The scaling property value is taken from the corresponding property value of the first argument ("value"). It then sets the class to be 'cfxp' (setting the complexness property and marking the object as a complex fixed-point object) and invokes the function "fixsize" (which in one embodiment is flowcharted in FIGS. 10A through 10D) to adjust "y" for the new property values. The result complex fixed-point object "y" is then returned via a jump to "wrapup" (act 1216E).

If the answer to act 1213E is "no", then the cfxp constructor function has been called with an invalid set of arguments, and an error is reported via act 1215E. Note that this embodiment has chosen to deal only with the relatively few types available in MATLAB; a skilled artisan, in view of this disclosure, can easily extend the number of types handled by cascading tests in acts 1201E, 1206E, 1208E, and 1213E. Note also that since MATLAB does not distinguish between vector, scalar, and array types (operators work transparently and polymorphically regardless of shape) that shape and size are not components of the test in this embodiment. A skilled artisan, in view of this disclosure, can easily extend the tests to accommodate languages with richer or stricter typing systems.

Figure 12F:
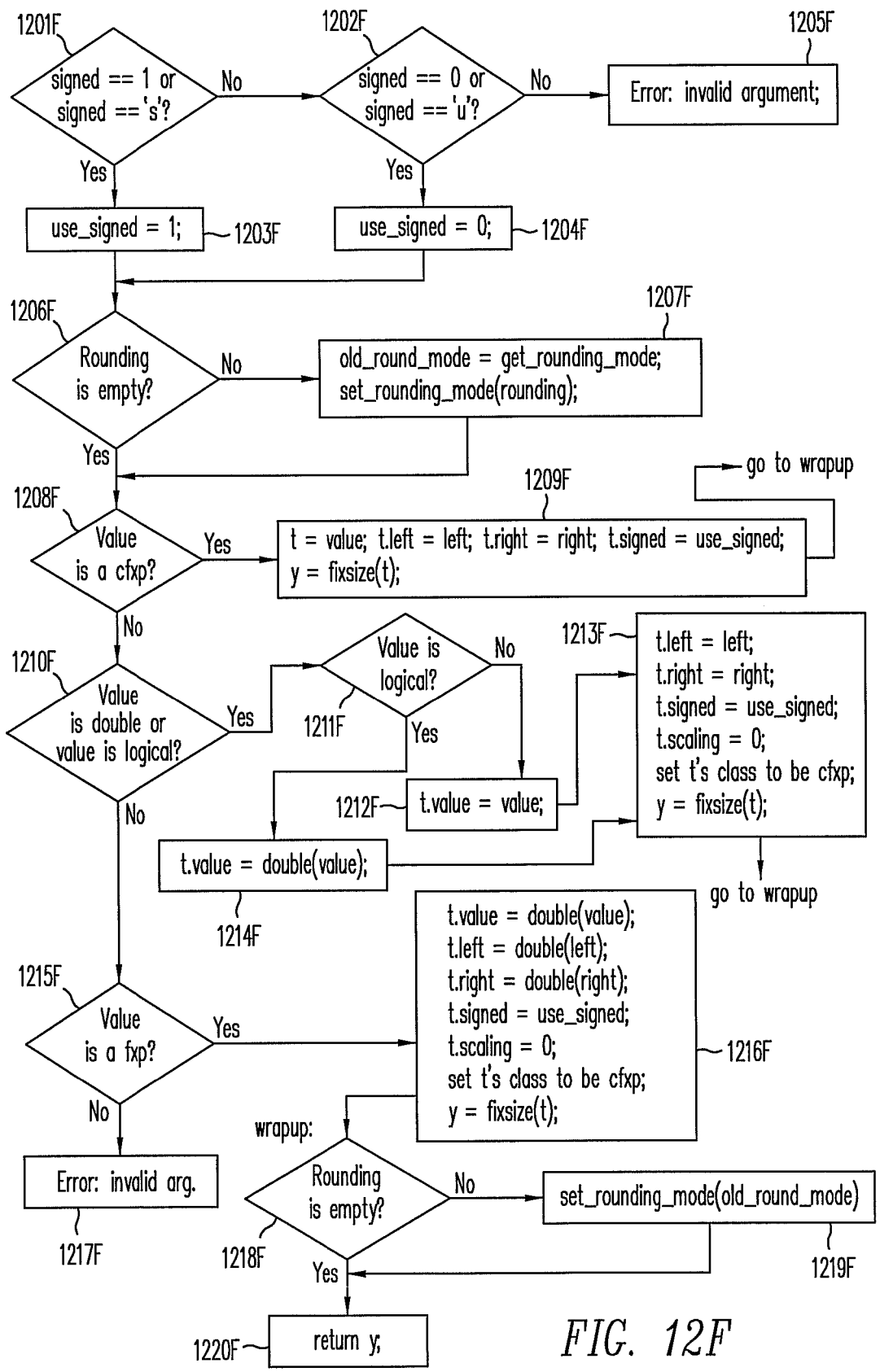

FIG. 12F details the actions of the cfxp constructor when it is passed five arguments: "value", "left", "right", "signed", and "rounding". The fifth parameter "rounding" allows for a different form of rounding to be used during the invocation of the cfxp constructor for special cases where a rounding mode other than the globally-set rounding mode is desired. Acts 1201F through 1205F are for determining the signedness property of the new complex fixed-point object and are identical in function to corresponding acts 1201E through 1205E in FIG. 12E. Act 1206F then tests whether a "rounding" parameter has been passed in. If "yes", the programmed computer then saves the current rounding mode in act 1207F and sets the global rounding mode to be the mode indicated in the "rounding" parameter. It then proceeds to act 1208F, which is also the continuation of act 1206F if "rounding" is empty.

Acts 1208F through acts 1217F are identical in function to acts 1206E through acts 1215E in FIG. 12E; the corresponding act numbers in FIG. 12F are obtained by adding 2 to the act in FIG. 12E. Acts 1218F through 1220F do the cleanup of the rounding mode, if the mode was changed at the beginning of the procedure (act 1207F). Act 1218F tests whether "rounding" is empty, which determines whether the rounding mode was changed. If it was, act 1219F sets it back to the saved value in the variable "old_round_mode". Act 1220F then returns the newly-created complex fixed-point object.

Figure 12G:
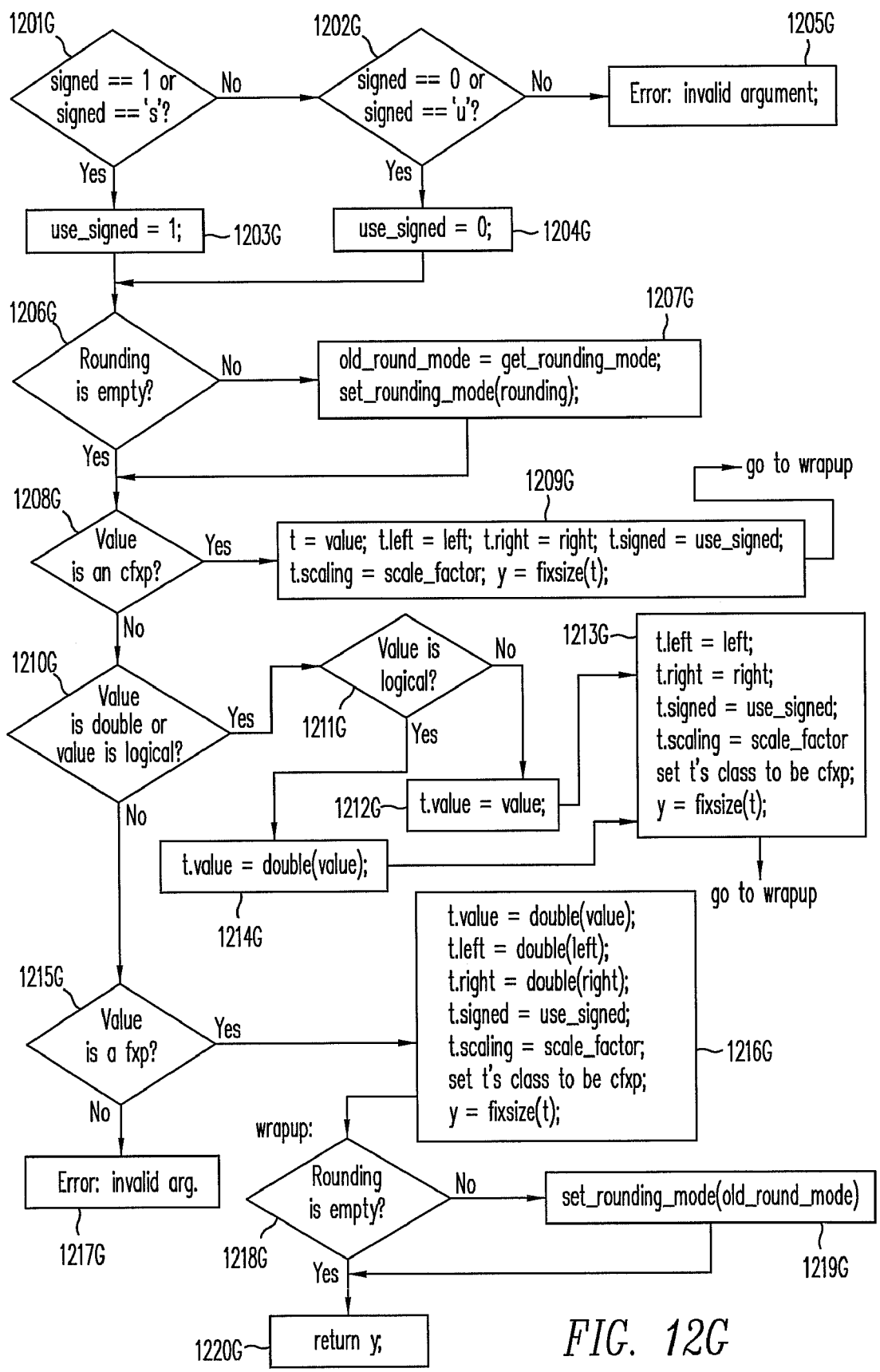

FIG. 12G details the actions of the cfxp constructor when it is passed six arguments: "value", "left", "right", "signed", "rounding", and "scale_factor". The sixth argument "scale_factor" is a scaling factor to be applied to the input argument "value". Acts 1201G through 1220G mirror exactly acts 1201F through 1220F in FIG. 12F. The only difference between the FIGS. 12F and 12G is that in FIG. 12F, no input argument is provided for "scale_factor", so a default of 0 is used. In FIG. 12G, an input argument "scaling_factor" has been provided by the caller, so that value is used, rather than the default value.

In certain embodiments, the language MATLAB is extended with software of the type illustrated in the attached CD-ROM appendix which is also called 'toolbox.' Such a toolbox enables users to write programs using fixed-point arithmetic rather than the default double precision floating point arithmetic provided in MATLAB.

More precise embodiments of this invention execute fixed-point operations precisely. This means that arithmetic results are identical in precision and accuracy to equivalent operations executed on typical fixed-point hardware such as that found on a Digital Signal Processor (DSP). Depending on the embodiment, signed and unsigned operands are supported, as are modulo and saturation arithmetic.

Certain embodiments of the fixed-point toolbox for MATLAB as described herein provide both real and complex fixed-point numbers. Even though real fixed-point numbers are a subset of complex fixed-point numbers, there is an execution-speed advantage to having a separate representation. Since the imaginary component of a real fixed-point object is known to be zero, fewer operations are required to implement arithmetic for real fixed-point objects than for complex fixed-point objects. Rounding modes for results can be selected from round to nearest, round towards zero, round toward positive infinity, and round toward negative infinity.

Certain embodiments of the toolbox simplify the conversion of programs that have already been written using default, double precision MATLAB, into fixed-point arithmetic. By using the class and operator-overloading features of MATLAB, those embodiments enable the conversion of a working double precision program into fixed-point arithmetic by the insertion of a small number of constructors and assignment statements.

Because they are working on fixed-point hardware which has a limited dynamic range, DSP programmers typically have to scale operands to keep values within a reasonable range. The scaling factor is often kept only in the programmer's head, creating troublesome bugs when a scaling is not carried through an operation correctly. Several embodiments of the toolbox described herein provide for implicit scalings to be carried along with fixed-point operations and correctly maintains these scalings through most arithmetic operations. Warnings are issued when an invalid arithmetic operation is attempted on differently-scaled operands (for instance, when adding two fixed-point objects with different scalings).

Mathematical functions, and in particular, transcendental functions, are widely used in DSP and fixed-point applications. Certain embodiments of the invention support mathematical and transcendental functions for fixed-point objects by expanding the fixed-point objects to floating-point, calling the equivalent double precision function, and then reducing the floating-point results back to fixed-point. While these embodiments provide a high degree of precision, they do not generally provide results that are bitwise identical to the results produced on fixed-point hardware and DSPs. The reason is that fixed-point hardware typically uses a coarse approximation to true function values, often (but not always) implemented via a set of lookup tables and polynomials. Other embodiments of this invention enable the emulation to get bitwise identical results to fixed-point hardware for transcendental functions. This accuracy is achieved by allowing the high level program to directly call the functions used on the fixed-point hardware. Such a toolbox provides a facility that allows transcendental functions written in C to be easily plugged into an application. In addition to providing MATLAB applications with the exact precision that a final application will have, this facility also permits early prototyping and exploration of DSP transcendental and mathematical functions.

Therefore, a toolbox as described herein allows users to write their own functions using fixed-point operations and call a large number of basic MATLAB functions with fixed-point arguments, obtaining fixed-point results. Furthermore, a toolbox as described herein also allows users to directly make use of existing libraries (or toolboxes) of functions that are provided in source form, and to write fixed-point source form representations for functions in libraries (or toolboxes) that are not provided in source form. For instance, some embodiments of the toolbox extend fixed-point support to include both the Signal Processing and Communications toolboxes of MATLAB.

Various embodiments will execute the package in different ways, depending on the details of the supported language. One embodiment for MATLAB, for instance, places the functions for the overloaded operators in some number of directories, which are added to the MATLAB search path using either the MATLAB command "pathtool" or the command "addpath".

One embodiment of a fixed-point toolbox of the type described herein may support fixed-point programming by adding two new data types to MATLAB using the class and operator overloading facilities: "fxp" to support real fixed-point objects and "cfxp" to support complex fixed-point objects. These two types of operands have the same basic properties and are similar in functionality. Fxps are cfxps whose imaginary part is known to be zero. While this embodiment could have been implemented with just cfxps (and any skilled practitioner will recognize that such embodiments are covered by the invention), separating real and imaginary fixed-point data types provides several computational efficiencies. The two data types are identical in their properties (other than the fact that fxps have no imaginary component), so the two types may be considered interchangeable in this discussion, although they certainly cannot be considered interchangeable in implementation.

Numerous modifications and adaptations of the embodiments, implementations and examples described herein will be apparent to the skilled artisan in view of the disclosure. For example, although some embodiments are implemented as a toolbox that extend MATLAB version 6, other embodiments may extend other MATLAB versions. Still other embodiments may extend other interpreters, such as GNU Octave which is described at, for example, http://www.octave.org/doc/octave toc.html.

Moreover, depending on the embodiment, a binary point's position in a fixed-point operand can be expressed as follows: (a) number of bits to the left of binary point and number of bits to right of binary point, (b) number of bits to left of binary point and total number of bits, and (c) number of bits to the right of binary point and total number of bits. The specific manner in which the binary point's position is stored in such an object is not a critical aspect of several embodiments of the invention.

In some embodiments, the above-described emulation is performed only on receiving an explicit indication from the user that an operand is to be expressed in a fixed-point representation (e.g. by invocation of a function in case of an interpreter or by declaration of a variable as being of fixed-point type in case of a compiler). Note that in certain embodiments, operands may simply default to a predetermined fixed-point representation (e.g. in case of a language that is known to be a fixed-point language), and hence such embodiments do not require an explicit indication to perform the above-described emulation.

In some embodiments, methods of the type described herein perform the same or similar operations for vector operands as for scalar operands. For example, such methods include receiving a set of instructions executable by a computer that supports floating-point arithmetic; receiving at least one operand (hereinafter "fixed-point vector") that is comprised of a vector, array, or other collection of elements, the first element of which is a fixed-point object, and the collection has at least a second element that is another fixed-point object; expanding said fixed-point vector into a floating-point representation to obtain a floating-point vector equivalent; receiving an instruction comprising an operation to be performed on the fixed-point vector; performing on the floating-point equivalent, at least one floating-point operation that corresponds to the fixed-point operation, yielding at least one floating-point result; and reducing at least one floating-point result generated by the floating-point operation into a corresponding fixed-point result.

In some embodiments, methods of the type described herein that perform operations on fixed-point vector operands have first elements and second elements with identical word length and with binary points at identical positions.

In some embodiments, methods of the type described herein that perform operations on fixed-point vector operands have first and second elements with at least one identical property, and the value of that property is stored in one memory location for the entire fixed-point vector. In some embodiments, that property is precision. In some embodiments, that property is the signedness of the fixed-point operand. In some embodiments, that property is complexness. In some embodiments, that property is scaling.

In some embodiments, methods of the type described herein that perform operations on fixed-point vector operands produce a scalar fixed-point result. In some embodiments, the scalar fixed-point result has at least one property (signedness, complexness, precision, scaling). In some embodiments, the property of the fixed-point result depends on at least one property of the fixed-point vector operand. In some embodiments, the property of the fixed-point result depends on the instruction that was performed on the fixed-point vector operand.

In some embodiments, methods of the type described herein use a representation for the fixed-point vector operand that stores the values of the operand in memory in floating-point format, including such formats as IEEE standard 754 for floating-point representation. In some embodiments, the representation for the fixed-point result stores the values of the result in memory in floating-point format, including such formats as IEEE standard 754 for floating-point representation.

In some embodiments, methods of the type described herein use a representation for the fixed-point vector operand that stores a value in memory to distinguish between signed and unsigned numbers. In some embodiments, methods of the type described herein use a representation for the fixed-point result that stores a value in memory to distinguish between signed and unsigned numbers.

In some embodiments, methods of the type described herein use a representation for the fixed-point vector operand that stores a value in memory to distinguish between real and complex numbers. In some embodiments, methods of the type described herein use a representation for the fixed-point result that stores a value in memory to distinguish between real and complex numbers.

In some embodiments, methods of the type described herein use a representation for the fixed-point vector operand that stores the precision of the vector in memory. In some embodiments, methods of the type described herein use a representation for the fixed-point result that stores the precision of the result in memory.

In some embodiments, methods of the type described herein use a representation for the fixed-point vector operand that stores a scaling factor in memory. In some embodiments, methods of the type described herein use a representation for the fixed-point result that stores a scaling factor in memory.

In some embodiments, methods of the type described herein store the position of the binary point of the fixed-point vector operand, prior to performing floating-point arithmetic operations, and use that stored position during conversion of the floating-point result into the corresponding fixed-point result.

In some embodiments, methods of the type described herein use a predetermined storage element to identify a mode of rounding to be used when reducing a floating-point result to a corresponding fixed-point result, where the mode of rounding is one of: round (round-to-nearest), fix (round towards zero), ceil (round towards positive infinity), and floor (round towards negative infinity).

In some embodiments, methods of the type described herein use a predetermined storage element to identify a kind of arithmetic to be performed on the floating-point operand, wherein the kind of arithmetic is one of: saturation and modulo.

In some embodiments, methods of the type described herein use a predetermined storage element to identify a kind of arithmetic to be applied during conversion of a floating-point result into a corresponding fixed-point result, wherein the kind of arithmetic is one of: saturation and modulo.

In some embodiments, methods of the type described herein detect during conversion of the floating-point result into the corresponding fixed-point result whether any values exceed the range of values accepted by the corresponding fixed-point result, and issue a warning message controlled by a predetermined storage element.

In some embodiments, methods of the type described herein express the corresponding fixed-point result with properties that are different from the fixed-point vector operand, and use a predetermined storage element to identify a property of the fixed-point result. Said property may be precision, signedness, or complexness.

In some embodiments, methods of the type described herein use a predetermined storage element to identify a mode of rounding to be performed when reducing a floating-point result into the corresponding fixed-point result, wherein the mode of rounding is one of: round (round-to-nearest), fix (round towards zero), ceil (round towards positive infinity), and floor (round towards negative infinity).

In some embodiments, methods of the type described herein perform the same or similar operations for vector operands as for scalar operands, producing vector results. For example, such methods include receiving a set of instructions executable by a computer that supports floating-point arithmetic; receiving at least one operand (hereinafter "fixed-point vector") that is comprised of a vector, array, or other collection of elements, the first element of which is a fixed-point object, and the collection has at least a second element that is another fixed-point object; expanding said fixed-point vector into a floating-point representation to obtain a floating-point vector equivalent; receiving an instruction comprising an operation to be performed on the fixed-point vector; performing on the floating-point equivalent, at least one floating-point operation that corresponds to the fixed-point operation, yielding at least one floating-point vector result (where a "vector result" is a vector, array, or other collection of elements); and reducing at least one floating-point vector result generated by the floating-point operation into a corresponding fixed-point vector result, where "fixed-point vector result" is a vector, array, or collection of elements wherein the first element is a fixed-point object, and at least a second element of the collection is another fixed-point object. Furthermore, in some embodiments the methods described herein may have said first element and said second element of the fixed-point vector result having at least one identical property, and the value of that propery is stored in one memory location for the entire collection. Said propery may be precision, signedness, complexness, or scaling. In some embodiments, the methods described herein have a vector fixed-point result that has at least one property. In some embodiments, said property depends on said at least one property of the fixed-point vector operand. In some embodiments, said property depends on the instruction that was performed on the fixed-point operand. In some embodiments, the computer stores the value of the vector fixed-point result in floating-point format, including the IEEE 754 standard for floating-point numbers. In some embodiments, the computer stores a value in memory to determine the signedness of the vector fixed-point result. In some embodiments, the computer stores a value in memory to determine the complexness of the vector fixed-point result. In some embodiments, the computer stores the precision of the vector fixed-point result in memory. In some embodiments, the computer stores the scaling factor of the vector fixed-point result in memory.

In some embodiments, the methods described herein store the position of a binary point of the vector fixed-point operand prior to performing the floating-point arithmetic operation, and use the stored position of the binary point of the vector fixed-point operand when reducing the floating-point result into the corresponding vector fixed-point result. In some embodiments, the methods described herein use a predetermined storage element to identify a mode of rounding to be performed when reducing a vector floating-point result into a vector fixed-point result, wherein the mode of rounding is one of: round (round-to-nearest), fix (round towards zero), ceil (round towards positive infinity), and floor (round towards negative infinity). In some embodiments, the methods described herein use a predetermined storage element to identify a kind of arithmetic to be performed during performance of the floating-point arithmetic operation on the vector floating-point equivalent, wherein the kind of arithmetic is one of: saturation and modulo. In some embodiments, the methods described herein use a predetermined storage element to identify a kind of arithmetic to be performed during conversion of the vector floating-point result into the vector fixed-point result, wherein the kind of arithmetic is one of: saturation and modulo.

In some embodiments, methods of the type described herein detect during the conversion of the vector floating-point result into the corresponding vector fixed-point result whether any values of the result exceeds the range of values accepted by the corresponding fixed-point result and issuing a warning message controlled by a predetermined storage element.

Exceptions that may occur during floating-point execution include Not a Number (NAN): this can only occur when dividing by 0 in the fixed-point input. Some embodiments trap this error before performing a floating point operation by checking if the divisor is zero. In some embodiments that support complex and real fixed point numbers, no other fixed point operations lead to a floating point operation that can generate a NaN. In embodiments that support only real fixed point numbers, exceptions that can generate complex results are trapped and reported as errors.

Fixed-point exceptions that can occur are overflow (which is trapped to implement saturation/modulo arithmetic), divide-by-zero (which is trapped as noted above), and overflow due to exceeding the number of digits in the emulation (which is trapped explicitly e.g. by the 53rd bit in IEEE 754).

Numerous such modifications and adaptations are encompassed by the attached claims.

Certain embodiments of the invention are described below in APPENDIX A, while one particular implementation is described below in APPENDIX B. APPENDICES A and B are both incorporated by reference herein in their entirety and form integral portions of this disclosure.

APPENDIX A

Embodiments may or may not require an initialization function. One specific embodiment uses a function "fxp_init" for initialization. Fxp_init allows the user to set the way in which arithmetic operations are performed. If the user does not explicitly initialize the fixed-point toolbox by calling fxp_init, the toolbox assumes a set of defaults.

In that particular embodiment, fxp_init can take up to 6 parameters:

1. saturate: whether to use saturation arithmetic or modulo arithmetic. In saturation arithmetic, positive overflows saturate at the largest positive value and negative overflows saturate at the smallest negative value. In 2-bit signed saturated arithmetic, adding 1 and 1 is 1; adding −1 to −2 results in −2. Modulo arithmetic ignores the most significant bits of an overflow result, wrapping the result in a ring. Most integer arithmetic units use modulo arithmetic based on 2s-complement number representations. Adding 1 to 1 in 2-bit signed modulo arithmetic results in −2; adding −1 to −2 results in 0. If 's' or 1 is passed as the first parameter to fxp_init, saturation arithmetic is used. If 'm' or 0 is passed, modulo arithmetic is used. Arithmetic defaults to saturation if fxp_init is not called.

2. rounding: what form of rounding to use when an input value specifies more precision than allowed in the fixed-point object. For instance, consider converting the value 1.25 (binary 1.01) into a 2 bit unsigned fixed-point object with 1 bit to the right of the decimal. Since the input value has 2 bits of precision to the right of the decimal but the result fixed-point object allows only 1 bit, the input value needs to be rounded. The fixed-point toolbox supports four rounding modes: 'r' or normal rounding (a 1 in the next significant bit rounds up; a 0 truncates); 'c' or ceil (always round toward positive infinity); 'f' or floor (always round toward negative infinity); and 'm' or modulo (always round toward 0). Under mode 'r' and 'c', 1.25 (1.01) becomes 1.50 (1.1); under mode 'm' and 'f', 1.25 becomes 1.0. Note that rounding does not occur on default arithmetic operations in the fixed-point toolbox because the library specifies enough precision to hold the results. Rounding occurs only when converting a fixed-point object or a double to a lower level of precision. The default setting for the rounding parameter is 'r'.

3. warn_on_size: the fixed-point toolbox supports any size fixed-point operands from 1 to 53 bits. However, arithmetic units are usually primed for operands that are one of 8, 16, 32, or 64 bits in size. Operands of other sizes are much less efficient. The parameter warn_on_size gives a user a chance to catch odd-sized operands accidentally introduced into a program. If warn_on_size is set to anything other than 0, the package will issue a warning whenever it creates an operand of a size other than 8, 16, or 32 bits. Setting warn_on_size to 0 suppresses these warnings, allowing operands of any size to be silently accepted. The default value is 1, causing warnings to be issued. Any skilled artisan will easily recognize that various standard programming mechanisms can be used to change acceptable sizes, such as using a function call (e.g. "fxp_size") that records in a table or other standard data structure representations of acceptable and unacceptable sizes.

4. warn_on_overflow: If warn_on_overflow is non-zero (the default is 1), the fixed-point toolbox issues a warning whenever an operation causes a real or complex fixed-point object to overflow. If warn_on_overflow is 0, overflows are silently executed according to the setting of the arithmetic mode (saturation or modulo). The MATLAB "warning" function is used to issue the warnings, allowing the user to catch the overflows in the MATLAB debugger using the command "warning debug". Note that "an operation" includes entire vector or matrix operations, so the user will receive only one warning if all the elements of a length 128 vector overflow.

5. warn_on_negative_unsigned: If warn_on_negative_unsigned is non-zero (the default is 1), the fixed-point toolbox issues a warning whenever an operation causes a negative number to be converted into an unsigned. If it is zero, negative numbers are silently converted into unsigneds. Again, only one warning is issued per vector or matrix operation.

6. warn_on_scaling: If the user wishes he can cause a fixed-point object to carry along an implicit scaling factor. This embodiment correctly combines scaling factors whenever an arithmetic operation is performed on two fixed-point objects that are carrying scaling factors: multiplication will cause the factors to be added; division subtracts the factors; and so on. If warn_on_scaling is set to be non-zero, arithmetic operations that attempt to invalidly combine differently-scaled fixed-point objects will issue a warning. For instance, if the user attempts to add a real fixed-point object that is scaled by 2^8 to a real fixed-point object that is scaled by 2^−8, the library will issue a warning that the user is attempting an operation on invalidly-scaled operands. The scaling for the result will be undefined. If warn_on_scaling is set to zero, invalidly-scaled operations are silently executed. The default value for this parameter if not explicitly set is 0—warnings not issued.

While initialization functions such as fxp_init are useful for setting initial options, other functions can be used to change options such as rounding or arithmetic mode during execution.

In this embodiment, once the fixed-point package has been initialized using fxp_init, real fixed-point objects and complex fixed-point objects can be created using the constructors fxp and cfxp, respectively. These constructors return as their result a real fixed-point object or a complex fixed-point object, respectively, and take up to six parameters:

1 value: the value to be converted to a fixed-point object (real or complex). This value can be a double, array of doubles, a fixed-point number (for changing sizes), or an array of fixed-point numbers. These functions can also be used to convert a real fixed object into a complex fixed-point object and vice versa.

2 left: the number of bits to the left of the binary point in the resulting fixed-point object. This number must include room for the sign bit, if the number is signed. For complex fixed-point objects, this size limits both the real and the imaginary parts of the number; that is, setting left equal to 4 will mean that the real part of a complex fixed-point object will have 4 bits to the left of the decimal point and the imaginary part will also have 4 bits to the left of the decimal point. When an array is passed as value, the left setting is applied to all elements of the array.

3 right: the number of bits to the right of the decimal in the resulting fixed-point object. All comments made regarding left (other than those involving the sign bit) apply to right as well.

4 signed: whether the resulting fixed-point object is to be stored as signed or unsigned. A value of 1 or 's' means that the number is to be stored as signed (so one of the left bits is used as a signed bit). A value of 0 or 'u' means that the number is to be stored as unsigned. Signed numbers are the default if no parameter is specified.

5 rounding: if the input value has more precision than the resulting output, what form of rounding should be used to reduce the precision. As with fxp_init, the value 'r' means use round to nearest; the value 'f' means use floor; the value 'c' means use ceil; and the value 'm' ('t' is also accepted) means modulo. This parameter is provided as a convenience for overriding the default rounding mode in rare cases that require special rounding. If this parameter is not specified or if an empty value ("[ ]") is passed, the default rounding mode will be used. The default rounding mode is initially set with fxp_init, but may be changed with fxp_round.

6 scaling: the fixed-point numbers used in signal processing are often scaled from the real data. To ease this scaling process, fixed-point objects can carry optional implicit scaling factors. The presence of the scaling factor means that the true number that the user is interested in is the value contained in the fixed-point object multiplied by 2 raised to the scaling factor—in other words, the bits in the fixed-point object are arithmetically shifted to the left or the right by the value of the scaling. Scaling factors are not required and do not enter explicitly into computations. However, if they are provided, they are maintained through arithmetic, and if the warn_on_scaling option is set, warning messages will be issued when an operation is attempted on invalidly scaled operands.

To illustrate this embodiment concretely, consider the earlier example to convert the double value 1.25 into an unsigned 2 bit real fixed-point object. All that is necessary is to make the following call:

```
a = fxp(1.25, 1, 1, 'u');
```

This call uses whatever default rounding is in effect. Assuming 'r' rounding, the entering the command to display "a" at the MATLAB prompt yields:

```
>> a
a    =
     1.5
>>
``` as with any other MATLAB variable. Similarly, assuming saturation arithmetic is in effect, one can type expressions using a

```
>> a + a
ans    =
       1.5
>> a − 1.0
ans    =
       0.5
>>
``` and so on. The first example shows saturation at the maximum value for a 2 bit number; the second example shows that doubles and fixed-point objects can be mixed in expressions.

Whole vectors or arrays can be converted to fixed-point representation:

```
>> a = [ 1 2 3; 4 5 6; 7 8 9]
a =
     1     2     3
     4     5     6
     7     8     9
>> a = fxp(a, 4, 0)
a =
     1     2     3
     4     5     6
     7     8     9
>>
```

Note that only 3 parameters are passed to the fxp call. The fourth parameter (the signed value) defaults to 's' when not specified, which is why the last 2 values become "7"—"7" is the largest value that can be represented with 3 value bits and 1 sign bit.

A complex fixed point number follows the same conventions:

```
>> a = cfxp(1.25 – 1.25i, 2, 1,'s')
a =
     1.5 – 1.5i
>>
```

The above example illustrates displaying a value of a variable.

The constructor functions fxp and cfxp will convert values other than just doubles to fixed-point representation. Real and complex fixed-point objects can also be passed as the first parameter to the constructors, allowing changes in size or representation. In this embodiment, the constructors also accept hexadecimal notation:

```
>> a = fxp('0x1.1', 1, 1, 'u')
a =
     1.5
>>
```

The following example illustrates the use of scaling factors:

```
>> a = fxp(0.5, 1, 7, 's', [ ], 8)
a =
     0.5
>>
```

This example creates an unsigned real fixed-point object whose value is 0.5 using the default rounding mode. While the value of the fixed-point object proper is 0.5, the value of the real number corresponding to the fixed-point object is actually $0.5*2^8$, or 128. Similarly, a real fixed-point object created by

```
>> b = fxp(0.5, 1, 7, 's', [ ], –8)
b =
     0.5
>>
``` would also have the value 0.5, but the real number would be $0.5*2^{-8}$, or 0.001953125. Scaling factors are carried along by the fixed-point toolbox, so that if the computation

```
>> c = a * b
c =
     0.25
>>
``` the fixed-point toolbox knows that the scaling on c is 0 (8-8), so that the true result is $0.25*2^0=0.25$. Scalings are typically invisible to the user unless debug options are turned on inside the toolbox.

In this embodiment, scalings are the most useful to a programmer when the option warn_on_scaling is enabled. With that option, an attempt to combine two invalidly scaled numbers results in a warning message.

Continuing the sequence above with scaling warnings enabled:

```
>> a – c
```

Warning: Subtraction of two differently scaled numbers.

```
ans =
     0.25
>>
```

The above example illustrates displaying a value of a result of evaluation of an operation (subtraction) and a warning.

Since a is scaled by $2^8$ and c is scaled by $2^0$, subtracting them is an invalid operation. The correct result is obtained and printed for the fixed-point objects (0.25=0.5–0.25), but that result is not correct for the real numbers represented by the scaling ($0.5*2^8$–0.25). Several embodiments of the fixed-point toolbox always compute correct results for numbers ignoring the scaling factors, using the scaling only to issue warnings. Note that no warning would be issued for the product a*b despite their different scaling, since the true result can be computed for products of differently scaled numbers.

While the "fxp" and "cfxp" constructor functions are the primary ways of creating fixed-point objects, there are alternative versions that take other number formats for users that desire that.

Certain embodiments of the fixed-point toolbox simplify as much as possible the conversion of working double precision programs into fixed-point operation. Ignoring precision issues, the only thing required to convert most double precision programs into fixed-point representation is insertion of constructors at the beginning of the computation; the package takes care of everything else. For example, consider the following simple program obtaining the DCT (Discrete Cosine Transform) of a sequence of numbers (assuming that the Signal Processing Toolbox is installed as part of MATLAB):

```
>> a =   [3.14   1.59 2.65 3.58];
>> dct(a)
ans =
     5.4800     –0.5743     1.2400     0.5734
```

Converting this program to fixed point requires only the following change:

```
>> a =[3.14  1.59 2.65 3.58];
>> a = fxp(a, 8, 8, 's');
>>   dct(a)
ans =
       5.4785        −0.5723        1.2402        0.57235
```

The answers come out slightly different because the arithmetic was performed in fixed point rather than double precision.

Fixed-point arithmetic can be performed in a number of different ways, as is obvious in the parameters to fxp_init. While most applications generally want to use the same options throughout the entire computation, there are other times when a rounding mode or saturation option needs to be changed for just one operation or a small number of operations. This embodiment contains a number of functions that make that easy to accomplish. The following functions may be called any time after fxp_init to set or uncover current arithmetic options:

1. fxp_round (mode): set the current rounding mode. Mode may be one of 'r' for round (round to nearest), 'f' for floor (round toward negative infinity), 'c' for ceil (round toward positive infinity), or 't' (or 'm') for truncate (round to zero).
2. fxp_rounding: returns one of 'r', 'f', 'c', or 'm' to indicate the rounding mode currently in effect.
3. fxp_saturate: sets the current arithmetic overflow mode to be saturation.
4. fxp_modulo: sets the current arithmetic overflow mode to be modulo.
5. fxp_arithmetic: returns the current arithmetic overflow mode as either 's' for saturation or 'm' for modulo.

This embodiment provides a number of warnings to help in program development and debugging, including detections of things such as overflowing a fixed-point number, converting a negative number into an unsigned, or using a fixed-point number which is an unusual size and may not allow for reasonable code generation. By default, fxp_init starts the fixed-point package with all warnings enabled, but users may turn them on and off at will using the function fxp_warn. In this embodiment, fxp_warn takes a variable number of arguments, which may be taken from the following list:

'all': enable all warnings.
'off': disable all warnings.
'overflow': enable warnings when an overflow occurs
'no_overflow ': disable warnings on overflow.
'unsigned': enable warnings when a negative number is converted to unsigned.
'no_unsigned': disable warnings on negatives becoming unsigned.
'size': enable a warning when a fixed-point number takes a size other than 8, 16, 32 bits.
'no_size': disable warnings on size.
'scaling': enable warnings for invalid combinations of scaled numbers.
'no_scaling': disable warnings for invalid combinations of scaled numbers.

Arguments may be abbreviated to the shortest unambiguous string. The skilled practitioner will easily recognize that there are many standard methods for resolving conflicting values passed as arguments; this embodiment resolves such conflicts in favor of the argument that appears rightmost in the list.

The embodiment may also contain display options that help in debugging fixed-point programs. While it is useful to have printing routines such as MATLAB's "display" routine for real and complex fixed-point objects use a format string that is identical to MATLAB's display format, it is also useful to have the fixed-point object display routine support an extended format that gives more information specific to fixed-point objects, such as signedness, number of bits, and scaling. In this embodiment, this extended format is enabled and disabled by the routine fxp_debug. The call fxp_debug('on') enables the extended information; the call fxp_debug('off') returns to normal MATLAB display mode. This routine affects only the display of fixed-point numbers. Following is a sample of the information provided:

```
>> fxp_debug('on');
>> a = [3.14  1.59 2.65 3.58];
>> a = fxp(a, 8, 8, 's')
a =       <signed fxp, 8.8> (scaled by 2^0).
       3.1406        1.5898        2.6484        3.5781
```

The above example illustrates displaying a scaling factor and a property, of a result of evaluation of an operation.

The toolbox also contains a function fxp_view that permits viewing of fixed-point objects in various formats, including hexadecimal. Fxp_view takes up to 3 parameters: a) the value or vector to be displayed; b) the format for displaying the data, which can be 'f' for double precision, 'x' for hexadecimal, or 'b' for binary; and c) an optional scaling factor by which the value is multiplied before display.

Arithmetic operators in this fixed-point toolbox behave much the same way that they do in basic MATLAB. As a result, a fixed-point program looks identical to a double precision computation, other than the initial fxp and cfxp constructors. All operators follow the same rules as MATLAB with respect to operations on scalars, vectors, and arrays. So, for instance, it is legal to add a scalar fixed-point object to a vector fixed-point object.

Additions in the fixed-point toolbox not present in basic MATLAB include the notion of signed and unsigned, and the explicit separation of real fixed-point objects from complex fixed-point objects. The package does support mixed operations among these various types. The rules governing such conversions are fairly simple. When an operation is specified between an unsigned operand and a signed operand, the package will first convert the signed operand to unsigned; the result is also unsigned following the rules of C. When an operation is specified between a real and a complex fixed-point object, the real object is promoted to a complex object and the result is a complex fixed-point object. When an operation is specified between a fixed-point object and a double ("double" here means MATLAB "double", which can be either double precision or complex), the double is converted to the same type as the fixed point object before the operation is performed.

When a non-multiplicative operation is specified between a fixed-point object and a logical, the logical is converted to the same type as the fixed-point operand before the operation is performed. For multiplicative operations, the fixed-point operand is converted to double precision before performing the arithmetic, and the result is converted back to the fixed-point type. The reason for this is that multiplicative logical operations are often used to select elements of another matrix. This definition allows that selection to occur without changing the types of the result elements. No other implicit conversions are performed. The toolbox flags such conversions as errors.

Certain embodiments of the fixed-point toolbox do not support operations between fixed-point objects that have different right or left properties. However, other embodiments of the fixed-point toolbox do not impose such a restriction.

The following table (Table B) lists all operators supported by certain embodiments of the fixed-point toolbox, the behavior and size of the result, and any special notes. The notation "fxp(a,b)+fxp(a,b)–>fxp(c,d)" means that the addition of two real fixed-point objects both having values of "a" for the number of bits to the left of the decimal and "b" for the number of bits to the right of the decimal results in a real fixed-point object with "c" bits to the left of the decimal and "d" bits to right. The behavior of signed and unsigned operands is described by the rule above. This table also comprises part of a result characteristic function, providing in this embodiment the details of how the precision of the result is determined from the precision of the operands.

tends to be more useful when the extra bits of precision are not necessary for multiplies and divides, as it automatically inserts the conversions that a programmer would have to insert by hand. This mode is enabled by use of the fxp_short routine. Fxp_short takes one parameter. If that parameter is 'on', the short multiply mode is enabled; if that parameter is anything else, the short multiply mode is disabled.

In addition to the basic arithmetic operators, the fixed-point toolbox also supports many of the primitive functions used by MATLAB. The complete list of supported functions in one embodiment of the fixed-point toolbox is as follows:

1. abs—take the absolute value of a real or complex fixed-point object, or vector of either. Abs(fxp(a,b)) yields a fxp(a,b) with overflow set by fxp_saturate/modulo. Abs (cfxp(a,b)) yields a fxp(2*a, 2*b) for unsigned, fxp(2*a−1, 2*b+1) for signed with overflow set by fxp_saturate/modulo.
2. all—returns true if all elements of a fixed-point vector are not equal to zero.

TABLE B

| Op | Function | Behavior | Notes |
|---|---|---|---|
| + | plus | fxp(a, b) + fxp(a, b) –> fxp(a, b) | Saturation/modulo by mode. |
| + | uplus | +fxp(a, b)–>fxp(a, b) | Unary plus. |
| − | minus | fxp(a, b) − fxp(a, b) –> fxp(a, b) | Saturation/modulo by mode. |
| − | uminus | −fxp(a, b)–>fxp(a, b) | Saturation/modulo by mode. |
| * | mtimes | fxp(a, b) * fxp(a, b)–> fxp(2*a, 2*b) | Matrix multiplication - for unsigneds |
|   |        | fxp(a, b)* fxp(a, b)–>fxp(2*a − 1, 2*b + 1) | Matrix multiplication - For signed variables. Saturation/modulo by mode. |
| .* | times | Same as mtimes. | Element-wise multiplication. No overflow. |
| ' | ctranspose | fxp(a, b)'–>fxp(a, b) | Saturation/modulo by mode. |
| .' | transpose | fxp(a, b).'–>fxp(a, b) | No overflow. Matrix transpose. |
| < | lt | fxp(a, b) < fxp(a, b) –> logical |   |
| > | gt | fxp(a, b) > fxp(a, b)–>logical |   |
| >= | ge | fxp(a, b) >= fxp(a, b)–>logical |   |
| <= | le | fxp(a, b) <= fxp(a, b)–>logical |   |
| ~= | ne | fxp(a, b) ~= fxp(a, b)–>logical |   |
| == | eq | fxp(a, b) == fxp(a, b)–>logical |   |
| & | and | fxp(a, b) & fxp(a, b)–>logical | Logical and, not bitwise. |
| \| | or | fxp(a, b) \| fxp(a, b)–>logical | Logical or, not bitwise. |
| ~ | not | ~fxp(a, b)–>logical | Logical not, not bitwise. |
| a:b | colon | fxp(a, b):fxp(a, b)–>vector of fxp(a, b) | Supported for completeness. |
|   | display |   | Displays value of a fxp/cfxp |
| [a;b] | vertcat | [fxp(a, b); fxp(a, b)] –> column vector | Vertical concatenation. |
| [a, b] | horzcat | [fxp(a, b) fxp(a, b)]–>row vector | Horizontal concatenation |
| a./b | rdivide | fxp(a, b)/fxp(a, b)–>fxp(a + b, a + b) if unsigned fxp(a, b)/fxp(a, b)–>fxp(a + b − 1, a + b + 1) if signed. | Division - element wise |
| a/b | mrdivide | fxp(a, b)/fxp(a, b)–>fxp(a, b) | Matrix division. |
| a.^b | power | fxp(a, b).^fxp(a, b)–>fxp(a, b) | Power function--element |
| a.\b | ldivide | fxp(a, b)\fxp(a, b)–>fxp(a, b) | Left division - element wise |
| a\b | mldivide | fxp(a, b)\fxp(a, b)–>fxp(a, b) | Left matrix division. |
| a^b | mpower | fxp(a, b)^fxp(a, b)–>fxp(a, b) | Power function |

In default mode, the toolbox computes products and quotients exactly (with the exception of the most negative case of signed multiplies and quotients) by doubling the number of bits of output. This level of precision is necessary for many signal processing applications, but it does cause the precision of results to continually increase, leading eventually to an overflow of the fixed-point space if many multiplications are performed and the results not trimmed on the right. The toolbox also supports an alternative mode where the results of multiplications and divisions are the same size as the input operands (that is, fxp(a,b)*fxp(a,b)–>fxp(a,b)). This mode 3. any—returns true if any element of a fixed-point vector is not equal to zero.
4. mean—returns the mean of a vector of fixed-point. Mean (fxp(a,b)) yields a fxp(a,b). Likewise for cfxp.
5. bitand—bitwise and'ing of two fixed-point objects. This and all other bitwise MATLAB functions will operate differently than the standard routine on doubles. "Double" routines normally convert the operands to integer, then perform the logical operation. It seems more reasonable for these to do the logical operation bitwise on the existing bits (no conversion to integer), since the location of the decimal point in fixed-point is somewhat arbitrary. Bitand(fxp(a,b), fxp(a,b)) yields a fxp(a,b); cfxp->cfxp.
6. bitcmp—complements a fixed point object. Result is same type as input (fxp(a,b) or cfxp(a,b)).
7. bitget—gets the bits indicated from a fixed-point number. 1 is at the right of the number, and the result is a vector of 0/1 (not fixed-point) of the appropriate bits. Bitget for complex numbers is undefined for MATLAB (it is only defined for integers), so we can arbitrarily define complex with the imaginary part on the left side. Result is a integer in MATLAB double format.
8. bitmax—returns the maximum value for a given real fixed-point object. That is, bitmax(fxp(a,b)) returns the maximum value that fxp(a,b) can take on. Bitmax(fxp(a,b)) yields a fxp(a,b); bitmax of complex fixed-point objects is undefined. This is slightly different behavior than base MATLAB.
9. bitor—bitwise or'ing of two fixed-point objects, following the pattern of bitand.
10. bitset—the inverse of bitget.
11. bitshift—shifts bits for fxp(a,b) returning fxp(a,b). Undefined for complex fixed-point objects. The behavior is the same as MATLAB's, and throws away bits shifted off the end.
12. bitshifta—same as bitshift, but does an arithmetic shift for right shifts rather than a logical shift, meaning that the sign bit is shifted in as filler rather than zeros.
13. bitxor—bitwise xor'ing of two fixed-point numbers, following pattern of bitand.
14. ceil—next larger integer. Returns fxp(a,b) for fxp(a,b); cfxp(a,b) for cfxp(a,b). Overflow controlled by saturate/module mode.
15. complex—creates a complex from one or two fixed-point inputs. Complex(fxp(a,b)) yields cfxp(a,b).
16. conj—returns the conjugate of a fixed-point object. Result has same size as input. Overflow controlled by saturate/modulo.
17. cumprod—returns a vector where each element is the cumulative product of previous results.
18. cumsum—returns a vector where each element is the cumulative sum. Resulting vector has same size characteristics of input (fxp(a,b)->fxp(a,b)) governed by saturate/modulo on overflow.
19. diag—creates diagonal matrices and returns the diagonals of matrices. Resulting vector has the same size and signed properties as the input.
20. diff—take the difference of elements of a vector as an approximation to a derivative.
21. disp—simpler form of display.
22. double—converts a fixed-point object into a double. Note that "double" in MATLAB means complex, so double (cfxp) does the right thing.
23. find—find the indices of non-zero elements in a fixed-point vector. The result is a vector of doubles (rather than fixed-point objects) assuming that it will be used as subscripts.
24. fix—rounds the elements of a fixed-point object towards 0. Result of fxp(a,b) is fxp(a,b); likewise for cfxp.
25. floor—rounds towards minus infinity. Same result types as fix.
26. full—convert an fixed-point sparse matrix into a fixed-point full matrix.
27. imag—return the imaginary component of a fixed-point object. For real fixed-point objects, the result is a vector of 0's sized identically to the input. In both cases, the characteristics of the output are the same as the input.
28. isempty—returns a double 1 if the input fixed-point object is empty; 0 if not.
29. isfinite—always returns a double 1 for fixed-point objects.
30. isnan—always returns a double 0 for fixed-point objects.
31. isnumeric—always returns a double 1 for fixed-point objects.
32. isreal—always returns a double 1 for real fixed-point objects and a double 0 for complex fixed-point objects.
33. issparse—returns a double 1 if the input fixed-point object is a sparse matrix; 0 if not.
34. is_signed—returns 1 if fixed-point object is signed; 0 if not.
35. left_of_decimal—return the number of bits to the left of the decimal (left in constructor) for a fixed-point object.
36. length—indicates the length of fixed-point arrays, just as with double arrays.
37. line—adds the line for the input fixed-point objects to the current graph.
38. loglog—plot fixed-point objects on a log-log scale.
39. max—returns the max value of, and optionally its index in a fixed-point array.
40. min—returns the minimum value of, and optionally its index in, a fixed-point array.
41. mod—signed remainder after division; mod(fxp(a,b), fxp (a,b)) yields fxp(a,b).
42. ndims—number of dimensions in a fixed-point array.
43. nnz—return the number of nonzeros.
44. nonzeros—vector indicating nonzero elements in fixed-point array. Result is same type as input.
45. norm—norm of a fixed-point array. Various norms are possible according to second parameter.
46. plot—graphically plot a fixed-point array.
47. prod—compute the product of a fixed-point vector. The prod function follows the rules of multiplication for the size of result (that is, one multiplication, not the number involved in the reduction. Thus, the result of a prod(fxp(a, b)) unsigned for any length vector is a fxp(2*a, 2*b)).
48. real—return the real part of a fixed-point object. Real(fxp (a,b)) yields a fxp(a,b); real(cfxp(a,b)) yields fxp(a,b).
49. rem—remainder after division, similar to mod.
50. reshape—reshape a fixed point or complex fixed point array to new dimensions.
51. right_of_decimal—return the number of bits to the right of the decimal (right in constructor) for a fixed-point object.
52. round—round to nearest; returns same type of argument as it receives.
53. semilogx—plot fixed-point objects with an x axis that is logarithmic.
54. semilogy—plot fixed-point objects with a y axis that is logarithmic
55. set—set properties using values that are fixed-point.
56. sign—returns 1 if argument>0, 0 if equal 0, −1 if less than 0. Result on complex fixed-point objects is a/abs(a). sign (fxp(a,b))->double; sign(cfxp(a,b))->cfxp(a,b).
57. single—converts a fixed-point object to single precision.
58. size—returns the size of a fixed-point array.
59. sort—sort the elements of a fixed-point array.
60. sparse—convert a full fixed-point matrix into a sparse one.
61. sprintf—create formatted output for fixed-point objects.
62. strncmpi—perform a string compare; arguments can be strings or fixed-point objects.
63. sum—return the sum of a fixed-point vector. Sum(fxp(a, b)) yields fxp(a,b).
64. whos—indicate the type of the variable. The "whos" function for fixed-point objects provides information such as signed/unsigned, bits to the left of decimal, and such. This function is invoked by passing the variable name in directly and not in string representation, unlike the base MATLAB function. If a is a fixed-point object, then "whos (a)" invokes the fixed-point-specific "whos" function, while "whos('a')" invokes the generic MATLAB function.

The transcendental functions sin, cos, and exp are used in several algorithms in DSP processing. Creating general fixed-point implementations of these functions, however, is a challenging task. Obtaining accurate answers over the entire range of possible inputs requires argument reduction and fairly long series computations. More often than not, particular DSP implementations only need reasonably accurate results over a restricted range of inputs. As a result, a restricted implementation of the transcendentals over expected inputs is usually much faster and better tailored to the particular DSP problem than a general implementation.

This creates a two-stage requirement for transcendental implementation in a fixed-point toolbox of the type described herein. Early prototyping stage requires existing general implementations of transcendentals so that users can evaluate algorithms without having to worry about implementing transcendentals. However, at the later stages of implementation, users will want to evaluate their computations using the same hand-tailored function implementations that will be used in the final implementation on the processor, so that they get bit-accurate simulation results identical to the results produced on the processor.

This embodiment provides support for both stages of implementation, allowing users to easily plug in their own implementations of sin, cos, and exp. By default, a call to a transcendental on a fixed-point object (real or complex) will result in a call to the appropriate MATLAB double precision routine to obtain a full precision result, followed by a conversion back to a fixed-point number with the same properties as the argument. Thus, by doing nothing a user will obtain highly accurate results for the transcendental functions over all argument ranges. However, if a user provides a version of a transcendental function written in C, the fixed-point package will automatically incorporate it and call it to evaluate transcendentals. This allows users to easily evaluate their own transcendental implementations as well as get totally accurate results from their MATLAB simulations.

All the complex fixed-point transcendental functions call various combinations of real fixed-point functions to obtain their results, so there should be no need to replace the complex fixed-point functions with the user's C versions.

The fixed-point toolbox currently supports the following mathematical/transcendental functions:

acos—arc cosine.
acosh—arc hyper cosine.
asin—arc sine.
asinh—arc huper sine.
atan—arc tangent.
atan2—arc tangent (y/x).
atanh—arc hyper tangent.
exp—exponential.
log—natural logarithm;.
cos —cosine.
cosh—hyper cosine.
sin—sine.
sinh—hyper sine.
sqrt—square root.
tan—tangent.
tanh—hyper tangent.

All functions return arguments that are identical in size, bits to the left and right of decimal, and signedness to their inputs, although the skilled practioner will easily recognize that this is not a requirement, and that other embodiments can easily support alternative implementations.

This embodiment provides a number of functions solely for the support of fixed-point objects. These include:

1. left_of_decimal(fixed-point object): returns the number of bits to the left of the decimal point in the passed in fixed-point object. Useful when creating a new fixed-point object that is desired to be the same size as another.

2. right_of_decimal(fixed-point object): returns the number of bits to the right of the decimal point.

3. is_signed(fixed-point object): returns 1 if the fixed-point number is in signed representation; 0 if unsigned.

4. fxp_view(fixed-point object, format, scale)—often fixed-point objects are scaled by the programmers, so that the value represented in a computation is actually a multiple of a power of 2 of the real value. The function fxp_view takes up to three parameters: 1) the fixed-point object to be viewed, 2) the format to be used to view the number, and 3) a scaling factor to be applied before viewing the number. The second parameter can be one of 'f' for floating point, 'x' for hexadecimal, or 'b' for binary. The default value if this argument is not specified is 'f'. The third parameter can be a positive or negative integer; if present, the value passed in will be multiplied by 2 raised to the third parameter before viewing. In other words, the bits in the value will be shifted left by the third parameter.

To illustrate the simplicity of converting a working double precision MATLAB program into fixed-point in this embodiment, consider the following general FIR filter:

function $y=fir(c,x)$ $y=dot(c,x)/\text{length}(x);$

This generic form of the filter accepts both coefficients and data, and returns the filtered result. For instance, a typical call might be:

```
>> coeffs = [ 0.5 0.25 0.125 0.0625];
>> x = [ 0.1 0.1 0.1 0.1];   % Simple set of sample
input data.
>> fir(coeffs, x)
```

Because the function "fir" is written using generic MATLAB operands, it can be invoked directly without change on fixed-point operands. For instance, inserting the conversion:

```
>> coeffs = [ 0.5 0.25 0.125 0.0625];
>> coeffs = fxp(coeffs, 1, 7, 's');
>> x = [ 0.1 0.1 0.1 0.1];   % Simple set of sample
input data.
>> fir(coeffs, x)
``` performs the filter as a fixed point operation, rather than as double precision. Given the choice of input data and coefficients, it's easy to see that the output will be the same, but it's also easily verified as well:

```
>> coeffs = [ 0.5 0.25 0.125 0.0625];
>> x = [ 0.1 0.1 0.1 0.1];   % Simple set of sample
input data.
>> fir(coeffs, x)
ans =
    0.0234
>> coeffs_fp = fxp(coeffs, 1, 7, 's');
>> fir(coeffs_fp, x)
ans =
    0.1016
```

As you can see, the conversion was easy, but the answer in the fixed-point case is 5 times larger than the correct answer—not what we'd expect given the input data and simple coefficients. Turning on the warnings, it's easy to find the answer:

```
>> fxp_warn('all');
>> fir(coeffs_fp, x)
Warning: Overflow detected.
ans =
    0.1016
```

Using the MATLAB debugger to stop on warnings, it's easy to find the problem—the length of x inside the fir function is 4, which overflows and saturates at essentially 1 when converted into an fxp(1, 7), causing the answer to be 4 times too big. This hypothesis can easily be verified by increasing the number of bits on the left:

```
>> coeffs_fp = fxp(coeffs, 4, 7, 's');
>> fir(coeffs_fp, x)
ans =
    0.0234
``` and we see the expected answer. However, we see we have an odd number of bits in the fixed-point object, which is not desirable, so we see if we can reduce it to a total of 8.

```
>> coeffs_fp = fxp(coeffs, 4, 4, 's');
>> fir(coeffs_fp, x)
ans =
    0.0625
```

As we expected, we cannot. While the coefficients can be exactly represented with 4 bits to the right of the decimal place, the data (0.1) has too much error:

```
>> fxp(0.1, 4, 4, 's')
ans =
    0.1250
```

Given that we need the bits on precision on the right, the simplest fix is to slightly modify our original fir function, eliminating the overflow:

function $y=fir(c,x)$ $y=dot(c,x)*(1/length(x));$

By doing the division in double precision, we keep our number within our scaling, and going back to our original fxps, we will get an exact answer:

```
>> coeffs_fp = fxp(coeffs, 1, 7, 's');
>> fir(coeffs_fp, x)
ans =
    0.0234
```

One specific embodiment of the fixed-point toolbox described in the attached CD-ROM appendix implements all the operators and functions described above. Any user function or MATLAB function that uses only these operators or functions will convert automatically to fixed-point operation by simply passing in a vector containing fixed point. For instance, the following simple fir function:

```
function y = fir(a)
    y = (1.5 * a(1) + 1.0125 * a(2) + 1.03125 *
a(3) + 1.007750 * a(4)) / 4;
``` will work correctly when passed a vector of fixed-point objects as well as when passed a vector of double precision numbers. The coefficients will automatically be converted to the same precision as the fixed-point objects by the package. This allows for an easy way of minimizing the number of bits required while maintaining required error tolerances. For instance, given the simple input sequence a=[1 2 3 4], the following loop:

```
for i=8:-1:0
    b = fxp(a, 4, i, 's');
    c = fir(a);
    d = fir(b);
    e = abs(c - double (d));
    disp([ ' Error at size ' num2str(i) ' is ...
        ' num2str(e)]);
end
``` will produce
  Error on size 8 is 0.00032813
  Error on size 7 is 0.001625
  Error on size 6 is 0.0061875
  Error on size 5 is 0.014
  Error on size 4 is 0.0094375
  Error on size 3 is 0.037438
  Error on size 2 is 0.037438
  Error on size 1 is 0.037438
  Error on size 0 is 0.087562 showing the increase in error as the number of bits of precision drop off. The coefficients were chosen to be $1/(2^i)$ for i=1,3,5,7, showing the error increases across those boundaries.

Certain embodiments (this one in particular) of the fixed-point toolbox do not support mixed mode arithmetic. That is, two operands must have the same number of bits to the left of the decimal and the same number of bits to the right of the decimal, or the fixed-point toolbox issues an error. This restriction is not present in other embodiments of the fixed-point toolbox, so that any precision numbers may be combined. Some embodiments of the fixed-point toolbox contain a routine "fxp_precision" which allows the user to specify the desired precision on specific operators or functions.

Several embodiments of the type described herein have the following features:

1) emulating fixed-point operations using floating point arithmetic so long as the values remain within the mantissa range, using the full range of modulo and saturation arithmetic, rounding, etc;

2) using vector algorithms and approaches for such tasks as converting results of fixed point to unsigned, detecting overflow, reducing floating point results into fixed-point, etc.; and 3) use of overloading within a dynamically typed language, and the ability to allow the user to adjust arithmetic, precision, rounding, etc. via mode changes.

In contrast to conventional range capture of the type described by Lee in U.S. Pat. No. 6,460,177, wherein a user executes a program in floating point using class structures to capture the dynamic range of the variable, several embodiments of the type described herein a) convert to a fixed-point representation that is chosen by the user based on their past experience, b) run that on the sample data, c) if the error is acceptable, keep it, otherwise adjust and go back to b). Range capture can be used in this embodiment, if desired, before step a) in order to obtain information to make a better estimate. However, such range capture would still be very different from Lee's range capture, because dynamically-typed languages such as MATLAB do not support the type of range capture envisioned by Lee.

APPENDIX B

Overview

The Catalytic FxP Toolbox is a Matlab package that enables users to write computations using fixed-point arithmetic rather than the default double precision floating point arithmetic provided in Matlab. The toolbox executes fixed-point operations precisely. This means that results are identical in precision and accuracy to operations executed on typical fixed-point hardware such as that found on a Digital Signal Processor (DSP). Signed and unsigned operands are supported, as are modulo and saturation arithmetic. The toolbox provides both real and complex fixed-point numbers. Real fixed-point numbers (also called fxps) execute faster than complex fixed-point numbers (also called cfxps) because the imaginary component is known to be zero. Rounding modes for results can be selected from round to nearest, round towards zero, round toward positive infinity, and round toward negative infinity.

One of the major goals of the toolbox is to simplify as much as possible the conversion of computations written using default, double precision Matlab into fixed-point arithmetic. Because the FxP Toolbox uses the class and operator-overloading features of Matlab, converting a working double precision program into fixed-point arithmetic usually requires only the insertion of a small number of constructors and assignment statements.

DSP programmers typically scale operands to keep values within a reasonable range. The scaling factor is often kept only in the programmer's head, creating troublesome bugs when a scaling is not carried through an operation correctly. The FxP Toolbox provides for implicit scalings to be carried along with fixed-point operations and correctly maintains these scalings through most arithmetic operations. Warnings are issued when an invalid arithmetic operation is attempted on differently-scaled operands (for instance, when adding two fixed-point operands with different scalings).

Transcendental functions are essential to many fixed-point applications but vary widely by application as far as the amount of precision required. Typically these functions are hand-written by applications programmers to provide just the amount of precision required. The only way to exactly match the precision of such functions over their entire domain is to use those functions directly. In order to allow this behavior, the FxP Toolbox provides a mechanism for easily replacing transcendental functions. The default behavior of the toolbox for an fxp transcendental call is to convert the fxp to double-precision, call the appropriate double-precision C math routine, then convert the results back into an appropriate fxp or cfxp. However, the toolbox also provides a facility that allows transcendental functions written in C to be easily plugged into an application. In addition to providing Matlab applications with the exact precision that a final application will have, this facility also permits early prototyping and exploration of DSP transcendental functions.

The basic FxP Toolbox allows users to write their own functions using fixed-point operations and call a large number of basic Matlab functions with fixed-point arguments, obtaining fixed-point results. The enhanced FxP Toolbox extends fixed-point support to include both the Signal Processing and Communications toolboxes of Matlab[1].

[1] In order to use the extended features of the enhanced Catalytic FxP Toolbox, you must be licensed for the appropriate Matlab toolboxes (Signal Processing, Communications, or both) from MathWorks.

Installation

The Catalytic FxP Toolbox is shipped as a gzipped tar file "cfpl.tgz". All that is necessary to install the package is to unload the tar file in the directory where you wish the package to reside (the "install directory"). Catalytic recommends the install directory "Catalytic/fxp" underneath "My Documents", but any directory is fine. If you are running a UNIX emulation under Windows (such as the MKS Toolkit or Cygnus Cygwin), the commands "cp cfpl.tgz <install directory>; cd <install directory>; gunzip cfpl.tgz" will execute the install process. If you are not running a UNIX package, the WinZip utility is one of many that can be used to unload the installation file.

To execute the package, it is necessary to add the three directories to your Matlab path: the install directory, and the "toolbox" and "support" directories underneath it. The easiest way to do this is to use the Matlab command "pathtool". Once inside pathtool, you can click on the "Add Folder" button then graphically select and add <install directory>, <install_directory>/toolbox, and <install_directory>/support to add them to your path (Catalytic recommends putting them at the end of your path, but they work correctly at any position). If you make these changes permanently to your path (either by clicking the "Save" button or by replying "Yes" when you exist "pathtool"), you will only need do this change once, and not every time you start Matlab. You can also make the changes by using the commands "addpath '<install directory>';", "addpath '<install directory>/toolbox';", "addpath '<install_directory>/support';" inside Matlab. To avoid entering the "addpath" commands every time you start up Matlab, you will most likely want to add these commands to your startup.m file in your base Matlab work directory, which is $matlabroot\work. The Matlab help documentation provides more information on startup.m if you need it.

Once the tar file has been unloaded and the Matlab "addpath" command has been executed, the installation can be verified by typing the command "fxp_test". If the package has been installed correctly, the phrase "Correct installation verified." will be printed. If the package does not appear to be installed correctly, contact support@catacomp.com for help troubleshooting.

Getting Started

The Catalytic FxP Toolbox provides fixed-point by adding two new data types to Matlab:

"fxp" to support real fixed-point operands and "cfxp" to support complex fixed-point operands. These data types are supported using the Matlab class and operator overloading facilities, but knowledge of these facilities is not necessary to use the fixed-point library. This section provides the information necessary to convert existing programs to fixed-point or to write new programs in fixed-point.

Cfxps and fxps have the same basic properties and are similar in functionality. Fxps are cfxps whose imaginary part is known to be zero. The package could easily have been implemented with just the complex representation, using cfxp's with imaginary values of 0 for fxp's. The dual representation was motivated by speed; there are several computational efficiencies that can be implemented when the imaginary part is known to be zero. The two data types are identical in their properties (other than the fact that fxps have no imaginary component), so the two types may be considered interchangeable in the remainder of this discussion.

The FxP Toolbox must be initialized with the function fxp_init prior to using any fxps or cfxps. Fixed-point operations can be performed in a number of different ways (modulo arithmetic versus saturation on overflow, for instance). Fxp_init allows the user to set the way in which arithmetic operations are performed. If the user does not explicitly initialize the FxP package by calling fxp_init, the toolbox assumes a reasonable set of defaults.

Fxp_init can take up to 6 parameters:

7. saturate: whether to use saturation arithmetic or modulo arithmetic. In saturation arithmetic, positive overflows saturate at the largest positive value and negative overflows saturate at the smallest negative value. In 2-bit signed saturated arithmetic, adding 1 and 1 is 1; adding −1 to −2 results in −2. Modulo arithmetic ignores the most significant bits of an overflow result, wrapping the result in a ring. Most integer arithmetic units use modulo arithmetic based on 2s-complement number representations. Adding 1 to 1 in 2-bit signed modulo arithmetic results in −2; adding −1 to −2 results in 0. If 's' or 1 is passed as the first parameter to fxp_init, saturation arithmetic is used. If 'm' or 0 is passed, modulo arithmetic is used. Arithmetic defaults to saturation if fxp_init is not called.

8. rounding: what form of rounding to use when an input value specifies more precision than allowed in the fxp. For instance, consider converting the value 1.25 (binary 1.01) into a 2 bit unsigned fxp with 1 bit to the right of the decimal. Since the input value has 2 bits of precision to the right of the decimal but the result fxp only allows 1 bit, the input value needs to be rounded. The FxP Toolbox supports four rounding modes: 'r' or normal rounding (a 1 in the next significant bit rounds up; a 0 truncates); 'c' or ceil (always round toward positive infinity); 'f' or floor (always round toward negative infinity); and 'm' or modulo (always round toward 0). Under mode 'r' and 'c', 1.25 (1.01) becomes 1.50 (1.1); under mode 'm' and 'f', 1.25 becomes 1.0. Note that rounding does not occur on default arithmetic operations in the FxP Toolbox because the library specifies enough precision to hold the results. Rounding occurs only when converting an fxp or a double to a lower level of precision. The default setting for the rounding parameter is 'r'.

9. warn_on_size: The FxP Toolbox supports any size fixed-point operands from 1 to 53 bits. However, arithmetic units are usually primed for operands that are one of 8, 16, 32, or 64 bits in size. Operands of other sizes are much less efficient. The parameter warn_on_size gives a user a chance to catch odd-sized operands accidentally introduced into a program. If warn_on_size is set to anything other than 0, the package will issue a warning whenever it creates an operand of a size other than 8, 16, or 32 bits. Setting warn_on_size to 0 suppresses these warnings, allowing operands of any size to be silently accepted. The default value is 1, causing warnings to be issued. Acceptable sizes may be changed by use of the fxp_size function.

10. warn_on_overflow: If warn_on_overflow is non-zero (the default is 1), the FxP Toolbox issues a warning whenever an operation causes an fxp or cfxp to overflow. If warn_on_overflow is 0, overflows are silently executed according to the setting of the arithmetic mode (saturation or modulo). The Matlab "warning" function is used to issue the warnings, allowing you to catch the overflows in the Matlab debugger using the command "warning debug". Note that "an operation" includes entire vector or matrix operations, so you will receive only one warning if all the elements of a length 128 vector overflow.

11. warn_on_negative_unsigned: If warn_on_negative_unsigned is non-zero (the default is 1), the FxP Toolbox issues a warning whenever an operation causes a negative number to be converted into an unsigned. If it is zero, negative numbers are silently converted into unsigneds. Again, only one warning is issued per vector or matrix operation.

12. warn_on_scaling: If you wish, you can cause an fxp or cfxp to carry along an implicit scaling factor. The FxP Toolbox will correctly combine scaling factors whenever an arithmetic operation is performed on two fixed-point numbers that are carrying scaling factors: multiplication will cause the factors to be added; division subtracts the factors; and so on. If warn_on_scaling is set to be non-zero, arithmetic operations that attempt to invalidly combine differently-scaled fxps or cfxps will issue a warning. For instance, if you attempt to add an fxp that is scaled by $2^8$ to an fxp that is scaled by $2^{-8}$, the library will issue a warning that you are attempting an invalidly-scaled operation. The scaling for the result will be undefined. If warn_on_scaling is set to zero, invalidly-scaled operations are silently executed. The default value for this parameter if not explicitly set is 0—warnings not issued.

Since fxp_init accepts a variable number of arguments, it is necessary to specify only the first arguments where the default values differ from those you desire. Also note that fxp_init is not the only way of requesting arithmetic change, rounding change, or warnings; it is simply a convenient way of starting up with your desired environment. There are other functions that allow you to change these parameters any time during execution. Once the fixed-point package has been initialized using fxp_init, fxps and cfxps can be created using the constructors fxp and cfxp, respectively. These constructors return as their result an fxp or cfxp, and take up to six parameters:

7 value: the value to be converted to fixed or cfixed form. This value can be a double, array of doubles, a fixed-point number (for changing the precision or other characteristics), or an array of fixed-point numbers. These functions can also be used to convert a fixed to a cfixed and vice versa.

8 left: the number of bits to the left of the decimal in the resulting fixed or cfixed number. This number must include room for the sign bit, if the number is signed. For cfixed numbers, this size limits both the real and the imaginary parts of the number; that is, setting left equal to 4 will mean that the real part of a cfixed will have 4 bits to the left of the decimal point and the imaginary part will also have 4 bits to the left of the decimal point. When an array is passed as value, the left setting is applied to all elements of the array.

9 right: the number of bits to the right of the decimal in the resulting fixed or cfixed number. All comments made regarding left (other than those involving the sign bit) apply to right as well.

10 signed: whether the resulting fixed/cfixed is to be stored as signed or unsigned. A value of 1 or 's' means that the number is to be stored as signed (so one of the left bits is used as a sign bit). A value of 0 or 'u' means that the number is to be stored as unsigned. Signed numbers are the default if no parameter is specified.

11 rounding: if the input value has more precision than the resulting output, what form of rounding should be used to reduce the precision. As with fxp_init, the value 'r' means use round to nearest; the value 'f' means use floor; the value 'c' means use ceil; and the value 'm' ('t' is also accepted) means modulo. This parameter is provided as a convenience for overriding the default rounding mode in rare cases that require special rounding. If this parameter is not specified or if an empty value ("[ ]") is passed, the default rounding mode will be used. The default rounding mode is initially set with fxp_init, but may be changed with fxp_round.

12 scaling: the fixed-point numbers used in signal processing are often scaled from the real data. To ease this scaling process, fxps and cfxps can carry optional implicit scaling factors. The presence of the scaling factor means that the true number that the user is interested in is the value contained in the fxp/cfxp multiplied by 2 raised to the scaling factor—in other words, the bits in the fxp/cfxp are arithmetically shift to the left or the right by the value of the scaling. Scaling factors are not required and do not enter explicitly into computations. However, if they are provided, they are maintained through arithmetic, and if the warn_on_scaling option is set, warning messages will be issued when an operation is attempted on invalidly scaled operands.

Using the earlier example to convert the double value 1.25 into an unsigned 2 bit fxp, all we need do is make the following call:

```
a = fxp(1.25, 1, 1, 'u');
```

This call will use whatever default rounding is in effect. Assuming 'r' rounding, the entering the command to display "a" at the Matlab prompt yields:

```
>> a
a     =
      1.5
>>
```

In other words, fxps behave just like other Matlab variables. Similarly, assuming saturation arithmetic is in effect, one can type expressions using "a"

```
>> a + a
ans   =
      1.5
>> a − 1.0
ans       =
      0.5
>>
``` and so on. The first example shows saturation at the maximum value for a 2 bit number; the second example shows that doubles and fxps can be mixed in expressions.

Whole vectors or arrays can be converted to fixed-point representation:

```
>> a = [ 1 2 3; 4 5 6; 7 8 9]
a =
      1         2         3
      4         5         6
      7         8         9
>> a = fxp(a,   4, 0)
a =
      1         2         3
      4         5         6
      7         7         7
>>
```

Note that only 3 parameters are passed to the fxp call. The fourth parameter (the signed value) defaults to 's' when not specified, which is why the last 2 values become "7". "7" is the largest value that can be represented with 3 value bits and 1 sign bit.

A complex fixed point number follows the same conventions:

```
>> a = cfxp(1.25 − 1.25i, 2, 1, 's')
a =
      1.5 − 1.5i
>>
```

The constructor functions fxp and cfxp will convert values other than just doubles to fixed-point representation. Fxps and cfxps can also be passed as the first parameter to the constructors, allowing changes in size or representation. The constructors also accept hexadecimal notation:

```
>> a = fxp('0x1.1', 1, 1, 'u')
a =
      1.5
>>
```

The following example illustrates the use of scaling factors:

```
>> a = fxp(0.5, 1, 7, 's', [ ], 8)
a =
      0.5
>>
```

This example creates an unsigned fxp whose value is 0.5 using the default rounding mode. While the value of the fxp proper is 0.5, the value of the real number corresponding to the fxp is actually 0.5*2^8, or 128. Similarly, an fxp created by

```
>> b = fxp(0.5, 1, 7, 's', [ ], -8)
b =
    0.5
>>
``` would also have the value 0.5, but the real number would be 0.5*2^-8, or 0.001953125. Scaling factors are carried along by the FxP Toolbox, so that if the computation

```
>> c = a * b
c =
    0.25
>>
``` is requested, the FxP Toolbox knows that the scaling on c is 0 (8-8), so that the true result is 0.25*2^0==0.25. Scalings are typically invisible to the user unless debug options are turned on inside the toolbox.

Scalings are the most useful to a programmer when the option warn_on_scaling is enabled. With that option, an attempt to combine two invalidly scaled numbers results in a warning message. Continuing the sequence above with scaling warnings enabled:

```
>> a - c
```

Warning: Subtraction of two differently scaled numbers.

```
ans =
    0.25
>>
```

Since a is scaled by 2^8 and c is scaled by 2^0, subtracting them is an invalid operation. The correct result is obtained and printed for the fxps (0.25=0.5−0.25), but that result is not correct for the real numbers represented by the scaling (0.5*2^8−0.25). The FxP Toolbox always computes correct results for numbers ignoring the scaling factors, using the scaling only to issue warnings. Note that no warning would be issued for the product a*b would be issued despite their different scaling, since the true result can be computed for products of differently scaled numbers.

One of the major design goals of the Catalytic Fixed-Point Library is to simplify as much as possible the conversion of working double precision programs into fixed-point operation. Ignoring precision issues, the only thing required to convert most double precision programs into fixed-point representation is the insertion of constructors at the beginning of the computation; the package takes care of everything else. For example, consider the following simple program obtaining the DCT of a sequence of numbers (assuming that you have the Signal Processing Toolbox installed):

```
>> a = [3.14  1.59 2.65 3.58];
>> dct(a)
ans =
    5.4800      −0.5743      1.2400      0.5734
```

Converting this program to fixed point requires only the following change:

```
>> a = [3.14  1.59 2.65 3.58];
>> a = fxp(a, 8, 8, 's');
>> dct(a)
ans =
    5.4785      −0.5723      1.2402      0.57235
```

The answers come out slightly different because the arithmetic was performed in fixed point rather than double precision.

Modes

Fixed-point arithmetic can be performed in a number of different ways, as is obvious in the parameters to fxp_init. While most applications generally want to use the same options throughout the entire computation, there are other times when a rounding mode or saturation option needs to be changed for just one operation or a small number of operations. The Catalytic Fixed-Point Library contains a number of functions that make that easy to accomplish. The following functions may be called any time after fxp_init to set or uncover current arithmetic options:

1. fxp_rounding_mode(mode): sets the current rounding mode. Mode may be one of 'r' for round (round to nearest), 'f' for floor (round toward negative infinity), 'c' for ceil (round toward positive infinity), or 't' (or 'm') for truncate (round to zero). The function returns the value of the rounding mode prior to the function call. For example, the sequence

```
fxp_rounding_mode('r');
t = fxp_rounding_mode('f');
fxp_rounding_mode(t);
``` initially sets the rounding to be round to nearest; it then changes it to floor while saving 'r' in the variable t; then finally resets the rounding mode back to round to nearest.

2. fxp_saturate_mode(enable): sets the current arithmetic mode to be either saturation or modulo. If "enable" is the string 'on' or the value 1, the arithmetic mode is set to saturation. If "enable" is the string 'off' or the value 0, the arithmetic mode is set to modulo. Any other value generates an error. As with fxp_rounding_mode, fxp_saturate_mode returns the previous setting of the arithmetic mode in a form that can be used for future calls.

3. fxp_round: set the current rounding mode to be 'r'. No value is returned. This function is shorthand for the call "fxp_rounding_mode('r')";

4. fxp_ceil: set the current rounding mode to be 'c'. No value is returned.

5. fxp_floor: set the current rounding mode to be 'f'. No value is returned.

6. fxp_truncate: set the current rounding mode to be 't'. No value is returned.

7. fxp_modulo: set the current arithmetic mode to be modulo. No value is returned. This function is shorthand for the call "fxp_saturate_mode('off')"
8. fxp_saturate: set the current arithmetic mode to be saturation. No value is returned.
9. fxp_real_mode: functions such as square root and log can return complex numbers for real inputs (e.g. sqrt(−1)). For many practical problems, these conditions are never seen, but since the toolbox cannot know this, it must assume that the outputs of these functions are cfxps rather than fxps, causing inefficiency in the resulting code. When fxp_real_mode is enabled (with a parameter of 'on' or 1), the toolbox enforces the restriction that all calls to functions such as sqrt and log involving fxp parameters produce fxp results—a condition that would cause a cfxp result generates an error. Disabling the mode (with a parameter of 'off' or 0) relaxes that restriction so that those functions return cfxps when passed fxp parameters.

Warnings

The Catalytic Fixed-Point library provides a number of warnings to help in program development and debugging, including detections of things such as overflowing a fixed-point number, converting a negative number into an unsigned, or using a fixed-point number which is an unusual size and may not allow for reasonable code generation. By default, fxp_init starts the fixed-point package will all warnings enabled, but users may turn them on and off at will using the function fxp_warn_mode. Fxp_warn_mode takes a variable number of arguments, which may be taken from the following list:

- 'all': enable all warnings.
- 'off': disable all warnings.
- 'overflow': enable warnings when an overflow occurs
- 'no_overflow': disable warnings on overflow.
- 'unsigned': enable warnings when a negative number is converted to unsigned.
- 'no_unsigned': disable warnings on negatives becoming unsigned.
- 'size': enable a warning when a fixed-point number takes a size other than 8, 16, 32 bits.
- 'no_size': disable warnings on size.
- 'scaling': enable warnings for invalid combinations of scaled numbers.
- 'no_scaling': disable warnings for invalid combinations of scaled numbers.

Arguments may be abbreviated to the shortest unambiguous string. If multiple conflicting arguments are passed to fxp_warn_mode, the conflict is resolved in favor of the argument that appears last in the argument list.

Fxp_warn_mode returns a cell array holding the previous setting for the warning flags. That setting can be restored by passing the returned value back into fxp_warn_mode as in the following:

```
t = fxp_warn_mode('off');
fxp_warn_mode(t{:});
```

The toolbox issues only one warning of a specific type per fxp vector or matrix operation, regardless of the number of elements in the vector or matrix that actually cause the exception. Cfxps may issue two warnings of each specific type: one for the real part and one for the imaginary.

The fxp/cfxp sizes which are "good" are set by the routines fxp_good_size and fxp_bad_size. Each routine takes vector of sizes, which is added to the appropriate category. By default the toolbox starts up as though the call fxp_good_size ([8, 16, 32]) had been issued.

Debugging Facilities

The FxP Toolbox contains a number of facilities in addition to the warnings to help you in debugging your fixed-point problems. These facilities include display routines that provide different formatting outputs for fixed-point numbers as well as the standard Matlab graphical and debugging facilities.

The FxP Toolbox contains display options that help in debugging fixed-point programs. By default, the "display" routine for fxps and cfxps use a format string that is identical to Matlab's display format. However, the fxp/cfxp display routine also supports an extended format that gives more information specific to fxps and cfxps, such as signedness, number of bits, and scaling. This extended format is enabled and disabled by the routine fxp_debug_mode. The call fxp_debug_mode('on') enables the extended information; the call fxp_debug_mode('off') returns to normal Matlab display mode. This routine affects only the display of fixed-point numbers. Following is a sample of the information provided:

```
>> fxp_debug('on');
>> a = [3.14   1.59 2.65 3.58];
>> a = fxp(a, 8, 8, 's')
a =        <signed fxp, 8.8>   (scaled by 2^0).
    3.1406          1.5898          2.6484          3.5781
```

As is the case with all other mode routines, fxp_debug_mode returns a value which can be used to restore the debug setting that was present prior to the call.

The toolbox also contains a function fxp_view that permits viewing of fxp and cfxps in various formats, including hexadecimal. Fxp_view takes up to 3 parameters: a) the value or vector to be displayed; b) the format for displaying the data, which can be 'f' for double precision, 'x' for hexadecimal, or 'b' for binary; and c) an optional scaling factor by which the value is multiplied before display.

Supported Operators

Arithmetic operators in the FxP Toolbox behave much the same way that they do in basic Matlab. As a result, a fixed-point program looks identical to a double precision computation, other than the initial fxp and cfxp constructors. All operators follow the same rules as Matlab with respect to operations on scalars, vectors, and arrays. So, for instance, it is legal to add a scalar fxp to a vector fxp.

Additional features found in the FxP Toolbox not present in basic Matlab include the notion of signed and unsigned, and the explicit separation of real fixed-point objects from complex fixed-point objects. The package does support mixed operations among these various types. The rules governing such conversions are fairly simple. When an operation is specified between an unsigned operand and a signed operand, the package will first convert the signed operand to unsigned; the result is also unsigned following the rules of C. When an operation is specified between an fxp and a cfxp, the fxp is promoted to a cfxp and the result is a cfxp. When an operation is specified between an fxp/cfxp and a double ("double" here means Matlab "double", which can be either double precision or complex), the double is converted to the same type as the fixed point operand before the operation is performed. When a non-multiplicative operation is specified between an fxp/cfxp and a logical, the logical is converted to the same type as the fixed-point operand before the operation is performed. For multiplicative operations, the fixed-point operand is converted to double precision before performing the arithmetic, and the result is converted back to the fixed-point type.[2] No other implicit conversions are performed. The toolbox flags such conversions as errors.

[2] The reason for this is that multiplicative logical operations are often used to select elements of another matrix. This definition allows that selection to occur without changing the types of the result elements.

For the moment, the package does not support operations between fxps or cfxps with different right or left parameters. This restriction will be lifted in the future.

The following table lists all operators supported by the FxP Toolbox, the behavior and size of the result, and any special notes. The notation "fxp(l,r)+fxp(l,r)−>fxp(l,r)" means that the addition of two fxps with values of "l" for the number of bits to the left of the decimal and "r" for the number of bits to the right of the decimal results in a fxp with "l" bits to the left of the decimal and "r" bits to right. The behavior of signed and unsigned operands is described by the rule above.

ful when the extra bits of precision are not necessary for multiplies and divides, as it automatically inserts the conversions that a programmer would have to insert by hand. This mode is enabled by use of the fxp_short_mode routine. Fxp_short_mode takes one parameter. If that parameter is 'on' or 1, the short multiply mode is enabled; if that parameter is 'off' or 0, the short multiply mode is disabled and multiplies and divides are done in full precision.

[3] With the exception of the most negative case of signed multiplies and quotients.

Supported Functions

In addition to the basic arithmetic operators, the FxP Toolbox also supports many of the primitive functions used by Matlab. The compete list of supported functions is as follows:

65. abs—take the absolute value of a fxp, cfxp, or vector of either. Abs(fxp(l,r)) yields a fxp(l,r) with overflow set by fxp_saturate/modulo. Abs(cfxp(l,r)) yields a fxp(2*l, 2*r) for unsigned, fxp(2*l−1, 2*r+1) for signed with overflow set by fxp_saturate/modulo.

| Op | Function | Behavior | Notes |
|---|---|---|---|
| + | plus | fxp(l, r) + fxp(l, r) −> fxp(l, r) | Saturation/modulo by mode. |
| + | uplus | +fxp(l, r) −>fxp(l, r) | Unary plus. |
| − | minus | fxp(l, r) − fxp(l, r) −> fxp(l, r) | Saturation/modulo by mode |
| − | uminus | −fxp(l, r) −>fxp (l, r) | Saturation/modulo by mode |
| * | mtimes | fxp(l, r) * fxp(l, r)−> fxp(2*l, 2*r) | Matrix multiplication - for unsigneds |
|  |  | fxp(l, r)* fxp(l, r)−>fxp(2*l − 1, 2*r + 1) | Matrix multiplication - For signed variables. Saturation/modulo by mode. |
| .* | times | Same as mtimes. | Element-wise multiplication. No overflow. |
| ' | ctranspose | fxp(l, r)'−>fxp(l, r) | Saturation/modulo by mode. |
| .' | transpose | fxp(l, r).'−>fxp(l, r) | Matrix transpose. |
| < | lt | fxp(l, r) < fxp(l, r) −> logical |  |
| > | gt | fxp(l, r) > fxp(l, r) −>logical |  |
| >= | ge | fxp(l, r) >= fxp(l, r) −>logical |  |
| <= | le | fxp(l, r) <= fxp(l, r) −>logical |  |
| ~= | ne | fxp(l, r) ~= fxp(l, r)−>logical |  |
| == | eq | fxp(l, r) == fxp(l, r) −>logical |  |
| & | and | fxp(l, r) & fxp(l, r) −>logical | Logical and, not bitwise. |
| \| | or | fxp(l, r) \| fxp(l, r)−>logical | Logical or, not bitwise. |
| ~ | not | ~fxp(l, r)−>logical | Logical not, not bitwise. |
| a:b | colon | fxp(l, r): fxp(l, r)−>vector of fxp(l, r) | Supported for completeness. |
|  | display |  | Displays value of a fxp/cfxp |
| [a;b] | vertcat | [fxp(l, r); fxp(l, r)] −> column vector | Vertical concatenation. |
| [a, b] | horzcat | [fxp(l, r) fxp(l, r)] −>row vector | Horizontal concatenation |
| a(b) | subsref | fxp(l, r) (b_type) −> fxp(l, r) | Indexing |
| a(b)= | subsassgn | fxp(l, r) = fxp(l, r) −> fxp(l, r) | Assignment into index |
| a(b) | subsindex | a_type(fxp(l, r)) −>a_type | Use as index |
| a./b | rdivide | fxp(l, r)/fxp(l, r)−>fxp (l + r, l + r) if unsigned fxp(l, r)/fxp(l, r)−>fxp(l + r − 1, l + r + 1) if signed. | Division - element wise |
| a/b | mrdivide | fxp(l, r)/fxp(l, r)−>fxp(l, r) | Matrix division. |
| a.^b | power | fxp(l, r).^fxp(l, r)−>fxp(l, r) | Power function- -element |
| a.\b | ldivide | fxp (l, r)\fxp(l, r) −>fxp(l, r) | Left division - element wise |
| a\b | mldivide | fxp (l, r)\fxp(l, r) −>fxp(l, r) | Left matrix division. |
| a^b | mpower | fxp(l, r) ^fxp(l, r)−>fxp(l, r) | Power function |

In default mode, the toolbox computes products and quotients exactly[3] by doubling the number of bits of output. This level of precision is necessary for many signal processing applications, but it does cause the precision of results to continually increase, leading eventually to an overflow of the fixed-point space if many multiplications are performed and the results not trimmed on the right. The toolbox also supports an alternative mode where the results of multiplications and divisions are the same size as the input operands (that is, fxp(l,r)*fxp(l,r)−>fxp(l,r)). This mode tends to be more use- 66. all—returns true if all elements of a fxp/cfxp vector are not equal to zero.
67. any—returns true if any element of a fxp/cfxp vector is not equal to zero.
68. mean—returns the mean of a vector of fxp/cfxp. Mean (fxp(l,r)) yields a fxp(l,r). Likewise for cfxp.
69. bitand—bitwise and'ing of two fxps/cfxps. This and all other bitwise Matlab functions will operate differently than the standard routine on doubles. "Double" routines normally convert the operands to integer, then perform the logical operation. It seems more reasonable for these to do the logical operation bitwise on the existing bits (no conversion to integer), since the location of the decimal point in fixed-point is somewhat arbitrary. Bitand(fxp(l,r), fxp(l, r)) yields a fxp(l,r); cfxp->cfxp.
70. bitcmp —complements a fixed point number. Result is same type as input (fxp(l,r,) or cfxp(l,r)).
71. bitget—gets the bits indicated from a fixed/cfixed number. 1 is at the right of the number, and the result is a vector of 0/1 (not fixed-point) of the appropriate bits. Bitget for complex numbers is undefined for Matlab (it is only defined for integers), so we can define complex with the imaginary part on either side—the left (most significant) seems appropriate. Result is a integer in Matlab double format.
72. bitmax—returns the maximum value for a given fxp type. That is, bitmax(fxp(l,r)) returns the maximum value that fxp(l,r) can take on. Bitmax(fxp(l,r)) yields a fxp(l,r); bitmax of cfxp is undefined. Note that this is different behavior from Matlab on doubles.
73. bitor—bitwise or'ing of two fixed/cfixed, following the pattern of bitand.
74. bitset—the inverse of bitget.
75. bitshift—shifts bits for fxp(l,r) returning fxp(l,r). Undefined for cfxp. The behavior is the same as Matlab's, and throws away bits shifted off the end.
76. bitshifta—same as bitshift, but does an arithmetic shift for right shifts rather than a logical shift. The sign bit is shifted in as filler for right shifts.
77. bitxor—bitwise xor'ing of two fixed/cfixed, following pattern of bitand.
78. ceil—next larger integer. Returns fxp(l,r) for fxp(l,r); cfxp(l,r) for cfxp(l,r). Overflow controlled by saturate/ module mode.
79. complex—creates a complex from one or two inputs. Complex(fxp(l,r)) yields cfxp(l,r).
80. conj—returns the conjugate of a fxp/cfxp. Result has same size as input. Overflow controlled by saturate/ modulo.
81. cumprod—returns a vector where each element is the cumulative product of previous results.
82. cumsum—returns a vector where each element is the cumulative sum. Resulting vector has same size characteristics of input (fxp(l,r)->fxp(l,r)) governed by saturate/ modulo on overflow.
83. diag—creates diagonal matrices and returns the diagonals of matrices. Resulting vector has the same size and signed characteristics (fxp or cfxp) as the input.
84. diff—take the difference of elements of a vector as an approximation to a derivative.
85. disp—simpler form of display.
86. double—converts a fxp/cfxp into a double. Note that "double" in Matlab means complex, so double(cfxp) does the right thing.
87. find—find the indices of non-zero elements in an fxp or cfxp vector. The result is a vector or doubles (rather than fxps) assuming that it will be used as subscripts.
88. fix—rounds the elements of a fixed/cfixed towards 0. Result of fxp(l,r) is fxp(l,r); likewise for cfxp.
89. floor—rounds towards minus infinity. Same result types as fix.
90. full—convert an fxp/cfxp sparse matrix into an fxp/cfxp full matrix.
91. imag—return the imaginary component of an fxp/cfxp. For fxp, the result is a vector of 0's sized identically to the input. In both cases, the characteristics of the output is the same as the input.
92. isempty—returns a double 1 if the input fxp/cfxp is empty; 0 if not.
93. isfinite—always returns a double 1 for both fxps and cfxps.
94. isnan—always returns a double 0 for both fxps and cfxps.
95. isnumeric—always returns a double 1 for fxps and cfxps.
96. isreal—always returns a double 1 for fxps and a double 0 for cfxps.
97. issparse—returns a double 1 if the input fxp/cfxp is a sparse matrix; 0 if not.
98. is_signed—returns 1 if fxp is signed; 0 if not.
99. left_of_decimal-return the number of bits to the left of the decimal (left in constructor) for a fxp, cfxp.
100. length—indicates the length of fixed/cfixed arrays, just as with double arrays.
101. line—adds the line for the input fxps/cfxps to the current graph.
102. loglog—plot fxps/cfxps on a log-log scale.
103. max—returns the max value, and optionally its index of a fixed/cfixed array.
104. min—returns the minimum value, and optionally its index, of a fixed/cfixed array.
105. mod—signed remainder after division; mod(fxp(l,r), fxp (l,r)) yields fxp(l,r).
106. ndims—number of dimensions in a cfixed/fixed array.
107. nnz—return the number of nonzeros.
108. nonzeros—vector indicating nonzero elements in cfixed/fixed array. Result is same type as input.
109. norm—norm of a fixed/cfixed array. Various norms are possible according to second parameter.
110. plot—graphically plot a fixed/cfixed array.
111. prod—compute the product of a fixed/cfixed vector. While supported, this is probably not practical for fixed point, as the size very quickly grows beyond anything that can be supported in fixed-point. For the moment, the prod function follows the rules of multiplication for the size of result (that is, one multiplication, not the number involved in the reduction. Thus, the result of a prod(fxp(l,r)) unsigned of any size is a fxp(2*l, 2*r)).
112. real—return the real part of a fixed/cfixed. Real(fxp(l,r)) yields a fxp(l,r); real(cfxp(l,r)) yields fxp(l,r)
113. rem—remainder after division, similar to mod.
114. reshape—reshape a fixed point or complex fixed point array to new dimensions.
115. right_of_decimal—return the number of bits to the right of the decimal (right in constructor) for a fxp, cfxp.
116. round—round to nearest; returns same type of argument as it receives.
117. semilogx—plot fxps/cfxps with an x axis that is logarithmic.
118. semilogy—plot fxps/cfxps with a y axis that is logarithmic
119. set—set properties using values that are fxp/cfxp.
120. sign—returns 1 if argument>0, 0 if equal 0, −1 if less than 0. Result on cfixed is a/abs(a). sign(fxp(l,r))->double; sign(cfxp(l,r))->cfxp(l,r).
121. single—converts a fixed/cfixed to single precision.
122. size—returns the size of a fixed/cfixed array.
123. sort—sort the elements of a fixed/cfixed array.
124. sparse—convert a full fxp/cfxp matrix into a sparse one.
125. sprintf—create formatted output for fxp/cfxps.
126. strncmpi—perform a string compare whether either the strings or the lengths are fxps.
127. sum—return the sum of a cfixed/fixed vector. Sum(fxp (l,r)) yields fxp(l,r).
128. whos—indicate the type of the variable. The "whos" function for fxps provides information such as signed/ unsigned, bits to the left of decimal, and such. This function is invoked by passing the variable name in directly and not in string representation, unlike the base Matlab function. If a is an fxp, then "whos(a)" invokes the fxp-specific "whos" function, while "whos('a')" invokes the generic Matlab function.

Prototype Mode

Because the FxP Toolbox was written using the operator overloading facility in Matlab, it tends to work transparently with most Matlab functions. Matlab functions that are written as ".m" files and that only use the operators and functions listed above (and that call only other functions that meet those restrictions) will execute transparently when invoked with an fxp or cfxp argument. Matlab functions that are implemented as executables or that are built into the Matlab interpreter most likely will not.

However, just because a function will execute transparently does not mean that it will execute correctly. Many algorithms are numerically sensitive to the precision of their inputs, and given that most Matlab functions are written with double precision in mind, executing them in fixed-point may produce instabilities. These instabilities generally manifest themselves as error conditions in the Matlab function.

The FxP Toolbox has two facilities to help avoid these problems when using Matlab library functions, particularly those in the Signal Processing and Communications Toolboxes. The first is the fxp_short_mode function. Because the library functions were written expecting double precision inputs, their use of multiply operators assumes that the type of the output of the multiply is the same as the type of the input. That assumption is not true with the FxP Toolbox in default mode, when the result of a multiply has twice as many bits as the input. This doubling of bits leads to a blow-up inside loops where multiply-accumulates are done in library functions. Using fxp_short_mode before library calls to force the output of multiplies to have the same number of bits as the input quickly fixes this problem.

The second facility is the fxp_prototype_mode function. The FxP Toolbox is designed to be used in two different modes: prototyping mode, when you are focusing on exploring the parameters of your functions and code in order to decide the fixed-point characteristics you need, and implementation mode, when you want to produce a real implementation from your program. In prototyping mode, you are not so concerned about having a correct implementation of a Matlab function (a singular value decomposition, for instance) for fixed-point as you are in observing the behavior of your code under different fixed-point scenarios. Accordingly, you usually don't care about how a particular Matlab function obtains its results, so long as it feeds fixed-point operands into your program. In implementation mode, however, when you are focused on getting an implementation of your program, you have to have versions of every routine that work in fixed-point.

The FxP Toolbox supports both methods of operation via the fxp_prototype_mode function. When prototype mode is enabled (fxp_prototype_mode('on') or fxp_prototype_mode (1)), the toolbox intercepts calls to Matlab library routines involving fixed-point parameters at the boundaries, converts the fixed-point parameters into double precision, makes the call, then converts the results back into fixed-point. This mode precisely emulates the situation of wanting to get fixed-point results out of a function, but without caring how the results are obtained. When prototype mode is disabled (the default), the toolbox calls Matlab library routines directly with fixed-point parameters, and returns the values that the routines return. While not all routines will work in this situation, if they do work, then you have an implementable version of the library routine.

Using Transcendental Functions

The transcendental functions sin, cos, and exp are extremely important in DSP processing. Creating general fixed-point implementations of these functions, however, is a challenging task. Obtaining accurate answers over the entire range of possible inputs requires argument reduction and fairly long series computations. More often than not, particular DSP implementations only need reasonable accurate results over a restricted range of inputs. As a result, a restricted implementation of the transcendentals over expected inputs is usually much faster and better tailored to the particular DSP problem than a general implementation. This creates a two-stage requirement for transcendental implementation in a fixed-point library. Early prototyping stage requires existing general implementations of transcendentals so that users can evaluate algorithms without having to worry about implementing transcendentals. However, at the later stages of implementation, users will want to evaluate their computations using the same hand-tailored function implementations that will be used in the final implementation on the processor, so that they get bit-accurate simulation results identical to the results produced on the processor.

The FxP Toolbox provides support for both stages of implementation, allowing users to easily plug in their own implementations of sin, cos, and exp. By default, a call to a transcendental on an fxp or cfxp will result in a call to the appropriate Matlab double precision routine to obtain a full precision result, followed by a conversion back to a fixed-point number with the same properties as the argument. Thus, by doing nothing a user will obtain highly accurate results for the transcendental functions over all argument ranges. However, if a user provides a version of a transcendental function written in C, the fixed-point package will automatically incorporate it and call it to evaluate transcendentals. This allows users to easily evaluate their own transcendental implementations as well as get totally accurate results from their Matlab simulations. In order for you to substitute your own C version of a transcendental for the fixed-point library all that is necessary for you to do is to copy your routine to a location where the Catalytic Fixed-Point library can recognize it. For fxp routines, that location is <install directory>/@fxp/fxp_<transcendental name>.c; for cfxp routines, that location is <install directory>/@cfxp/cfxp_<transcendental name>.c. As an example, your own version of an fxp sin routine should be copied to the file <install directory>/@fxp/fxp_sin.c. You should also remove the file <install directory>/@fxp/fxp_<transcendental name>.dll; in the case of sin, that file would be fxp_sin.dll. The toolbox will take care of the rest. To reinstate the default, merely remove your version of the transcendental from the @fxp/@cfxp location as well as the associated dll that the fixed-point package will build.

Your transcendental routine should take one integer (32 bit) for an argument is it is an fxp; two if it is a cfxp. The first argument is the fixed-point value for which the transcendental is to be evaluated; the second for cfxps is the imaginary part of the cfxp. The FxP Toolbox will pass as following arguments in integers the number of bits to the left of the decimal and the number of bits to the right, but since you probably know these values, you can ignore them in your calling sequence. Your routine should return a 32 bit integer for fxps that gives the resulting value; a 64 bit integer for cfxps that has the real and imaginary packed. The library assumes that these are scaled the same as the input. The fxp_routines that are provided in the directory by default provide examples of how to write your routines.

To summarize, all you need do to insert your own version of a transcendental function is to create a routine which accepts the value in the form of an integer and place that routine in the location <install directory>/@(c)fxp/@(c)fxp_<transcendental name>.c. The system currently works only with the Microsoft C compiler.

All the cfxp transcendental functions call various combinations of fxp functions to obtain their results, so there should be no need to replace the cfxp functions with your C versions.

The FxP Toolbox currently supports the following mathematical/transcendental functions:

- acos—arc cosine; supported only for fxp (for the moment).
- acosh—arc hyper cosine, supported only for fxp (for the moment).
- asin—arc sine; supported only for fxp (for the moment).
- asinh—arc huper sine; supported only for fxp (for the moment).
- atan—arc tangent; supported only for fxp (for the moment).
- atan2—arc tangent (y/x); supported only for fxp (for the moment).
- atanh—arc hyper tangent; supported only for fxp (for the moment).
- exp—exponential; supported for both fxp and cfxp.
- log—natural logarithm; supported for both fxp and cfxp.
- cos—cosine; supported for both fxp and cfxp.
- cosh—hyper cosine; supported for both fxp and cfxp.
- sin—sine; supported for both fxp and cfxp.
- sinh—hyper sine; supported for both fxp and cfxp.
- sqrt—square root; supported for both fxp and cfxp.
- tan—tangent; supported for both fxp and cfxp.
- tanh—hyper tangent; supported for both fxp and cfxp.

All functions return arguments that are identical in size, bits to the left and right of decimal, and signedness to their inputs.

Special Functions

The Catalytic Fixed-Point library provides a number of functions solely for the support of fixed-point numbers. These include:

5. left_of_decimal(fxp or cfxp): returns the number of bits to the left of the decimal point in the passed in fixed-point number. Useful when creating a new fixed-point number that is desired to be the same size as another.
6. right_of_decimal(fxp or cfxp): returns the number of bits to the right of the decimal point.
7. is_signed(fxp or cfxp): returns 1 if the fixed-point number is in signed representation; 0 if unsigned.
8. fxp_view(fxp, format, scale)—often fixed-point numbers are scaled by the programmers, so that the value represented in a computation is actually a multiple of a power of 2 of the real value. The function fxp_view takes up to three parameters: 1) the fxp or cfxp to be viewed, 2) the format to be used to view the number, and 3) a scaling factor to be applied before viewing the number. The second parameter can be one of 'f' for floating point, 'x' for hexadecimal, or 'b' for binary. The default value if this argument is not specified is 'f'. The third parameter can be a positive or negative integer; if present, the value passed in will be multiplied by 2 raised to the third parameter before viewing. In other words, the bits in the value will be shifted left by the third parameter.

Example—FIR Filter

As an example of how simple it is to convert most double precision Matlab programs into fixed-point, consider the following general FIR filter:

function $y=fir(c,x)$ $y=dot(c,x)/length(x);$

This generic form of the filter accepts both coefficients and data, and returns the filtered result. For instance, a typical call might be:

```
>> coeffs = [ 0.5 0.25 0.125 0.0625];
>> x = [ 0.1 0.1 0.1 0.1];   % Simple set of sample input data.
>> fir(coeffs, x)
```

Because the function "fir" is written using generic Matlab operands, it can be invoked directly without change on fixed-point operands. For instance, inserting the conversion:

```
>> coeffs = [ 0.5 0.25 0.125 0.0625];
>> coeffs = fxp(coeffs, 1, 7, 's');
>> x = [ 0.1 0.1 0.1 0.1];   % Simple set of sample input data.
>> fir(coeffs, x)
``` performs the filter as a fixed point operation, rather than as double precision. Given the choice of input data and coefficients, it's easy to see that the output will be the same, but it's also easily verified as well:

```
>> coeffs = [ 0.5 0.25 0.125 0.0625];
>> x = [ 0.1 0.1 0.1 0.1];   % Simple set of sample input data.
>> fir(coeffs, x)
ans =
    0.0234
>> coeffs_fp = fxp(coeffs, 1, 7, 's');
>> fir(coeffs_fp, x)
ans =
    0.1016
```

As you can see, the conversion was easy, but the answer in the fixed-point case is 5 times larger than the correct answer—not what we'd expect given the input data and simple coefficients. Turning on the warnings, it's easy to find the answer:

```
>>fxp_warn_mode('all');
>>fir(coeffs_fp, x)
Warning: Overflow detected.
ans =
    0.1016
```

Using the Matlab debugger to stop on warnings, it's easy to find the problem—the length of x inside the fir function is 4, which overflows and saturates at essentially 1 when converted into an fxp(1,7), causing the answer to be 4 times too big. This hypothesis can easily be verified by increasing the number of bits on the left:

```
>> coeffs_fp = fxp(coeffs, 4, 7, 's');
>> fir(coeffs_fp, x)
ans =
    0.0234
``` and we see the expected answer. However, we see we have an odd number of bits in the fxp, which is not desirable, so we see if we can reduce it to a total of 8.

```
>> coeffs_fp = fxp(coeffs, 4, 4, 's');
>> fir(coeffs_fp, x)
ans =
    0.0625
```

As we expected, we cannot. While the coefficients can be exactly represented with 4 bits to the right of the decimal place, the data (0.1) has too much error:

```
>> fxp(0.1, 4, 4, 's')
ans =
    0.1250
```

Given that we need the bits on precision on the right, the simplest fix is to slightly modify our original fir function, eliminating the overflow:

function $y = fir(c, x)$ $y = dot(c, x) * (1/length(x));$

By doing the division in double precision, we keep our number within our scaling, and going back to our original fxps, we will get an exact answer:

```
>> coeffs_fp = fxp(coeffs, 1, 7, 's');
>> fir(coeffs_fp, x)
ans =
    0.0234
```

Usage Tips

In general, converting a working double precision program into fixed-point is extremely simple and straightforward using the FxP Toolbox. Because types propagate forward naturally in Matlab, converting a program generally requires the insertion of only a few fxp or cfxp constructors on variables at the beginning of the program. However, there are a few common "gotchas" that often tend to arise. Following are a few of the common pratfalls, as well as guidance on how to detect and avoid them 1. Convert whole arrays to fxps, not individual elements. Oftentimes, a vector or matrix in Matlab is built up using assignments to its elements:

```
for i=1:10
    a(i) = cos(i);
end
```

This is not good Matlab practice in general (the Matlab documentation also strongly recommends against it), as creating an array by dynamically extending its length during each iteration of a loop leads to very slow execution. That aside, one's first instinct for converting "a" into an fxp is to do the following:

```
for i=1:10
    a(i) = fxp(cos(i), ...);
end
```

This in fact, will not work. Before assigning into a double-precision array, Matlab converts any values found on the right hand side of an assignment into doubles. As a result, the code first converts the cos into an fxp, then immediately converts it back into a double, leaving "a" as a double. A better and also more efficient way to convert "a" is

```
for i=1:10
    a(i) = cos(i);
end
a = fxp(a, ...);
```

Convert whole arrays where possible; it's faster and more likely to produce the result you want.

2. Beware the use of "zeros" and "ones". In examples like the previous one, MathWorks strongly recommends that you use the "zeros" function to initialize "a" prior to the loop to avoid the extensible array:

```
a = zeros(10);
for i=1:10
    a(i) = cos(i);
end
```

This is good practice and Catalytic strongly recommends it. However, it is also important to be aware that when converting double-precision programs to fixed-point, the use of "zeros" and "ones" are often the source of unexpected errors in the conversion. Consider the following variation on the previous loop

```
a = zeros(10);
for i=1:10
    a(i) = b(i) + c(i);
end
``` where "b" and "c" are fxp input parameters. Again, it is easy to expect that "a" would automatically be converted into fxp because of the assignment of the fxp value into it. In fact, it would not; the previous assignment of "zeros" sets "a" as double precision, and it retains that setting through the assignment. This problem is averted by inserting an fxp assignment after the zeros:

```
a = zeros(10);
a = fxp(a, ...);
for i=1:10
    a(i) = b(i) + c(i);
end
```

So long as values flow strictly from input parameters that have been set to fxps, programs convert straightforwardly into fixed-point. The most common construct that blocks such a flow is the definition of a variable via "zeros" or "ones"—not just as in this context, but several others as well. Such a blockage can be insidious to find, because it causes future arithmetic to be done in double precision, rather than in fixed-point. This causes your answer to look exactly as you hope. As a result, it is good to check every use of "zeros" and "ones" in your program when converting, to ensure that you do not accidentally introduce double precision arithmetic.

3. "Function not defined for variables of class fxp". Matlab provides a rich set of library functions, and while the FxP Toolbox provides support for a large number of them (and in particular, the ones most interesting in signal processing applications), it does not support them all. If you should get a message "Function not defined for variables of class fxp", it means that you've called a function not supported by the toolbox, and you'll need to work around that or create your own version of the function.

Current Limitations

The Catalytic Fixed-Point Library implements all the operators and functions listed in sections "Supported Operators" and "Supported Functions"; more are being added over time. Any user function or Matlab function that uses only these operators or functions will convert automatically to fixed-point operation by simply passing in a vector containing fixed point. For instance, the following simple fir function:

function $y=fir(a)$ $y=(1.5*a(1)+1.0125*a(2)+1.03125*a(3)+1.007750*a(4))/4;$ will work correctly when passed a vector of fixed-point numbers as well as when passed a vector of double precision numbers. The coefficients will automatically be converted to the same precision as the fixed-point numbers by the package. This allows for an easy way of minimizing the number of bits required while maintaining required error tolerances. For instance, given the simple input sequence a=[1 2 3 4], the following loop:

```
for i=8:-1:0
    b = fxp(a, 4, i, 's']);
    c = fir(a);
    d = fir(b);
    e = abs(c – double(d));
    disp([ ' Error at size ' num2str(i) ' is ' num2str(e)]);
end
``` will produce

Error on size 8 is 0.00032813
Error on size 7 is 0.001625
Error on size 6 is 0.0061875
Error on size 5 is 0.014
Error on size 4 is 0.0094375
Error on size 3 is 0.037438
Error on size 2 is 0.037438
Error on size 1 is 0.037438
Error on size 0 is 0.087562 showing the increase in error as the number of bits of precision drop off. The coefficients were chosen to be $1/(2^i)$ for i=1,3,5,7, showing the error increases across those boundaries.

Despite this effort, not all functions will transparently run on fixed-point numbers. Functions that use Matlab built-ins or that use functions relying on other operators or built-in functions will not run when passed a fixed-point number. For example, the DCT example in the section "Getting Started" will not run with the package as is because the "dct" program calls a built-in function for "fft", and that fft did not know how to handle fixed-point. The program ran only after we filled in our own fft computation. Catalytic is currently filling out all the built-in functions required to run the Signal Processing Toolbox, the Communications Toolbox, and the DSP Toolbox.

The fixed-point library does not currently support mixed mode arithmetic. That is, two operands must have the same number of bits to the left of the decimal and the same number of bits to the right of the decimal, or the package issues an error. This restriction was put in primarily for decreasing the time of getting a prototype up for use, and will be removed shortly, so that any precision numbers may be combined. Even as is, this limitation is primarily annoying only on multiply-accumulates, since the multiply step produces a result twice as big as the accumulator, requiring a conversion to step it back down.

Longer term, the Catalytic Fixed-Point Library will support a routine "fxp_precision" which allows you to specify the desired precision on specific operators or functions.

Listing of Control Functions

Following is a list of all fxp control functions and their purpose:

1. fxp_init(parms): initializes the fxp package.
2. fxp_rounding_mode(mode): sets the current rounding mode to be one of 'r', 'f', 'c', 't'.
3. fxp_saturate_mode(enable): sets the current arithmetic mode to be either saturation or modulo.
4. fxp_round: set the current rounding mode to be 'r'.
5. fxp_ceil: set the current rounding mode to be 'c'.
6. fxp_floor: set the current rounding mode to be 'f'.
7. fxp_truncate: set the current rounding mode to be 't'.
8. fxp_modulo: set the current arithmetic mode to be modulo.
9. fxp_saturate: set the current arithmetic mode to be saturation.
10. fxp_warn_mode: enable or disable various warning messages.
11. fxp_debug mode: enable or disable extra debugging output.
12. fxp_short_mode: cause multiplicative operators to give abbreviated (same size as input) or complete precision to results.
13. fxp_prototype_mode: cause library functions to be invoked in prototype mode (the routines are executed in double precision; the result is converted to an fxp) or in implementation mode (the routines are executed in fixed-point).
14. fxp_good_size: cause the input sizes to be viewed as valid sizes for a result to have with respect to size warnings.
15. fxp_bad_size: causes the input sizes to be viewed as invalid sizes for results with respect to size warnings.
16. fxp_real_mode: when enabled, the system assumes that outputs of transcendental functions taking fxps as input are real and never complex.

The invention claimed is:

1. In a computer comprising a memory and a floating point unit, a method implemented in a set of instructions executable by said computer, the method comprising:
   said computer receiving a program, a portion of said program comprising an operand (hereinafter "fixed-point operand") represented in a fixed-point representation;

wherein said fixed-point operand has at least one property selected from a group consisting of (signedness, precision, complexness);

said computer expanding said fixed-point operand into a floating-point representation to obtain a floating-point equivalent;

said computer storing a precision of the fixed-point operand;

said computer further receiving in said portion an instruction comprising an operation to be performed on the fixed-point operand by a fixed point processor;

said computer using said floating point unit to perform on the floating-point equivalent, at least one floating-point operation that corresponds to the fixed-point operation, yielding at least one floating-point result;

said computer reducing said at least one floating-point result generated by the floating-point operation into a fixed-point result;

said computer using the stored precision during reduction of the floating-point result into the fixed-point result; and said computer displaying said fixed-point result to a user to enable said portion of said program to be debugged without use of said fixed point processor.

2. The method of claim 1 wherein:
said fixed-point operand is one of at least two fixed-point operands to be used by said instruction; and
said expanding comprises normalization of at least said fixed-point operand if said fixed-point operand has said property of a value different from another value of said property of another operand to be used by said instruction.

3. The method of claim 1 wherein:
said instruction is to use two operands, with
said fixed-point operand as a first operand, and another fixed-point operand as a second operand; and
said first operand has a property of a first value and the second operand has said property of a second value different from said first value, said expanding comprises normalization of at least one fixed-point operand to have a common value for said property, said common value being one of the first value and the second value.

4. The method of claim 1 wherein:
the fixed-point result has said value of at least said one property.

5. The method of claim 1 further comprising:
said computer determining a property value for the fixed-point result, based on said at least one property value of the fixed-point operand, said fixed-point result being displayed to said user based on said property value from said determining.

6. The method of claim 1 comprising:
said computer determining a property value for the corresponding fixed-point result, based on the instruction that was performed on the fixed-point operand.

7. The method of claim 1 wherein:
the fixed-point representation includes the value of the fixed-point number in memory in floating-point representation.

8. The method of claim 1 wherein:
the fixed-point representation includes a value in memory to represent the signedness property.

9. The method of claim 1 wherein:
the fixed-point representation includes a value in memory to represent the complexness property.

10. The method of claim 1 wherein:
the fixed-point representation uses at least two locations in memory to store a precision of the value.

11. The method of claim 1 wherein:
the fixed-point representation includes a value in memory to represent a scaling factor for the fixed-point number.

12. The method of claim 1 wherein during reduction of the floating-point result to the fixed-point result, the method comprises:
said computer using a predetermined storage element to identify a mode of rounding to be performed on the floating-point result, wherein the mode of rounding is one of: round (round-to-nearest), fix (round towards zero), cell (round towards positive infinity), and floor (round towards negative infinity), and said computer performing said rounding, and said fixed-point result being displayed after said rounding is performed.

13. The method of claim 1 wherein during reduction of the floating-point result into the corresponding fixed-point result, the method comprises:
said computer using a predetermined storage element to identify a kind of arithmetic to be performed on the floating-point result, wherein the kind of arithmetic is one of: saturation and modulo.

14. The method of claim 1 wherein:
said fixed-point representation is hereinafter "first fixed-point representation";
the fixed-point result is expressed in a second fixed-point representation which is different from the first fixed-point representation; and
the method further comprises said computer using a predetermined storage element in said memory to identify a property of the second fixed-point representation, said fixed-point result being displayed to said user in said second fixed-point representation.

15. The method of claim 14 wherein:
said property of the second fixed-point representation is precision.

16. The method of claim 14 wherein:
said property of the second fixed-point representation is signedness.

17. The method of claim 14 wherein:
said property of the second fixed-point representation is complexness.

18. The method of claim 14 wherein said fixed-point operand comprises:
a value of a scaling factor of said fixed-point number.

19. The method of claim 14 wherein:
said fixed-point operand comprises a plurality of additional floating-point values; and
said fixed-point operand is a vector operand.

20. The method of claim 14 wherein said property of the second fixed-point representation comprises at least two of:
a number of bits to the left of a point in the fixed-point number;
a number of bits to the right of said point in the fixed-point number; and
a total number of bits in the fixed-point number.

21. The method of claim 14 wherein at least one location in said memory of said computer encoded with said floating-point value of said fixed-point number holds a real component of said fixed-point number, said memory further comprising:
at least one additional location for holding a complex component of said fixed-point number.

22. The method of claim 1 wherein during expansion of the fixed-point operands into floating-point equivalents, the method comprises:

said computer detecting that the operands are invalidly scaled and issuing a warning message displayed to said user based on a predetermined storage element.

23. The method of claim 1 further comprising:
said computer using at least the precision of the fixed-point operand. during emulation of another instruction that uses a result of the fixed-point arithmetic operation.

24. The method of claim 1 wherein:
the floating-point representation conforms to an IEEE Standard for floating-point arithmetic.

25. The method of claim 1 wherein the instruction is to be performed on said fixed-point operand and at least an additional floating-point operand, and the fixed-point arithmetic operation is to be performed on the fixed-point operand and said additional floating-point operand, and the method further comprises:
during the act of receiving said floating-point operand, said computer reducing said additional floating-point operand into fixed-point representation, based on the precision of the fixed-point operand.

26. The method of claim 25 wherein:
reduction of the floating-point operand into said fixed-point representation is based on said property of the fixed-point operand.

27. The method of claim 26 wherein said fixed-point operand comprises:
a value of a scaling factor of said fixed-point number.

28. The method of claim 26 wherein said fixed-point operand comprises:
a plurality of floating-point values; and
said fixed-point operand is a vector operand.

29. The method of claim 26 wherein said property comprises at least two of:
a number of bits to the left of a point in the fixed-point number;
a number of bits to the right of said point in the fixed-point number; and
a total number of bits in the fixed-point number.

30. The method of claim 26 wherein at least one location in said memory of said computer encoded with said floating-point value of said fixed-point number holds a real component of said fixed-point number, said memory further comprising:
at least one additional location for holding a complex component of said fixed-point number.

31. The method of claim 26 wherein:
said property is precision.

32. The method of claim 26 wherein:
said property is signedness.

33. The method of claim 26 wherein:
said property is complexness.

34. The method of claim 1 wherein said fixed-point operand comprises:
a value of a scaling factor of said fixed-point number.

35. The method of claim 1 wherein:
said fixed-point operand comprises a plurality of floating-point values; and
said fixed-point operand is a vector operand.

36. The method of claim 1 wherein said property comprises at least two of:
a number of bits to the theft of a point in the fixed-point number;
a number of bits to the right of said point in the fixed-point number; and
a total number of bits the fixed-point number.

37. The method of claim 1 wherein at least one location in said memory of said computer encoded with said floating-point value of said fixed-point number holds a real component of said fixed-point number, said memory further comprising:
at least one additional location for holding a complex component of said fixed-point number.

38. The method of claim 1 wherein:
said computer displays during said displaying, a value of a variable in said portion of said program.

39. The method of claim 1 wherein:
said computer displays during said displaying, a property of a variable in said portion of said program.

40. The method of claim 1 wherein:
said computer evaluates an operation on a variable in said portion of said program arid during said displaying displays a result of evaluation of said operation.

41. The method of claim 1 wherein:
said computer evaluates an operation on a variable in said portion of said program and during said displaying displays a property of a result of evaluation of said operation 42. The method of claim 1 wherein:
said set of instructions are implemented in an interpreter.

43. The method of claim 1 wherein:
a warning is displayed by said set of instructions.

44. A method implemented in a set of instructions executable by a computer that comprises a floating point unit, the method comprising:
said computer receiving receiving a program, at least a portion of said program being written for execution on a fixed point processor, said fixed point processor being not available for execution of said program, said portion of said program comprising at least one operand represented in fixed-point representation (hereinafter "fixed-point operand"), said fixed-point operand having at least one property selected from a group consisting of (signedness, precision, complexness);
said computer expanding said fixed-point operand into a floating-point representation to obtain a floating-point equivalent;
said computer receiving an instruction comprising an operation to be performed on the fixed-point operand;
said computer receiving another instruction that indicates a type of said fixed-point operand;
wherein said another instruction comprises a call to a function;
said computer using said floating point unit to perform on the floating-point equivalent, at least one floating-point operation that corresponds to the fixed-point operation, yielding at least one floating-point result;
said computer reducing, based on a value of said at least one property, said at least one floating-point result generated by the floating-point operation into a fixed-point result; and
said computer displaying the fixed point result and receiving instructions for debugging said portion of said program without use of the fixed point processor.

45. The method of claim 44 wherein:
said function comprises instantiation of an object of a predetermined class, the object comprising said floating-point equivalent and at least one property of said fixed-point operand.

46. The method of claim 45 wherein each fixed-point operand comprises:
a value of a scaling factor of said fixed-point number.

47. The method of claim 45 wherein:
said fixed-point operand further comprises a plurality of additional floating-point values; and said values of said properties are identical for each of said additional floating-point values, and said fixed-point operand is a vector operand.

48. The method of claim 45 wherein said property comprises at least two of:
a number of bits to the left of a point in the fixed-point number;
a number of bits to the right of said point in the fixed-point number; and
a total number of bits in the fixed-point number.

49. The method of claim 45 wherein at least one location in a memory of said computer is encoded with said floating-point value of said fixed-point number and hold a real component of said fixed-point number, the memory further comprising:
at least one additional memory location for holding a complex component of said fixed-point number.

50. The method of claim 44 wherein:
the fixed-point operand is a real number;
the method further comprises said computer receiving another indication via another function name that a complex number is to be expressed in fixed-point representation; and
on receipt of an imaginary part and a real part of the complex number, said computer expanding each part into a corresponding floating-point equivalent.

51. A method implemented in a set of instructions executable by a computer that comprises a floating point unit, the method comprising:
said computer receiving receiving a program, at least a portion of said program being written for execution on a fixed point processor, said fixed point processor being not available for execution of said program, said portion of said program comprising at least one operand represented in fixed-point representation (hereinafter "fixed-point operand"), said fixed-point representation having a precision identifying a first plurality of bits on a left side of a point and a second plurality of bits on a right side of said point;
said computer expanding said fixed-point operand into a floating-point representation to obtain a floating-point equivalent;
said computer receiving in said program an instruction comprising an operation to be performed on the fixed-point operand;
wherein said instruction comprises overloading of an operator normally used to denote said corresponding floating-point operation;
said computer using said floating point unit to perform on the floating-point equivalent, at least one floating-point operation that corresponds to the fixed-point operation, yielding at least one floating-point result;
said computer reducing, based said precision, said at least one floating-point result generated by the floating-point operation into a fixed-point result; and
said computer displaying the fixed point result and receiving instructions for debugging said portion of said program without use of the fixed point processor.

52. The method of claim 51 wherein said fixed-point operand comprises:
a value of a scaling factor of said fixed-point number.

53. The method of claim 51 wherein:
said fixed-point operand comprises a plurality of floating-point values; and
said fixed-point operand is a vector operand.

54. The method of claim 51 wherein said property comprises at least two of:
a number of bits to the left of a point in the fixed-point number;
a number of bits to the right of said point in the fixed-point number; and
a total number of bits in the fixed-point number.

55. The method of claim 51 wherein at least one location in said memory of said computer encoded with said floating-point value of said fixed-point number holds a real component of said fixed-point number, said memory further comprising:
at least one additional for holding a complex component of said fixed-point number.

56. In a computer comprising a floating point unit, a method implemented in a set of instructions executable by said computer, the method comprising:
said computer receiving at least one operand represented in fixed-point representation (hereinafter "fixed-point operand");
said computer expanding said fixed-point operand into a floating-point representation to obtain a floating-point equivalent;
said computer receiving an instruction comprising a fixed-point operation to be performed on the fixed-point operand by a fixed point processor;
said computer using said floating point unit to perform on the floating-point equivalent, at least one floating-point operation that corresponds to the fixed-point operation, yielding at least one floating-point result;
said computer reducing said at least one floating-point result generated by the floating-point operation into a fixed-point result; and
said computer displaying said fixed-point result and receiving instructions to debug a portion of a program comprising said fixed-point operand and said fixed-point operation without use of said fixed-point processor;
wherein if the fixed-point operation is specified as saturation arithmetic and if said floating-point result is a vector or array, said act of reducing comprises:
said computer setting a maximum value and a minimum value for a fixed-point result to be obtained from reducing the floating-point result generated by the floating-point operation, based on the precision and signedness of at least said fixed-point operand;
said computer replacing any negative numbers in the floating-point result with zero;
said computer replacing any numbers in the floating-point result that are greater than the maximum value with the maximum value;
said computer replacing any numbers in the floating-point result that are less than the minimum value with the minimum value.

57. The method of claim 56 wherein if a rounding mode is specified as round, the act of reducing further comprises:
subsequent to performance of said act of setting, rounding the floating-point result.

58. The method of claim 56 wherein said fixed-point operand comprises:
a value of a scaling factor of said fixed-point number.

59. The method of claim 56 wherein:
said fixed-point operand comprises a plurality of floating-point values; and
said fixed-point operand is a vector operand.

60. The method of claim 56 wherein said property comprises at least two of:
a number of bits to the left of a pointing the fixed-point number;
a number of bits to the right of said point in the fixed-paint number; and
a total number of bits in the fixed-point number.

61. The method of claim 56 wherein at least one location in said memory of said computer encoded with said floating-point value of said fixed-point number holds a real component of said fixed-point number, said memory further comprising:
at least one additions location for holding a complex component of said fixed-point number.

62. A computer-implemented method implemented in a set of instructions, the computer-implemented method comprising:
receiving a program, at least a portion of said program being written for execution on a fixed point processor, said fixed point processor being not available for execution of said program, said portion of said program comprising at least one operand representing a real number expressed in fixed-point representation (hereinafter "fixed-point operand"), said fixed-point representation having a precision identifying a first plurality of bits on a left side of a point and a second plurality of bits on a right side of said point;
said computer expanding said fixed-point operand into a floating-point representation to obtain a floating-point equivalent, said expanding comprising storing in said memory said precision of said fixed-point operand;
said computer further receiving in said portion of said program an instruction to be performed on the fixed-point operand;
said computer using said floating point unit to perform on the floating-point equivalent, at least one floating-point operation that corresponds to the fixed-point operation, yielding at least one floating-point result;
said computer reducing based on kind of said instruction received, said at least one floating-point result generated by the floating-point operation into a fixed-point result; and
said computer displaying said fixed-point result to a programmer to enable said portion of said program to be debugged without use of said fixed point processor.

63. The method of claim 62 wherein:
said instruction including an operator and said act of reducing is based on said operator.

64. A computer readable memory encoded with a plurality of objects, each object representing at least one fixed-point number, each object being encoded in a plurality of locations comprising:
a first location encoded with a value of a signedness property of said fixed-point number;
a second location encoded with a value of a complexness property of said fixed-point number;
a plurality of location encoded with values of subproperties of a precision property of said fixed-point number; and
at least one location encoded with a floating-point value of said fixed-point number;
wherein the memory further comprises instructions that cause a computer to operate floating point hardware to use said floating-point value and display a result of said use thereby to help in debugging at least a portion of a program without use of a fixed point processor.

65. The memory of claim 64 wherein each object further comprises:
a third value of a scaling factor of said fixed-point number.

66. The memory of claim 64 wherein at least one object in said plurality further comprises:
a plurality of additional floating-point values;
wherein said values of said properties are identical for each of said additional floating-point values, and at least one object represents a vector operand.

67. The memory of claim 64 wherein said precision property comprises:
a number of bits to the left of a point in the fixed-point number as a subproperty.

68. The memory of claim 67 wherein said precision property further comprises:
a total number of bits in the fixed-point number as another subproperty.

69. The memory of claim 64 wherein said precision property further comprises:
a number of bits to the right of a point in the fixed-point number as a subproperty.

70. The memory of claim 64 wherein said at least one location encoded with said floating-point value of said fixed-point number holds a real component of said fixed-point number, the memory further comprising:
at least one additional memory location for holding a complex component of said fixed-point number.

71. The memory of claim 64 wherein:
a value of a variable in said portion of said program is displayed by said instructions.

72. The memory of claim 64 wherein:
a property of a variable in said portion of said program is displayed by said instructions.

73. The memory of claim 64 wherein:
said instructions evaluate an operation on a variable in said portion of said program and said results from evaluation of said operation.

74. The memory of claim 73 wherein:
a property of said result is displayed by said instructions.

75. The memory of claim 64 wherein:
said instructions are implemented in an interpreter.

76. The memory of claim 64 wherein:
a warning is displayed by said instructions.

77. A memory encoded with a plurality of objects, each object representing at least one fixed-point number, each object being encoded in a plurality of locations comprising:
a first location encoded with a value of a signedness property of said fixed-point number;
a second location encoded with a value of a complexness property of said fixed-point number;
a plurality of locations encoded with values of subproperties of a precision property of said fixed-point number; and
at least one location encoded with a floating-point value of said fixed-point number;
wherein said precision property further comprises a number of bits to the right of said point in the fixed-point umber as another subproperty;
wherein the memory further comprises a program written for execution on a fixed point processor, said fixed point processor being not available for execution of said program, said program comprising instructions to:
use floating-point hardware on the floating-point value in said at least one location to generate a floating-point result; and
display said fixed-point result to a user by use of at least said precision property to enable at least a portion of said program to be debugged without use of said fixed point processor.

78. The memory of claim 77 wherein each object further comprises:
a third value of a scaling factor of said fixed-point number.

79. The memory of claim 77 wherein at least one object in said plurality further comprises:
- a plurality of addition floating-point values;
- wherein said values of said properties are identical for each of said additional floating-point values, and said at least one object represents a vector operand.

80. The memory of claim 77 wherein said precision property comprises at least two of:
- a number of bits to the left of a point in the fixed-point number;
- a number of bits to the right of said point in the fixed-point number; and
- a total number of bits in the fixed-point number.

81. A computer that supports floating-point arithmetic, the computer comprising:
- means (hereinafter "receiving means") for receiving and storing in a memory of said computer a program written for execution on a fixed point processor, said fixed point processor being not available for execution of said program, said program comprising at least one operand represented in fixed-point representation (hereinafter "fixed-point operand"), said fixed-point operand having at least one property selected from a group consisting of (signedness, precision, complexness);
- means, coupled to said receiving means, for expanding said fixed-point operand into a floating-point representation to obtain a floating-point equivalent;
- said program in said memory comprising a fixed-point operation to be performed on the fixed-point operand;
- a floating point unit coupled to the means for expanding to receive therefrom the floating-point equivalent and to generate at least one floating-point result by performance of at least one floating-point operation that corresponds to the fixed-point operation;
- means for reducing said at least one floating-point result generated by the floating-point operation into a fixed-point result; and
- means for displaying the fixed-point result and receiving instructions for debugging said program without use of the fixed point processor;
- wherein said memory is coupled to each of said means and said floating point unit, said memory being encoded with a plurality of objects, at least one object representing at least said fixed-point operand, said object being encoded in a plurality of locations comprising:
- a first location encode with a value of a signedness property of said fixed-point operand;
- a second location encode with a value of a complexness property of said fixed-point operand;
- a group of locations encoded with values of subproperties of a precision property of said fixed-point operand; and
- at least one location encoded with a floating-point value of said fixed-point operand.

82. The computer of claim 81 wherein:
- a location in said plurality of locations is encoded with a value of a scaling factor.

83. The computer of claim 81 wherein:
- said fixed-point operand comprises a plurality of floating-point values; and
- said fixed-point operand is a vector operand.

84. The computer of claim 81 wherein said property comprises at least two of:
- a number of bits to the left of a point in the fixed-point number;
- a number of bits to the right of said point in the fixed-point number; and
- a total number of bits in the fixed-point number.

85. In a computer, a method implemented in a set of instructions executable by said computer, the method comprising:
- said computer receiving a program, at least a portion of said program being written for execution on a fixed point processor, said fixed point processor being not available for execution of said program, said portion of said program comprising at least one operand representing a real number expressed in fixed-point representation (hereinafter "fixed-point operand"), said fixed-point representation having a precision identifying a plurality of first bits of the fixed-point operand on a first side of a point and a plurality of second bits of the fixed-point operand on a second side of the point;
- said computer adding to said program a sequence of instructions to expand said fixed-point operand into a floating-point representation to obtain a floating-point equivalent, said sequence comprising an instruction to store in said memory said precision of said fixed-point operand;
- said computer adding said program at least a first instruction to use a floating point unit to perform on the floating-point equivalent, at least one floating-point operation that corresponds to the fixed-point operation, to yield at least one floating-point result;
- said computer adding to said program at least a second instruction to reduce, based on said precision, said at least one floating-point result generated by the floating-point operation into a fixed-point result; and
- said computer displaying said fixed-point result and receiving instructions for debugging said program without use of said fixed point processor.

* * * * *